US012507913B2

(12) United States Patent
Fall et al.

(10) Patent No.: US 12,507,913 B2
(45) Date of Patent: Dec. 30, 2025

(54) APPARATUSES, SYSTEMS, AND METHODS OF IMPROVING PATCH PERFORMANCE FOR A MEDICAL DEVICE

(71) Applicant: DexCom, Inc., San Diego, CA (US)

(72) Inventors: Scott Alexander Fall, San Diego, CA (US); John Charles Barry, San Diego, CA (US); Sean Akio Collignon, San Diego, CA (US); David Gennrich, Fitchburg, WI (US); Andrew Joncich, Madison, WI (US); Randall Scott Koplin, Middleton, WI (US); Morgan Alexander Robinson, San Diego, CA (US); Jeffrey James Smith, San Diego, CA (US); Warren M. Terry, Poway, CA (US); Nicole Marie Weikert, La Jolla, CA (US)

(73) Assignee: DexCom, Inc., San Diego, CA (US)

( * ) Notice: Subject to any disclaimer, the term of this patent is extended or adjusted under 35 U.S.C. 154(b) by 535 days.

(21) Appl. No.: 17/956,703

(22) Filed: Sep. 29, 2022

(65) Prior Publication Data

US 2023/0115454 A1   Apr. 13, 2023

Related U.S. Application Data

(60) Provisional application No. 63/261,910, filed on Sep. 30, 2021.

(51) Int. Cl.
*A61B 5/00* (2006.01)
*A61B 5/145* (2006.01)

(52) U.S. Cl.
CPC ........ *A61B 5/14503* (2013.01); *A61B 5/0002* (2013.01); *A61B 5/6833* (2013.01); *A61B 5/68335* (2017.08); *A61B 5/6849* (2013.01); *A61B 5/14532* (2013.01); *A61B 2560/0412* (2013.01)

(58) Field of Classification Search
CPC .......... A61B 2560/0412; A61B 5/0002; A61B 5/14503; A61B 5/14532; A61B 5/6833; A61B 5/68335; A61B 5/6849
See application file for complete search history.

(56) References Cited

U.S. PATENT DOCUMENTS

| 7,129,389 B1 | 10/2006 | Watson |
| 2008/0154205 A1 | 6/2008 | Wojcik |
| 2009/0048563 A1 | 2/2009 | Ethelfeld et al. |
| 2014/0088389 A1 | 3/2014 | Simpson et al. |

(Continued)

FOREIGN PATENT DOCUMENTS

| EP | 3771429 A1 * | 2/2021 | ......... A61B 5/14503 |
| WO | WO-2007140785 A1 | 12/2007 | |
| WO | WO-2014179343 A1 | 11/2014 | |

OTHER PUBLICATIONS

International Search Report and Written Opinion for Application No. PCT/US2022/045262 mailed Apr. 17, 2023, 20 pages.

*Primary Examiner* — Scott Luan
(74) *Attorney, Agent, or Firm* — Snell & Wilmer LLP

(57) ABSTRACT

The present embodiments relate generally to apparatuses, systems, and methods for deploying a medical device to skin of a host. The apparatuses, systems, and methods may be directed to removing a liner for a medical device so that the medical device may couple to the skin of the host. The medical device may comprise an on-skin wearable medical device.

24 Claims, 82 Drawing Sheets

(56) References Cited

U.S. PATENT DOCUMENTS

2016/0058380 A1    3/2016   Lee et al.
2019/0076069 A1    3/2019   Lin et al.
2022/0202366 A1    6/2022   Mitchell et al.

* cited by examiner

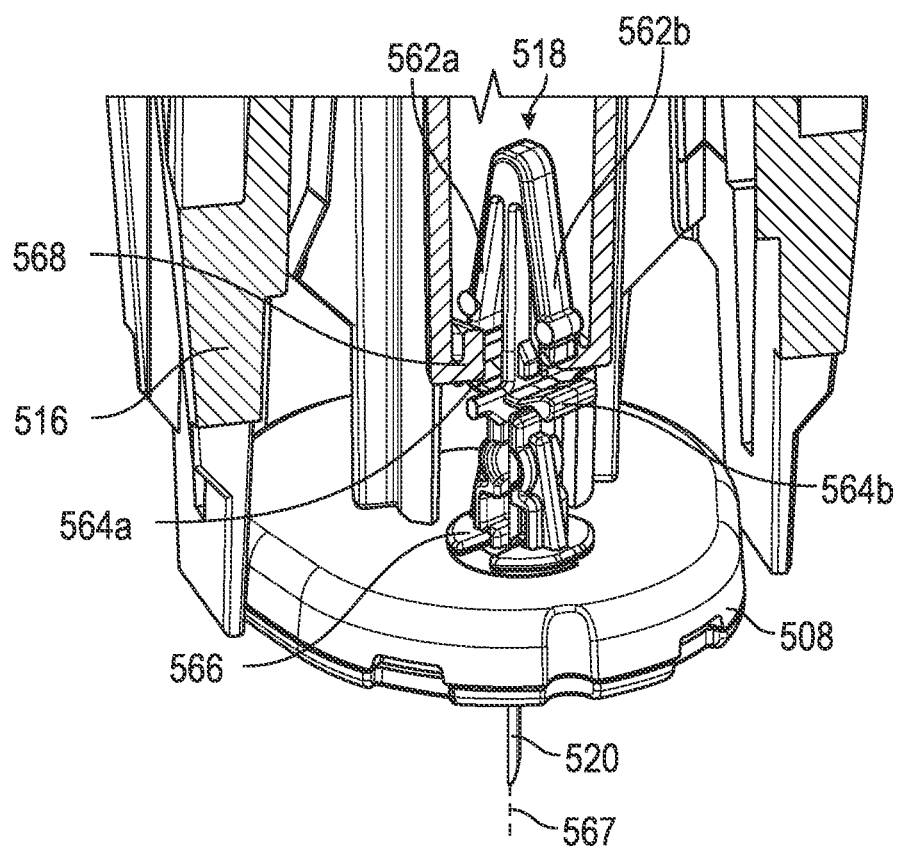
FIG. 17
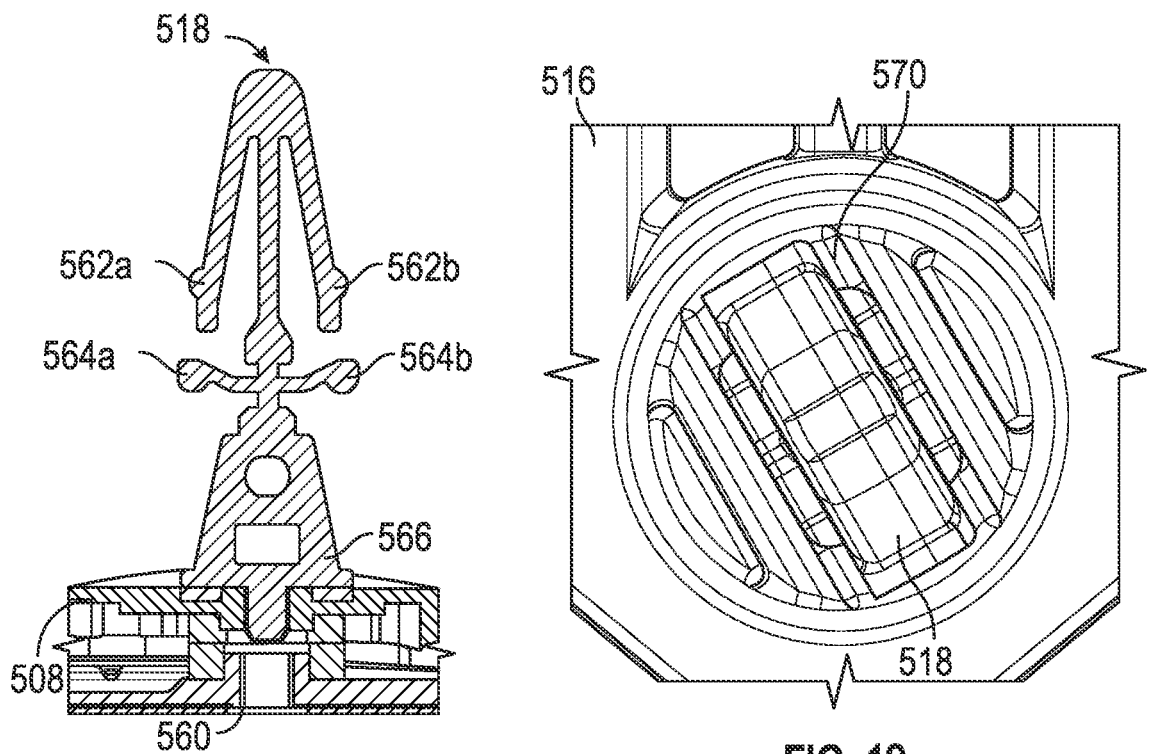
FIG. 18
FIG. 19

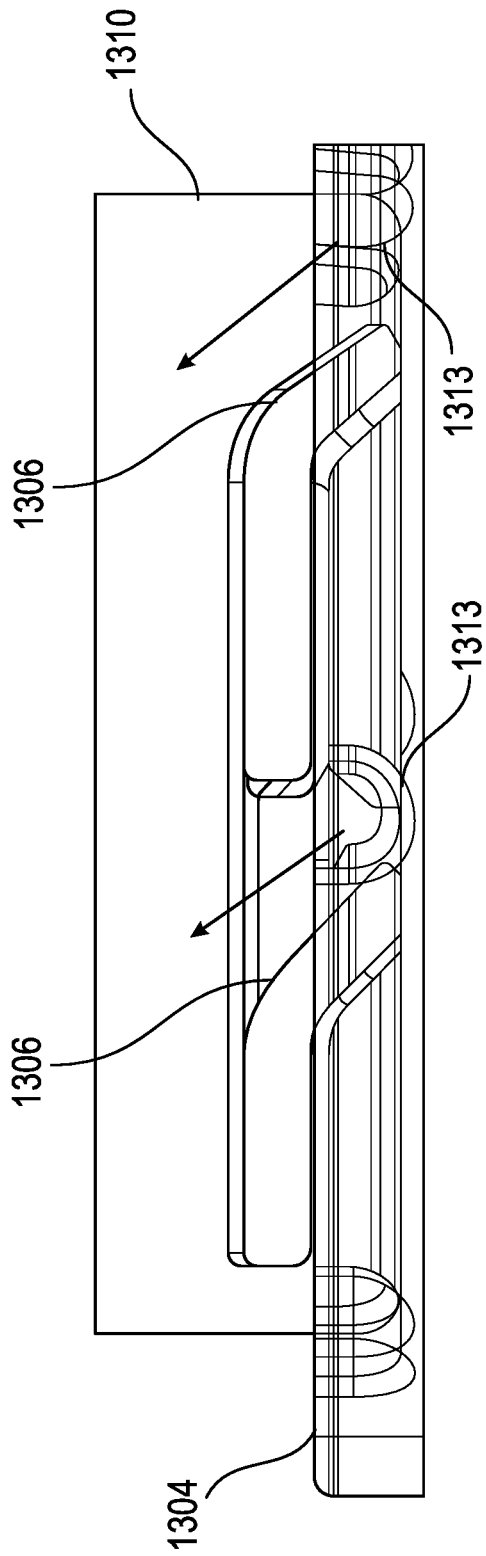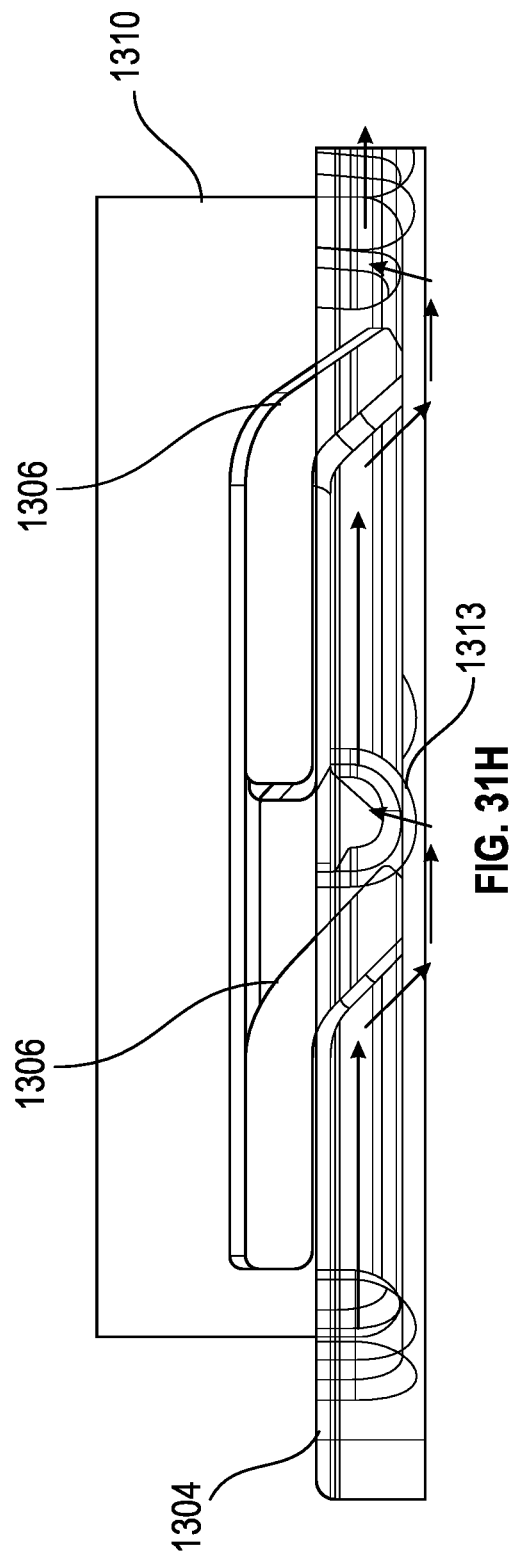

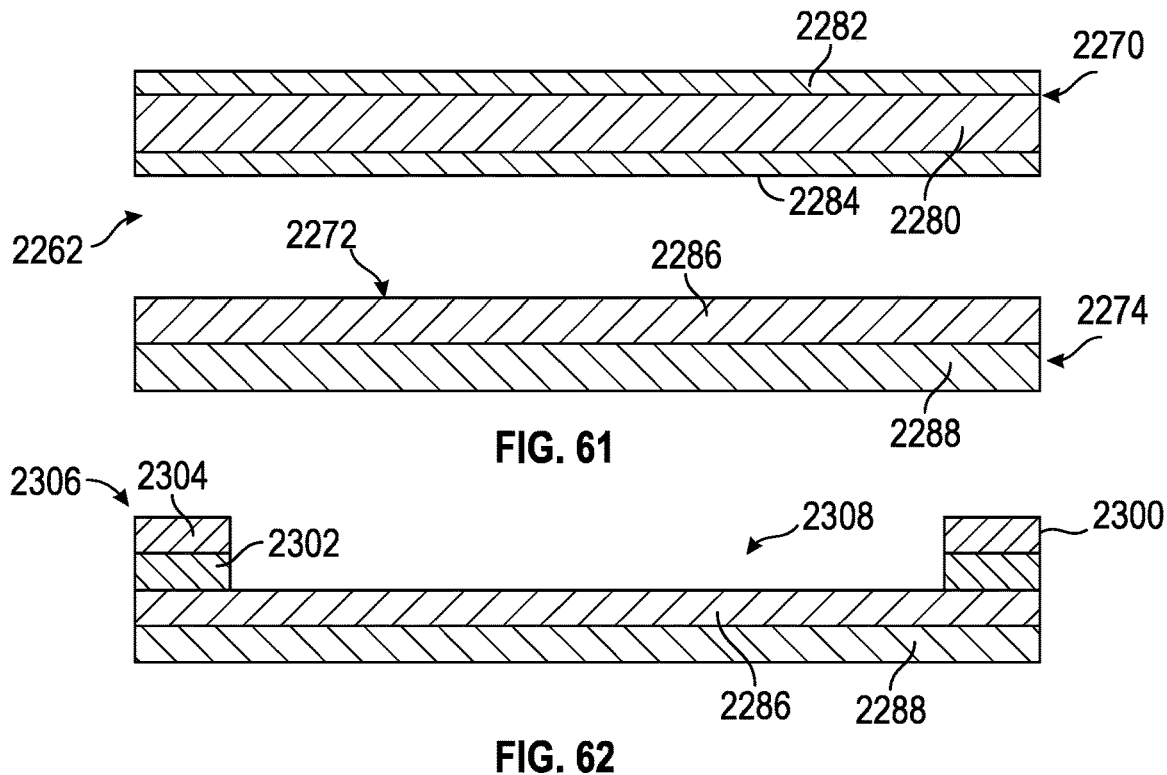
FIG. 61
FIG. 62
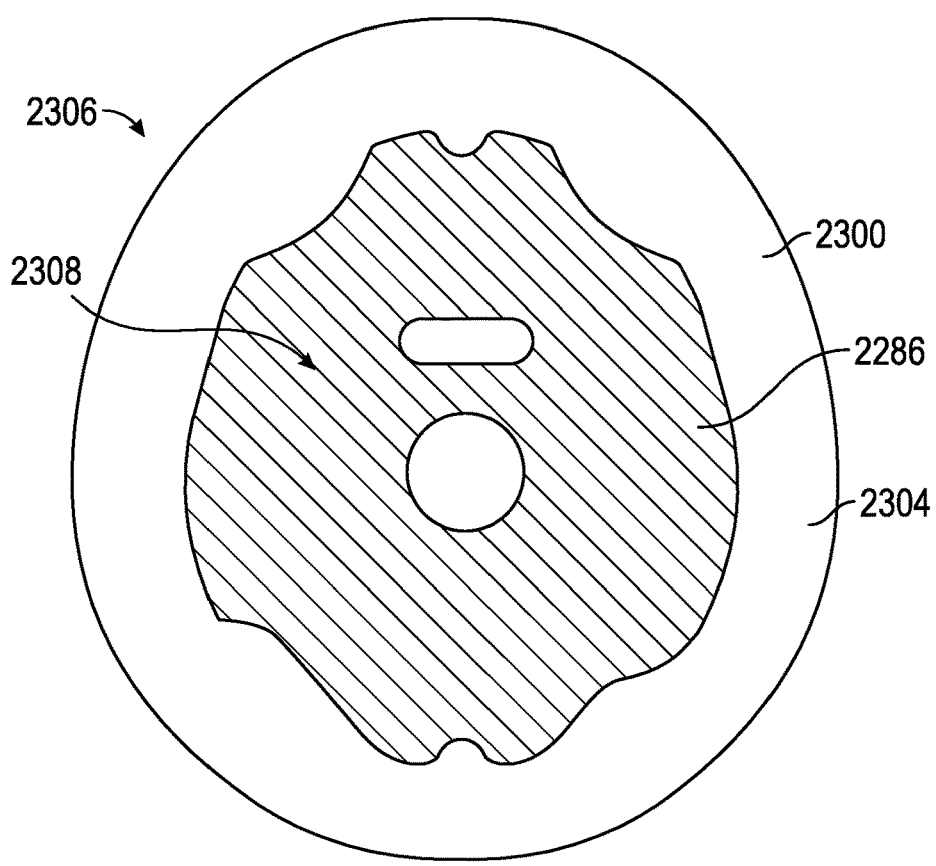
FIG. 63

APPARATUSES, SYSTEMS, AND METHODS OF IMPROVING PATCH PERFORMANCE FOR A MEDICAL DEVICE

CROSS REFERENCE TO RELATED APPLICATIONS

This application claims the benefit of U.S. Provisional Application No. 63/261,910, filed Sep. 30, 2021, the entire contents of which are incorporated by reference herein.

BACKGROUND

Field

Apparatuses, systems, and methods for deploying and attaching a medical device to skin of a host. More particularly, apparatuses, systems, and methods are provided for deploying and attaching a transcutaneous analyte sensor to a host.

Description of the Related Technology

Diabetes mellitus is a disorder in which the pancreas cannot create sufficient insulin (Type 1 or insulin dependent) and/or in which insulin is not effective (Type 2 or non-insulin dependent). In the diabetic state, the victim suffers from high blood sugar, which can cause an array of physiological derangements associated with the deterioration of small blood vessels, for example, kidney failure, skin ulcers, or bleeding into the vitreous of the eye. A hypoglycemic reaction (low blood sugar) can be induced by an inadvertent overdose of insulin, or after a normal dose of insulin or glucose-lowering agent accompanied by extraordinary exercise or insufficient food intake.

Conventionally, a person with diabetes carries a self-monitoring blood glucose (SMBG) monitor, which typically requires uncomfortable finger pricking methods. Due to the lack of comfort and convenience, a person with diabetes normally only measures his or her glucose levels two to four times per day. Unfortunately, such time intervals are spread so far apart that the person with diabetes likely finds out too late of a hyperglycemic or hypoglycemic condition, sometimes incurring dangerous side effects. Glucose levels may be alternatively monitored continuously by a measurement system including an on-skin sensor assembly. The sensor assembly may have a wireless transmitter which transmits measurement data to a receiver which can process and display information based on the measurements.

The process of applying the sensor to the person is important for such a system to be effective and user friendly. The application process should result in the on-skin sensor assembly being attached to the person in a state where it is capable of sensing the analyte (e.g., glucose) level information, communicating the sensed data to the transmitter, and transmitting the analyte level information to the receiver.

Exemplary prior art systems are disclosed in, e.g., U.S. Patent Publication No. 2014/0088389, U.S. Patent Publication No. 2013/0267813, and 2018/0368771, owned by the assignee of the present application and herein incorporated by reference in their entireties.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

The present systems and methods relate to apparatuses, systems, and methods for deploying and attaching a medical device to skin of a host. More particularly, apparatuses, systems, and methods are provided for deploying and attaching a transcutaneous analyte sensor to a host. The various embodiments of the present apparatuses, systems, and methods may have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In a first aspect, a system. The system may comprise an on-skin wearable medical device configured to be deployed to skin and including a patch having a first surface for engaging the skin. The system may comprise a liner positioned on the first surface. The system may comprise an applicator housing configured to retain the on-skin wearable medical device. The system may comprise a liner removal component configured to engage the liner and at least partially decouple the liner from the first surface upon the liner removal component being at least partially withdrawn from the first surface.

Implementations of the embodiments may include one or more of the following. The applicator housing may be configured to be gripped by a user. One or more retention elements may be for releasing the on-skin wearable medical device from the applicator housing. An insertion assembly may be for insertion of at least a portion of the on-skin wearable medical device into the skin. The insertion assembly may include at least one spring for inserting at least a portion of the on-skin wearable medical device into the skin. The insertion assembly may be configured to insert a needle into the skin. A retraction assembly may be for retracting the needle from the skin. The applicator housing may include an internal cavity for retaining the on-skin wearable medical device. The liner removal component may include a body configured to extend axially within the internal cavity. The applicator housing may include an opening at an end portion of the internal cavity for the on-skin wearable medical device to be deployed from. The liner removal component may include a first portion for engaging the liner and a second portion axially spaced from the first portion. The second portion may be configured to be positioned at the opening. The applicator housing may include a distal end portion and a proximal end portion, and the opening is positioned at the distal end portion of the applicator housing, and at least a portion of the liner removal component is configured to extend exterior of the applicator housing from the second portion to a third portion positioned at the proximal end portion of the applicator housing. The liner removal component may include an opening at the third portion configured for the applicator housing to be passed through. A cover may be positioned at the opening at the third portion for covering the applicator housing. The liner removal component may include a first portion for engaging the liner and a second portion that is spaced from the first portion. The second portion may be configured to extend over an outer surface of the applicator housing. The first portion may be configured to rotate relative to the second portion. The second portion may be configured to be separated from the applicator housing. The second portion may be configured to be unscrewed from the applicator housing to at least partially decouple the liner removal component from the applicator housing. The liner removal component may include one or more guides configured to prevent rotation of the first portion relative to the applicator housing upon the second portion rotating relative to the first portion. The one or more guides may be configured to engage an interior surface of the applicator housing to prevent rotation of the first portion relative to the applicator housing. The liner removal component may include one or more bearing surfaces configured to couple the first portion to the second portion. The liner removal component may include one or more bearing surfaces configured to allow for rotation of the first portion relative to the second portion. The liner removal component may include one or more rotation couplers spaced from one or more bearing surfaces with a gap, and the one or more rotation couplers are configured to rotate relative to the one or more bearing surfaces. A rotation of the first portion relative to the second portion may bring the one or more rotation couplers into contact with the one or more bearing surfaces. A first one of the rotation couplers may be configured to contact the one or more bearing surfaces prior to a second one of the rotation couplers. The one or more rotation couplers may include one or more arms. At least a portion of the liner removal component may be configured to be assembled with the one or more arms deflected by the second portion. A grip portion may be positioned at the second portion and configured to be gripped by a user to at least partially withdraw the liner removal component from the first surface of the on-skin wearable medical device. An engagement portion may be positioned at the second portion and configured to engage a portion of the applicator housing to retain the liner removal component to the applicator housing. The engagement portion may be configured to be rotated relative to the applicator housing to release the liner removal component from the applicator housing. A height of the first portion relative to the second portion may be configured to be adjustable. The liner removal component may include a cam surface configured to adjust the height of the first portion relative to the second portion. The liner removal component may include one or more deflectable arms coupling the first portion to the second portion. The one or more deflectable arms may be configured to deflect to adjust the height of the first portion relative to the second portion. The one or more deflectable arms may be arranged in a spiral. The one or more deflectable arms may be configured to deflect to accommodate the liner removal component being coupled to the applicator housing. The liner removal component may comprise a base for the applicator housing. The applicator housing may include an internal cavity for retaining the on-skin wearable medical device, and the liner removal component covers the internal cavity. At least a portion of the liner removal component may comprise packaging for the applicator housing. The liner removal component may include a cover for covering at least a portion of the first surface. The cover may include an aperture for a needle to pass through. The aperture may include a puncture layer for the needle to pass through. The liner removal component may include a sheath for covering a needle. The liner removal component may include a spring configured to press against the on-skin wearable medical device, the spring configured to move the liner removal component away from the on-skin wearable medical device to at least partially decouple the liner from the first surface. The liner may include one or more coupling surfaces for coupling to the liner removal component. The one or more coupling surfaces may comprise adhesive surfaces. The liner may include an aperture for a needle to pass through. The one or more coupling surfaces may surround the aperture. The liner may include a central portion proximate the aperture and an edge portion proximate an edge of the liner, and the one or more coupling surfaces are positioned at one or more of the central portion or the edge portion. The one or more coupling surfaces may comprise a plurality of sections. The one or more coupling surfaces may be positioned at the central portion and at the edge portion. The one or more coupling surfaces may comprise one or more strips. The liner may include one or more coupling regions for coupling to the liner removal component. A needle may drive to the skin to deploy the on-skin wearable medical device to the skin. The on-skin wearable medical device may include a transcutaneous analyte sensor. The first surface may be an adhesive surface. The patch may include a puncture layer for a needle to pass through. The puncture layer may be configured for a transcutaneous analyte sensor to pass through. The liner removal component may be configured to asymmetrically decouple the liner from the first surface upon the liner removal component being at least partially withdrawn from the first surface. The liner removal component may be configured to peel the liner from the first surface upon the liner removal component being at least partially withdrawn from the first surface. The liner removal component may comprise a cap. The liner removal component may include a sheath for sealing at least a portion of a needle or at least a portion of a transcutaneous analyte sensor. At least a portion of the sheath may include a layer configured to allow sterilizing gas to permeate through the layer to contact at least the portion of the needle or at least the portion of the transcutaneous analyte sensor. The sheath may surround an internal cavity, and the system further comprises a gasket configured to seal the internal cavity. The sheath may surround an internal cavity, and the system further comprises an adhesive configured to seal the internal cavity. The liner removal component may include an engagement portion configured to engage an outer surface of the applicator housing for retention of the liner removal component to the applicator housing, the engagement portion configured to disengage from the outer surface upon the liner removal component being axially pulled relative to the applicator housing. The system may further comprise a stabilizing body configured to stabilize a transcutaneous analyte sensor of the on-skin wearable medical device within a channel of a needle. The on-skin wearable medical device may include a light sensor and the liner removal component is configured to shield the light sensor from light.

In a second aspect, a method comprising at least partially withdrawing a liner removal component from a first surface of an on-skin wearable medical device to at least partially decouple a liner from the first surface, the on-skin wearable medical device being retained by an applicator housing; and deploying the on-skin wearable medical device to skin from the applicator housing with the first surface contacting the skin.

Implementations of the embodiments may include one or more of the following. The on-skin wearable medical device may be retained within an internal cavity of the applicator housing. The liner removal component may include a body extending axially within the internal cavity. The applicator housing may include an opening at an end portion of the internal cavity for the on-skin wearable medical device to be deployed from, and at least a portion of the liner removal component is positioned at the opening. The liner removal component may include a first portion axially spaced from a second portion, the first portion engaging the liner. The method may include separating the second portion from the applicator housing. The method may include gripping a grip portion positioned at the second portion to at least partially withdraw the liner removal component from the first surface. The method may include rotating the grip portion relative to the applicator housing to at least partially release the liner removal component from the applicator housing. The first portion may be configured to rotate relative to the second portion. The method may include unscrewing the second portion from the applicator housing to at least partially release the liner removal component from the applicator housing. The liner removal component may include one or more guides configured to prevent rotation of the first portion relative to the applicator housing upon the second portion rotating relative to the first portion. The liner removal component may include one or more bearing surfaces configured to couple the first portion to the second portion. The liner removal component may include one or more bearing surfaces configured to allow for rotation of the first portion relative to the second portion. The liner removal component may include one or more rotation couplers spaced from one or more bearing surfaces with a gap, the one or more rotation couplers configured to rotate relative to the one or more bearing surfaces. Rotation of the first portion relative to the second portion may bring the one or more rotation couplers into contact with the one or more bearing surfaces. The first one of the rotation couplers may contact the one or more bearing surfaces prior to the second one of the rotation couplers. The one or more rotation couplers may include one or more arms. A height of the first portion relative to the second portion may be configured to be adjusted. The liner removal component may include one or more deflectable arms coupling the first portion to the second portion. The on-skin wearable medical device may include a transcutaneous analyte sensor. The first surface may be an adhesive surface. The on-skin wearable medical device may include a patch having the first surface. The patch may include a puncture layer for a needle to pass through. The puncture layer may be configured for a transcutaneous analyte sensor to pass through. The liner may include one or more coupling surfaces for coupling to the liner removal component. The liner may include an aperture for a transcutaneous analyte sensor to pass through, and a central portion proximate the aperture and an edge portion proximate an edge of the liner, and the one or more coupling surfaces are positioned at one or more of the central portion or the edge portion. The method may include inserting a needle from the applicator housing to the skin. The method may include retracting the needle from the skin to the applicator housing. The method may include coupling the liner removal component to the applicator housing after the needle has retracted from the skin to the applicator housing. At least a portion of the liner removal component may deflect to accommodate the liner removal component being coupled to the applicator housing. The method may include peeling the liner from the first surface upon the liner removal component being at least partially withdrawn from the first surface. The liner removal component may comprise a cap. The liner removal component may include a sheath for sealing at least a portion of a needle or at least a portion of a transcutaneous analyte sensor. At least a portion of the sheath may include a layer configured to allow sterilizing gas to permeate through the layer to contact at least the portion of the needle or at least the portion of the transcutaneous analyte sensor. The sheath may surround an internal cavity, and a gasket seals the internal cavity. The sheath may surround an internal cavity, and an adhesive that seals the internal cavity. The liner removal component may include an engagement portion engaging an outer surface of the applicator housing for retention of the liner removal component to the applicator housing, and the method further comprises pulling the liner removal component axially relative to the applicator housing to disengage the engagement portion from the outer surface. A stabilizing body may stabilize a transcutaneous analyte sensor of the on-skin wearable medical device within a channel of a needle. The on-skin wearable medical device may include a light sensor and the liner removal component is configured to shield the light sensor from light. The method may include withdrawing the liner removal component from the light sensor to expose the light sensor to light.

In a third aspect, an on-skin wearable medical device system comprising a housing; a transcutaneous analyte sensor coupled to the housing; a patch coupled to the housing and including a first surface for engaging skin; a liner having a proximal surface contacting the first surface and a distal surface facing opposite the proximal surface; and one or more adhesive surfaces on the distal surface and configured to engage a body for at least partially withdrawing the liner from the first surface of the patch.

Implementations of the embodiments may include one or more of the following. The patch may include an aperture for the transcutaneous analyte sensor to pass through. The patch may include a puncture layer for the transcutaneous analyte sensor to pass through. The puncture layer may be configured for a needle to pass through. The patch may include a plurality of layers and the puncture layer is a first layer of the plurality of layers positioned adjacent to a second layer of the plurality of layers. The one or more adhesive surfaces may comprise a plurality of sections. The one or more adhesive surfaces may comprise one or more dots. The one or more adhesive surfaces may comprise one or more strips. The one or more adhesive surfaces may comprise a plurality of strips. The one or more adhesive surfaces may cover an entirety of the distal surface of the liner. The patch may include a skirt portion extending radially outward from the housing, and the liner includes a skirt portion covering the skirt portion of the patch, and the one or more adhesive surfaces are positioned at the skirt portion of the liner. The liner may include an aperture for the transcutaneous analyte sensor to pass through. The one or more adhesive surfaces may surround the aperture. The liner may include a central portion proximate the aperture and an edge portion proximate an edge of the liner, and the one or more adhesive surfaces are positioned at one or more of the central portion or the edge portion. The one or more adhesive surfaces may be positioned at the edge portion. The one or more adhesive surfaces may be positioned at the central portion and at the edge portion. The liner may include one or more curved cuts extending radially outward from the aperture of the liner. The liner may include multiple layers. The liner may include a layer having a first portion and a second portion, with the first portion folded upon the second portion. The patch and the liner may both include an aperture for a needle to pass through.

In a fourth aspect, an on-skin wearable medical device system comprising: a housing; a transcutaneous analyte sensor coupled to the housing; and a patch coupled to the housing and including a first surface for engaging skin, the patch including a puncture layer for one or more of the transcutaneous analyte sensor or an insertion element for the transcutaneous analyte sensor to pass through.

Implementations of the embodiments may include one or more of the following. The puncture layer may be configured to retain the transcutaneous analyte sensor in a channel of the insertion element. The puncture layer may be configured to form a seal about the insertion element to retain the transcutaneous analyte sensor in a channel of the insertion element. The puncture layer may be configured to stabilize the transcutaneous analyte sensor from dislodging from a channel of the insertion element in a horizontal dimension. The patch may include a plurality of layers and the puncture layer is a first layer of the plurality of layers layered adjacent to a second layer of the plurality of layers. The second layer may include the first surface, and the first layer is sandwiched between the second layer and the housing. The plurality of layers may include a third layer sandwiched between the first layer and the second layer, the third layer including an adhesive surface for adhering the patch to the housing. The first layer may include a puncture portion and a support portion, the puncture portion configured for the one or more of the transcutaneous analyte sensor or the insertion element for the transcutaneous analyte sensor to pass through, the support portion being positioned radially outward from the puncture portion and configured to overlap another layer of the plurality of layers. The support portion may comprise an elongate arm extending radially outward from the puncture portion. The housing may include a cavity for receiving a portion of the transcutaneous analyte sensor; and at least a portion of the puncture layer extends along the cavity. The puncture layer may include at least one elongate arm for forming at least one passageway for moisture transport. The puncture layer may be made of a hydrophobic material. The puncture layer may be configured for the insertion element to be withdrawn through the puncture layer with the transcutaneous analyte sensor remaining passing through the puncture layer. The first surface may comprise an adhesive surface. The system may further comprise an applicator housing configured to retain the housing.

In a fifth aspect, an on-skin wearable medical device system comprising: a housing; a transcutaneous analyte sensor coupled to the housing; and a patch coupled to the housing and including a first surface for engaging skin, at least a portion of the patch comprising a spiral body configured to extend around an insertion element for the transcutaneous analyte sensor to stabilize a position of the transcutaneous analyte sensor relative to the insertion element.

Implementations of the embodiments may include one or more of the following. The spiral body may be configured to stabilize the transcutaneous analyte sensor from dislodging from a channel of the insertion element in a horizontal dimension. The spiral body may be configured to contact the transcutaneous analyte sensor to stabilize the transcutaneous analyte sensor from dislodging from a channel of the insertion element in a horizontal dimension. The spiral body may be configured to move from an extended position to a retracted position, the spiral body in the extended position protruding from the first surface, and the spiral body in the retracted position being co-planar or retracted from the first surface. The spiral body may have a helical shape in the extended position and has a flat coil shape in the retracted position.

In a sixth aspect, an on-skin wearable medical device system comprising: a transcutaneous analyte sensor; a housing including a cavity for receiving a portion of the transcutaneous analyte sensor; a patch coupled to the housing and including a first surface for engaging skin; and a stabilizing body configured to be positioned within the cavity, the stabilizing body configured to stabilize a position of the transcutaneous analyte sensor relative to an insertion element for the transcutaneous analyte sensor.

Implementations of the embodiments may include one or more of the following. The stabilizing body may be configured to stabilize the transcutaneous analyte sensor from dislodging from a channel of the insertion element in a horizontal dimension. The stabilizing body may be configured to contact the transcutaneous analyte sensor to stabilize the transcutaneous analyte sensor from dislodging from a channel of the insertion element in a horizontal dimension. The stabilizing body may comprise an insert for the cavity. The stabilizing body may comprise a foam body.

In a seventh aspect, a system comprising: an on-skin wearable medical device configured to be deployed to skin and including a transcutaneous analyte sensor and a patch having a first surface for engaging the skin; an applicator housing having a cavity for the on-skin wearable medical device to be retained within; a cap for the cavity; and a stabilizing body coupled to the cap, the stabilizing body including a bearing surface configured to stabilize a position of the transcutaneous analyte sensor relative to an insertion element for the transcutaneous analyte sensor.

Implementations of the embodiments may include one or more of the following. The stabilizing body may be configured to stabilize the transcutaneous analyte sensor from dislodging from a channel of the insertion element in a horizontal dimension. The bearing surface may comprise a curved bearing surface. The cap may be configured to couple to the applicator housing and be unscrewed from the applicator housing to decouple from the applicator housing, the bearing surface configured to rotate with the cap relative to the transcutaneous analyte sensor when the cap is unscrewed from the applicator housing. The stabilizing body may have a conical shape.

In an eighth aspect, an on-skin wearable medical device system comprising: a housing including a distal surface configured to face towards skin; a transcutaneous analyte sensor coupled to the housing; a patch coupled to the housing and including a first surface for engaging the skin, the patch positioned distal of the housing; and one or more moisture passageways configured for removal of moisture positioned distal of the housing.

Implementations of the embodiments may include one or more of the following. The one or more moisture passageways may be configured for removal of moisture positioned proximate an insertion site of the transcutaneous analyte sensor into the skin. The housing may include an outer perimeter, and the one or more moisture passageways are configured for removal of moisture in a direction towards the outer perimeter of the housing. The one or more moisture passageways may be configured for removal of moisture positioned between the patch and the distal surface of the housing. The distal surface of the housing may include at least one channel forming at least a portion of the one or more moisture passageways. The patch may include at least one channel forming at least a portion of the one or more moisture passageways. The housing may include an outer perimeter, and the at least one channel extends in a direction from a region of the patch proximate an insertion site of the transcutaneous analyte sensor into the skin towards the outer perimeter. The patch may include a plurality of layers and a first layer of the plurality of layers spaces a second layer of the plurality of layers from the distal surface of the housing to form the one or more moisture passageways. The first layer may include one or more elongate arms spacing the second layer from the distal surface of the housing to form the one or more moisture passageways. The housing may include an outer perimeter, and at least one of the one or more elongate arms extends in a direction from a region of the patch proximate an insertion site of the transcutaneous analyte sensor into the skin towards the outer perimeter. The one or more elongate arms may include at least two of the elongate arms that intersect. At least a portion of the first layer may include a V-shape. The first layer may include a puncture layer for one or more of the transcutaneous analyte sensor or an insertion element for the transcutaneous analyte sensor to pass through. The patch may include a third layer, the third layer including the first surface. The one or more moisture passageways may be configured for wicking moisture positioned distal of the housing.

In a ninth aspect, an on-skin wearable medical device system comprising: a housing; a transcutaneous analyte sensor coupled to the housing; a patch coupled to the housing and including a first surface for engaging skin; and an antimicrobial agent coupled to at least a portion of the on-skin wearable medical device system.

Implementations of the embodiments may include one or more of the following. The antimicrobial agent may comprise at least a portion of a surface of one or more of the housing, the transcutaneous analyte sensor, or the patch. The antimicrobial agent may be coupled to the first surface of the patch. The housing may include a distal surface for facing towards the skin, and the antimicrobial agent is coupled to a second surface of the patch that faces opposite the first surface and towards the distal surface of the housing. The antimicrobial agent may be coupled to an adhesive for coupling the patch to the housing. The patch may include a puncture layer for one or more of the transcutaneous analyte sensor or an insertion element for the transcutaneous analyte sensor to pass through, the antimicrobial agent being coupled to the puncture layer. The housing may include an outer perimeter, and the patch includes a skirt positioned radially outward of the outer perimeter, the antimicrobial agent being coupled to the skirt. The antimicrobial agent may be positioned proximate an insertion site of the transcutaneous analyte sensor into the skin. The antimicrobial agent may comprise one or more of iodine, silver, or chlorohexidine gluconate. The antimicrobial agent may comprise an antimicrobial adhesive.

In a tenth aspect, an on-skin wearable medical device system comprising: a housing; a transcutaneous analyte sensor coupled to the housing; and a patch including a first surface for engaging skin, the patch being coupled to the housing solely with an adhesive.

Implementations of the embodiments may include one or more of the following. The housing may include a distal surface configured to face towards the skin, and the adhesive is positioned between the patch and the distal surface of the housing. The patch may include a plurality of layers. The housing may include an outer perimeter, and the plurality of layers include a first layer and a second layer, the first layer having the first surface, and the second layer overlaying the first layer and forming a skirt positioned radially outward of the outer perimeter. The plurality of layers may include a first layer and a second layer, the first layer having the first surface, and the second layer being positioned between the first layer and the housing and including the adhesive. The first layer may include a backing and an adhesive for engaging the skin; and the second layer may include an adhesive for coupling to the first layer, a breathable carrier layer, and the adhesive for coupling the patch to the housing. The housing may include an outer perimeter, and the patch does not extend outward of the outer perimeter of the housing. An outer perimeter of the patch may be recessed from the outer perimeter of the housing. The patch may comprise a scrim. The patch may include a plurality of perforations.

In an eleventh aspect, a method of manufacturing an on-skin wearable medical device. The method may comprise providing a housing of the on-skin wearable medical device, the housing configured to couple to a transcutaneous analyte sensor; and coupling a patch to the housing solely with an adhesive, the patch including a first surface for engaging skin.

Implementations of the embodiments may include one or more of the following. The housing may include a distal surface configured to face towards the skin, and the method further comprises pressing an adhesive between the patch and the distal surface. The patch may include a plurality of layers. The housing may include an outer perimeter, and the plurality of layers include a first layer and a second layer, the first layer having the first surface, and the second layer overlaying the first layer and forming a skirt configured to be positioned radially outward of the outer perimeter. The plurality of layers may include a first layer and a second layer, the first layer having the first surface, and the second layer configured to be positioned between the first layer and the housing and including the adhesive. The first layer may include a backing and an adhesive for engaging the skin; and the second layer includes an adhesive for coupling to the first layer, a breathable carrier layer, and the adhesive for coupling the patch to the housing. The housing may include an outer perimeter, and the patch is configured to not extend outward of the outer perimeter of the housing. An outer perimeter of the patch may be configured to be recessed from the outer perimeter of the housing. The patch may comprise a scrim. The patch may include a plurality of perforations.

In further aspects and embodiments, the above methods and features of the various aspects are formulated in terms of a system as in various aspects, having an applicator configured to carry out the method features. Any of the features of an embodiment of any of the aspects, including but not limited to any embodiments of any of the first through eleventh aspects referred to above, is applicable to all other aspects and embodiments identified herein, including but not limited to any embodiments of any of the first through eleventh aspects referred to above. Moreover, any of the features of an embodiment of the various aspects, including but not limited to any embodiments of any of the first through eleventh aspects referred to above, is independently combinable, partly or wholly with other embodiments described herein in any way, e.g., one, two, or three or more embodiments may be combinable in whole or in part. Further, any of the features of an embodiment of the various aspects, including but not limited to any embodiments of any of the first through eleventh aspects referred to above, may be made optional to other aspects or embodiments. Any aspect or embodiment of a method can be performed by a system or apparatus of another aspect or embodiment, and any aspect or embodiment of a system or apparatus can be configured to perform a method of another aspect or embodiment, including but not limited to any embodiments of any of the first through eleventh aspects referred to above.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

These and other features, aspects, and advantages are described below with reference to the drawings, which are intended to illustrate, but not to limit, the disclosure. In the drawings, like reference characters denote corresponding features consistently throughout similar embodiments.

FIG. 17 illustrates a perspective partial cutaway view of the needle carrier assembly, hub, and on-skin sensor assembly of the applicator system of FIGS. 5 and 6.

FIG. 18 illustrates a cross-sectional view of the hub and on-skin sensor assembly of the applicator system of FIGS. 5 and 6.

FIG. 19 illustrates a top view of a portion of the needle carrier assembly and hub of FIGS. 5 and 6.

FIG. 31G illustrates a side schematic view of a portion of the liner removal component shown in FIG. 31A.

FIG. 31H illustrates a side schematic view of a portion of the liner removal component shown in FIG. 31A.

FIG. 55C illustrates a cross sectional schematic view of a portion of the on-skin wearable medical device shown in FIG. 55A, along line C-C shown in FIG. 55A.

FIG. 56 illustrates a distal view of an on-skin wearable medical device.

FIG. 57 illustrates a cross sectional perspective view of an on-skin wearable medical device.

FIG. 58 illustrates a distal view of an on-skin wearable medical device.

FIG. 59 illustrates a distal view of an on-skin wearable medical device.

FIG. 60 illustrates a cross sectional side view of an on-skin wearable medical device.

FIG. 61 illustrates a cross sectional assembly view of a patch.

FIG. 62 illustrates a cross sectional assembly view of a patch.

FIG. 63 illustrates a proximal view of the patch shown in FIG. 62.

FIG. 64 illustrates a proximal view of an on-skin wearable medical device.

FIG. 65 illustrates a distal view of the on-skin wearable medical device shown in FIG. 64.

FIG. 66 illustrates a distal view of an on-skin wearable medical device.

Figure 67:
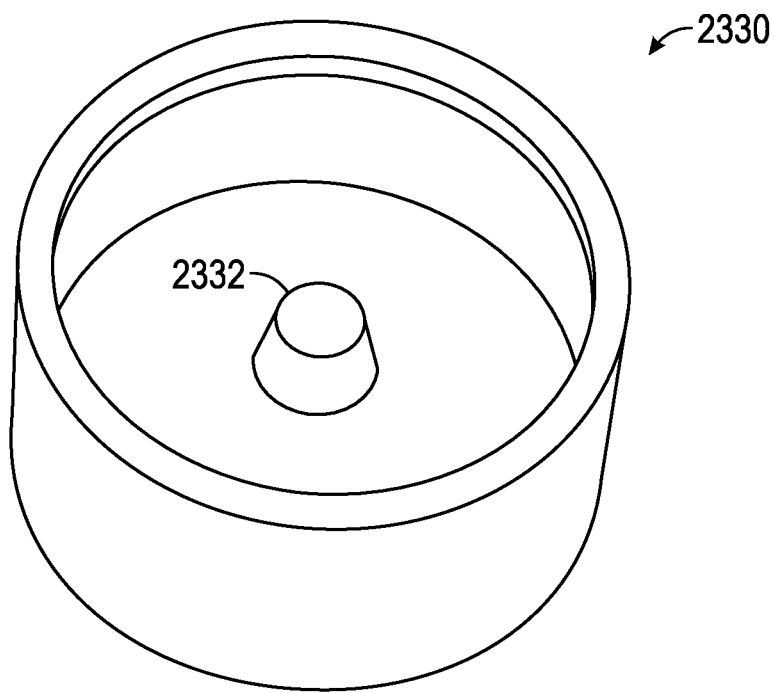

FIG. 67 illustrates a distal perspective view of a liner removal component.

Figure 68:
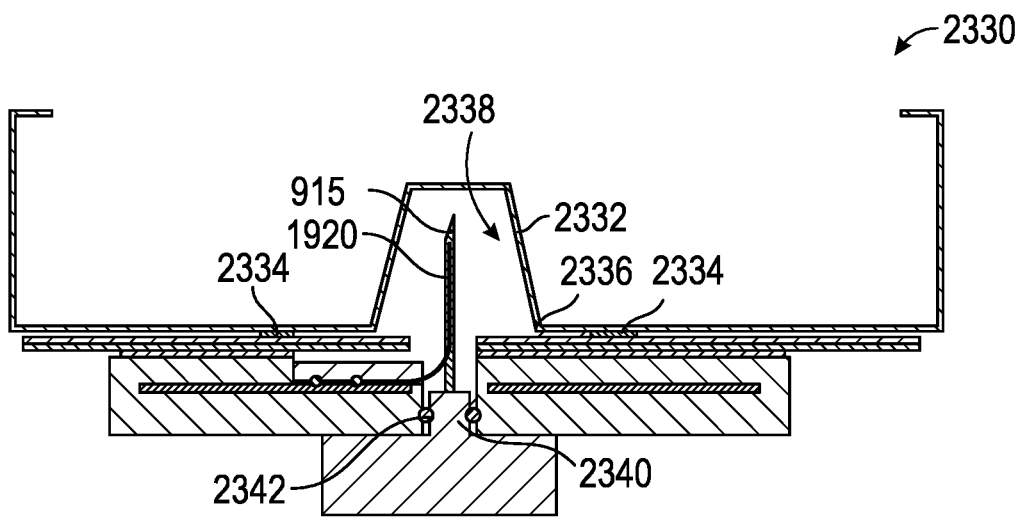

FIG. 68 illustrates a cross sectional schematic view of the liner removal component shown in FIG. 67.

Figure 69:
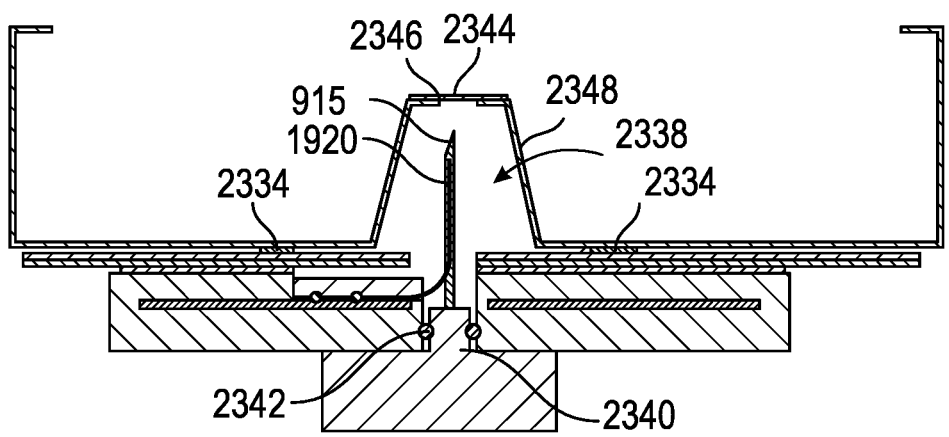

FIG. 69 illustrates a cross sectional schematic view of a liner removal component.

Figure 70:
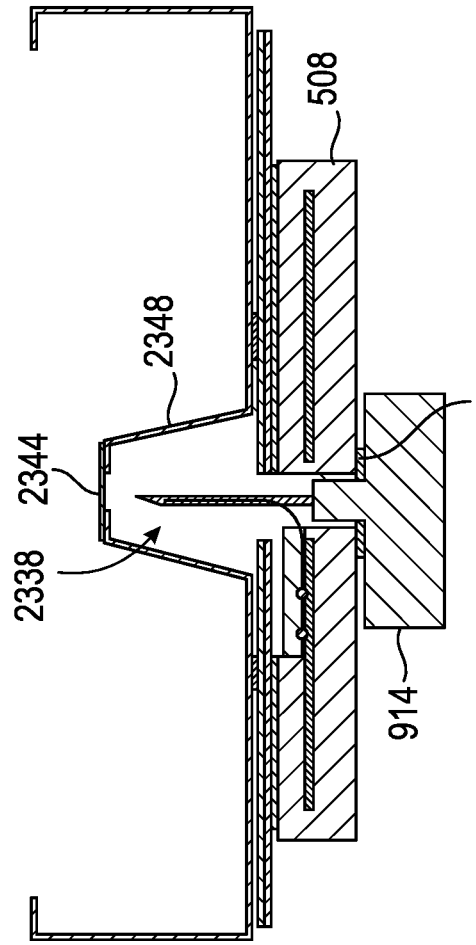

FIG. 70 illustrates a cross sectional schematic view of a liner removal component.

Figure 71:
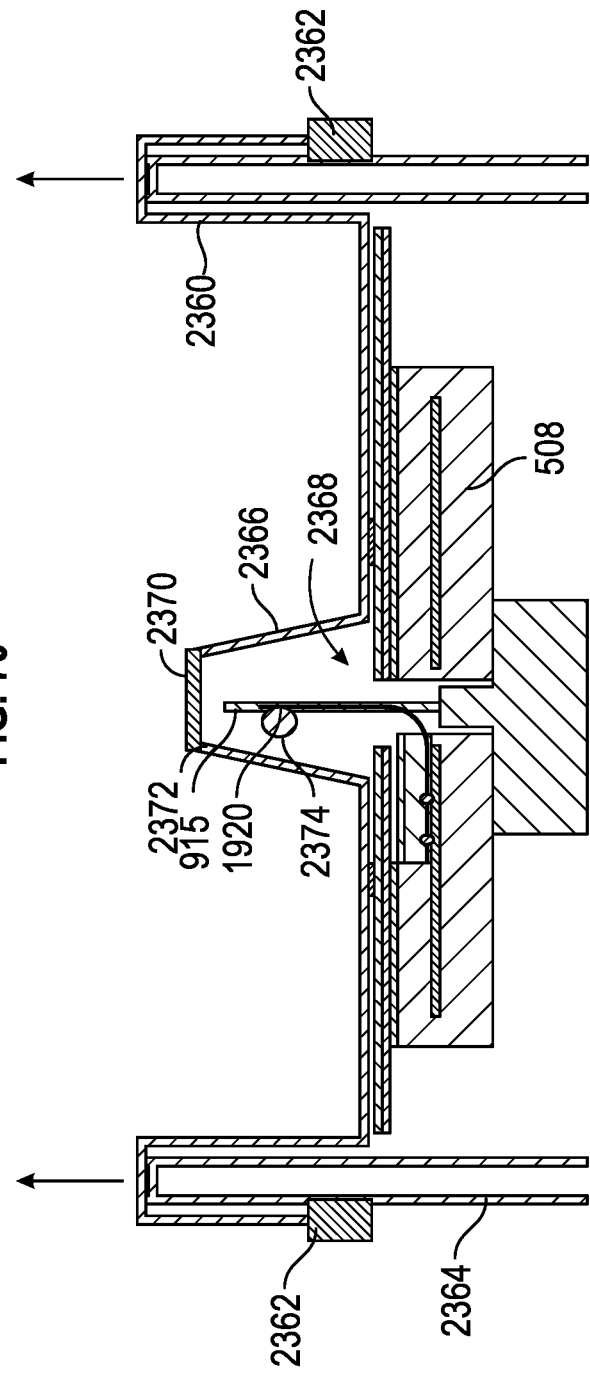

FIG. 71 illustrates a cross sectional schematic view of a liner removal component.

Figure 72:
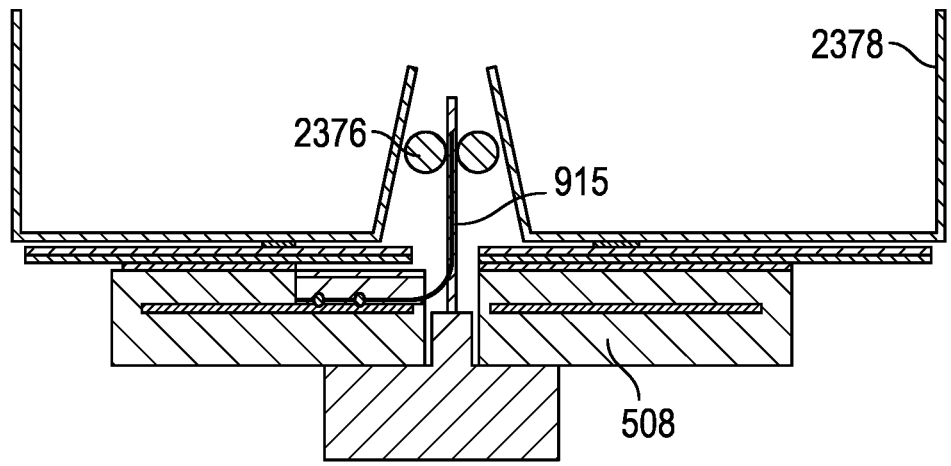

FIG. 72 illustrates a cross sectional schematic view of a liner removal component.

Figure 73:
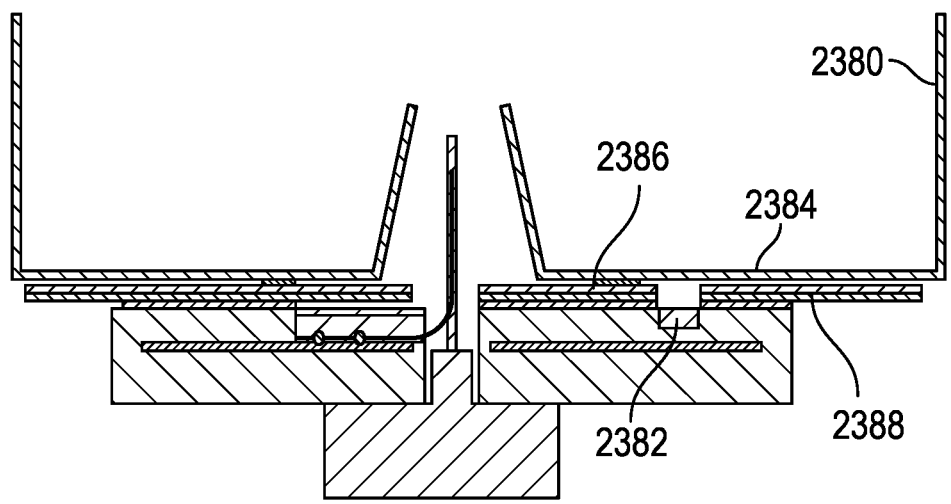

FIG. 73 illustrates a cross sectional schematic view of a liner removal component.

DETAILED DESCRIPTION

The following description and examples illustrate some exemplary embodiments of the disclosure in detail. Those of skill in the art will recognize that there are numerous variations and modifications of the disclosure that are encompassed by its scope. Accordingly, the description of certain exemplary embodiments should not be deemed to limit the scope of the present disclosure.

Figure 1:
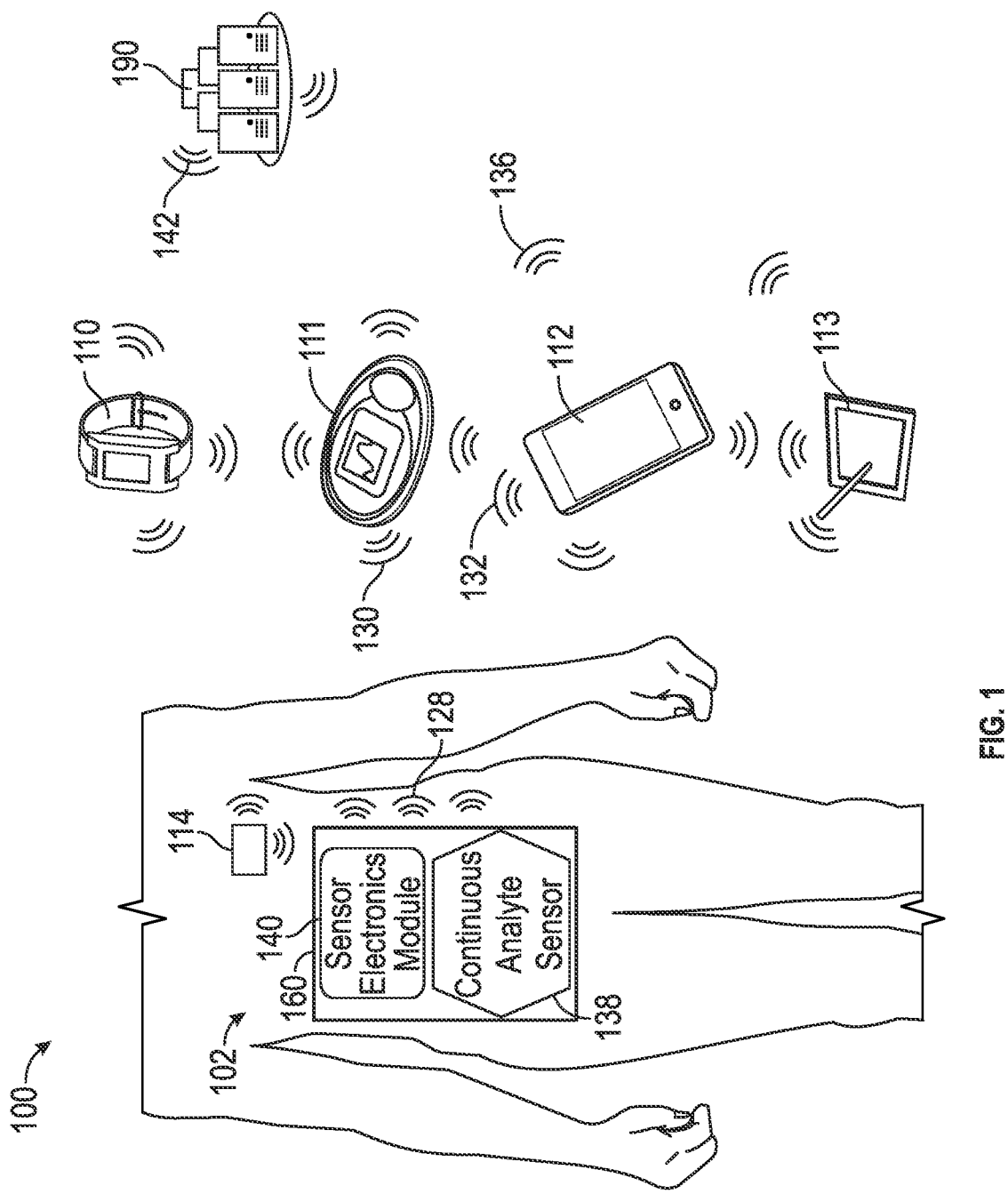
FIG. 1 illustrates a schematic view of a continuous analyte sensor system.

FIG. 1 is a diagram depicting an example medical device system according to embodiments herein. The medical device system in embodiments may comprise a continuous analyte monitoring system 100. The continuous analyte monitoring system 100 may include an analyte sensor system 102 comprising an on-skin sensor assembly 160 configured to be fastened to the skin of a host via a base (not shown).

In embodiments, other forms of medical device systems may be utilized, including other forms of monitoring systems, medicament delivery systems, or other therapeutic systems. In embodiments, an on-skin wearable medical device may be utilized that may comprise an on-skin sensor assembly, or a medicament delivery medical device, among other forms of on-skin wearable medical devices.

As shown in FIG. 1, the analyte sensor system 102 may be operatively connected to a host and a plurality of display devices 110-114 according to certain aspects of the present disclosure. Example display devices 110-114 may include computers such as smartphones, smartwatches, tablet computers, laptop computers, and desktop computers. In some embodiments, display devices 110-114 may be Apple Watches, iPhones, and iPads made by Apple Inc., or iOS, Windows, or Android operating-system devices. It should be noted that display device 114 alternatively or in addition to being a display device, may be a medicament delivery device that can act cooperatively with analyte sensor system 102 to deliver medicaments to the host. Analyte sensor system 102 may include a sensor electronics module 140 and a continuous analyte sensor 138 associated with sensor electronics module 140. Sensor electronics module 140 may be in direct wireless communication with one or more of the plurality of display devices 110-114 via wireless communications signals. As will be discussed in greater detail below, display devices 110-114 may also communicate amongst each other and/or through each other to analyte sensor system 102. For ease of reference, wireless communications signals from analyte sensor system 102 to display devices 110-114 can be referred to as "uplink" signals 128. Wireless communications signals from, e.g., display devices 110-114 to analyte sensor system 102 can be referred to as "downlink" signals 130. Wireless communication signals between two or more of display devices 110-114 may be referred to as "crosslink" signals 132. Additionally, wireless communication signals can include data transmitted by one or more of display devices 110-113 via "long-range" uplink signals 136 (e.g., cellular signals) to one or more remote servers 190 or network entities, such as cloud-based servers or databases, and receive long-range downlink signals 142 transmitted by remote servers 190.

In embodiments shown by FIG. 1, one of the plurality of display devices may be a custom display device 111 specially designed for displaying certain types of displayable sensor information associated with analyte values received from the sensor electronics module 140 (e.g., a numerical value and an arrow, in some embodiments). In some embodiments, one of the plurality of display devices may be a handheld device 112, such as a mobile phone based on the Android operating system, iOS operating system, or other operating system, a palm-top computer and the like, where handheld device 112 may have a relatively larger display and be configured to display a graphical representation of the continuous sensor data (e.g., including current and historic data). Other display devices can include other hand-held devices, such as a tablet 113, a smart watch 110, a medicament delivery device 114, a blood glucose meter, and/or a desktop or laptop computer.

It should be understood that in the case of display device 114, which may be a medicament delivery device in addition to or instead of a display device, the alerts and/or sensor information provided by continuous analyte sensor 138 vis-à-vis sensor electronics module 140, can be used to initiate and/or regulate the delivery of the medicament to host.

During use, a sensing portion of sensor 138 may be disposed under the host's skin and a contact portion of sensor 138 can be electrically connected to sensor electronics module 140. Electronics module 140 can be engaged with a housing (e.g., a base) which is attached to a patch that may engage the skin of the host. The patch may be an adhesive patch in embodiments. In some embodiments, electronics module 140 is integrally formed with the housing. Furthermore, electronics module 140 may be disposable and directly coupled to the patch.

Continuous analyte sensor system 100 can include a sensor configuration that provides an output signal indicative of a concentration of an analyte. The output signal including (e.g., sensor data, such as a raw data stream, filtered data, smoothed data, and/or otherwise transformed sensor data) is sent to the receiver.

In some embodiments, analyte sensor system 102 includes a transcutaneous glucose sensor, such as is described in U.S. Patent Publication No. 2011/0027127, the entire contents of which are hereby incorporated by reference. In some embodiments, sensor system 102 includes a continuous glucose sensor and comprises a transcutaneous sensor (e.g., as described in U.S. Pat. No. 6,565,509, as described in U.S. Pat. No. 6,579,690, and/or as described in U.S. Pat. No. 6,484,046). The contents of U.S. Pat. Nos. 6,565,509, 6,579,690, and 6,484,046 are hereby incorporated by reference in their entirety.

Various signal processing techniques and glucose monitoring system embodiments suitable for use with the embodiments described herein are described in U.S. Patent Publication No. 2005/0203360 and U.S. Patent Publication No. US-2009-0192745-A1, the contents of which are hereby incorporated by reference in their entirety. The sensor can extend through a housing, which can maintain sensor 138 on, in or under the skin and/or can provide for electrical connection of sensor 138 to sensor electronics in sensor electronics module 140.

In some embodiments, description of a base, a housing, a wearable, and/or a transmitter of on-skin sensor assembly 160 may be interchangeable. In other embodiments, a base and a housing of on-skin sensor assembly 160 may be different in the sense that they may be separate components from sensor electronics module 140, e.g., from a transmitter or receiver.

In several embodiments, sensor 138 is in a form of a wire. A distal end of the wire can be formed, e.g., having a conical shape (to facilitate inserting the wire into the tissue of the host). Sensor 138 may comprise an elongate analyte sensor, and may include an elongate conductive body, such as an elongate conductive core (e.g., a metal wire) or an elongate conductive core coated with one, two, three, four, five, or more layers of material, each of which may or may not be conductive. The elongate analyte sensor may be long and thin, yet flexible and strong. For example, in some examples, the smallest dimension of the elongate conductive body is less than 0.1 inches, less than 0.075 inches, less than 0.05 inches, less than 0.025 inches, less than 0.01 inches, less than 0.004 inches, less than 0.002 inches, less than 0.001 inches, and/or less than 0.0005 inches.

Sensor 138 may have a circular shaped cross section. In some embodiments, the cross section of the elongated conductive body can be ovoid, rectangular, triangular, polyhedral, star-shaped, C-shaped, T-shaped, X-shaped, Y-shaped, irregular, or the like. In some embodiments, a conductive wire electrode is employed as a core. In other embodiments, sensor 138 may be disposed on a substantially planar substrate. To such an electrode, one or two additional conducting layers may be added (e.g., with intervening insulating layers provided for electrical isolation). The conductive layers can be comprised of any suitable material. In certain embodiments, it may be desirable to employ a conductive layer comprising conductive particles (i.e., particles of a conductive material) in a polymer or other binder.

In some embodiments, the materials used to form the elongated conductive body (e.g., stainless steel, titanium, tantalum, platinum, platinum-iridium, iridium, certain polymers, and/or the like) can be strong and hard, and therefore can be resistant to breakage. For example, in several embodiments, the ultimate tensile strength of the elongated conductive body is greater than 80 kPsi and less than 140 kPsi, and/or the Young's modulus of the elongate conductive body is greater than 160 GPa and less than 220 GPa. The yield strength of the elongate conductive body can be greater than 58 kPsi and less than 2200 kPsi.

Electronics module 140 can be releasably or permanently coupled to sensor 138. Electronics module 140 can include electronic circuitry associated with measuring and processing the continuous analyte sensor data. Electronics module 140 can be configured to perform algorithms associated with processing and calibration of the sensor data. For example, electronics module 140 can provide various aspects of the functionality of a sensor electronics module as described in U.S. Patent Publication No. 2009/0240120 and U.S. Patent Publication No. 2012/0078071, the entire contents of which are incorporated by reference herein. Electronics module 140 may include hardware, firmware, and/or software that enable measurement of levels of the analyte via a glucose sensor, such as sensor 138.

For example, electronics module 140 can include a potentiostat, a power source for providing power to sensor 138, signal processing components, data storage components, and a communication module (e.g., a telemetry module) for one-way or two-way data communication between electronics module 140 and one or more receivers, repeaters, and/or display devices, such as devices 110-114. Electronic components can be affixed to a printed circuit board (PCB), or the like, and can take a variety of forms. The electronic components can take the form of an integrated circuit (IC), such as an Application-Specific Integrated Circuit (ASIC), a microcontroller, and/or a processor. The electronics module 140 may include sensor electronics that are configured to process sensor information, such as storing data, analyzing data streams, calibrating analyte sensor data, estimating analyte values, comparing estimated analyte values with time-corresponding measured analyte values, analyzing a variation of estimated analyte values, and the like. Examples of systems and methods for processing sensor analyte data are described in more detail in U.S. Pat. Nos. 7,310,544, 6,931,327, U.S. Patent Publication No. 2005/0043598, U.S. Patent Publication No. 2007/0032706, U.S. Patent Publication No. 2007/0016381, U.S. Patent Publication No. 2008/0033254, U.S. Patent Publication No. 2005/0203360, U.S. Patent Publication No. 2005/0154271, U.S. Patent Publication No. 2005/0192557, U.S. Patent Publication No. 2006/0222566, U.S. Patent Publication No. 2007/0203966 and U.S. Patent Publication No. 2007/0208245, the contents of which are hereby incorporated by reference in their entirety. Electronics module 140 may communicate with the devices 110-114, and/or any number of additional devices, via any suitable communication protocol. Example communication methods or protocols include radio frequency; Bluetooth; universal serial bus; any of the wireless local area network (WLAN) communication standards, including the IEEE 802.11, 802.15, 802.20, 802.22 and other 802 communication protocols; ZigBee; wireless (e.g., cellular) telecommunication; paging network communication; magnetic induction; satellite data communication; a proprietary communication protocol, open source communication protocol, and/or any suitable wireless communication method.

Additional sensor information is described in U.S. Pat. Nos. 7,497,827 and 8,828,201. The entire contents of U.S. Pat. Nos. 7,497,827 and 8,828,201 are incorporated by reference herein.

Any sensor shown or described herein can be an analyte sensor; a glucose sensor; and/or any other suitable sensor. A sensor described in the context of any embodiment can be any sensor described herein or incorporated by reference. Sensors shown or described herein can be configured to sense, measure, detect, and/or interact with any analyte.

As used herein, the term "analyte" is a broad term, and is to be given its ordinary and customary meaning to a person of ordinary skill in the art (and is not to be limited to a special or customized meaning), and refers without limitation to a substance or chemical constituent in a biological fluid (for example, blood, interstitial fluid, cerebral spinal fluid, lymph fluid, urine, sweat, saliva, etc.) that can be analyzed. Analytes can include naturally occurring substances, artificial substances, metabolites, or reaction products.

In some embodiments, the analyte for measurement by the sensing regions, devices, systems, and methods is glucose. However, other analytes are contemplated as well, including, but not limited to ketone bodies; acetyl-CoA; acarboxyprothrombin; acylcarnitine; adenine phosphoribosyl transferase; adenosine deaminase; albumin; alpha-fetoprotein; amino acid profiles (arginine (Krebs cycle), histidine/urocanic acid, homocysteine, phenylalanine/tyrosine, tryptophan); andrenostenedione; antipyrine; arabinitol enantiomers; arginase; benzoylecgonine (cocaine); biotinidase; biopterin; c-reactive protein; carnitine; carnosinase; CD4; ceruloplasmin; chenodeoxycholic acid; chloroquine; cholesterol; cholinesterase; cortisol; testosterone; choline; creatine kinase; creatine kinase MM isoenzyme; cyclosporin A; d-penicillamine; de-ethylchloroquine; dehydroepiandrosterone sulfate; DNA (acetylator polymorphism, alcohol dehydrogenase, alpha 1-antitrypsin, cystic fibrosis, Duchenne/Becker muscular dystrophy, glucose-6-phosphate dehydrogenase, hemoglobin A, hemoglobin S, hemoglobin C, hemoglobin D, hemoglobin E, hemoglobin F, D-Punjab, beta-thalassemia, hepatitis B virus, HCMV, HIV-1, HTLV-1, Leber hereditary optic neuropathy, MCAD, RNA, PKU, *Plasmodium vivax*, sexual differentiation, 21-deoxycortisol); desbutylhalofantrine; dihydropteridine reductase; diptheria/tetanus antitoxin; erythrocyte arginase; erythrocyte protoporphyrin; esterase D; fatty acids/acylglycines; triglycerides; glycerol; free β-human chorionic gonadotropin; free erythrocyte porphyrin; free thyroxine (FT4); free tri-iodothyronine (FT3); fumarylacetoacetase; galactose/gal-1-phosphate; galactose-1-phosphate uridyltransferase; gentamicin; glucose-6-phosphate dehydrogenase; glutathione; glutathione perioxidase; glycocholic acid; glycosylated hemoglobin; halofantrine; hemoglobin variants; hexosaminidase A; human erythrocyte carbonic anhydrase I; 17-alpha-hydroxyprogesterone; hypoxanthine phosphoribosyl transferase; immunoreactive trypsin; lactate; lead; lipoproteins ((a), B/A-1, B); lysozyme; mefloquine; netilmicin; phenobarbitone; phenytoin; phytanic/pristanic acid; progesterone; prolactin; prolidase; purine nucleoside phosphorylase; quinine; reverse tri-iodothyronine (rT3); selenium; serum pancreatic lipase; sissomicin; somatomedin C; specific antibodies (adenovirus, anti-nuclear antibody, anti-zeta antibody, arbovirus, Aujeszky's disease virus, dengue virus, *Dracunculus medinensis, Echinococcus granulosus, Entamoeba histolytica*, enterovirus, *Giardia duodenalisa, Helicobacter pylori*, hepatitis B virus, herpes virus, HIV-1, IgE (atopic disease), influenza virus, *Leishmania donovani*, leptospira, measles/mumps/rubella, *Mycobacterium leprae, Mycoplasma pneumoniae*, Myoglobin, *Onchocerca volvulus*, parainfluenza virus, *Plasmodium falciparum*, poliovirus, *Pseudomonas aeruginosa*, respiratory syncytial virus, *rickettsia* (scrub typhus), *Schistosoma mansoni, Toxoplasma gondii, Trepenoma pallidum, Trypanosoma cruzi*/rangeli, vesicular *stomatis* virus, *Wuchereria bancrofti*, yellow fever virus); specific antigens (hepatitis B virus, HIV-1); acetone (e.g., succinylacetone); acetoacetic acid; sulfadoxine; theophylline; thyrotropin (TSH); thyroxine (T4); thyroxine-binding globulin; trace elements; transferrin; UDP-galactose-4-epimerase; urea; uroporphyrinogen I synthase; vitamin A; white blood cells; and zinc protoporphyrin. Salts, sugar, protein, fat, vitamins, and hormones naturally occurring in blood or interstitial fluids can also constitute analytes in certain embodiments. The analyte can be naturally present in the biological fluid or endogenous, for example, a metabolic product, a hormone, an antigen, an antibody, and the like. Alternatively, the analyte can be introduced into the body or exogenous, for example, a contrast agent for imaging, a radioisotope, a chemical agent, a fluorocarbon-based synthetic blood, or a drug or pharmaceutical composition, including but not limited to insulin; glucagon; ethanol; *cannabis* (marijuana, tetrahydrocannabinol, hashish); inhalants (nitrous oxide, amyl nitrite, butyl nitrite, chlorohydrocarbons, hydrocarbons); cocaine (crack cocaine); stimulants (amphetamines, methamphetamines, Ritalin, Cylert, Preludin, Didrex, PreState, Voranil, Sandrex, Plegine); depressants (barbiturates, methaqualone, tranquilizers such as Valium, Librium, Miltown, Serax, Equanil, Tranxene); hallucinogens (phencyclidine, lysergic acid, mescaline, peyote, psilocybin); narcotics (heroin, codeine, morphine, opium, meperidine, Percocet, Percodan, Tussionex, Fentanyl, Darvon, Talwin, Lomotil); designer drugs (analogs of fentanyl, meperidine, amphetamines, methamphetamines, and phencyclidine, for example, Ecstasy); anabolic steroids; and nicotine. The metabolic products of drugs and pharmaceutical compositions are also contemplated analytes. Analytes such as neurochemicals and other chemicals generated within the body can also be analyzed, such as, for example, ascorbic acid, uric acid, dopamine, noradrenaline, 3-methoxytyramine (3MT), 3,4-dihydroxyphenylacetic acid (DOPAC), homovanillic acid (HVA), 5-hydroxytryptamine (5HT), 5-hydroxyindoleacetic acid (FHIAA), and intermediaries in the Citric Acid Cycle.

Any of the features described in the context of at least FIG. 1 can be applicable to all aspects and embodiments identified herein. Moreover, any of the features of an embodiment is independently combinable, partly or wholly with other embodiments described herein in any way, e.g., one, two, or three or more embodiments may be combinable in whole or in part. Further, any of the features of an embodiment may be made optional to other aspects or embodiments. Any aspect or embodiment of a method can be performed by a system or apparatus of another aspect or embodiment, and any aspect or embodiment of a system can be configured to perform a method of another aspect or embodiment.

Figure 2A:
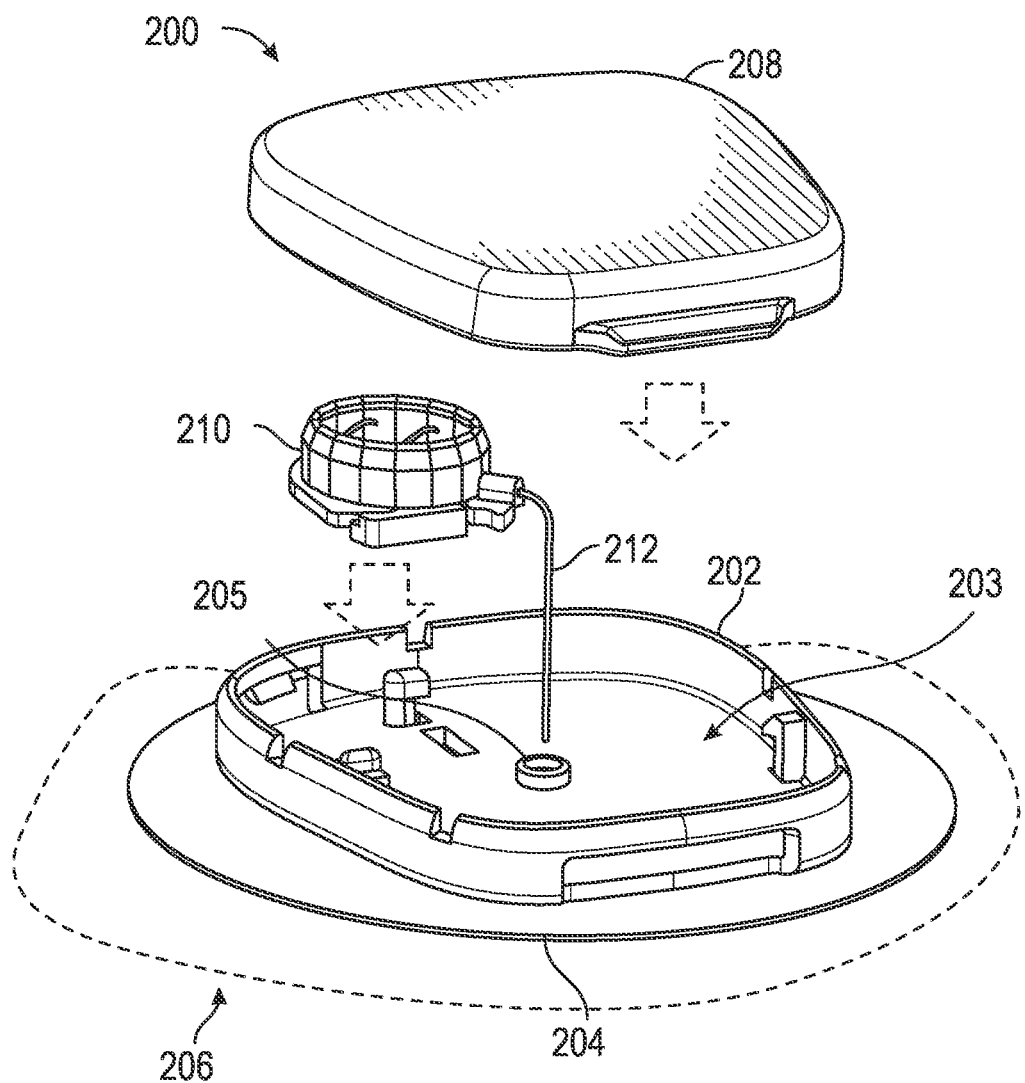
FIG. 2A illustrates a top perspective view of an on-skin sensor assembly.

FIG. 2A illustrates a perspective view of an exemplary on-skin wearable medical device, in the form of an on-skin sensor assembly 200, which is configured to be deployed to skin. The on-skin sensor assembly 200 may include a housing or base 202. The housing or base 202 may be configured to be worn on skin of a host and may include a distal surface for facing towards the skin and a proximal surface 203 facing opposite the distal surface. The housing or base 202 may include an opening 205 for an insertion element to be retracted proximally through from the skin. A patch 204 such as an adhesive patch can couple the base 202 to the skin 206 of the host. The patch 204 may be positioned on the distal surface of the housing or base 202. In some examples, the adhesive patch 204 may include an engaging surface for engaging the skin and including an adhesive suitable for skin adhesion, for example a pressure sensitive adhesive (e.g., acrylic, rubber-based, or other suitable type) bonded to a carrier substrate (e.g., spun lace polyester, polyurethane film, or other suitable type) for skin attachment, though any suitable type of adhesive is also contemplated. An on-skin sensor assembly 200 may comprise an electronics unit 208 (e.g., a transmitter) which may further comprise a glucose sensor module 210 coupled to an analyte sensor such as a transcutaneous analyte sensor (e.g., a glucose sensor) 212 and to base 202.

The applicator system can engage the adhesive patch 204 to skin 206. The glucose sensor module 210 may be secured to base 202 (e.g., via retention elements such as snap fits and/or interference features, adhesive, welding, etc.) to ensure analyte sensor 212 (e.g., glucose sensor) is coupled to base 202. In alternative embodiments, the sensor module 210 and base 202 are preassembled or manufactured as a single component.

After on-skin sensor assembly 200 is deployed to a user's skin, a user (or an applicator) can couple electronics unit 208 (e.g., a transmitter) to on-skin sensor assembly 200 via retention elements such as snap fits and/or interference features. Electronics unit 208 can measure and/or analyze glucose indicators sensed by transcutaneous analyte sensor (e.g., a glucose sensor) 212. Electronics unit 208 can transmit information (e.g., measurements, analyte data, glucose data) to a remotely located device (e.g., 110-114 shown in FIG. 1).

On-skin sensor assembly 200 may be attached to the host with use of an applicator adapted to provide convenient and secure application. Such an applicator may also be used for attaching electronics unit 208 to base 202, inserting sensor 212 through the host's skin, and/or connecting sensor 212 to electronics unit 208. Once electronics unit 208 is engaged with the base and sensor 212 has been inserted into the skin (and is connected to the electronics unit 208), the sensor assembly can detach from the applicator.

Figure 2B:
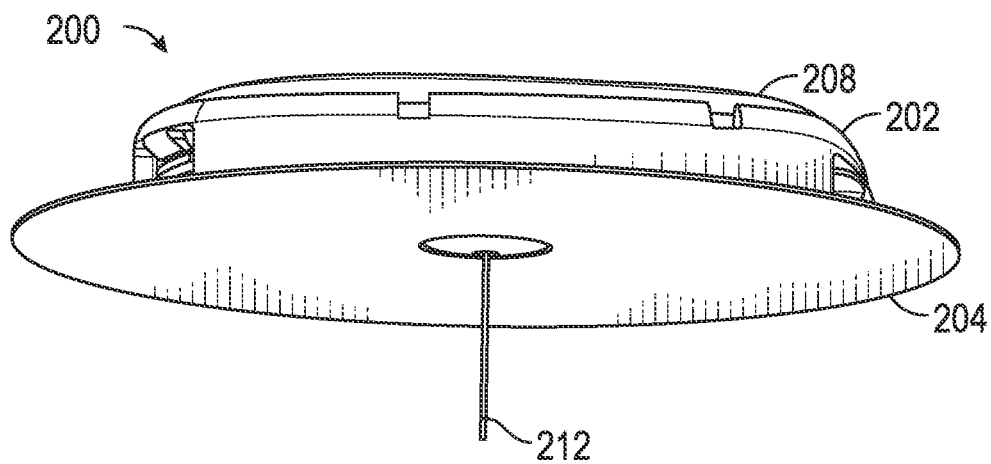
FIG. 2B illustrates a bottom perspective view of the on-skin sensor assembly of FIG. 2A in an assembled state.

FIG. 2B illustrates a perspective view of electronics unit 208 coupled to base 202 via retention elements such as snap fits and/or interference features. In some embodiments, electronics unit 208 and base 202 are coupled by adhesive, welding, or other bonding techniques. Patch 204, on a distal face of base 202, is configured to couple sensor assembly 200 to the skin.

Figure 2C:
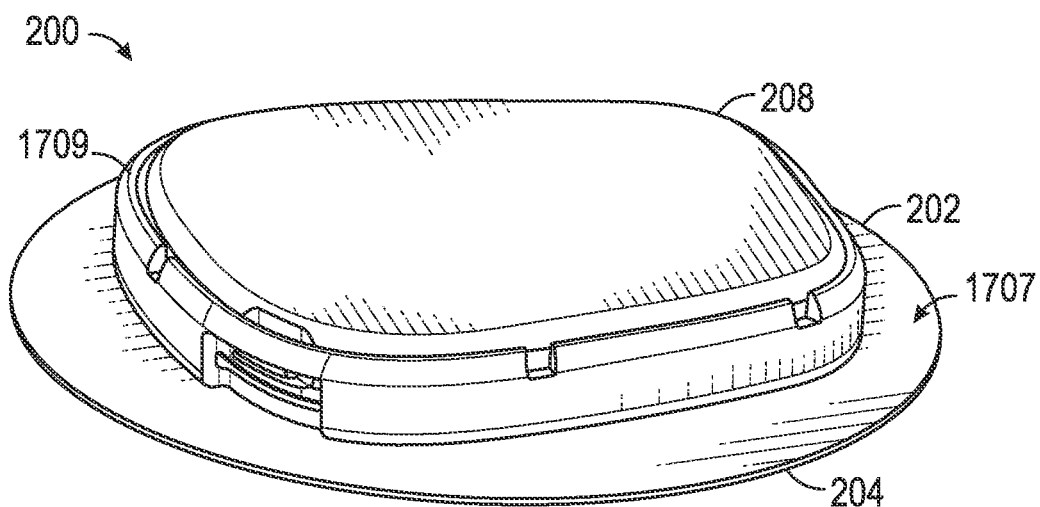
FIG. 2C illustrates a cross-sectional view of the on-skin sensor assembly of FIG. 2A in an assembled state.

FIG. 2C illustrates a perspective view of on-skin sensor assembly 200. On-skin sensor assembly 200 may be disposable or reusable. FIG. 2C further illustrates electronics unit 208 coupled to a base 202, and a patch 204 configured to be attached to on-skin sensor assembly 200, which, when combined, may be held within the applicator.

Figure 3:
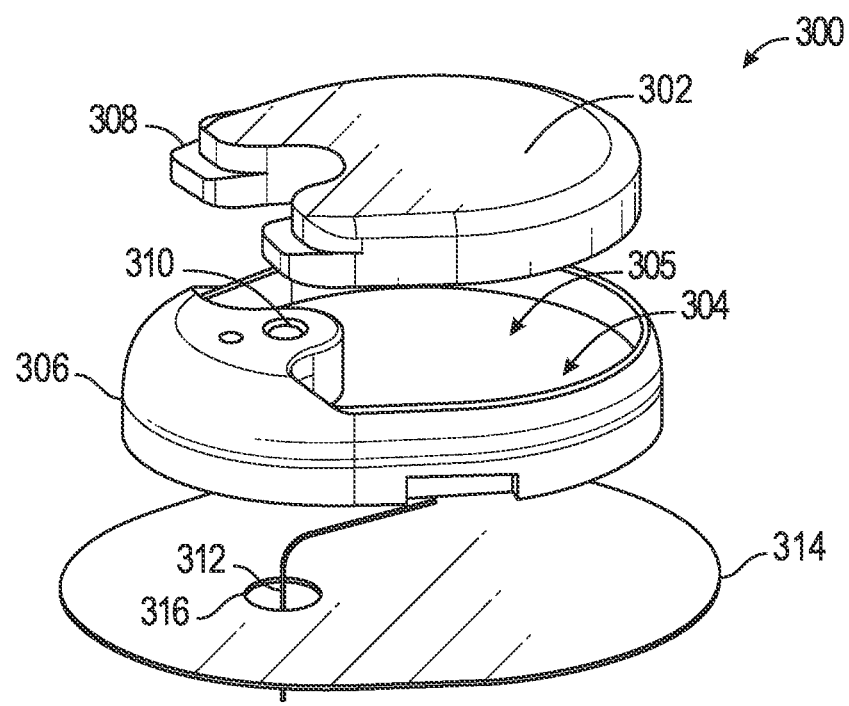
FIG. 3 illustrates a perspective assembly view of an on-skin sensor assembly.

FIG. 3 illustrates an embodiment of an on-skin wearable medical device in the form of an on-skin sensor assembly 300 with an electronics unit 302 configured to insert into a cavity 304 of the base or housing 306. The base or housing 306 may be configured to be worn on skin of a host and may include a distal surface for facing towards the skin and a proximal surface 305 facing opposite the distal surface. The electronics unit 302 may include one or more tabs 308 that couple to a portion of the housing 306 and allow the electronics unit 302 to be retained by the housing 306. The housing 306 may include an opening 310 for an insertion element to be retracted proximally through from the skin. The opening 310 may allow the insertion element (such as a needle) to pass through to deploy the transcutaneous analyte sensor 312 to the skin. The patch 314 may further include an aperture 316 that may allow the sensor 312 and the insertion element to pass through. The electronics unit 302 may couple to the housing 306 prior to or following deployment of the sensor 312 to the host's skin.

Figure 4:
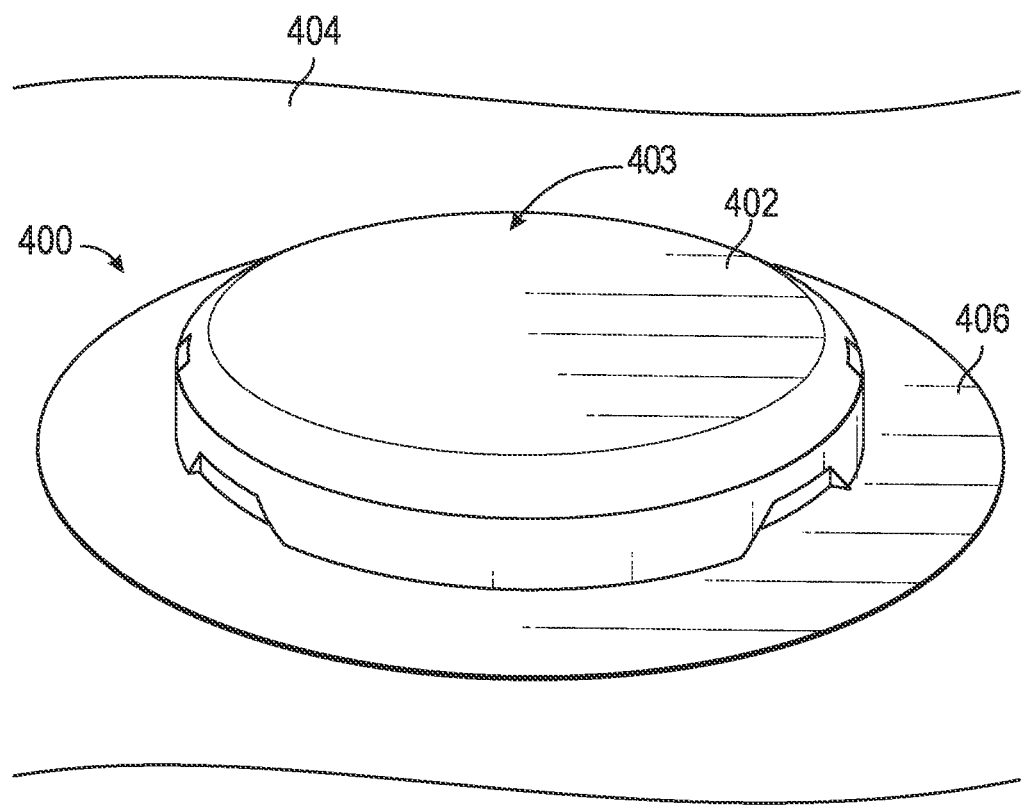
FIG. 4 illustrates a perspective view of an on-skin sensor assembly.

FIG. 4 illustrate an embodiment of an on-skin wearable medical device in the form of an on-skin sensor assembly 400, in which the electronics unit is integral with the housing 402. The housing 402 may be configured to be worn on skin of a host and may include a distal surface for facing towards the skin and a proximal surface 403 facing opposite the distal surface. The on-skin sensor assembly 400 is shown on the skin 404, with the patch 406 engaging the skin 404.

The embodiments of FIGS. 2A-4 may each include an engaging surface for engaging the skin. The engaging surface may be positioned on the patch in embodiments, for example on a distal surface of the patch or may have another position in embodiments. The engaging surface may comprise an adhesive surface in embodiments configured to adhere to the skin. The adhesive can be configured for adhering to skin. Additional adhesive information is described in U.S. Pat. No. 11,219,413, which was filed on Aug. 25, 2015. The entire contents of U.S. Pat. No. 11,219,413 are incorporated by reference herein. The engaging surface in embodiments may be covered with a liner prior to deployment to the host's skin.

Figures 5, 6:
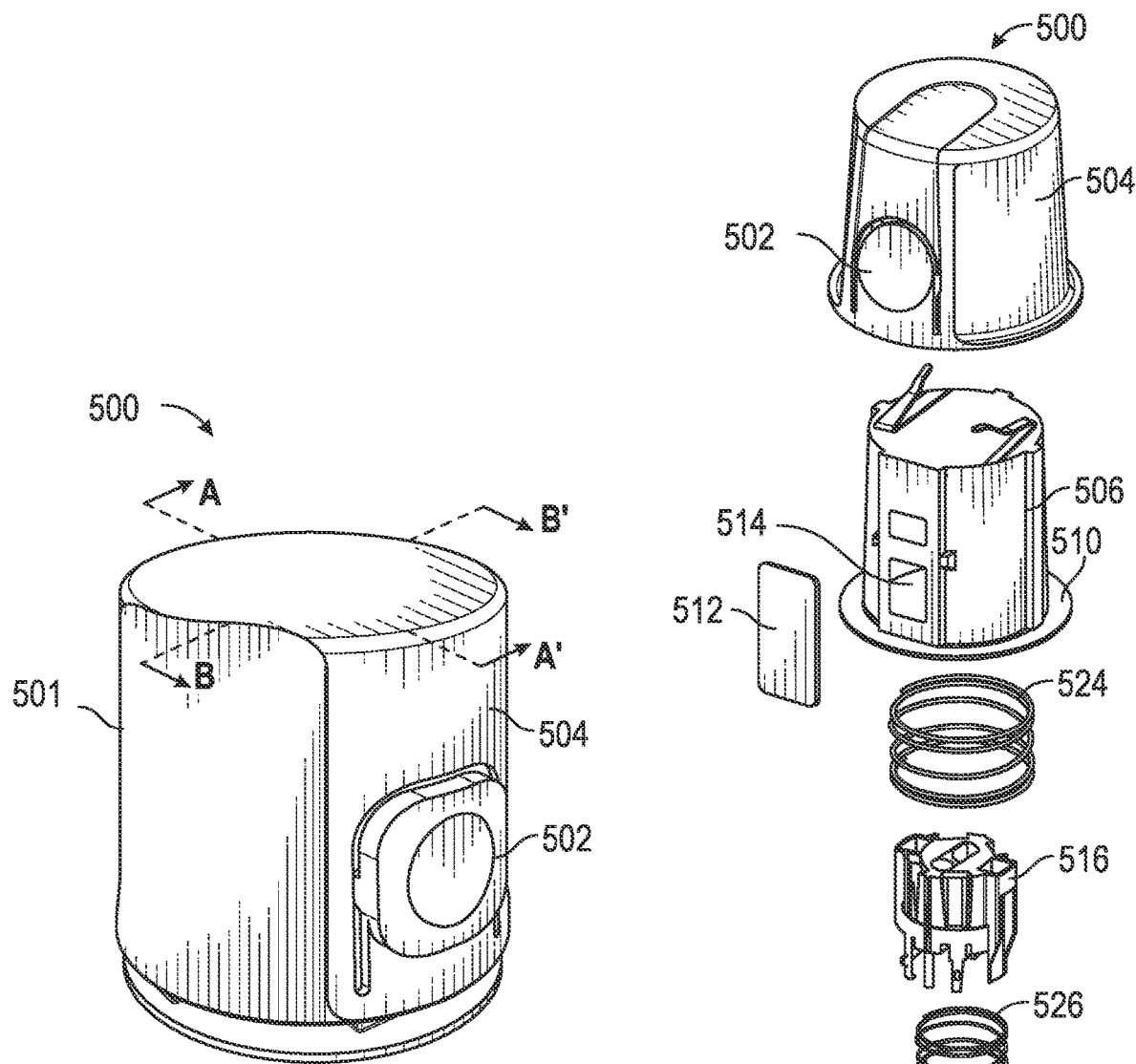
FIG. 5 illustrates a perspective view of an applicator system for an on-skin sensor assembly of an analyte sensor system.
FIG. 6 illustrates an exploded perspective view of the applicator system of FIG. 5.

FIG. 5 illustrates a system for deploying an on-skin wearable medical device to skin. The system may comprise an applicator system in embodiments. The system may include an applicator for an on-skin sensor assembly of an analyte sensor system, according to some embodiments. In embodiments, other forms of systems may be utilized.

The applicator 500 may include an applicator housing 501, which may include an outer housing 504 and an inner housing 506, and other forms of housings in embodiments. The applicator housing 501 may be configured to retain the on-skin wearable medical device in embodiments. The applicator 500 may include a deployment mechanism that may be configured to deploy the on-skin wearable medical device to skin. The deployment mechanism, for example, may include one or more retention element(s) for retaining the on-skin wearable medical device and releasing the on-skin wearable medical device from the applicator housing 501 to the skin in embodiments. The deployment mechanism may include an insertion assembly for inserting at least a portion of the on-skin wearable medical device into the skin. The insertion assembly may drive a portion of the on-skin wearable medical device, such as the insertion element and the sensor, into the skin of the host. The deployment mechanism may include a retraction assembly for retracting the portion of the on-skin wearable medical device from the skin, such as an insertion element.

In embodiments, the applicator 500 may include an activation element 502 disposed on a side of applicator 500, for example, on a side of an outer housing 504 of applicator 500. In some embodiments, activation element 502 may be a button, a switch, a toggle, a slide, a trigger, a knob, a rotating member, a portion of applicator 500 that deforms and/or flexes or any other suitable mechanism for activating an insertion and/or retraction assembly of applicator 500. In some embodiments, activation element 502 may be disposed in any location, e.g., a top, upper side, lower side, or any other location of applicator 500. Applicator 500 may be large enough for a host to grasp with a hand and push, or otherwise activate, activation element 502 with, for example, a thumb, or with an index finger and/or a middle finger.

Applicator 500 may be configured with one or more safety features such that applicator 500 is prevented from activating until the safety feature is deactivated. In one example, the one or more safety features prevents applicator 500 from activating unless applicator 500 is pressed against the skin of a host with sufficient force. Moreover, as will be described in more detail in connection with one or more of FIGS. 6-20B below, applicator 500 may be further configured such that one or more components therein retract based at least in part on the one or more components pushing against the skin of the host with a force exceeding a predetermined threshold, rather than based on the one or more components translating beyond a predetermined and static distal position. In other words, applicator 500 may implement force-based retraction triggering rather than being limited to displacement-based retraction triggering.

FIG. 6 illustrates an exploded perspective view of applicator 500 of FIG. 5, according to some embodiments. Applicator 500 may include outer applicator housing 504 comprising activation element 502. The outer applicator housing 504 may be configured to be gripped by a user in embodiments. Outer applicator housing 504 may be configured to translate in a distal direction by a force applied by a host to applicator 500, specifically to inner housing 506, thereby aligning activation element 502 in a position that allows applicator 500 to fire. Further explanation of the alignment process will be explained below.

Applicator 500 further comprises inner housing 506, configured to house at least one or more mechanisms utilized to apply on-skin sensor assembly 508 to skin of a host. A distal surface 510 of a bottom opening of inner housing 506 may define a bottom surface of applicator 500. In some embodiments, upon pressing applicator 500 against skin of the host, skin may deform in a substantially convex shape at distal surface 510 such that at least a portion of a surface of skin disposed at the bottom opening of applicator inner housing 506 extends into the bottom opening of inner housing 506 beyond a plane defined by distal surface 510 in a proximal direction.

Figure 7:
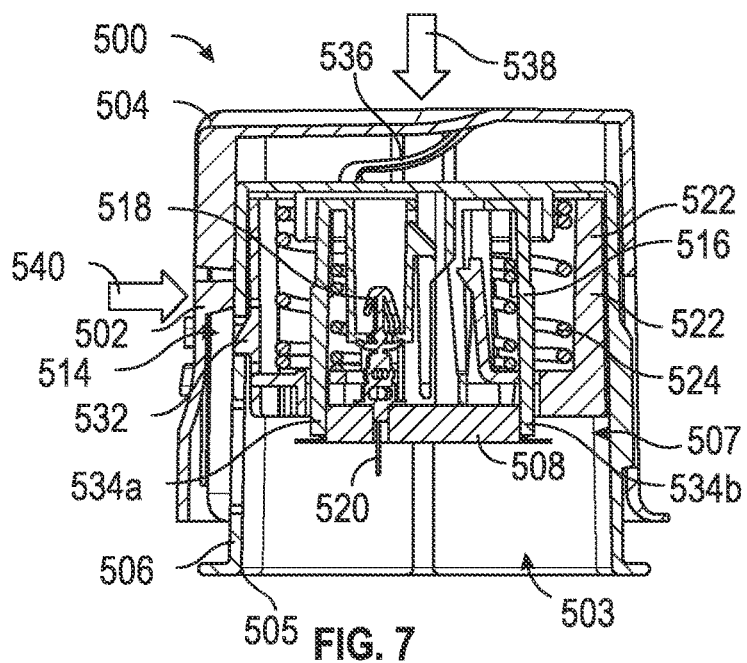
FIGS. 7-9 illustrate several cross-sectional views of the applicator system of FIGS. 5 and 6, taken along the section line A-A' of FIG. 5, during operation.

As shown in FIG. 7, the housing 501, and particularly the inner housing 506 may include an internal cavity 503 for retaining the on-skin wearable medical device. The internal cavity 503 may have a distal end portion 505 at the opening for on-skin wearable medical device to be deployed from. A proximal end portion 507 of the internal cavity 503 may include the on-skin wearable medical device coupled to the needle carrier assembly 516.

Referring back to FIG. 6, in some embodiments, a first barrier layer 512 may be disposed over one or more apertures in inner housing 506, for example, an aperture 514 through which at least a portion of activation element 502 may be configured to extend through during activation of applicator 500. In such embodiments, a portion of activation element 502 may be configured to pierce or deform first barrier layer 512 upon activation of applicator 500. First barrier layer 512 may comprise a gas permeable material such as Tyvek, or a non-gas permeable material such as metallic foil, polymer film, elastomer, or any other suitable material.

Applicator 500 may further comprise a needle carrier assembly 516, including a needle hub 518 configured to couple an insertion element 520 to needle carrier assembly 516. In some other embodiments, insertion element 520 may be directly coupled to needle carrier assembly 516. Insertion element 520 is configured to insert sensor of on-skin sensor assembly 508 into skin of the host. In some embodiments, the insertion element comprises a needle, for example, an open sided-needle, a needle with a deflected-tip, a curved needle, a polymer-coated needle, a hypodermic needle, or any other suitable type of needle or structure. In yet other embodiments, insertion element 520 may be integrally formed with sensor and may be sufficiently rigid to be inserted partially into skin of the host with minimal or no structural support.

Applicator 500 may further include a holder 522 releasably coupled to needle carrier assembly 516 and configured to guide needle carrier assembly 516 and on-skin sensor assembly 508 while coupled to needle carrier assembly 516, e.g., at least during translation from a proximal position to a distal insertion position. As will be described in more detail below, on-skin sensor assembly 508 may be stripped or released from holder 522 and/or needle carrier assembly 516 once on-skin sensor assembly 508 is disposed on skin of the host. For example, one or more retention elements may release the on-skin wearable medical device from the applicator housing 501.

Applicator 500 may further comprise an insertion assembly configured to translate insertion element 520, needle hub 518, needle carrier assembly 516, and on-skin sensor assembly 508 from a proximal position, in the distal direction, to a distal insertion position. Such an insertion assembly may include at least one spring for inserting at least a portion of the on-skin wearable medical device into the skin. The insertion assembly may include a first spring 524. First spring 524 may be a compression spring, or any suitable type of spring, and may have a first end in contact with or coupled to inner applicator housing 506 and a second end in contact with or coupled to holder 522. First spring 524 is configured to, upon activation of the insertion assembly, translate holder 522, needle carrier assembly 516, needle hub 518, insertion element 520 and on-skin sensor assembly 508, in the distal direction to the distal insertion position. Substantially at the distal insertion position, needle carrier assembly 516 may decouple from holder 522 and on-skin sensor assembly 508.

Applicator 500 may further comprise a retraction assembly for retracting the insertion element (e.g., needle) from the skin. The retraction assembly may be configured to translate needle carrier assembly 516, needle hub 518 and insertion element 520, in the proximal direction, from the distal insertion position to a proximal retracted position. In some embodiments the initial proximal position may be the same as the proximal retracted position. In other embodiments, the initial proximal position may be different from the proximal retracted position. Such a retraction assembly may include at least one spring. The retraction assembly may include a second spring 526. Second spring 526 may be a compression spring, or any suitable type of spring, and may have a first end contacting or coupled to holder 522 and a second end in contact with or coupled to at least one spring retention element (e.g., 528a, 528b in FIGS. 10-14), at least until retraction. Second spring 526 is configured to translate needle carrier assembly 516, needle hub 518, and insertion element 520 in the proximal direction from the distal insertion position to the proximal retracted position in response to on-skin sensor assembly 508 contacting skin of the host, and/or reaching a limit of travel with a force exceeding a predetermined threshold sufficient to cause first end of second spring 526 to overcome the at least one spring retention element (e.g., 528a, 528b in FIGS. 10-14). In some embodiments, a stop feature (not shown) may be disposed at a bottom of applicator 500, e.g., on a distal portion of inner housing 506. Such a stop feature may be configured to contact one or more of on-skin sensor assembly 508, needle carrier assembly 516, or holder 522 in the distal insertion position.

In some embodiments, a second barrier layer 530 may be disposed over the bottom opening of inner housing 506. Second barrier layer 530 may comprise a gas permeable material such as Tyvek, or a non-gas permeable material such as metallic foil, film. In some embodiments, second barrier layer 530 may be removed by the host prior to use of applicator 500. In embodiments comprising one or both of first and second barrier layers 512, 530, such layers may provide a sterile environment between applicator 500 and the outside environment and/or may allow ingress and egress of gas such as during sterilization.

Figure 8:
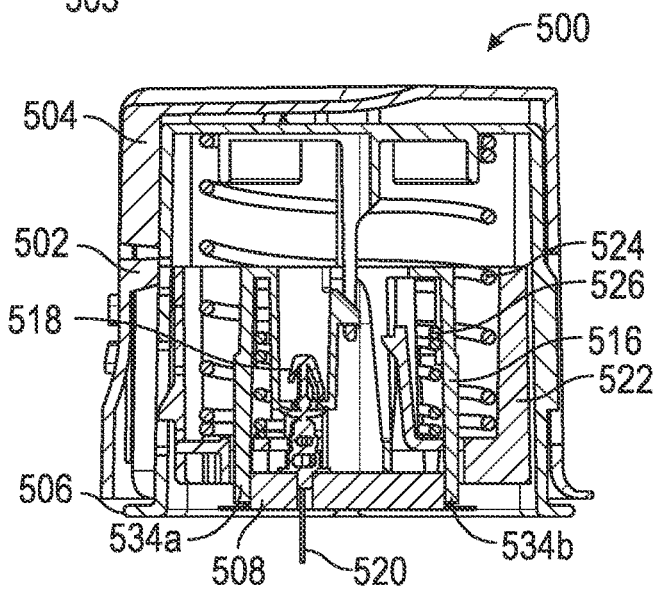
Figure 9:
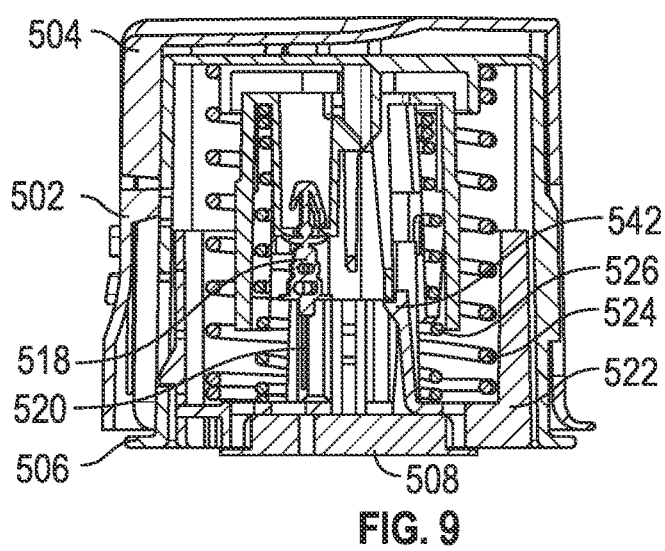

A brief description of some aspects of the operation of applicator 500 follows with respect to FIGS. 7-9, which illustrate several cross-sectional views of applicator 500 of FIGS. 5 and 6 during operation, according to some embodiments. FIGS. 7-9 may correspond to applicator 500 cut along the section line A-A' shown in FIG. 5, for example.

FIG. 7 illustrates a state of applicator 500 prior to activation. Holder 522 comprises an insertion assembly retention element 532 configured to contact inner housing 506, thereby immobilizing holder 522, needle carrier assembly 516, needle hub 518, insertion element 520 and on-skin sensor assembly 508, in the pre-activated state.

Needle carrier assembly 516 comprises a plurality of wearable retention and/or alignment elements 534a, 534b configured to extend through holder 522 and releasably couple on-skin sensor assembly 508 to holder 522 and/or to needle carrier assembly 516. Wearable retention elements 534a, 534b may comprise, e.g., arms, deflection element, tabs, detents, snaps or any other features capable of a retaining function. In some embodiments, wearable retention elements 534a, 534b may extend around rather than through holder 522. Although two wearable retention elements are illustrated, any number of wearable retention elements are contemplated. In some embodiments, wearable retention element(s) 534a, 534b may comprise snap fits, friction fits, interference features, elastomeric grips and/or adhesives configured to couple on-skin sensor assembly 508 with needle carrier assembly 516 and/or holder 522.

Inner housing 506 may comprise a spring 536 configured to contact outer housing 504 and maintain a predetermined spacing between outer housing 504 and inner housing 506 in the pre-activation orientation of FIG. 7. Spring 536 may be a compression spring, leaf spring, flex arm spring, a piece of foam or rubber, etc. In some other embodiments, outer housing 504 may comprise spring 536 and spring 536 may be configured to contact inner housing 506, in a reverse fashion from that shown in FIG. 7.

Activation of applicator 500 may include a host pressing applicator 500 against their skin with sufficient force to translate outer housing 504 in a distal direction, as shown by arrow 538, toward and with respect to inner housing 506 until activation element 502 is aligned with aperture 514 of inner housing 506 and insertion assembly retention element 532 of holder 522. Insertion assembly retention element 532 may comprise, e.g., an arm, a deflection element, a tab, a detent, a snap or any other feature capable of a retaining function. Once such an alignment is achieved, a host may initiate (e.g., push) activation element 502, as shown by arrow 540, thereby deflecting insertion assembly retention element 532 sufficiently to release holder 522 from inner housing 506. In some other embodiments, applicator 500 may be configured such that activation element 502 may be activated first, but that actual insertion is not triggered until outer housing 504 is translated sufficiently in the distal direction toward and with respect to inner housing 506. In yet other embodiments, activation element 502 may be biased toward a center of applicator 500 such that activation element 502 need not be explicitly activated by the host but, instead, activation element 502 may be configured to automatically initiate insertion upon outer housing 504 being translated sufficiently in the distal direction toward and with respect to inner housing 506.

Such configurations provide several benefits. First, translation of outer housing 504 with respect to inner housing 506 before activation provides a measure of drop protection such that if applicator 500 is accidentally dropped, it may not prematurely fire. Second, spring 536 provides a force bias that the host has to affirmatively overcome by pressing applicator 500 into their skin prior to firing, thereby reducing the probability of activating applicator 500 before it is properly positioned. Further, the host may decide to not fire applicator 500 and discontinue pressing applicator 500 against their skin, in which spring 536 will bias against outer housing 504 and allow outer housing 504 to return to its initial state.

Holder 522, needle carrier assembly 516, needle hub 518, insertion element 520, on-skin sensor assembly 508, first spring 524 and second spring 526 are all shown in pre-activation positions in FIG. 7.

FIG. 8 illustrates applicator 500 during insertion of on-skin sensor assembly 508 but before retraction of needle carrier assembly 516. First spring 524 drives holder 522, needle carrier assembly 516, needle hub 518, insertion element 520, and on-skin sensor assembly 508, in the distal direction toward the distal insertion position. FIG. 8 illustrates a position where on-skin sensor assembly 508 is in contact with skin of the host but where holder 522 is not yet fully driven, by first spring 524, into contact with on-skin sensor assembly 508 or skin of the host.

In some embodiments, masses of each of holder 522, needle carrier assembly 516, needle hub 518, insertion element 520, and on-skin sensor assembly 508 may be specifically designed to reduce or substantially eliminate a tendency of needle carrier assembly 516, needle hub 518, insertion element 520, and on-skin sensor assembly 508 to detach due to inertial forces from holder 522 while being driven in the distal direction during insertion. In some embodiments, a force exerted by first spring 524 may be selected to be sufficient for proper operation of applicator 500, while not so large as to further exacerbate such above-described inertially triggered detachment. In some embodiments, a spring (not shown) may be configured to exert a force against a portion of needle carrier assembly 516, for example in a distal direction, sufficient to prevent needle carrier assembly 516 from inertially triggered detaching from holder 522 during insertion.

FIG. 9 illustrates applicator 500 during activation, as needle carrier assembly 516, needle hub 518 and insertion element 520 are retracted in the proximal direction by second spring 526. In FIG. 9, first spring 524 has fully driven on-skin sensor assembly 508 to the skin of the host. In this position, second spring 526 is released from spring retention elements (e.g., 528a, 528b in FIGS. 10-14) and drives needle carrier assembly 516, needle hub 518, and insertion element 520 in the proximal direction from the distal insertion position. Upon needle carrier assembly 516 reaching the proximal retraction position, needle carrier retention element 542 of holder 522 engages with needle carrier assembly 516, thereby maintaining needle carrier assembly 516, needle hub 518 and insertion element 520 in a locked, retracted position limiting access to insertion element 520. Needle carrier retention element 542 may comprise, e.g., an arm, a deflection element, a tab, a detent, a snap or any other feature capable of a retaining function. In this retracted position, needle carrier assembly 516, needle hub 518, and insertion element 520 is prevented from travelling in a distal direction.

Figure 10:
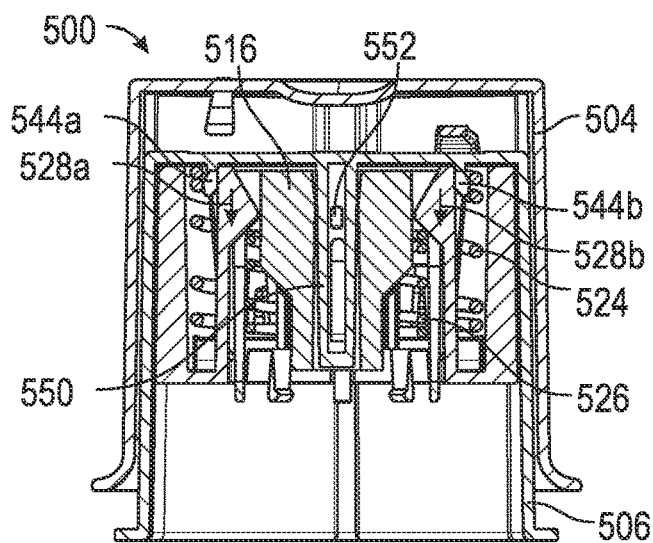
FIGS. 10-12 illustrate several cross-sectional views of the applicator system of FIGS. 5 and 6, taken along the section line B-B' of FIG. 5, during operation.
Figure 11:
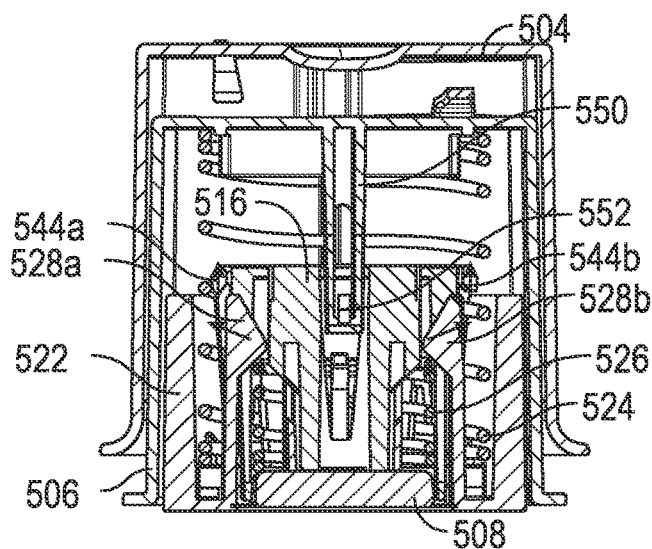
Figure 12:
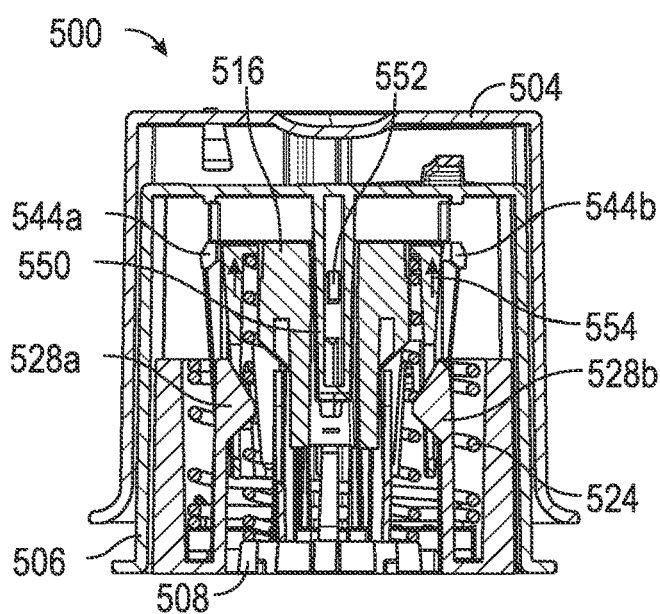

A further description of some aspects of the operation of applicator 500 follows with respect to FIGS. 10-12, which illustrate several cross-sectional views of applicator 500 of FIGS. 5 and 6 during operation, according to some embodiments. FIGS. 10-12 may correspond to applicator 500 cut along the section line B-B' shown in FIG. 5, for example. For ease of illustration, needle hub 518 and insertion element 520 are not shown in FIGS. 10-12.

FIG. 10 illustrates a state of applicator 500 prior to activation. For ease of illustration, on-skin sensor assembly 508 is not illustrated in FIG. 10. Holder 522 comprises spring retention elements 528a, 528b configured to contact and retain a first end of second spring 526 in the pre-activated state, e.g., during insertion, while a second end of spring 526 is in contact with needle carrier assembly 516. Spring retention elements 528a, 528b may comprise, e.g., arms, deflection element, tabs, detents, snaps or any other features capable of a retaining function. Although two spring retention elements 528a, 528b are shown, at least one spring retention element is contemplated. In some embodiments, applicator 500 may include one spring retention element, as shown in FIGS. 21-24. In some embodiments, applicator 500 may include three spring retention elements. In some embodiments, applicator 500 may include four spring retention elements. In some embodiments, spring retention elements 528a, 528b are deflectable arms, rigid arms, deformable features, snaps, catches, or hooks. In some embodiments, spring retention elements 528a, 528b may be actively deflected by one or more features within applicator 500.

Needle carrier assembly 516 comprises backstop features 544a, 544b, configured to prevent lateral deflection of spring retention elements 528a, 528b in the proximal starting position, e.g., at least during insertion, thereby supporting retention of second spring 526 between spring retention elements 528a, 528b and holder 522 until retraction. Although two backstop features are illustrated, any number of backstop features are contemplated. The number of backstop features may equal the number of spring retention elements.

Figure 13:
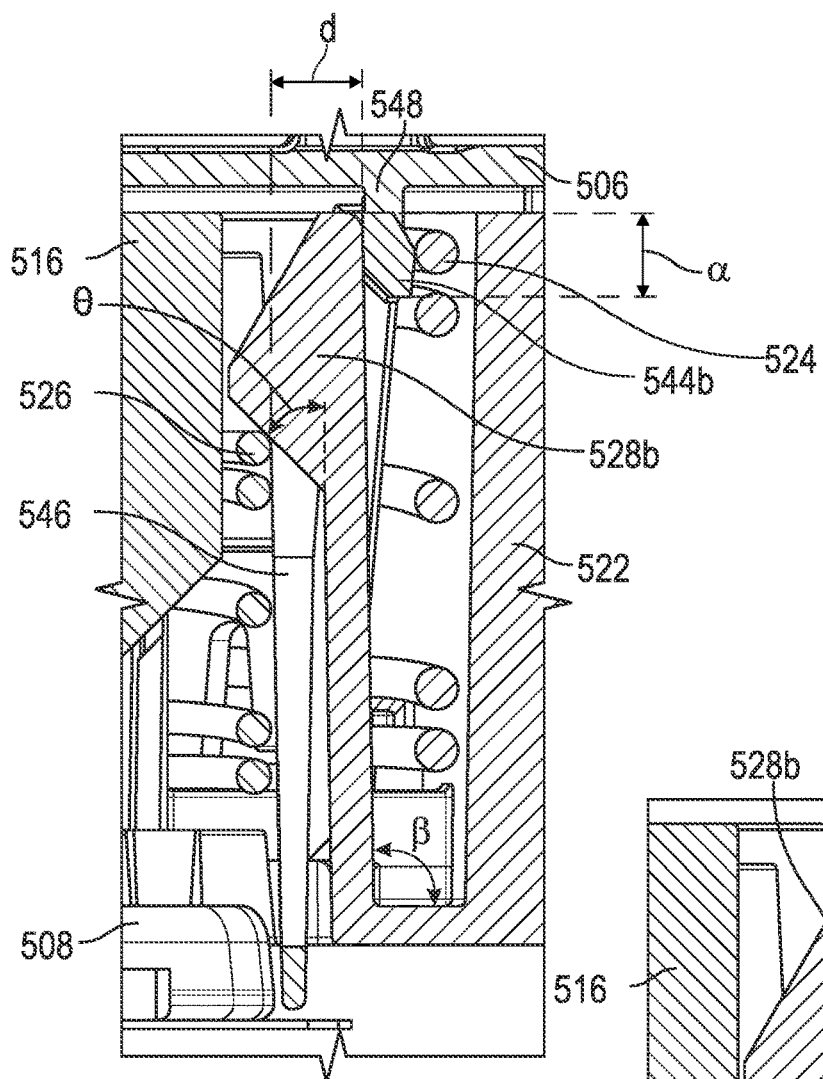
FIGS. 13 and 14 illustrate magnified views of some features of the applicator system of FIGS. 5 and 6.

FIG. 13 illustrates a magnified view of spring retention element 528b and backstop feature 544b. In FIG. 13, first spring 524 is driving holder 522, needle carrier assembly 516 and on-skin sensor assembly 508, in the distal direction toward the distal inserted position. Backstop feature 544b is shown engaged to spring retention element 528b, preventing spring retention element 528b from deflecting laterally, thereby preventing second spring 526 from releasing. As shown in FIG. 13, a proximal end of spring retention element 528b may be offset from a distal end of backstop feature 544b by a distance a. In some embodiments, distance a is the length required for spring retention element 528b to traverse along backstop feature 544b such that spring retention element 528b clears past backstop feature 544b. Backstop feature 544b may feature a ramp to guide spring retention element 528b. A distal end of needle carrier assembly 516 and a distal end of holder 522 may be offset from each other at least the same distance a to allow for spring retention element 528b to traverse distally past backstop feature 544b.

It may be appreciated that the frictional force between corresponding contacting surfaces of backstop feature 544b and spring retention element 528b may at least partly determine an amount of force to release spring retention element 528b from backstop feature 544b. This force may allow for lateral deflection of spring retention element 528b and thus allow the expansion of second spring 526. In some embodiments, the amount of force is at least 0.1 pounds. In some embodiments, the amount of force is at least 0.5 pounds. In some embodiments, the amount of force is at least 1 pound. In some embodiments, the amount of force is at least 2 pounds. In some embodiments, the amount of force is at least 3 pounds. In some embodiments, the amount of force is at least 4 pounds. In some embodiments, the amount of force is at least 5 pounds.

Although the figure shows backstop feature 544b preventing lateral deflection of spring retention element 528b in a radially outward direction, it is contemplated that an inverse structural relationship can be achieved. For instance, the ramped surface of spring retention element 528b can be reversed to face the opposite direction as shown in FIG. 13. Further, the ramped surface of spring retention element 528b may be biased in a radially inward direction by second spring 526 against backstop feature 544b. In such embodiments, backstop feature 544b may be located radially inward of spring retention element 528b.

Accordingly, in some embodiments, materials utilized to form holder 522 and needle carrier assembly 516 may be selected based on a desired amount of force to release spring retention element 528b for lateral deflection. Examples of such materials may include polycarbonate, ABS, PC/ABS, polypropylene, HIPS (High impact polystyrene), polybutylene terephthalate (PBT), polyoxymethylene (POM), acetal, polyacetal, polyformaldehyde, PTFE, high density polyethylene (HDPE), ultra-high-molecular-weight polyethylene (UHMWPE), nylon, polyethylene terephthalate (PET), thermoplastic elastomer (TPE), thermoplastic polyurethane (TPU), silicone thermoplastic elastomer (TPSiv), cyclo-olefin polymer (COP), cyclo-olefin copolymer (COC), and/or liquid-crystal polymer (LCP).

An angle $\theta$ of a portion of spring retention element 528b in contact with second spring 526 may also affect the amount of frictional force to laterally deflect spring retention element 528b and so to release second spring 526. Accordingly, the angle $\theta$ may be selected based on a desired amount of force to laterally deflect spring retention element 528b sufficiently to release second spring 526. In some embodiments, the angle $\theta$ is at least 1 degree with respect to a vertical axis of the spring retention element 528b. In some embodiments, the angle $\theta$ is at least 5 degrees. In some embodiments, the angle $\theta$ is at least 10 degrees. In some embodiments, the angle $\theta$ is at least 15 degrees. In some embodiments, the angle $\theta$ is at least 20 degrees. In some embodiments, the angle $\theta$ is about 30 to 45 degrees. In addition, the force profile of second spring 526 may affect a target amount of frictional force to laterally deflect spring retention element 528b. Accordingly, in some embodiments, the force profile of second spring 526 may be taken into account when selecting one or both of the materials for forming holder 522 and needle carrier assembly 516 and the angle $\theta$ of the portion of spring retention element 528b in contact with second spring 526.

An angle $\beta$ of spring retention element 528b with respect to a vertical axis may also affect the amount of frictional force to laterally deflect spring retention element 528b and so to release second spring 526. By contacting spring retention element 528b, second spring 526 may exert a force on spring retention element 528b at a distance d from a bottom of spring retention element 528b that causes a torque moment sufficient to induce a lateral deflection of spring retention element 528b.

Figure 14:
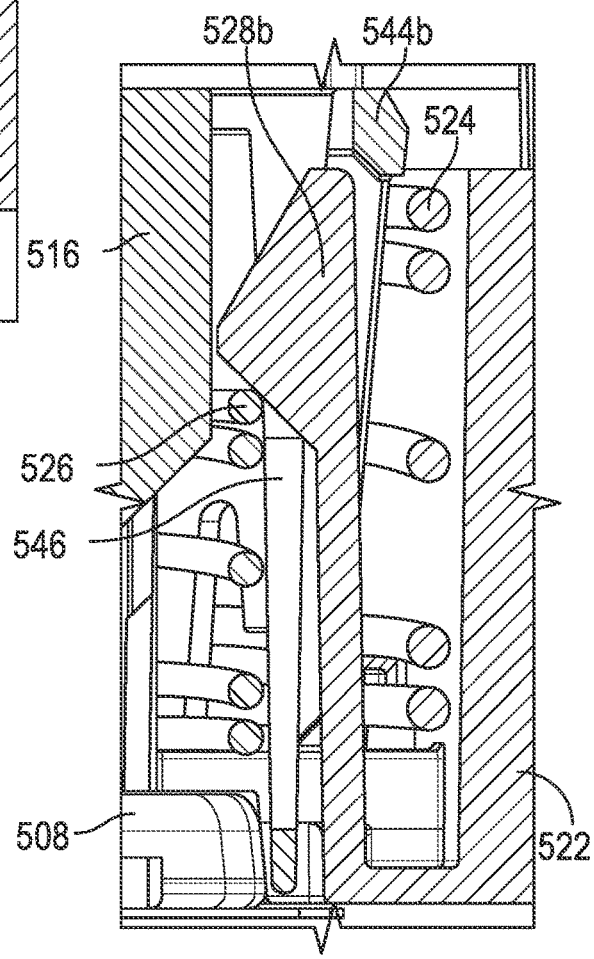

FIG. 13 further illustrates needle carrier assembly 516 comprising a deflecting element 546 configured to contact spring retention element 528b and maintain spring retention element 528b in a laterally deflected orientation once second spring 526 has initially deflected spring retention element 528b and sufficiently driven needle carrier assembly 516 in the proximal direction, as will be shown in more detail in FIG. 14. Deflecting element 546 may prevent spring retention element 528b from contacting the windings of second spring 526 while second spring 526 is extending, smoothing the operation of applicator 500 and preventing energy released by second spring 526 and designed for driving needle carrier assembly 526 in the proximal direction from being absorbed by undesired contact with spring retention element 528b during the release of second spring 526.

In some embodiments, the angle θ of the portion of spring retention element 528b in contact with second spring 526 may be substantially 90° (e.g., flat) and deflecting element 546 may have a ramped or angled surface in contact with spring retention element 528b in the position illustrated in FIG. 13. In such embodiments, deflecting element 546, in addition to the above-described functionality, may be configured to initially deflect spring retention element 528b as first spring 524 drives holder 522 from the position illustrated in FIG. 13 to the position illustrated in FIG. 14.

In some embodiments, inner housing 506 may comprise a protrusion 548 extending from inner housing 506 in the distal direction. Protrusion 548 may be configured to contact at least one of spring retention elements 528a, 528b and backstop features 544a, 544b in the pre-activation state such that spring retention elements 528a, 528b are prevented from laterally deflecting until holder 522 and needle carrier assembly 516 have translated at least a predetermined minimum distance in the distal direction. Accordingly, protrusion 548 may provide a measure of drop protection such that applicator 500 may not prematurely fire in response to a concussive shock from being dropped before intentional activation.

Turning back to FIG. 10, inner housing 506 may further comprise an engagement element 550 configured to engage with a protrusion 552 of needle carrier assembly 516 upon needle carrier assembly 516 translating in the distal direction beyond a predetermined threshold, thereby preventing needle carrier assembly 516 from translating in the distal direction beyond the predetermined threshold. It is contemplated that this may ensure needle carrier assembly retraction in the event of an air firing or dry firing in which applicator 500 is somehow activated when not held against the skin of the host. In some embodiments, the predetermined threshold may correspond to the distal end of needle carrier assembly 516 extending beyond a point proximal to the distal end of inner housing 506, to a point substantially in line with the distal end of inner housing 506 or to a point distal of the distal end of inner housing 506. In some embodiments, engagement element 550 comprises a hook, a U-shaped structure, a loop, a protrusion, or any other structure capable of engaging with protrusion 552 as described above.

FIG. 11 illustrates applicator 500 after activation, at a beginning of a force retraction feature process at or near the distal insertion position where on-skin sensor assembly 508 may be in contact with the skin of the host. First spring 524 has driven holder 522, needle carrier assembly 516, needle hub 518, insertion element, and on-skin sensor assembly 508, in the distal direction toward the distal insertion position. During proper operation, holder 522 and on-skin sensor assembly 508 should be pressing against the skin of the host. However, FIG. 11 may also illustrate a dry fire condition, where applicator 500 is not properly pressed against the skin of the host before triggering applicator 500. Accordingly, upon first spring 524 driving holder 522 and needle carrier assembly 516 in the distal direction beyond the predetermined threshold, engagement element 550 contacts protrusion 552, which prevents needle carrier assembly 516 from traveling further in the distal direction, while holder 522 is driven sufficiently further in the distal direction such that backstop features 544a, 544b of needle carrier assembly 516 no longer contact spring retention elements 528a, 528b in the distal insertion position, thereby releasing the first end of second spring 526 and initiating retraction even when applicator 500 is dry fired. The insertion force provided by first spring 524 may be sufficient to additionally overcome the frictional force between corresponding contacting surfaces of backstop feature 544b and spring retention element 528b.

Turning to FIG. 14, first spring 524 has driven holder 522, needle carrier assembly 516 and on-skin sensor assembly 508 in the distal direction to the skin of the host. As first spring 524 drives holder 522, needle carrier assembly 516 and on-skin sensor assembly 508 against the skin of the host, the skin provides a counter force to the force generated by first spring 524. The skin may oppose the force of first spring 524 and bias against the distal end of on-skin sensor assembly 508. Because the distal end of holder 522 is offset from the distal end of on-skin sensor assembly 508 as shown in FIG. 13, the counter force provided by the skin is transferred to holder 522 as first spring 524 continues to drive holder 522 towards the skin while on-skin sensor assembly 508 is pressed against the skin. The counter force provided by the skin allows spring retention element 528b to displace past backstop feature 544b. Once spring retention element 528b has cleared distance a past backstop feature 544b, second spring 526 can laterally deflect spring retention element 528b, thereby releasing second spring 526, which drives needle carrier assembly 516 in the proximal direction. Alternatively, as described above in connection with FIG. 13, where the angle θ of the portion of spring retention element 528b in contact with second spring 526 is substantially 90° (e.g., flat), the ramped or angled surface of deflecting element 546 in contact with spring retention element 528b deflects spring retention element 528b sufficiently to release second spring 526, which drives needle carrier assembly 516 in the proximal direction.

In some embodiments, engagement element 550 may engage protrusion 552 even when applicator 500 is pressed against the skin of a user. In such embodiments, engagement element 550 engages protrusion 552 as first spring 524 drives holder 522, needle carrier assembly 516, and on-skin sensor assembly 508 against the skin of the host. As explained above, engagement element 550 prevents needle carrier assembly 516 from moving distally when engagement element 550 engages protrusion 552. This allows spring retention elements 528a, 528b to separate away from backstop features 544a, 544b and allow for release of second spring 526. The engagement of engagement element 550 and protrusion 552 may add additional force to the counter force provided by the skin, thus increasing the energy needed to overcome the frictional engagement of spring retention elements 528a, 528b and backstop features 544a, 544b. In some instances, the engagement of engagement element 550 and protrusion 552 provides an immediate impulse force that converts at least some of the initial energy of first spring 524 into energy needed to overcome the frictional engagement of spring retention elements 528a, 528b and backstop features 544a, 544b. It is contemplated that such embodiments may benefit users with soft skin or higher body fat percentage.

Turning back to FIG. 12, which illustrates applicator 500 during activation, needle carrier assembly 516 is retracted in the proximal direction by second spring 526, as indicated by arrow 554. In FIG. 12, with backstop features 544a, 544b no longer immobilizing spring retention elements 528a, 528b, first end of second spring 526 pushes against spring retention elements 528a, 528b with sufficient force to deflect spring retention elements 528a, 528b in the distal insertion position when on-skin sensor assembly 508 is in contact with skin of the host, allowing second spring 526 to clear spring retention elements 528a, 528b and drive needle carrier assembly 516 in the proximal direction, thereby maintaining needle carrier assembly 516, needle hub 518 (see FIGS. 7-9) and insertion element 520 (see FIGS. 7-9) in a locked, retracted position even in the event of a dry fire.

Figure 15:
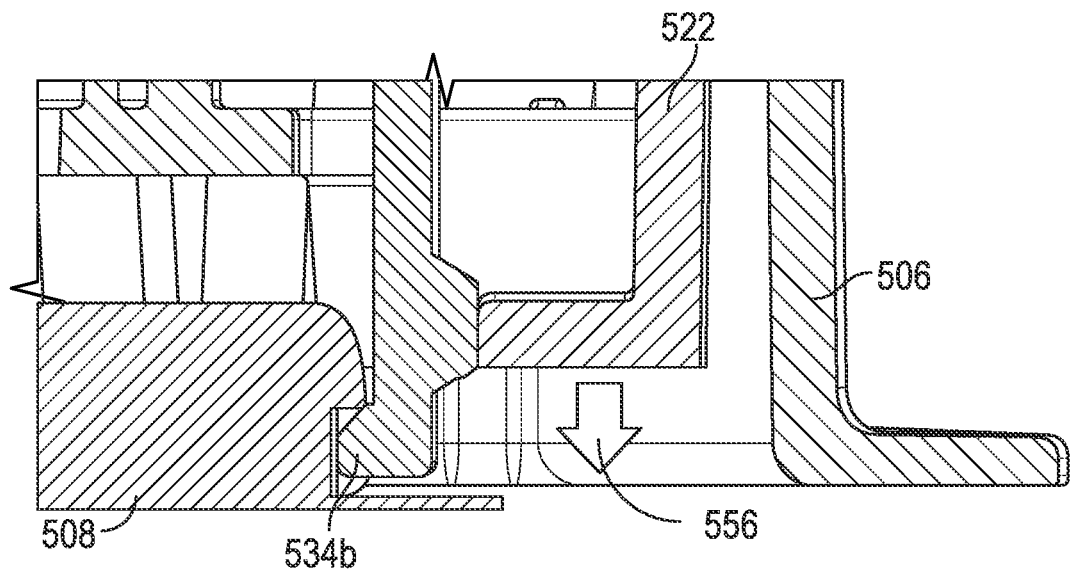
FIGS. 15 and 16 illustrate magnified views of some features of the applicator system of FIGS. 5 and 6.
Figure 16:
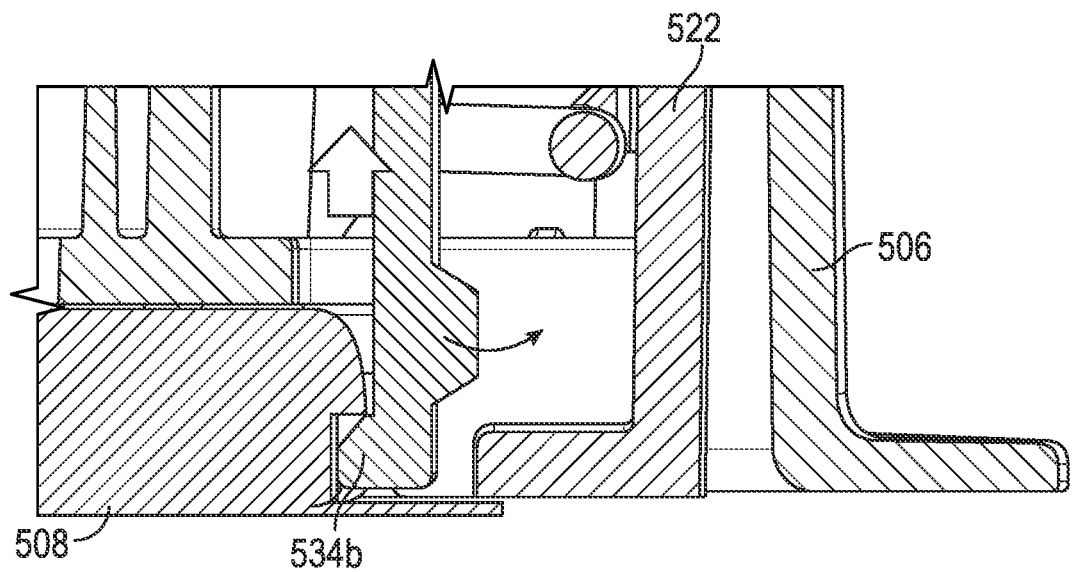

FIGS. 15 and 16 illustrate magnified views of some features of an applicator, such as applicator 500, according to some embodiments.

In FIG. 15, first spring 524 (see FIGS. 6-12) is driving holder 522, as well as the needle carrier assembly and on-skin sensor assembly 508 in the distal direction, illustrated by arrow 556, toward the distal insertion position. Retention element 534b of the needle carrier assembly is releasably coupled to on-skin sensor assembly 508. As illustrated, during insertion and near the distal inserted position, holder 522 is in contact with spring retention element 534b, preventing spring retention element 534b from deflecting laterally and thereby rigidly securing on-skin sensor assembly 508 to the needle carrier assembly.

In FIG. 16, second spring 526 (see FIGS. 6-12) is driving needle carrier assembly 516 in the proximal direction from the distal insertion position. Because holder 522 has been driven sufficiently in the distal direction, at the distal insertion position, holder 522 is no longer in contact with wearable retention element 534b. Accordingly, wearable retention element 534b is free to deflect laterally, thereby releasing on-skin sensor assembly 508 from wearable retention element 534b and thus from the needle carrier assembly 516. Needle carrier assembly 516 is now driven in the proximal direction by second spring 526, while on-skin sensor assembly 508 is secured to the skin of the host. Moreover, in some embodiments, because holder 522 is driven to the distal inserted position and substantially held in that position by first spring 524, holder 522 may press against one or both of on-skin sensor assembly 508 or an adhesive patch of on-skin sensor assembly 508, supporting one or both during attachment to the skin of the host.

FIG. 17 illustrates a perspective partial cutaway view of needle carrier assembly 516, needle hub 518, and on-skin sensor assembly 508 of applicator 500 of FIGS. 5 and 6, according to some embodiments. FIG. 18 illustrates a cross-sectional view of needle hub 518 and on-skin sensor assembly 508, according to some embodiments. FIG. 19 illustrates a top view of a portion of needle carrier assembly 516 and needle hub 518, according to some embodiments. The following is a description of these features with reference to FIGS. 17-19.

On-skin sensor assembly 508 comprises sensor assembly opening 560. Needle hub 518 is configured to couple insertion element 520 to needle carrier assembly 516 and to substantially maintain a desired orientation of insertion element 520 during insertion of the sensor of on-skin sensor assembly 508 into the skin of the host.

Needle hub 518 comprises a plurality of upper arms 562a, 562b, a plurality of lower arms 564a, 564b, and a base 566. Although two upper arms and two lower arms are illustrated, any number of arms, including a single upper and lower arm, are contemplated. In some embodiments, upper arms 562a, 562b and lower arms 564a, 564b may be flexible such that, when needle hub 518 is coupled to needle carrier assembly 516, upper arms 562a, 562b and lower arms 564a, 564b secure needle hub 518 in a desired orientation with respect to needle carrier assembly 516. For example, upper arms 562a, 562b may be configured to flex radially inward, such that when disposed through a carrier aperture 568 in needle carrier assembly 516, upper arms 562a, 562b are in contact with an upper surface of needle carrier assembly 516 adjacent to carrier aperture 568 and lower arms 564a, 564b are in contact with a lower surface of needle carrier assembly 516 adjacent to carrier aperture 568. Such an arrangement allows a compliant fit between needle carrier assembly 516 and needle hub 518 where lower arms 564a, 564b deflect to allow upper arms 562a, 562b to expand after clearing surface of carrier aperture 568. The lower arms 564a, 564b can partially or fully relax to bias the needle hub in a distal direction and decrease the clearance between the needle hub and the needle carrier that would otherwise exist with a non-compliant fit. In addition, upper arms 562a, 562b and lower arms 564a, 564b also help to maintain contact between base 566 and a top surface of on-skin sensor assembly 508.

Base 566 comprises an anti-rotation feature. The anti-rotation feature may comprise a key having a shape complementary to at least a portion of sensor assembly opening 560 of on-skin sensor assembly 508 and may be configured to substantially prevent needle hub 518 from rotating about an axis 567 parallel to insertion element 520 with respect to on-skin sensor assembly 508, e.g., to prevent rotation of base 566 within sensor assembly opening 560. In addition, or the alternative, the upper surface of needle carrier assembly 516 adjacent to carrier aperture 568 may comprise a groove 570 configured to accept upper arms 562a, 562b when upper arms 562a, 562b are disposed through carrier aperture 568 in an orientation complementary to an orientation of groove 570, as illustrated in FIG. 19, thereby immobilizing needle hub 518 with respect to needle carrier assembly 516.

In some embodiments, base 566 further comprises a substantially flat surface configured to mate with a top surface or proximal surface of on-skin sensor assembly 508 and maintain insertion element 520 in a substantially perpendicular orientation to the top surface of on-skin sensor assembly 508, in some cases, when the anti-rotation feature of base 566 is engaged within sensor assembly opening 560 of on-skin sensor assembly 508.

Based at least upon the above-described features of needle hub 518, on-skin sensor assembly 508, and/or needle carrier assembly 516, base 566 allows easy assembly during manufacture, including but not limited to proper alignment and preassembly of insertion element 520 onto on-skin sensor assembly 508, and/or the ability to easily engage an assembly of needle hub 518, insertion element 520, sensor and on-skin sensor assembly 508 to other portions of assembled applicator 500.

Figure 20A:
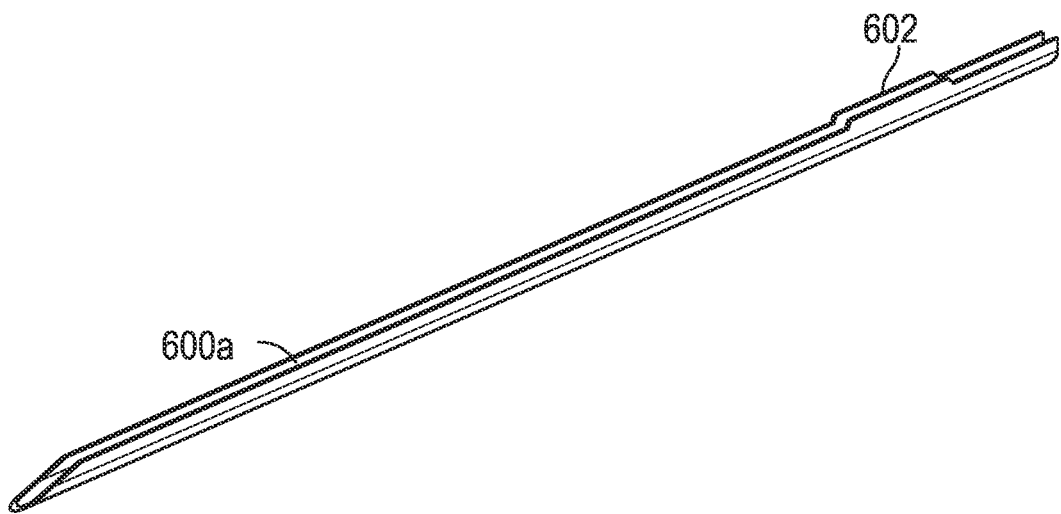
FIGS. 20A and 20B illustrate perspective views of locking features for needles for use in an applicator for an analyte sensor system.
Figure 20B:
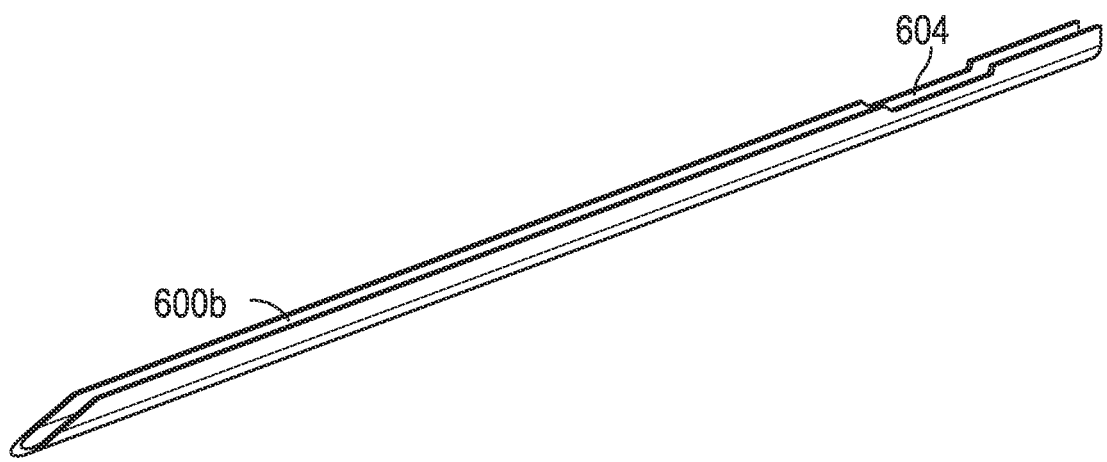

FIGS. 20A and 20B illustrate perspective views of locking features for insertion elements in the form of needles 600a, 600b for use in an applicator for an analyte sensor system, according to some embodiments. For example, needle 600a of FIG. 20A comprises a locking feature comprising a ridge 602 configured to mate with a complementary-shaped feature within needle hub 518, for example. In the alternative, needle 600b of FIG. 20B comprises a locking feature comprising a groove 604 configured to mate with a complementary-shaped feature within needle hub 518, for example.

In yet another alternative, any insertion element described in this disclosure may comprise a locking feature that heat stakes the selected insertion element to needle hub 518, for example. In yet another alternative, any insertion element described in this disclosure may comprise a locking feature comprising one or more friction-fit or snap-fit elements securing the selected insertion element to needle hub 518, for example. In yet another alternative, any insertion element described in this disclosure may comprise a locking feature comprising complementary clamshell elements on the selected insertion element and needle hub 518, for example, configured to mate with one another. In yet another alternative, any insertion element described in this disclosure may comprise a locking element comprising one or more inserted molded elements configured to couple the selected insertion element to needle hub 518, for example.

During manufacture, applicator 500 may be assembled in stages. For example, and not limitation, if present, first barrier layer 512 may be affixed to inner housing 506. Insertion element 520 may be coupled to needle hub 518, which may then be coupled to on-skin sensor assembly 508. Second spring 526 may be placed into holder 522 or needle carrier assembly 516 and then needle carrier assembly 516 may be disposed into holder 522 and attached to needle hub 518 and to on-skin sensor assembly 508 via wearable retention elements 534a, 534b. First spring 524 may be disposed in holder 522, which may then be installed into inner housing 506. Inner housing 506 may be inserted into and secured to outer housing 504. If present, second barrier layer 530 may be affixed to inner housing 506. If a separate element, activation element 502 may then be disposed into outer housing 504. Any labeling, sterilizing and/or packaging may then be applied to applicator 500.

Figure 21:
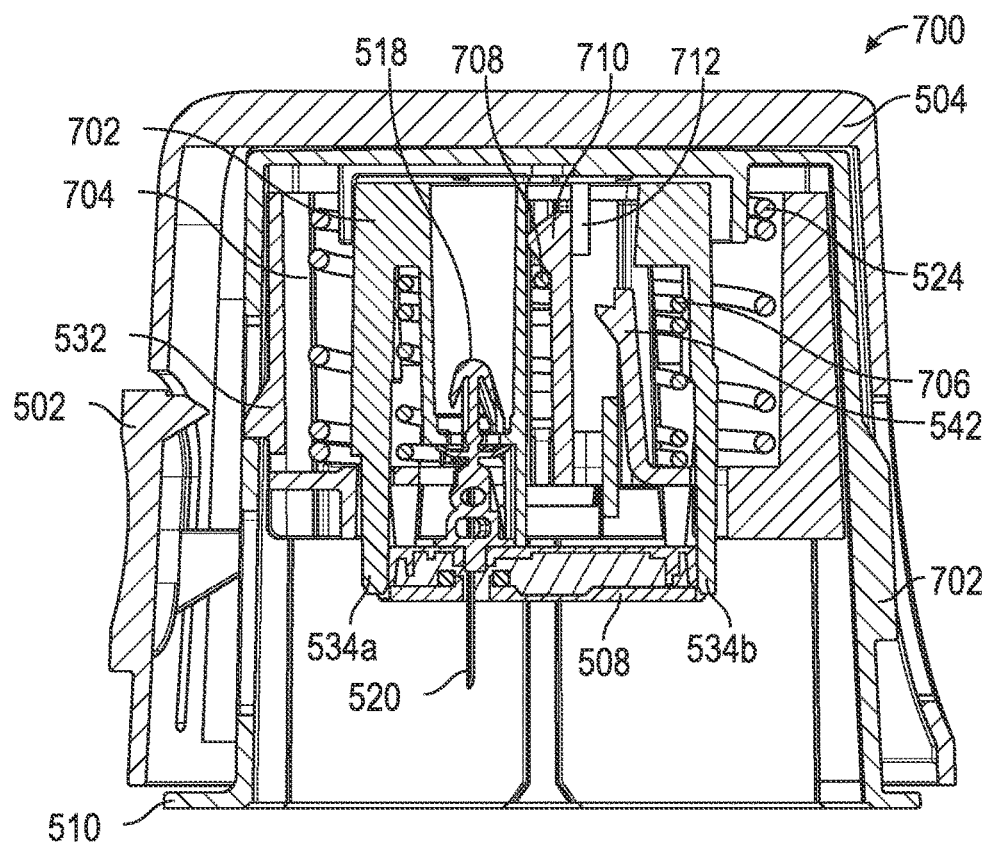
FIGS. 21-23 illustrate several cross-sectional views, and various features and operating positions, of yet another applicator for an on-skin sensor assembly of an analyte sensor system.
Figure 22:
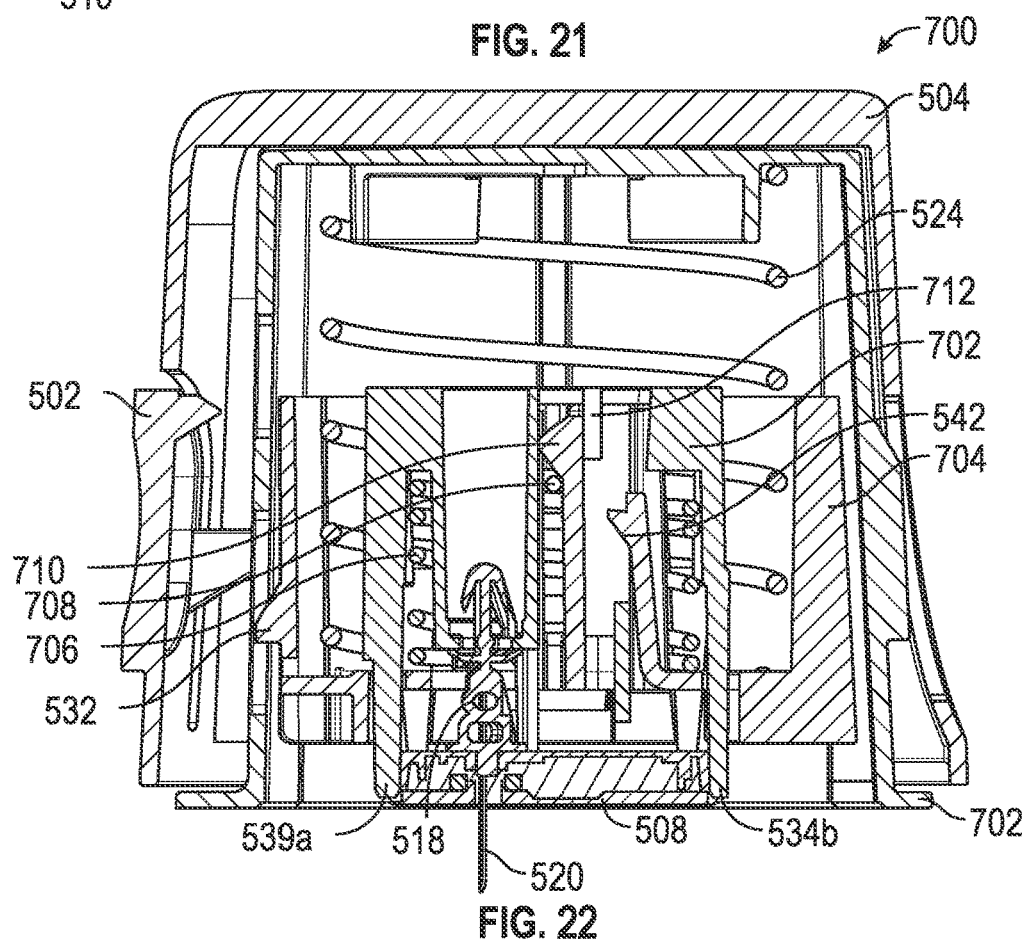
Figure 23:
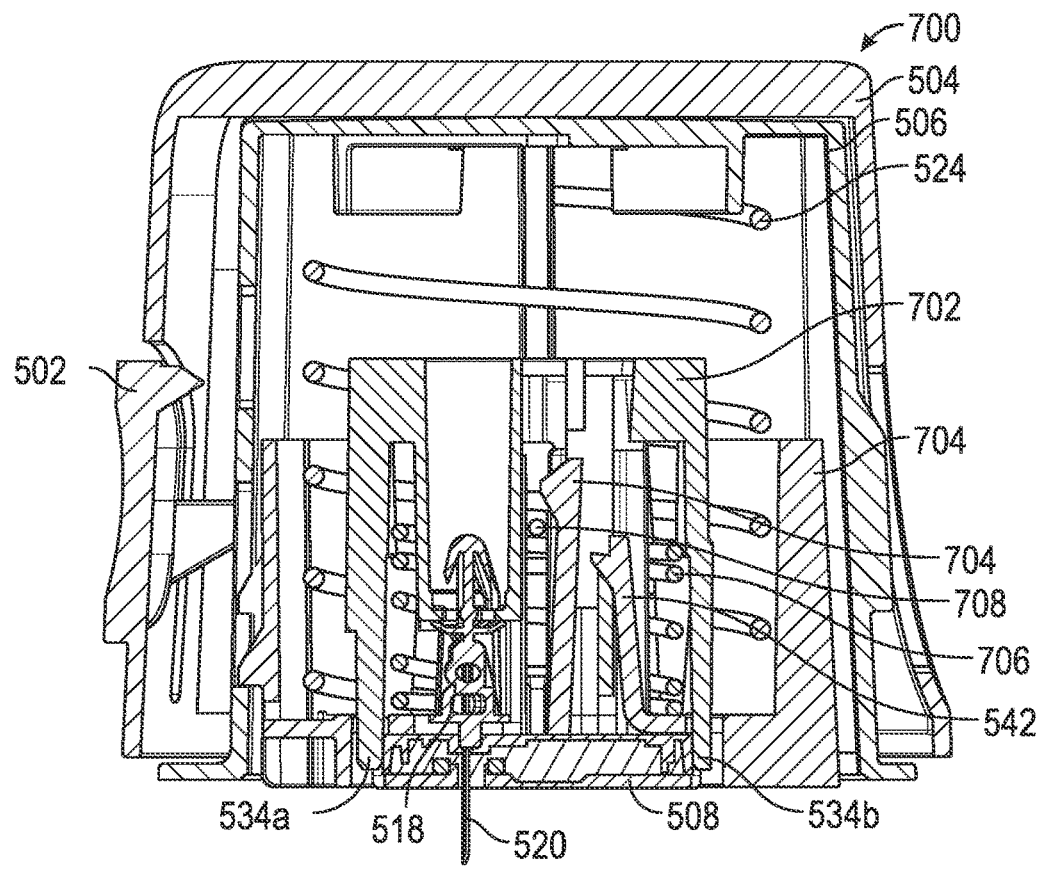

FIGS. 21-23 illustrate several cross-sectional views, and various features and operating positions, of yet another applicator 700 for an on-skin sensor assembly of an analyte sensor system, according to some embodiments.

Applicator 700 may include outer applicator housing 504 comprising activation element 502. Outer applicator housing 504 may be configured to translate in a distal direction under force applied by a host of applicator 700, thereby aligning activation element 502 in a position that allows applicator 700 to fire, an alignment illustrated by FIG. 21. As previously described in connection with applicator 500, in some embodiments, activation element 502 may be disposed in any location, e.g., a top, upper side, lower side, or any other location of applicator 700.

Applicator 700 further comprises inner housing 506, configured to house one or more mechanisms utilized to apply on-skin sensor assembly 508 to skin of a host. Distal surface 510 of a bottom opening of inner housing 506 may define a bottom surface of applicator 700. In some embodiments, upon pressing applicator 700 against the skin of the host, the skin may deform in a substantially convex shape at distal surface 510 such that at least a portion of a surface of the skin disposed at the bottom opening of applicator housing 506 extends into the bottom opening of inner housing 506, in a proximal direction, beyond a plane defined by distal surface 510.

Although not illustrated in FIGS. 21-23, inner housing 506 may comprise a spring 536 configured to contact outer housing 504 and maintain a predetermined spacing between outer housing 504 and inner housing 506 in the pre-activation orientation (see FIG. 7). Spring 536 may be a compression spring, leaf spring, flex arm spring, a piece of foam or rubber, etc. In some other embodiments, outer housing 504 may comprise spring 536 and spring 536 may be configured to contact inner housing 506.

Applicator 700 may further comprise a needle carrier assembly 702. Needle carrier assembly 702 comprises wearable retention and/or alignment elements 534a, 534b configured to pass through holder 704 and releasably couple on-skin sensor assembly 508 to holder 704 and/or to needle carrier assembly 702. Although two wearable retention and/or alignment elements are illustrated, any number of wearable retention and/or alignment elements are contemplated.

Applicator 700 further comprises needle hub 518 configured to couple insertion element 520 to needle carrier assembly 702. Insertion element 520 is configured to insert sensor of on-skin sensor assembly 508 into skin of the host. In some embodiments, insertion element 520 comprises a needle, for example, an open sided-needle, a needle with a deflected-tip, a curved needle, a polymer-coated needle, a hypodermic needle, or any other suitable type of needle or structure. In yet other embodiments, insertion element 520 may be integrally formed with sensor, in which insertion element 520 may be sufficiently rigid to be inserted partially into skin of the host with minimal or no structural support.

Applicator 700 may further include holder 704 releasably coupled to needle carrier assembly 702 and configured to guide on-skin sensor assembly 508 while coupled to needle carrier assembly 702, e.g., at least during translation from a proximal position to a distal insertion position. As previously described in connection with applicator 500, on-skin sensor assembly 508 may be stripped or released from holder 704 and/or needle carrier assembly 702 once on-skin sensor assembly 508 is disposed on the skin of the host.

Applicator 700 may further comprise an insertion assembly configured to translate insertion element 520, needle hub 518, and needle carrier assembly 702 from a proximal position, in the distal direction, to a distal insertion position. Such an insertion assembly may include first spring 524. First spring 524 may be a compression spring, or any suitable type of spring, and may have its first end in contact with or coupled to inner applicator housing 506 and its second end in contact with or coupled to holder 704. First spring 524 is configured to, upon activation of the insertion assembly, translate holder 704, needle carrier assembly 702, needle hub 518, insertion element 520 and on-skin sensor assembly 508, in the distal direction to the distal insertion position. Substantially at the distal insertion position, needle carrier assembly 702 may decouple from holder 704 and on-skin sensor assembly 508.

Applicator 700 may further comprise a retraction assembly configured to translate needle carrier assembly 702, needle hub 518 and insertion element 520, in the proximal direction, from the distal insertion position to a proximal retracted position. In some embodiments the initial proximal position may be the same as the proximal retracted position. In other embodiments, the initial proximal position may be different from the proximal retracted position. Such a retraction assembly may include a second spring 706. Second spring 706 may be a compression spring, or any suitable type of spring, and may have a first end contacting or coupled to holder 704 and a second end, comprising a tang 708 (e.g., a spring portion or spring end) disposed substantially along a diameter of second spring 706, in contact with or coupled to a spring retention element 710 of holder 704, at least until retraction. Spring retention element 710 may comprise, e.g., an arm, a deflection element, a tab, a detent, a snap or any other feature capable of a retaining function. Spring retention element 710 may have substantially the same form and function as spring retention elements 528a, 528b of applicator 500 except as described below. Second spring 706 is configured to translate needle carrier assembly 702, needle hub 518, and insertion element 520 in the proximal direction from the distal insertion position to the proximal retracted position. Tang 708 of second spring 706 is released from spring retention element 710 in the distal insertion position when spring retention element 710 is not backed up by backstop element 712 and in response to tang 708 of second spring 706 pushing against spring retention element 710 with a force exceeding a predetermined threshold sufficient to overcome and deflect spring retention element 710.

Needle carrier assembly 702 further comprises a backstop feature 712, configured to prevent lateral motion of spring retention element 710 of holder 704 in at least the proximal pre-activation position, thereby supporting retention of second spring 706 between spring retention element 710 and holder 704 until retraction. In the orientation shown in FIG. 21, second spring 706 is exerting a force against spring retention element 710 but backstop feature 712 prevents lateral deflection of retention element 710.

Holder 704 further comprises needle carrier retention element 542, which may comprise a deflectable arm, rigid arm, deformable feature, snap, catch, or hook. Upon needle carrier assembly 702 reaching the proximal retraction position after activation, needle carrier retention element 542 is configured to engage with needle carrier assembly 702, thereby maintaining needle carrier assembly 702, needle hub 518 and insertion element 520 in a locked, retracted position, limiting access to insertion element 520.

Although not illustrated in FIGS. 21-23, inner housing 506 of applicator 700 may further comprise engagement element 550 and needle carrier assembly 702 may further comprise protrusion 552 and may function substantially as previously described in connection with at least FIGS. 10-12.

Although not illustrated in FIGS. 21-23, inner housing 506 of applicator 700 may further comprise a protrusion extending from inner housing 506 in the distal direction, substantially as previously described protrusion 548. Similar to that previously described in connection with FIG. 13, this protrusion may be configured to contact at least one of spring retention element 710 and backstop feature 712 in the pre-activation state such that spring retention element 710 is prevented from laterally deflecting until holder 704 and needle carrier assembly 702 have translated at least a predetermined minimum distance in the distal direction. Accordingly, the protrusion may provide a measure of drop protection such that applicator 700 may not prematurely fire in response to a concussive shock from being dropped before activation.

Applicator 700 functions substantially similarly to applicator 500 with the exception that instead of utilizing spring retention elements 528a, 528b, which are disposed along an outside of second coil of spring 526 and are configured to contact and retain a coil of second spring 526, applicator 700 utilizes spring retention element 710, which is disposed along an inside of second spring 706 and is configured to contact and retain tang 708 of second spring 706 along a diameter of second spring 706. Disposing spring retention element 710 within and substantially along a center of second spring 706, as opposed to along an outside of second spring 706, further ensures that spring retention element 710 does not contact the coils of second spring 706 as second spring 706 extends during retraction, thereby smoothing the operation of applicator 700. In addition, the arrangement including spring retention element 710, as opposed to spring retention elements 528a, 528b mitigates the risk of, and difficulty ensuring that, multiple spring retention elements trigger or are overcome at substantially the same time.

FIG. 21 illustrates a state of applicator 700 prior to activation, according to some embodiments. Holder 704, needle carrier assembly 702, needle hub 518, insertion element 520, on-skin sensor assembly 508, first spring 524 and second spring 526 are all shown in pre-activation positions.

Retention element 532 of holder 704 is in contact with inner housing 506, thereby immobilizing holder 704, and therefore also needle carrier assembly 702, needle hub 518, insertion element 520 and on-skin sensor assembly 508, in the pre-activated state.

Backstop feature 712 of needle carrier assembly 702 is in contact with and prevents spring retention element 710 from deflecting laterally, thereby ensuring spring retention element 710 retains tang 708 of second spring 706 in the loaded or pre-activation position shown.

Activation of applicator 700 may include a host pressing applicator 700 against their skin with sufficient force to translate outer housing 504 in a distal direction toward and with respect to inner housing 506 until activation element 502 is aligned with insertion assembly retention element 532 of holder 704, as shown in FIG. 21. Once such an alignment is achieved, a host may initiate activation element 502, thereby deflecting insertion assembly retention element 532 sufficiently to release holder 704 from inner housing 506. In some other embodiments, applicator 700 may be configured such that activation element 502 may be activated first, but that actual insertion is not triggered until outer housing 504 is translated sufficiently in the distal direction toward and with respect to inner housing 506. In yet other embodiments, activation element 502 may be biased toward a center of applicator 700 such that activation element 502 need not be explicitly activated by the host but, instead, activation element 502 may be configured to automatically initiate insertion upon outer housing 504 being translated sufficiently in the distal direction toward and with respect to inner housing 506.

FIG. 22 illustrates applicator 700 after activation and during insertion, according to some embodiments. First spring 524 drives holder 704, and so needle carrier assembly 702, needle hub 518, insertion element 520, and on-skin sensor assembly 508, in the distal direction toward the distal insertion position. FIG. 22 illustrates on-skin sensor assembly 508 in contact with skin of the host but where holder 704 is not yet fully driven, by first spring 524, into contact with on-skin sensor assembly 508 or skin of the host.

In some embodiments, masses of each of holder 704, needle carrier assembly 702, needle hub 518, insertion element 520, and on-skin sensor assembly 508 may be specifically designed to reduce or substantially eliminate a tendency of needle carrier assembly 702, needle hub 518, insertion element 520, and on-skin sensor assembly 508 to detach from holder 704 while being driven in the distal direction during insertion. In some embodiments, a force exerted by first spring 524 may further be selected to be sufficient for proper operation of applicator 500, while not so large as to further exacerbate such above-described inertially triggered detachment. In some embodiments, a spring (not shown) may be configured to exert a force against a portion of needle carrier assembly 702, for example in the distal direction, sufficient to prevent needle carrier assembly 516 from inertially triggered detaching from holder 704 during insertion.

FIG. 23 illustrates applicator 700 after activation and at or near the distal insertion position, according to some embodiments. First spring 524 has driven holder 704, needle carrier assembly 702 and on-skin sensor assembly 508 in the distal direction to the distal inserted position. Since first spring 524 has driven holder 704 a short distance farther in the distal direction than needle carrier assembly 702, backstop feature 712 is no longer in contact with spring retention element 710, allowing second spring 706 (e.g., tang 708) to laterally deflect spring retention element 710, thereby releasing second spring 706, which drives needle carrier assembly 702 in the proximal direction. Alternatively, similar to that described above in connection with applicator 500 in FIG. 13, where the angle θ of the portion of spring retention element 710 in contact with tang 708 of second spring 526 is substantially 90° (e.g., flat), spring retention element 710 may be biased to automatically deflect sufficiently to release second spring 526 once backstop feature 712 is no longer in contact with spring retention element 710, thereby freeing second spring 706 to drive needle carrier assembly 702 in the proximal direction. Although not shown in FIGS. 21-23, inner housing 506 may further comprise engagement element 550 configured to engage with a protrusion 552 of needle carrier assembly 702, and to function substantially as previously described in connection with at least FIGS. 10-12. In some embodiments, a stop feature (not shown) may be disposed at a bottom of applicator 700, e.g., on a distal portion of inner housing 506. Such a stop feature may be configured to contact one or more of on-skin sensor assembly 508, needle carrier assembly 702, or holder 704 in the distal insertion position.

Upon release of second spring 706, second spring 706 is configured to drive needle carrier assembly 702, needle hub 518 and insertion element 520, in the proximal direction. Although not shown in FIG. 23, as needle carrier assembly 702 travels to the proximal retracted position, needle carrier retention element 542 may engage with needle carrier assembly 702, thereby retention needle carrier assembly 702, needle hub 518 and insertion element 520, in a locked, retracted position limiting access to insertion element 520.

Figure 24:
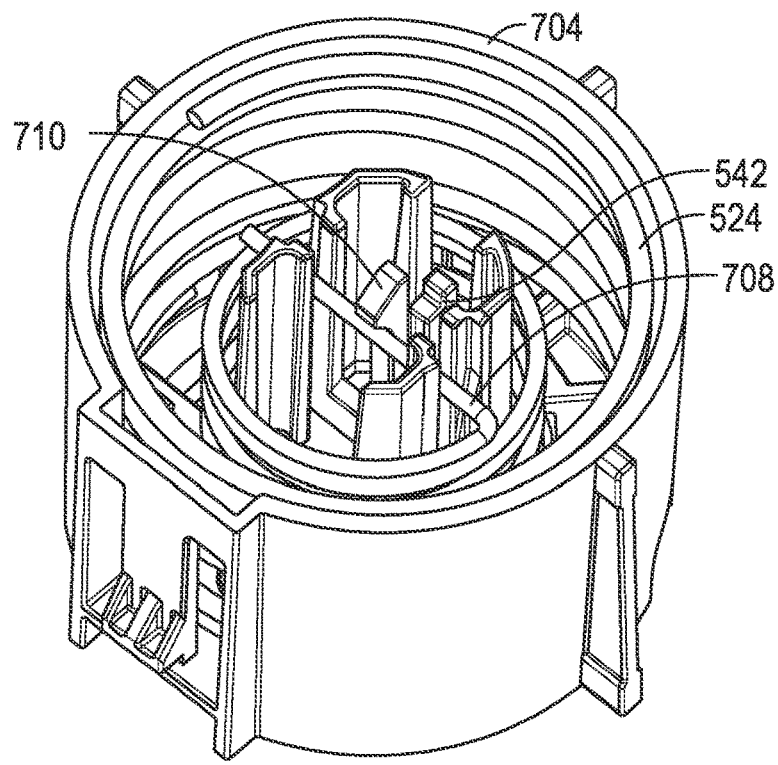
FIG. 24 illustrates a perspective view of various features of the applicator system of FIGS. 21-23.

FIG. 24 illustrates a perspective view of holder 704, first spring 524 and second spring 706 of applicator 700, according to some embodiments. FIG. 24 illustrates spring retention element 710, retention tang 708 of second spring 706 in an orientation within applicator 700 before retraction.

During manufacture, applicator 700 may be assembled in stages. For example, and not limitation, if present, as previously described in connection with applicator 500, first barrier layer 512 (see FIG. 6) may be affixed to inner housing 506. Insertion element 520 may be coupled to needle hub 518, which may then be coupled to on-skin sensor assembly 508. Second spring may be placed into holder 704 or needle carrier assembly 702 and then needle carrier assembly 702 may be disposed into holder 704 and attached to needle hub 518 and to on-skin sensor assembly via wearable retention elements 534a, 534b. First spring 524 may be disposed in holder 704, which may then be installed into inner housing 506. Inner housing 506 may be inserted into and secured to outer housing 504. If present, as previously described in connection with applicator 500, second barrier layers 530 (see FIG. 6) may be affixed to inner housing 506. If a separate element, activation element 502 may then be disposed into outer housing 504. Any labeling, sterilizing and/or packaging may then be applied to applicator 700.

Figure 25A:
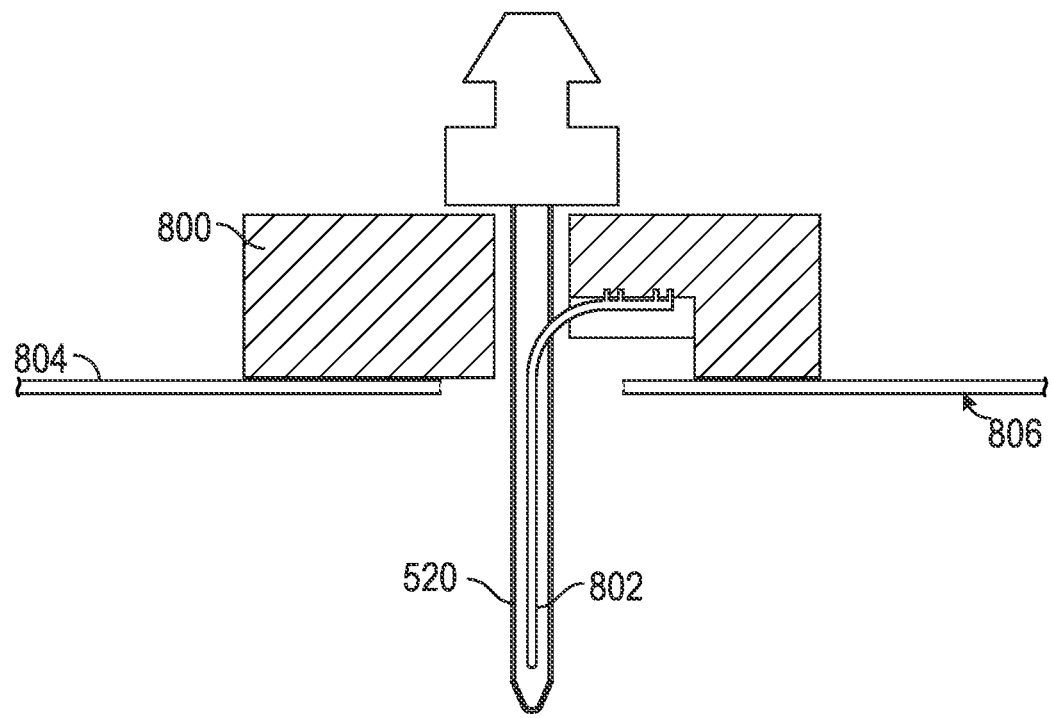
FIGS. 25A-25B illustrate cross-sectional views of yet another sensor retention element for an applicator for an analyte sensor system.
Figure 25B:
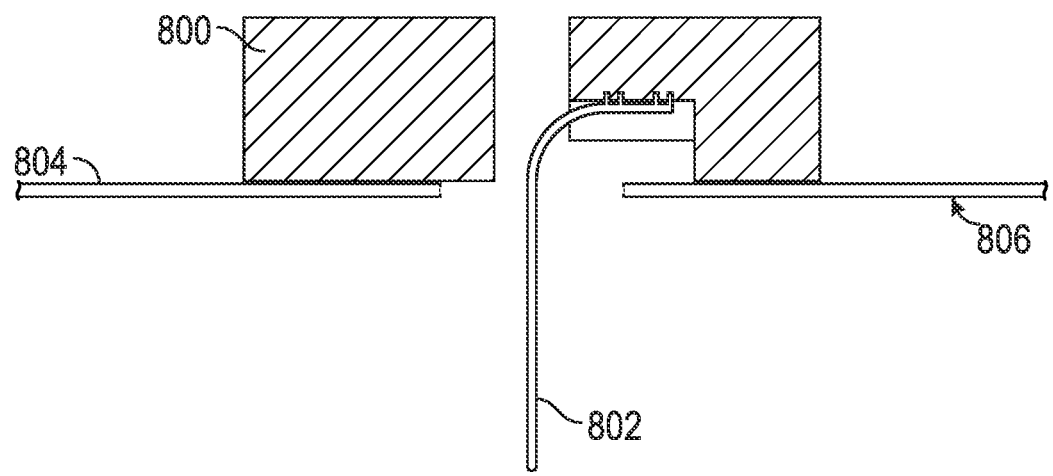

Upon activation, an applicator as disclosed herein may insert a transcutaneous analyte sensor into the skin of a host by utilizing an insertion element (such as insertion element 520). Referring to FIG. 25A, the insertion element 520 may drive the transcutaneous analyte sensor 802 of the on-skin sensor assembly 800 into the host's skin by the transcutaneous analyte sensor 802 extending along a channel of the insertion element 520. The insertion element 520 may be withdrawn with the transcutaneous analyte sensor 802 remaining within the skin, as represented in FIG. 25B. A patch 804 or other component of the on-skin sensor assembly 800 may include a surface 806 (which may be referred to as a first surface) for engaging the skin. The surface, for example, may comprise an adhesive surface. The adhesive can be configured for adhering to skin. Additional adhesive information is described in U.S. Pat. No. 11,219,413, which was filed on Aug. 25, 2015. The entire contents of U.S. Pat. No. 11,219,413 are incorporated by reference herein. The patch 804 may be coupled to a housing of the on-skin sensor assembly 800 in embodiments. The transcutaneous analyte sensor 802 may be coupled to the housing of the on-skin sensor assembly 800.

A liner (not shown in FIGS. 25A-25B) may be positioned on the surface 806 in embodiments. The liner may cover the surface 806 and may protect the surface 806 from damage, deterioration, or other adverse effects. The liner, for example may comprise a sheet of material that covers the surface 806. The liner may have a proximal surface contacting the surface 806 and a distal surface facing opposite the proximal surface. The liner in embodiments, may be configured to reduce the possibility of an exposed surface 806 from deteriorating or otherwise losing adhesive properties prior to deployment. For example, during a sterilization process using a gas or other sterilization material, the liner may reduce the possibility of the surface 806 deteriorating. A sterilizing gas may comprise ethylene oxide (EtO) or another form of sterilizing gas as desired.

The liner, however, is to be decoupled from the surface 806 prior to deployment of the on-skin sensor assembly 800 to the skin. FIGS. 26A-26G illustrate an embodiment of a system for deploying an on-skin wearable medical device to skin. The system includes an applicator 900 having an applicator housing 902 configured to retain the on-skin wearable medical device, and a deployment mechanism configured to deploy the on-skin wearable medical device to the skin. The applicator housing 902 may be configured similarly as in embodiments of applicators disclosed herein, including having an outer housing 904 and an inner housing 906 as disclosed in regard to the embodiments of FIGS. 5-24. The outer housing 904 for example, may be configured similarly as the outer housing 504 and the inner housing may be configured similarly as the inner housing 506. The applicator housing 902 may be configured to be gripped by a user in embodiments. Various other configurations of applicator housings may be utilized as desired.

The applicator housing 902 may include an internal cavity 903 for retaining the on-skin wearable medical device. The housing 902 may include an opening 905 at an end portion 907 of the internal cavity 903 for the on-skin wearable medical device to be deployed from. The internal cavity 903 may include a proximal end portion 909 that may include the on-skin wearable medical device coupled to a needle carrier assembly.

The deployment mechanism may be configured similarly as other forms of deployment mechanisms disclosed herein. The deployment mechanism may be configured similarly as the deployment mechanisms disclosed in regard to the embodiments of FIGS. 5-24. For example, the deployment mechanism may include one or more retention element(s) for retaining the on-skin wearable medical device and releasing the on-skin wearable medical device from the housing 902 to the skin in embodiments. The deployment mechanism may include an insertion assembly for inserting at least a portion of the on-skin wearable medical device into the skin. The insertion assembly may insert an insertion element (e.g., a needle) into the skin. The deployment mechanism may drive the insertion element to the skin upon the deployment mechanism deploying the on-skin wearable medical device to skin. The deployment mechanism may include a retraction assembly for retracting the insertion element from the skin. Other forms of deployment mechanisms may be utilized in embodiments as desired.

The applicator 900 may include an activation element 908 that may operate similarly as the activation element 502. The applicator 900 may include a needle carrier assembly 910 that may operate similarly as the needle carrier assembly 516. The applicator 900 may include a holder 912 that may operate similarly as the holder 522. The applicator 900 may include a hub (e.g., a needle hub 914) that may operate similarly as the needle hub 518. The applicator 900 may include an insertion element 915 (e.g., a needle) that may operate similarly as the insertion element 520. The applicator 900 may include springs 916, 918 that may operate similarly as the springs 524, 526 respectively. The applicator 900 may include retention elements 920a, b that may operate similarly as the retention elements 534a, 534b respectively. Additional components of the applicators shown in FIGS. 5-24 may be utilized with the applicator 900. The applicator 900 may operate in a similar manner and provide similar function as the applicators shown in FIGS. 5-24.

The applicator 900 may be utilized to deploy an on-skin wearable medical device to skin. The on-skin wearable medical device may comprise the on-skin sensor assembly 508 shown in FIG. 6, for example, which may include a housing, a transcutaneous analyte sensor coupled to the housing, an electronics unit, and a patch 922. The on-skin sensor assembly may have forms as shown in FIGS. 2A-4, for example, or other forms as desired.

The on-skin sensor assembly 508 may include a surface 924 (which may be referred to as a first surface) (marked in FIG. 26F) that may be utilized to engage the skin. As such, the surface 924 may contact the skin and may retain the on-skin sensor assembly 508 to the skin. The surface 924 may be positioned on a patch of the on-skin sensor assembly 508. The surface 924 may comprise a distal surface of the on-skin sensor assembly 508 that faces opposite a proximal surface in embodiments. In embodiments, the surface 924 may comprise an adhesive surface as disclosed herein.

A liner 926 (marked in FIG. 26G) may be positioned on the surface 924 and cover the surface 924 and may protect the surface 924 from damage, deterioration, or other adverse effects, as disclosed herein. The liner 926, however, is to be decoupled from the surface 924 prior to deployment of the on-skin sensor assembly 508 to the skin.

Figure 26A:
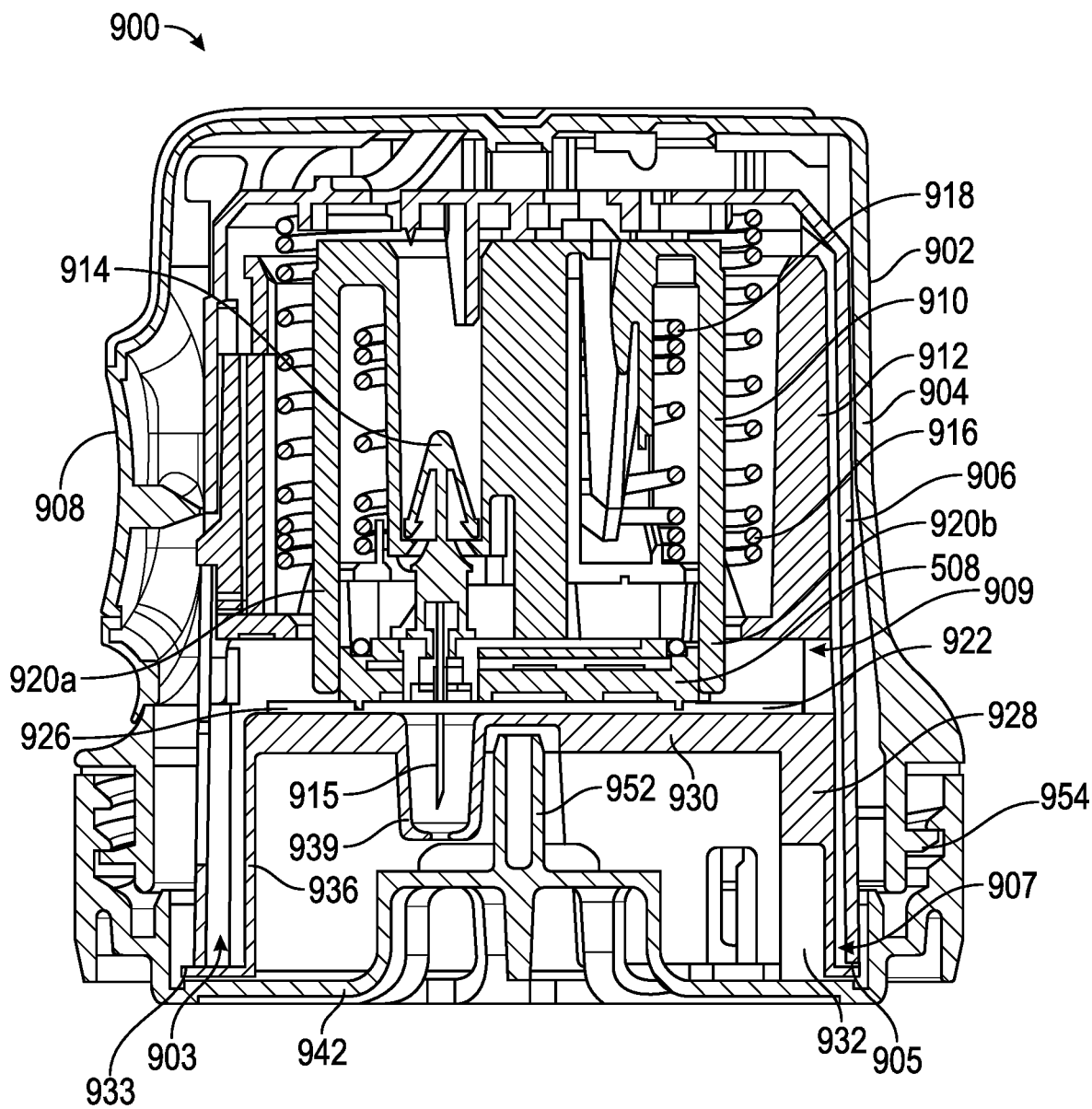
FIG. 26A illustrates a cross sectional view of a system.

Referring to FIG. 26A, the system may include a liner removal component 928. The liner removal component 928 may be configured to engage the liner 926 positioned on the surface 924 and at least partially decouple the liner 926 from the surface 924 of the on-skin wearable medical device upon being at least partially withdrawn from the surface 924 of the on-skin wearable medical device. In embodiments, the liner removal component may comprise a body configured to extend axially within the internal cavity 903 that may be utilized to engage the liner 926 positioned on the surface 924 and at least partially decouple the liner 926 from the surface 924 of the on-skin wearable medical device upon being at least partially withdrawn from the surface 924 of the on-skin wearable medical device.

The liner removal component 928 may include at least a portion that is configured to extend within the internal cavity 903. The liner removal component 928, for example, may extend axially within the internal cavity 903. The liner removal component 928 may include a first portion 930 that may be configured to engage the liner, and a second portion 932 that is spaced from the first portion 930. The second portion 932 may be axially spaced from the first portion 930. The axial extent of the liner removal component 928 may provide a variety of benefits. For example, a user seeking to grip the liner removal component 928 to at least partially decouple the liner 926 may have a reduced possibility of deeply inserting the user's fingers into the internal cavity 903 to at least partially decouple the liner 926 from the surface 924. Such a feature may enhance the ease with which the user may remove the liner 926. Further, the user may have a reduced possibility of contacting a tip of the insertion element 915 (e.g., a needle) and potentially injuring the user or dislodging the insertion element 915 or the transcutaneous analyte sensor from each other. Further, the user may have a reduced possibility of dislodging the on-skin sensor assembly 508 from the housing 902 inadvertently.

Figure 26B:
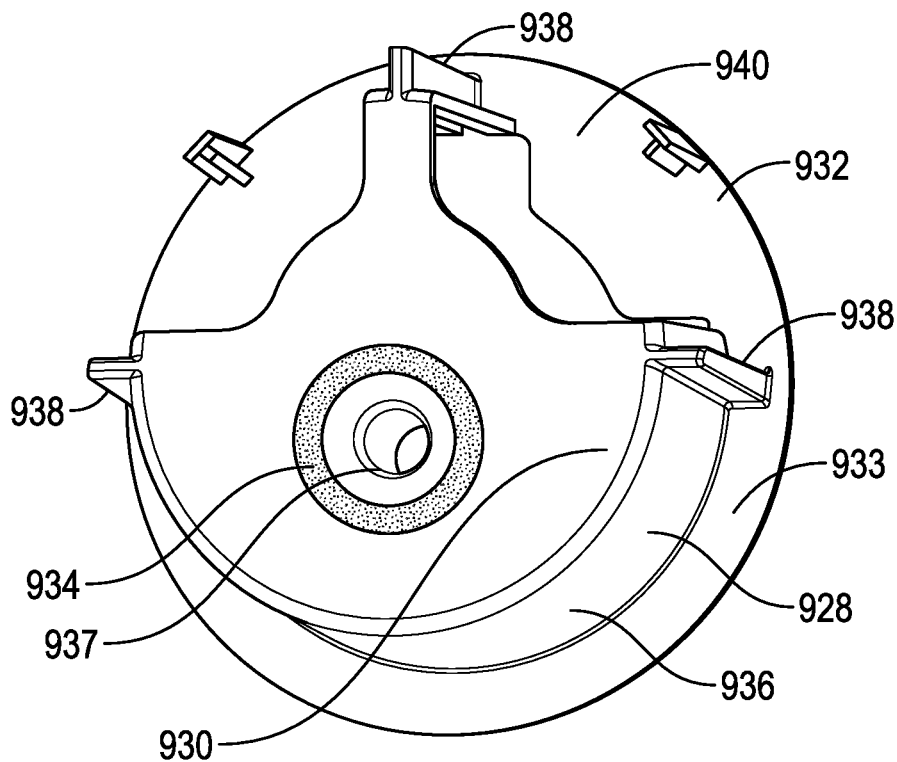
FIG. 26B illustrates a perspective view of a liner removal component.

FIG. 26B illustrates a perspective view of the liner removal component 928 separated from the internal cavity 903. The first portion 930 of the liner removal component 928 may comprise a cover for a portion of the liner 926 (marked in FIG. 26G), that covers the liner 926 upon the surface 924 (marked in FIG. 26F). The cover may cover at least a portion of the surface 924. The first portion 930 of the liner removal component 928 may comprise a support for the liner 926, that supports the liner 926 upon the surface 924 until a desired time for decoupling of the liner 926 from the surface 924. The first portion 930 may comprise a substrate for the liner 926 to be positioned upon, and may have a flat shape as shown in FIG. 26B or another shape as desired. In embodiments, support provided by the liner removal component 928 may reduce the possibility of dislodging the on-skin wearable medical device from the applicator housing 902 through vibration, or shock (through distribution or drop events), or dislodgement of a transcutaneous analyte sensor from the insertion element 915. Other benefits may result from the support provided by the liner removal component 928 in embodiments.

Figure 26C:
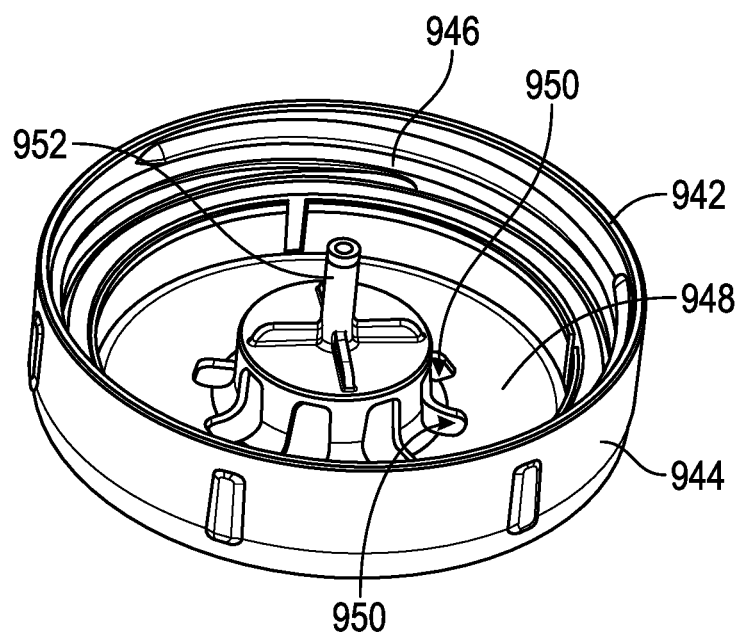
FIG. 26C illustrates a perspective view of a retaining body.
Figure 26D:
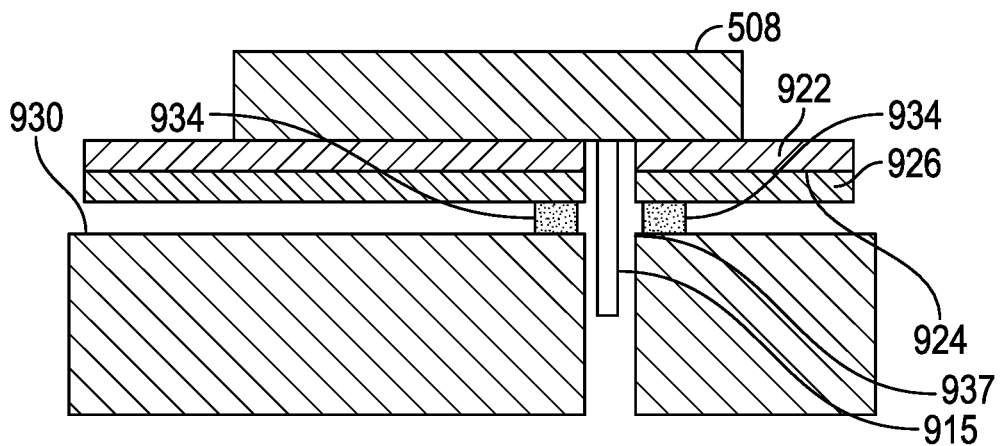
FIG. 26D illustrates a cross sectional schematic view of a liner upon a liner removal component.

In embodiments, the first portion 930 may engage the liner 926 utilizing one or more coupling surfaces 934 (marked in FIGS. 26B and 26D). In embodiments, the coupling surfaces 934 may comprise adhesive surfaces that couple the liner 926 to the first portion 930. The adhesive surfaces, for example, may comprise pressure sensitive adhesive, or other forms of adhesive surfaces as desired. The coupling surfaces 934 may have a variety of configurations. For example, FIG. 26B illustrates an annular shape for a coupling surface 934. Other configurations of coupling surfaces 934 may be utilized in embodiments as desired.

In embodiments, the first portion 930 may include an aperture 937 for the insertion element 915 and the transcutaneous analyte sensor to pass through (as shown in FIG. 26A). In embodiments, the first portion 930 may include a sheath 939 configured to cover the insertion element 915, and particularly the tip of the insertion element 915. Thus, as a user grasps the liner removal component 928, a reduced possibility of contact with the insertion element 915 and the transcutaneous analyte sensor results.

An intermediate portion 936 may be positioned between the first portion 930 and the second portion 932 and may provide a height between the first portion 930 and the second portion 932. The intermediate portion 936 may comprise a spacer body in embodiments, or may have another form as desired. As shown in FIGS. 26A and 26B, the intermediate portion 936 may have a cylindrical shape, although other configurations may be utilized in embodiments as desired.

The intermediate portion 936 in embodiments may include one or more guides 938 that may extend along channels 941 (marked in FIG. 26F) in the interior surface of the applicator housing 902 that may prevent rotation of the liner removal component 928 prior to or during removal from the housing 902. The guides 938 may extend axially along the internal cavity 903 to orient the liner removal component 928 within the internal cavity 903. The guides 938 may prevent rotation of the first portion 930 to reduce the possibility of shear of the liner. A shear of the liner, for example, may cause the surface 924 to undesirably fold or crease onto itself in embodiments. In embodiments, the guides 938 may reduce the possibility of rotation of the liner removal component 928.

The second portion 932 may comprise a base for the liner removal component 928 in embodiments. In embodiments, the second portion 932 may be configured to be positioned at the opening 905 of the applicator housing 902. As such, a user may have a reduced possibility of deeply extending the user's fingers into the internal cavity 903 and potentially contacting or damaging the insertion element 915 or the transcutaneous analyte sensor. The second portion 932 in embodiments, may include a grip portion 940 positioned at the second portion 932 and configured to be gripped by a user to withdraw the liner removal component 928 from the surface 924 of the on-skin sensor assembly 508.

The grip portion 940, for example, may comprise a portion of the liner removal component 928 for gripping manually or through another method for removal from the housing 902. The grip portion 940 as shown in FIG. 26B may comprise one or more flanges that may be configured for grip.

The second portion 932 may include one or more flanges 933 extending radially outward from the intermediate portion 936. The flanges 933 may be configured to abut a distal end portion of the inner housing 906 to impede proximal movement of the liner removal component 928.

In embodiments, the liner removal component 928 may have other configurations than shown in FIGS. 26A-26G.

The liner removal component 928 may have at least a portion configured to extend into the internal cavity 903. In embodiments, the liner removal component 928 may comprise an insert into the internal cavity 903 that may be covered by a retaining body 942 of the system. The liner removal component 928 may cover the internal cavity 903. The liner removal component 928 may comprise a cap that is covered by a retaining body 942 of the system. FIG. 26C, for example, illustrates a perspective view of a retaining body 942, including a grip portion 944 on an exterior surface of the retaining body 942 and an engagement portion 946 on an interior surface of the retaining body 942. The retaining body 942 may include a central portion 948 comprising a cover over the liner removal component 928 when the retaining body 942 is positioned over the liner removal component 928. The retaining body 942 may comprise an exterior lid for the applicator 900 upon transport and unpackaging of the applicator 900.

The central portion 948 of the retaining body 942 may include one or more openings 950 that may allow a sterilizing material such as sterilizing gas to pass through, to sterilize internal components of the applicator 900. The central portion 948 may include a central support 952 that may be configured to press against the liner removal component 928 to retain the liner removal component 928 in position. The central support 952 may be configured to rotate relative to a distal surface of the first portion 930 of the liner removal component 928 to allow the retaining body 942 to rotate relative to the liner removal component 928. In embodiments, the central portion 948 may press against the second portion 932 of the liner removal component 928 to retain the liner removal component 928 in position. The grip portion 944 may be positioned radially outward of the central portion 948 and may be positioned at the second portion 932 of the liner removal component 928 when the retaining body 942 is engaged with the housing 902. The engagement portion 946 may comprise threading or another form of engagement portion 946 for engaging a corresponding engagement portion 954 (as shown in FIG. 26A) on an exterior surface of the housing 902. The engagement portion 946 may be positioned at the second portion 932 of the liner removal component 928 and configured to engage the engagement portion 954 to retain the liner removal component 928 to the applicator housing 902. The engagement portion 946 may be configured to be rotated relative to the applicator housing 902 to release the liner removal component 928 from the applicator housing 902. Both engagement portions 946, 954 may be positioned at the second portion 932 of the liner removal component 928 in embodiments.

FIG. 26D illustrates a schematic cross-sectional view of an arrangement of the liner 926 relative to the first portion 930. The coupling surfaces 934 may be positioned proximate the aperture 937 in the first portion 930, as well as apertures in the liner 926 and the patch 922, to couple the liner 926 to the first portion 930.

Figure 26E:
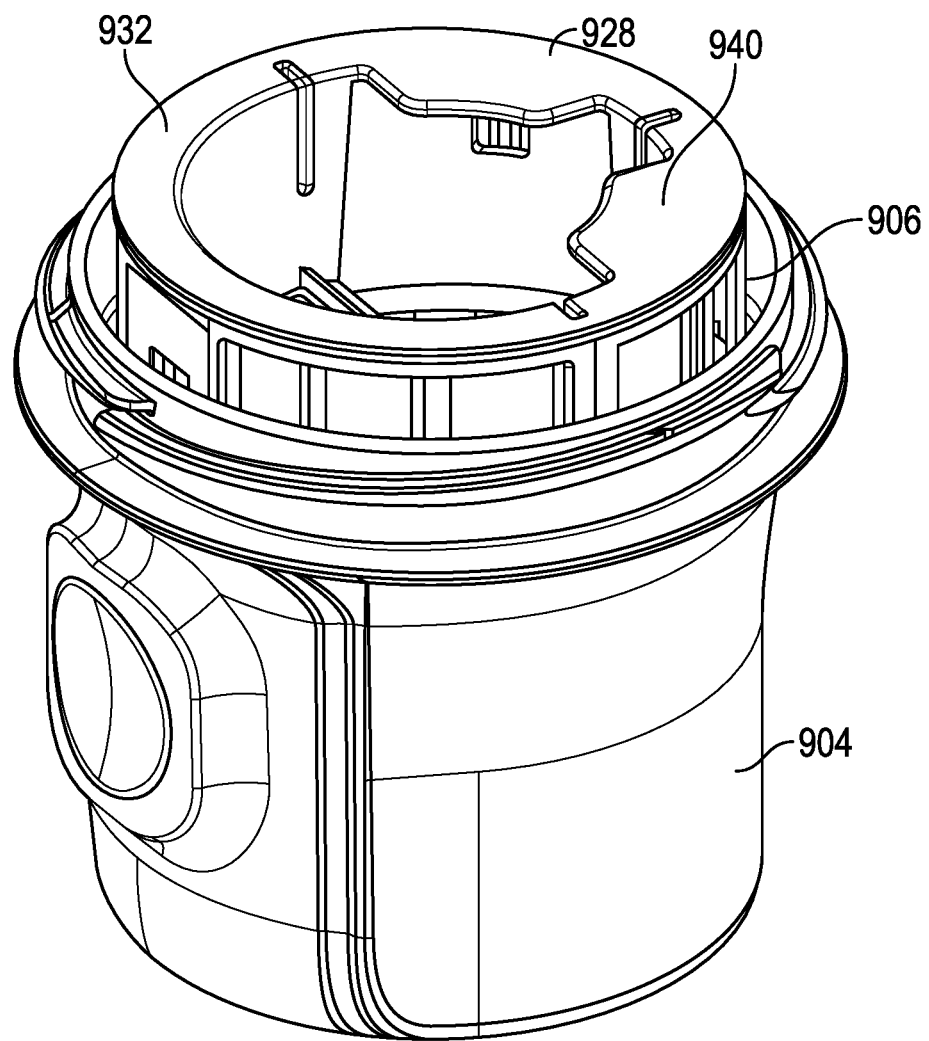
FIG. 26E illustrates a perspective view of the system shown in FIG. 26A.

In operation, the retaining body 942 shown in FIGS. 26A and 26C may be separated from the housing 902. For example, the retaining body 942 may be rotated relative to the housing 902, with the engagement portion 946 rotating relative to the housing 902 to release the retaining body 942 from the housing and to release the liner removal component 928 from the housing 902. FIG. 26E, for example, illustrates the retaining body 942 having been separated from the housing 902 with the second portion 932 of the liner removal component 928 exposed.

A user may accordingly grip the liner removal component 928, for example, at the grip portion 940 and withdraw the liner removal component 928 from the surface 924 of the on-skin wearable medical device. The liner removal component 928 may be axially withdrawn from the internal cavity 903 of the housing 902. FIG. 26F illustrates a resulting configuration of the applicator 900, with the surface 924 exposed and able to be deployed to the skin in a manner disclosed herein.

Figure 26G:
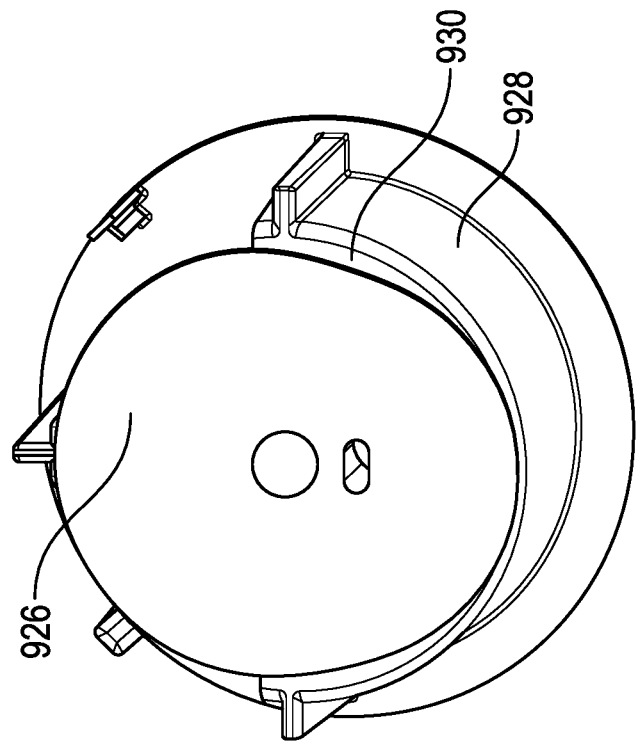
FIG. 26G illustrates a perspective view of a liner removal component.
Figure 26F:
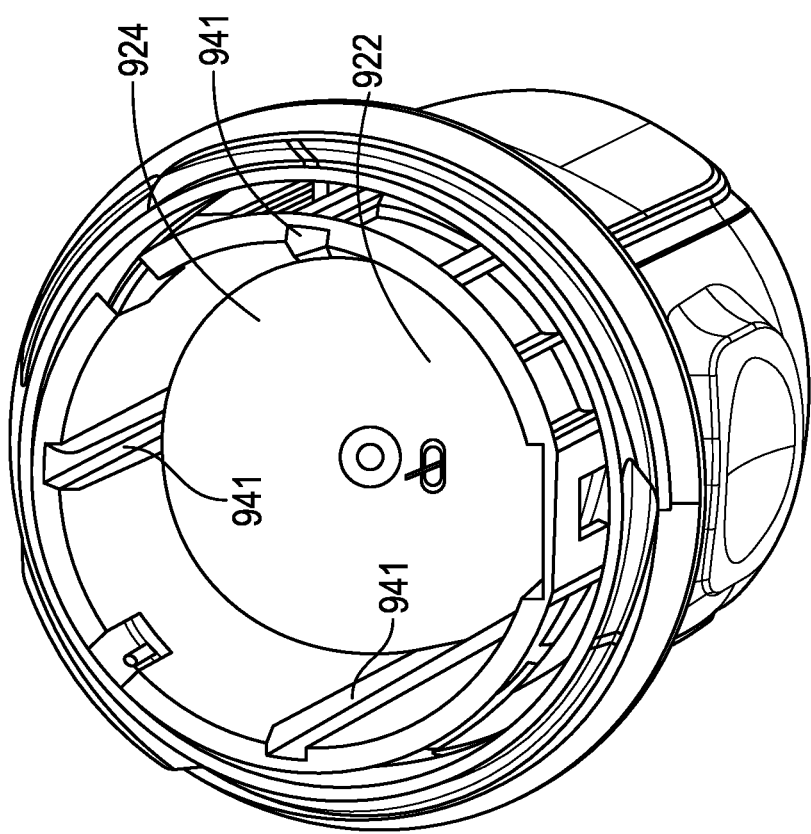
FIG. 26F illustrates a perspective view of the system shown in FIG. 26A.

FIG. 26G illustrates the liner 926 coupled to the liner removal component 928 upon being withdrawn from the housing 902.

In embodiments, the liner removal component 928 may be configured to be reinserted into the internal cavity 903 following deployment of the on-skin wearable medical device. The liner removal component 928, for example, may be inserted proximally into the internal cavity 903 and the needle carrier assembly 910 for example may be pressed proximally to accommodate the liner removal component 928. The retaining body 942 may be recoupled to the housing 902 over the liner removal component 928.

In embodiments, a retaining body or the liner removal component may have other forms of securement to the applicator housing 902, for example, snaps, clamps, or other forms of securement may be utilized as desired.

In embodiments, the liner removal component 928 may be flattened, and may not extend axially into the internal cavity 903. For example, in an embodiment in which the surface 924 of the on-skin sensor assembly 508 is not positioned within an internal cavity then the liner removal component 928 may not need to extend into such a cavity. The liner removal component 928 may yet remain available for access and grip by a user if desired. In embodiments, other forms of liner removal components configured to extend axially within the internal cavity 903 may be utilized. For example, pull rings or other forms of axially extending tethers may be utilized to at least partially decouple the liner from the surface 924.

Figure 27A:
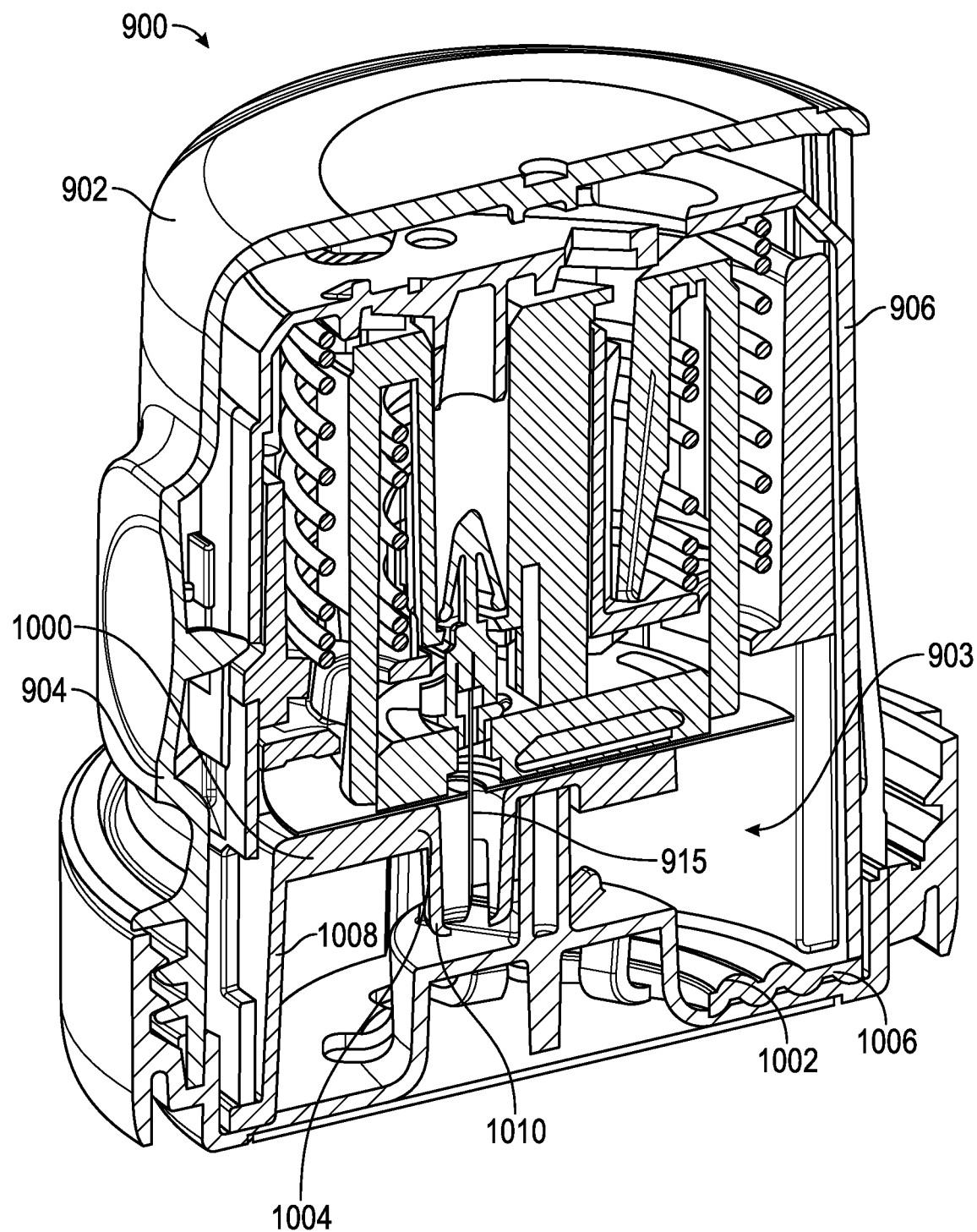
FIG. 27A illustrates a cross sectional view of a system.
Figure 27B:
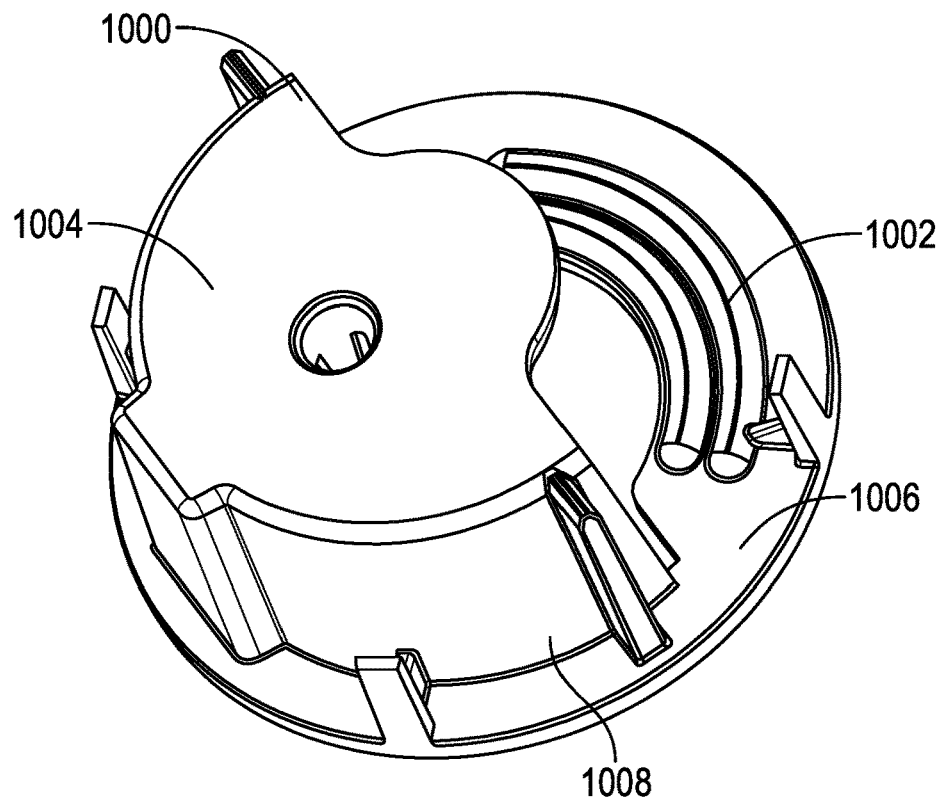
FIG. 27B illustrates a top perspective view of a liner removal component.
Figure 27C:
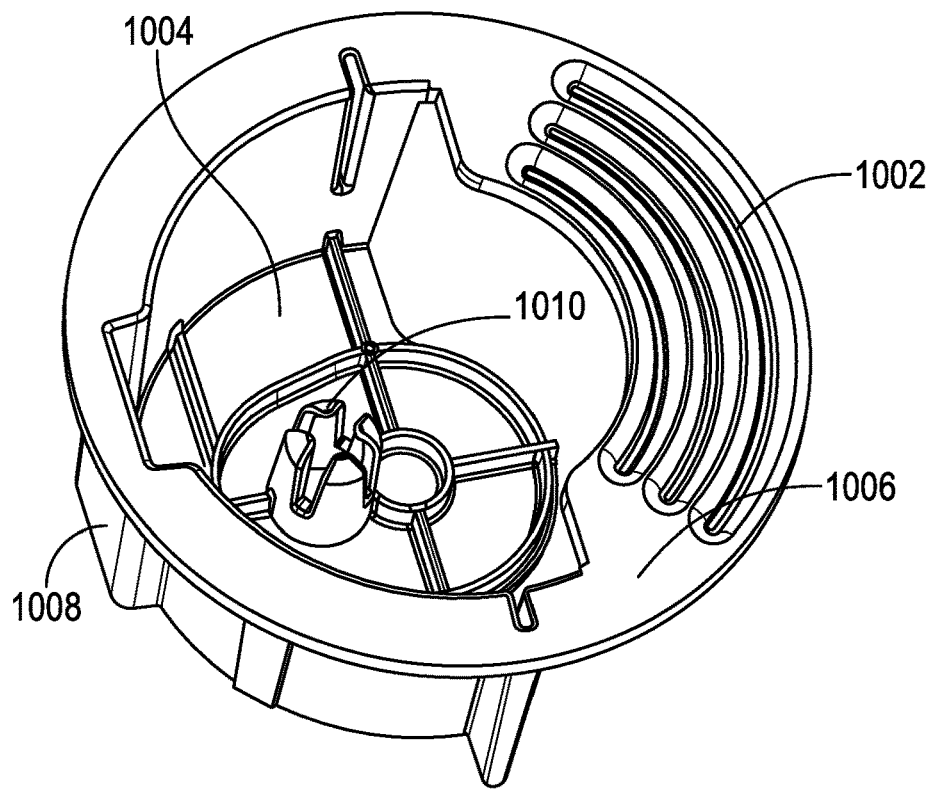
FIG. 27C illustrates a bottom perspective view of the liner removal component shown in FIG. 27B.

FIGS. 27A-27C illustrate an embodiment of a liner removal component 1000 configured similarly as the liner removal component 928 shown in FIGS. 26A-26G, yet including a textured grip portion 1002. The liner removal component 1000 may include a first portion 1004, a second portion 1006, and an intermediate portion 1008, each configured similarly as the respective first portion 930, second portion 932, and intermediate portion 936 of the liner removal component 928. The first portion 1004 may include a sheath 1010 including a plurality of openings for exposing the insertion element 915 to any sterilizing material such as sterilizing gas that may be utilized.

FIG. 27B illustrates a top perspective view of the liner removal component 1000 withdrawn from the housing 902. The liner is not shown in FIG. 27B, yet would be present upon the first portion 1004 upon the liner removal component 1000 being removed from the applicator housing 902. FIG. 27C illustrates a bottom perspective view of the liner removal component 1000 withdrawn from the housing 902.

FIGS. 28A-28E illustrate an embodiment of a liner removal component 1050 configured similarly as the liner removal component 928 shown in FIGS. 26A-26G, yet including a spring 1052. The spring 1052 may be configured to press against the on-skin wearable medical device to move the liner removal component 1050 away from the on-skin wearable medical device to at least partially decouple the liner 926 from the surface 924. The liner removal component 1050 may include a second portion 1054 and an intermediate portion 1056, each configured similarly as the respective second portion 932 and intermediate portion 936 of the liner removal component 928. The first portion 1058 of the liner removal component 1050 may include the spring 1052 and may include a sheath 1060 including a plurality of openings for exposing the insertion element 915 to any sterilizing material such as sterilizing gas that may be utilized.

Figure 28A:
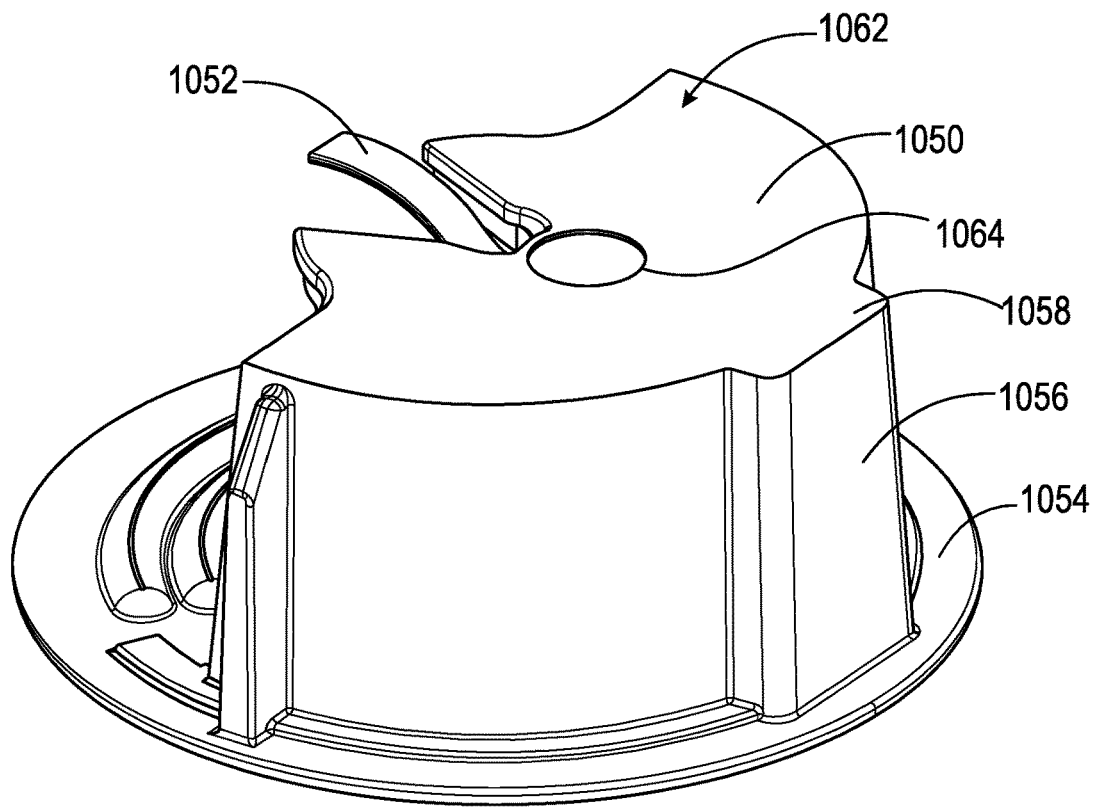
FIG. 28A illustrates a top perspective view of a liner removal component.

FIG. 28A illustrates a top perspective view of the liner removal component 1050 withdrawn from the housing 902. The liner is not shown in FIG. 28A, yet would be present upon the first portion 1058 upon the liner removal component 1050 being removed from the applicator housing 902.

Figure 28B:
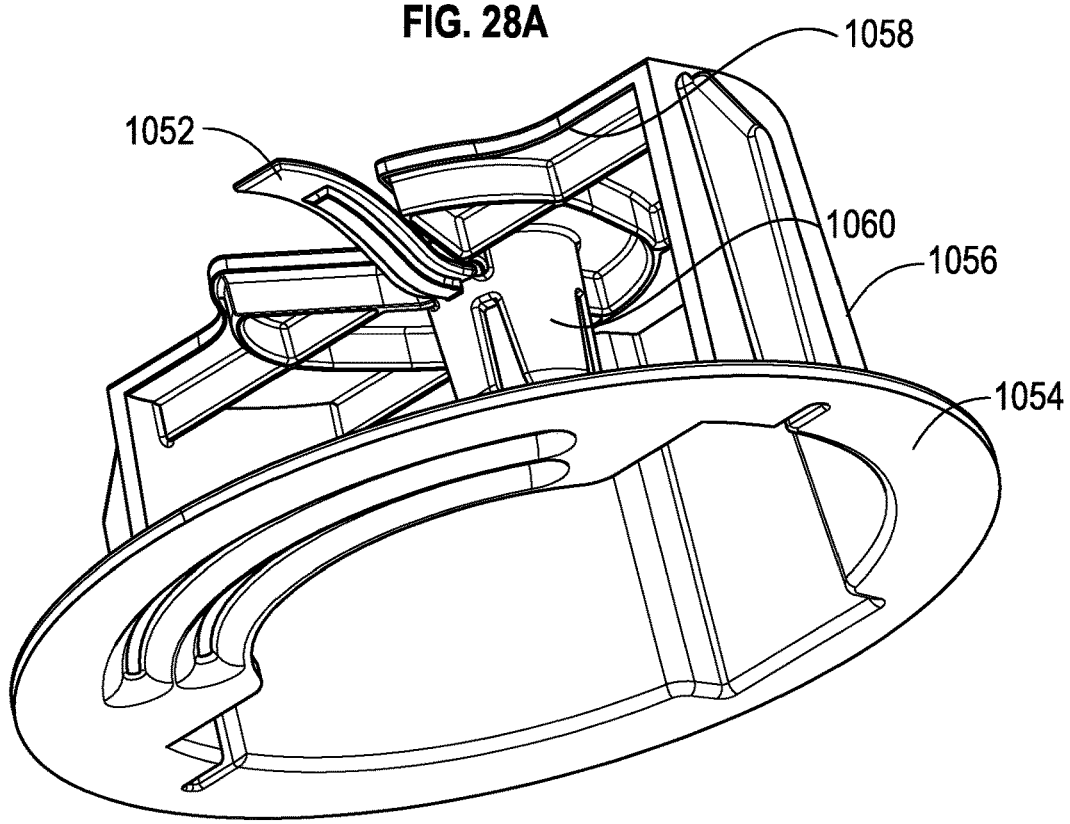
FIG. 28B illustrates a bottom perspective view of the liner removal component shown in FIG. 28A.
Figure 28C:
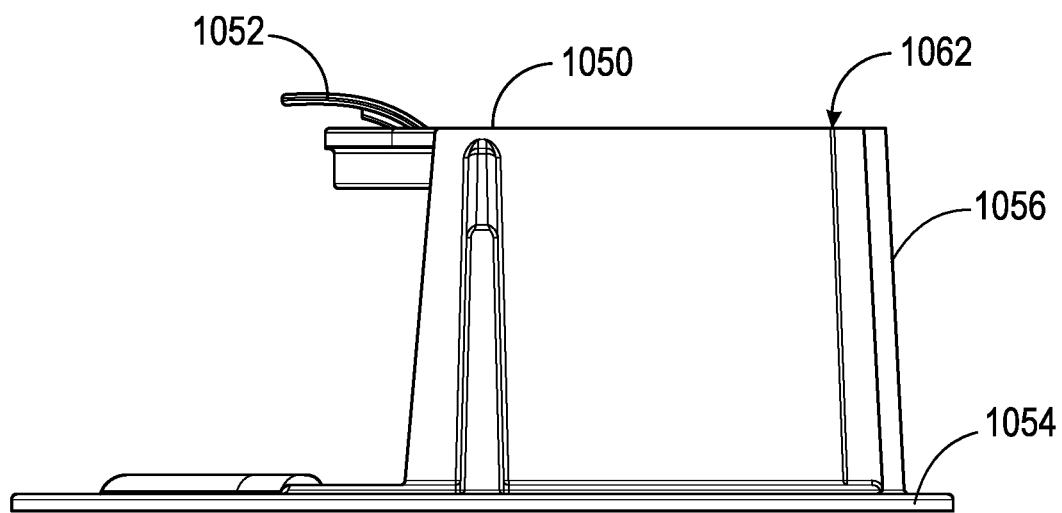
FIG. 28C illustrates a side view of the liner removal component shown in FIG. 28A.

FIG. 28B illustrates a bottom perspective view of the liner removal component 1050 withdrawn from the housing 902. FIG. 28C illustrates a side view of the liner removal component 1050.

Referring to FIGS. 28A-28C, the spring 1052 may protrude from the proximal support surface 1062 of the liner removal component 1050 in a proximal direction. The spring 1052 may be biased to protrude from the proximal support surface 1062, as shown in FIG. 28C, and may provide a resilient force upon being pressed in a distal direction. The spring 1052, in embodiments, may comprise a leaf spring as shown in FIGS. 28A-28C or may have another configuration in embodiments.

The spring 1052 may be positioned such that the spring 1052 produces an asymmetric force upon the on-skin wearable medical device. Referring to FIG. 28A, the spring 1052 may be positioned to produce a force upon only a portion of the on-skin wearable medical device, such that withdrawal of the liner occurs proximate that portion. The spring 1052, for example, may be positioned adjacent to the aperture 1064 of the liner removal component 1050 and on one side of the aperture 1064. Such a position may produce an asymmetric force upon the on-skin wearable medical device.

Figure 28D:
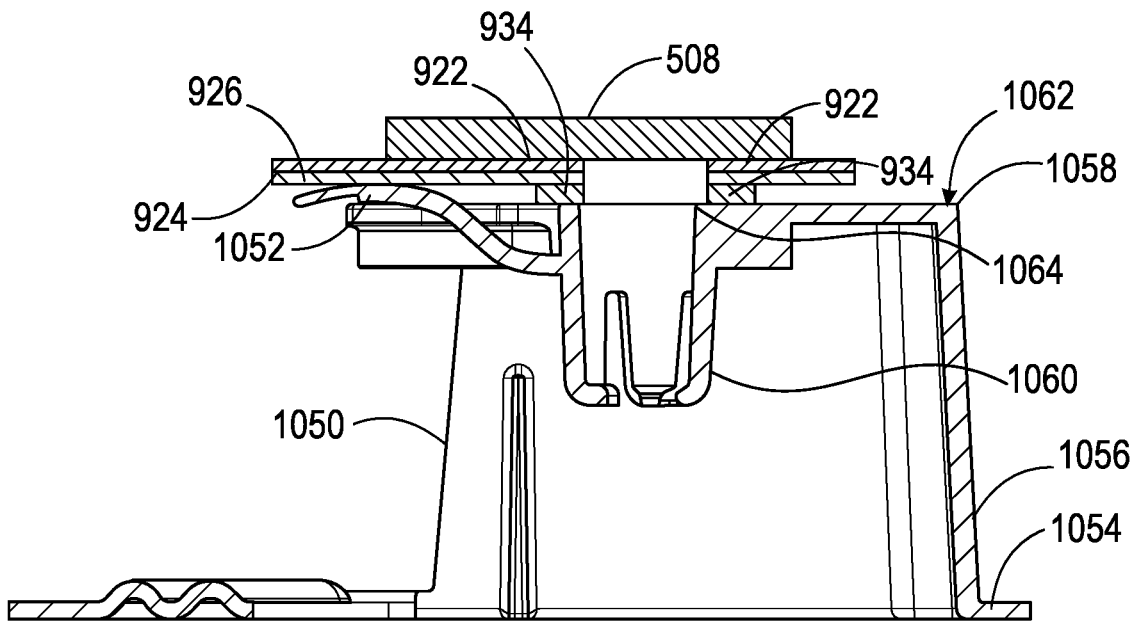
FIG. 28D illustrates a cross sectional view of the liner removal component shown in FIG. 28A, with a schematic view of an on-skin wearable medical device positioned thereon.

FIG. 28D illustrates a cross sectional view of the liner removal component 1050 with a schematic of the coupling surfaces 934, the liner 926, the patch 922, and the on-skin sensor assembly 508 positioned upon the first portion 1058 of the liner removal component 1050. In the configuration shown in FIG. 28D, the liner removal component 1050 may be inserted into the internal cavity 903 of the applicator housing 902, in a configuration shown in FIG. 26A, for example. A retaining body 942 (as shown in FIG. 26C) may be utilized to press the liner removal component 1050 against the on-skin sensor assembly 508 to compress the spring 1052 and move the spring 1052 to the lowered or distal position shown in FIG. 28D.

The liner removal component 1050 may be held in the position shown in FIG. 28D upon storage and transportation of the system, as well as during sterilization of the system and other processes that may be applied to the system. The liner 926 may remain in contact with the surface 924 of the patch 922 and may cover the surface 924. The spring 1052 may press against the on-skin sensor assembly 508, which may comprise the housing of the on-skin sensor assembly 508 and/or the patch 922 in embodiments.

The spring 1052 may be positioned such that one or more of the coupling surfaces 934 are positioned between the spring 1052 and the aperture 1064. For example, the coupling surfaces 934 may be positioned radially outward of the aperture 1064 and between the spring 1052 and the aperture 1064. In embodiments, the spring 1052 may be positioned to apply a force that is radially offset from the center of the liner removal component 1050, such that a torque may be applied to the liner removal component 1050 by the force of the spring 1052. Other positions of the spring 1052 may be utilized in embodiments.

The spring 1052 may be held in the lowered or distal position shown in FIG. 28D until a desired time to remove the retaining body 942 from the applicator housing 902 to deploy the on-skin wearable medical device to the skin. Upon removal of the retaining body 942, the spring 1052 may be allowed to apply a force to the on-skin wearable medical device, to move the liner removal component 1050 away from the on-skin wearable medical device to at least partially decouple the liner 926 from the surface 924.

Figure 28E:
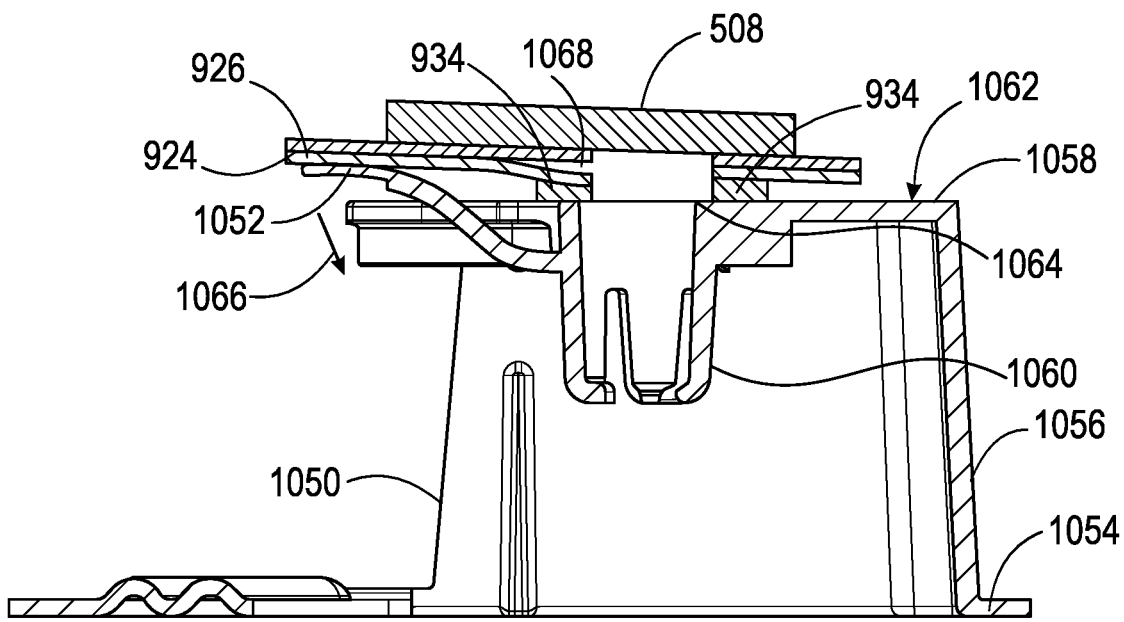
FIG. 28E illustrates a cross sectional view of the liner removal component shown in FIG. 28A, with a schematic view of an on-skin wearable medical device positioned thereon.

FIG. 28E, for example, illustrates the spring 1052 having applied a force to the on-skin wearable medical device. The spring 1052 has moved to a raised or proximal position and has moved the liner removal component 1050 away from the on-skin wearable medical device. The movement may be an axial movement or may comprise a rotational movement (as indicated by arrow 1066 shown in FIG. 28E) or a combination of axial and rotational movement. The movement may at least partially decouple the liner 926 from the surface 924. The removal may be proximate one of the coupling surfaces 934, as shown at the gap 1068 between the liner 926 and the surface 924 in FIG. 28E. In embodiments, the spring 1052 may remove a greater or lesser portion of the liner 926 as desired.

In embodiments, the spring 1052 may initiate removal of the liner 926, which may lessen the force required by a user to remove the entirety of the liner 926. For example, the gap 1068 formed between the liner 926 and the surface 924 may comprise a first portion of the liner 926 that is removed, with the remainder removed by the user upon withdrawing the liner removal component 1050 from the surface 924 axially. Such a reduced force may beneficially reduce the possibility of the user inadvertently applying too great a force to the liner removal component 1050 and the liner 926 upon removing the liner removal component 1050, which could undesirably disengage the on-skin sensor assembly 508 from the applicator housing 902 prior to deployment.

As shown in FIG. 28E, the removal of the liner 926 from the surface 924 may be asymmetric, which may further allow for a peeling of the liner 926. The peeling may be in a horizontal direction relative to the surface 924 in embodiments, as the liner removal component 1050 is withdrawn from the surface 924 axially. Such a peeling motion of the liner 926 may lessen the force required by a user to remove the entirety of the liner 926. The liner removal component 1050 accordingly may be configured to asymmetrically decouple the liner 926 from the surface 924 upon the liner removal component 1050 being at least partially withdrawn from the surface 924. The liner removal component 1050 may be configured to peel the liner 926 from the surface 924 upon the liner removal component 1050 being at least partially withdrawn from the surface 924.

A spring may be utilized with any embodiment of component for at least partially removing a liner disclosed herein.

FIGS. 29A-29D illustrate an embodiment of a liner removal component 1100 in which the liner removal component 1100 is configured to be rotated relative to the applicator housing 902 to release the liner removal component 1100 from the applicator housing 902. The liner removal component 1100 may include a first portion 1102, a second portion 1104, and an intermediate portion 1106. The second portion 1104 may be spaced from the first portion 1102.

The first portion 1102 may be configured similarly as the first portion 930 of the liner removal component 928 and may be configured to engage the liner 926. The first portion 1102 may cover at least a portion of the liner 926 and may support the liner 926. The first portion 1102 may include a cavity 1108 that may be sized to allow for the first portion 1102 to rotate relative to the insertion element 915 and not contact the insertion element 915. Such a configuration may reduce the possibility of the first portion 1102 dislodging or otherwise damaging the insertion element 915. The cavity 1108 may extend distally from a proximal opening 1110 (marked in FIG. 29B) of the first portion 1102. The cavity 1108 may form a well for receiving the insertion element 915. The first portion 1102 may include one or more openings 1112 for exposing the insertion element 915 to any sterilizing material such as sterilizing gas that may be utilized.

The first portion 1102 may include a ring 1114 (marked in FIG. 29B) around the cavity 1108 that may have a flattened surface. The ring 1114 may comprise the portion of the first portion 1102 that engages the liner 926 and removes the liner 926 upon withdrawal of the liner removal component 1100 from the housing 902. The peripheral contact of the ring 1114 upon the liner 926 may support the liner 926 and may support the on-skin sensor assembly 508 within the applicator housing 902. Such support may improve retention of the liner 926 upon the patch 922 and may provide robustness for the on-skin sensor assembly 508 against drops and other shocks that may be applied to the on-skin sensor assembly 508 within the applicator housing 902.

Figure 29A:
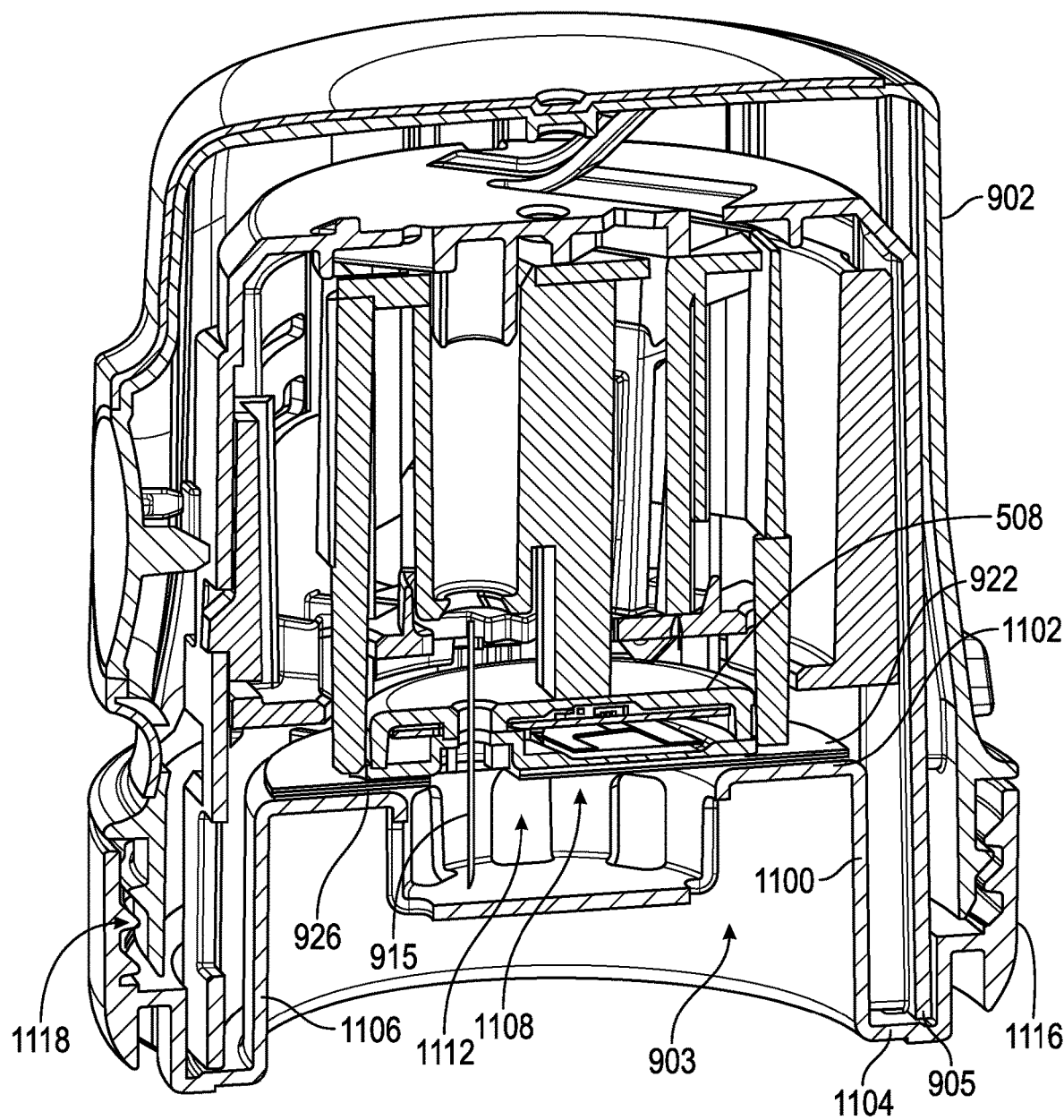
FIG. 29A illustrates a cross sectional view of a system.

The intermediate portion 1106 may extend axially between the first portion 1102 and the second portion 1104 and may have a cylindrical shape as shown in FIG. 29A. The intermediate portion 1106 may comprise a spacer body in embodiments, or may have another form as desired. The intermediate portion 1106 may be configured to transmit the rotation of the second portion 1104 to the first portion 1102 to allow the first portion 1102 to withdraw the liner 926 from the on-skin sensor assembly 508.

The second portion 1104 may be configured to be positioned at the opening 905 of the housing 902 and may include a grip portion 1116 positioned at the second portion 1104. The second portion 1104 may comprise a base for the liner removal component 1100. The grip portion 1116 may be configured to be gripped to withdraw the liner removal component 1100 from the surface 924 of the on-skin wearable medical device. The grip portion 1116 may be positioned on an exterior surface of the second portion 1104 that is positioned on an outer surface of the housing 902. In embodiments, the second portion 1104 may be configured to extend over an outer surface of the applicator housing 902. The second portion 1104 may further include an engagement portion 1118 positioned at the second portion 1104 and configured to engage a portion of the housing 902 to retain the liner removal component 1100 to the housing 902. The engagement portion 1118 for example, may comprise threading that engages an engagement portion on the housing, in the form of threading.

The engagement portion 1118 may be configured to be rotated relative to the housing 902 to release the liner removal component 1100 from the housing 902.

Figure 29C:
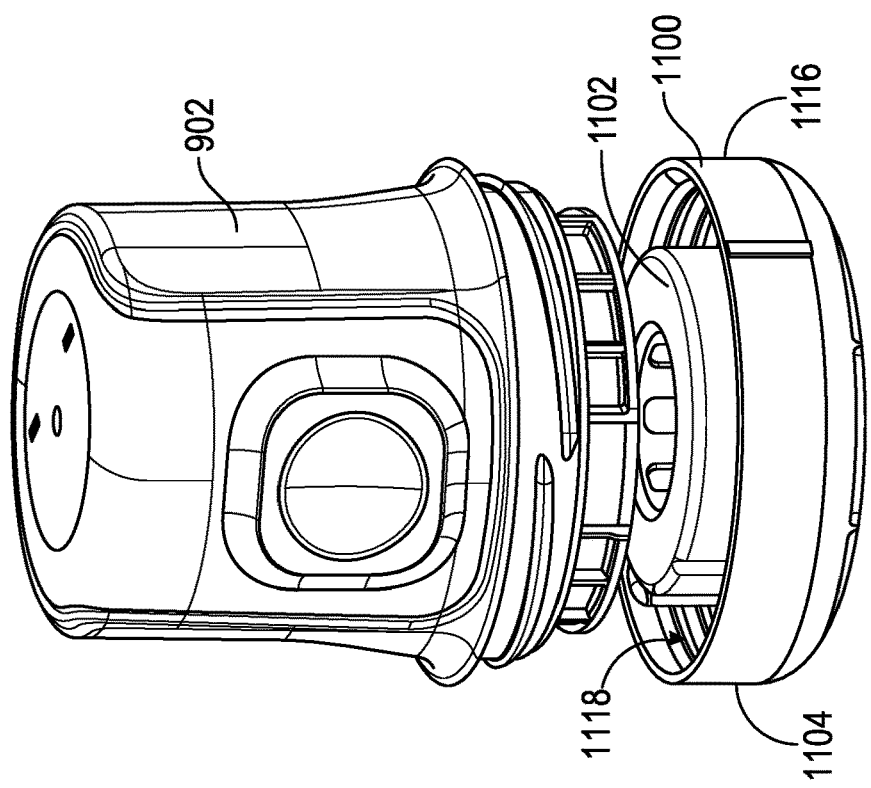
FIG. 29C illustrates a perspective view of the system shown in FIG. 29A.
Figure 29B:
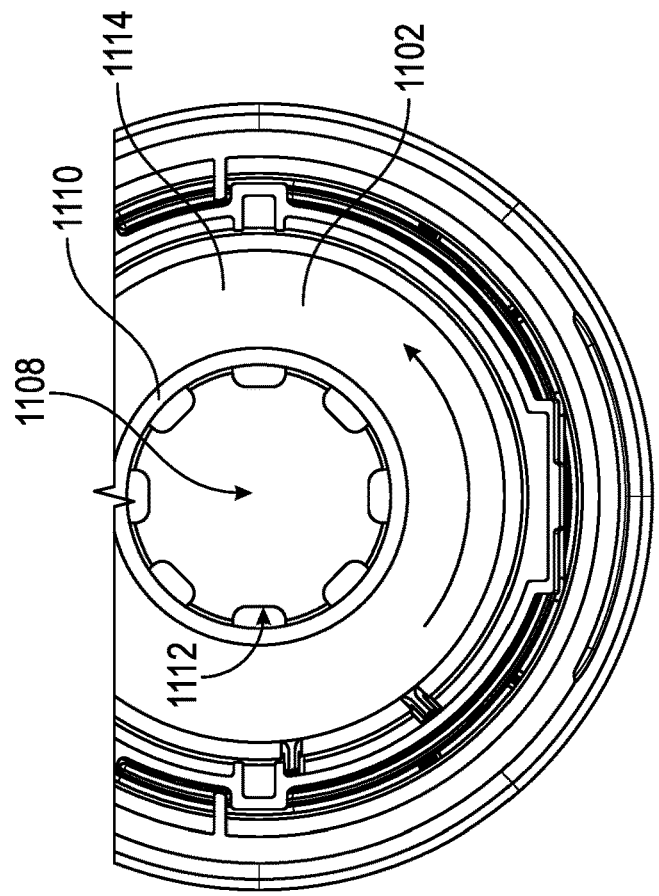
FIG. 29B illustrates a top view of a liner removal component.

For example, as shown in FIG. 29C, when the engagement portion 1118 is rotated, the entirety of the liner removal component 1100 rotates, which causes the liner removal component 1100 to move axially and be withdrawn from the housing 902 and at least partially decouple the liner (not shown in FIG. 29C) from the surface 924 of the on-skin sensor assembly 508. The second portion 1104 may be separated from the applicator housing 902. The second portion 1104 may be configured to be unscrewed from the applicator housing 902 to at least partially decouple the liner removal component 1100 from the applicator housing 902.

The first portion 1102 accordingly may rotate and be withdrawn axially from the surface 924 of the on-skin sensor assembly 508 to withdraw the liner from the surface 924 of the on-skin sensor assembly 508. The liner removal component 1100 may comprise a base for the applicator housing 902 and may cover the internal cavity 903. The liner removal component 1100 may comprise a cap in embodiments.

Figure 29D:
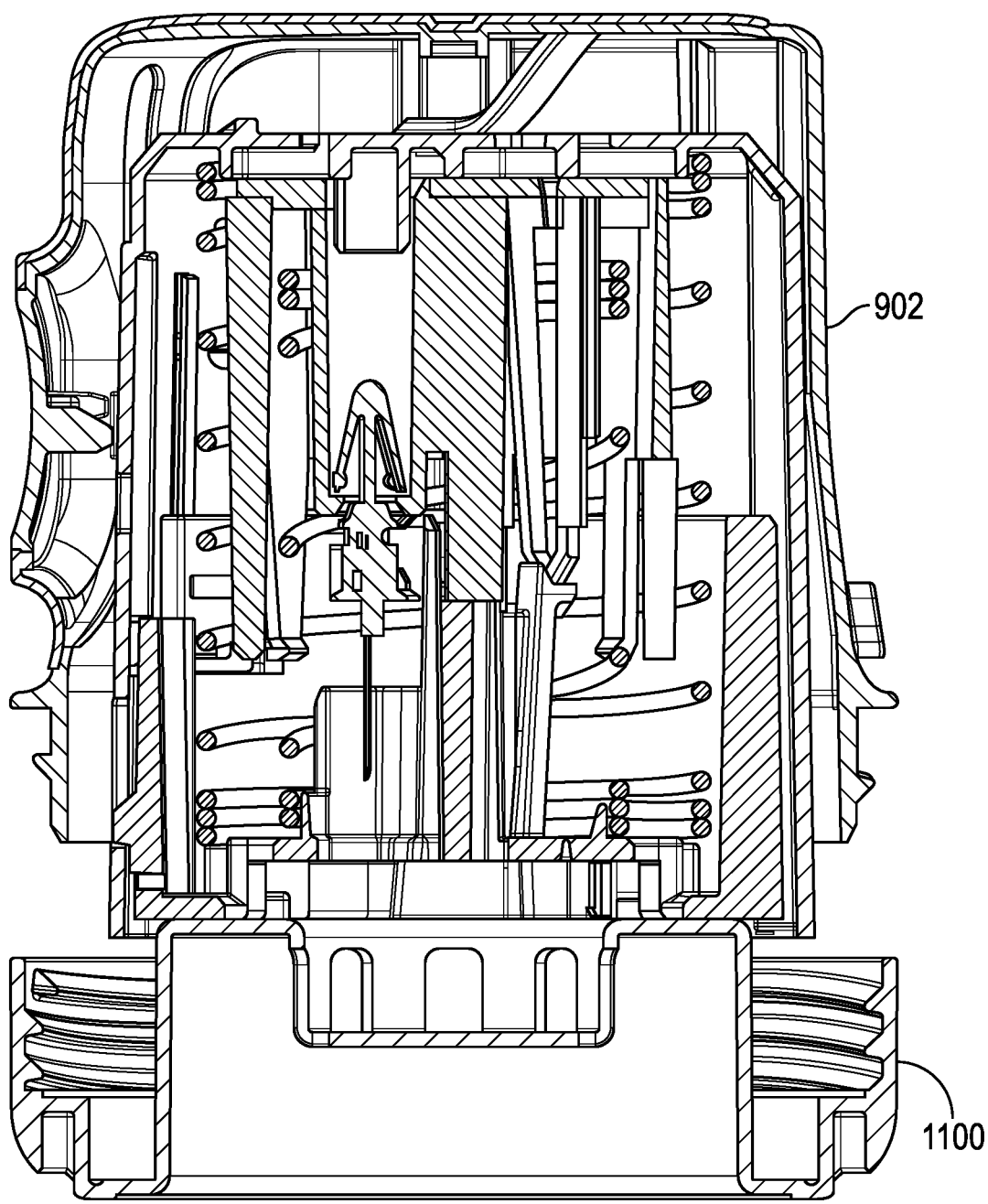
FIG. 29D illustrates a cross sectional view of the system shown in FIG. 29A.

In embodiments, the liner removal component 1100 may be configured to be reinserted into the internal cavity 903 following deployment of the on-skin wearable medical device. The liner removal component 1100, for example, may be positioned as shown in FIG. 29D and rotated back onto the housing 902 to recouple to the housing.

Figure 29E:
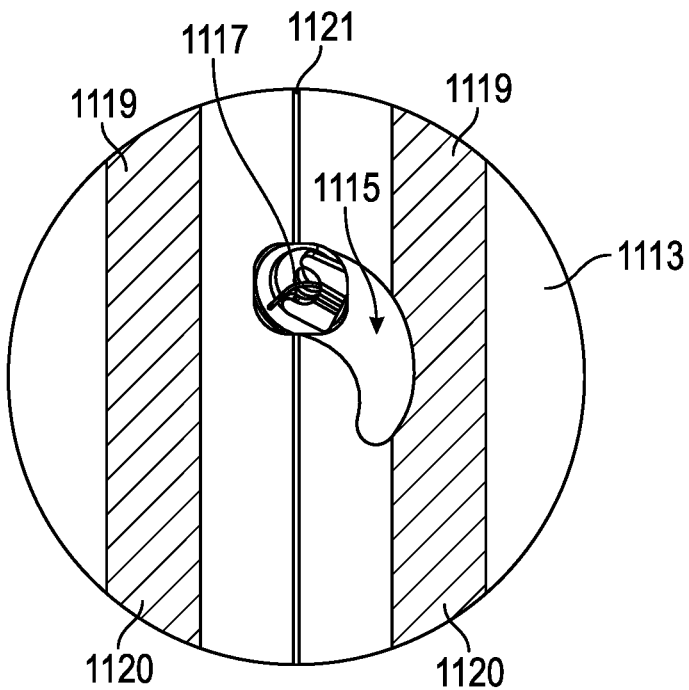
FIG. 29E illustrates a perspective view of a liner.

The liner utilized with an embodiment shown in FIGS. 29A-29D may be configured to rotate to at least partially decouple from the surface 924 of the on-skin sensor assembly 508. FIG. 29E, for example, illustrates such an embodiment of a liner 1113 including a cut out portion 1115 having a curved or spiral shape that allows the liner to rotate relative to the transcutaneous analyte sensor 1117 without contacting the sensor 1117. The liner 1113 may include multiple layers 1119, which may be folded upon each other with a central opening 1121 between the layers 1119. A layer 1119a (marked in FIG. 29F) may include a first portion 1123a and a second portion 1123b to form the multiple layers, with the first portion 1123a folded upon the second portion 1123b. The layers 1119 may be arranged in a butterfly fold configuration. Coupling portions 1120 in the form of a plurality of longitudinal strips may extend along the folded portions of the liner 1113. The coupling portions 1120 may be arranged to allow the folded portions of the liner 1113 to rotate and unfold as the liner removal component 1100 extends axially away from the surface 1122 of the patch for engaging skin (marked in FIG. 29F).

Figure 29F:
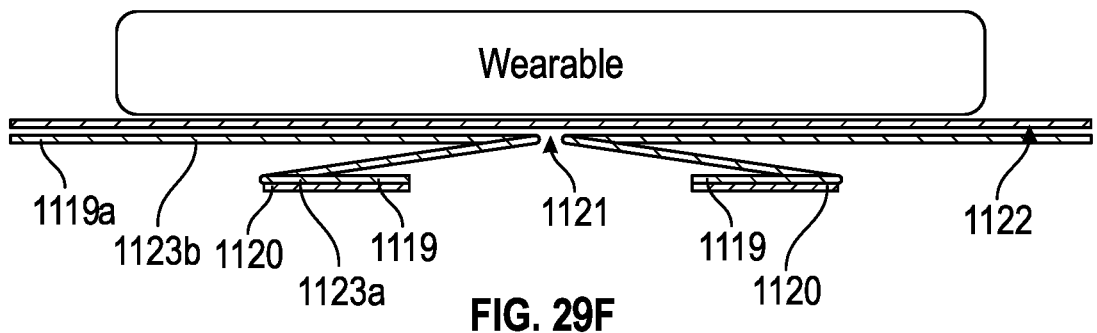
FIG. 29F illustrates a cross sectional schematic view of the liner shown in FIG. 29E.

FIG. 29F illustrates a cross sectional schematic view of the folded liner shown in FIG. 29E.

FIGS. 30A-30E illustrate an embodiment of a liner removal component 1200 in which the liner removal component 1200 is configured to be rotated relative to the housing 902 to release the liner removal component 1200 from the housing 902. The liner removal component 1200 may include a first portion 1202 that is configured to rotate relative to a second portion 1204 to allow the liner removal component 1200 to withdraw axially from the surface 924 of the on-skin sensor assembly 508. The first portion 1202 may be spaced axially from the second portion 1204.

The first portion 1202 may be configured similarly as the first portion 930 of the liner removal component 928 and may be configured to engage the liner 926. The first portion 1202 may cover at least a portion of the liner 926 and may support the liner 926. The first portion 1202 may include a sheath 1206 that is configured to receive the insertion element 915 and reduce the possibility of contact with the insertion element 915. The first portion 1202 may be configured to slide axially within the internal cavity 903 yet not rotate within the internal cavity 903.

Figure 30A:
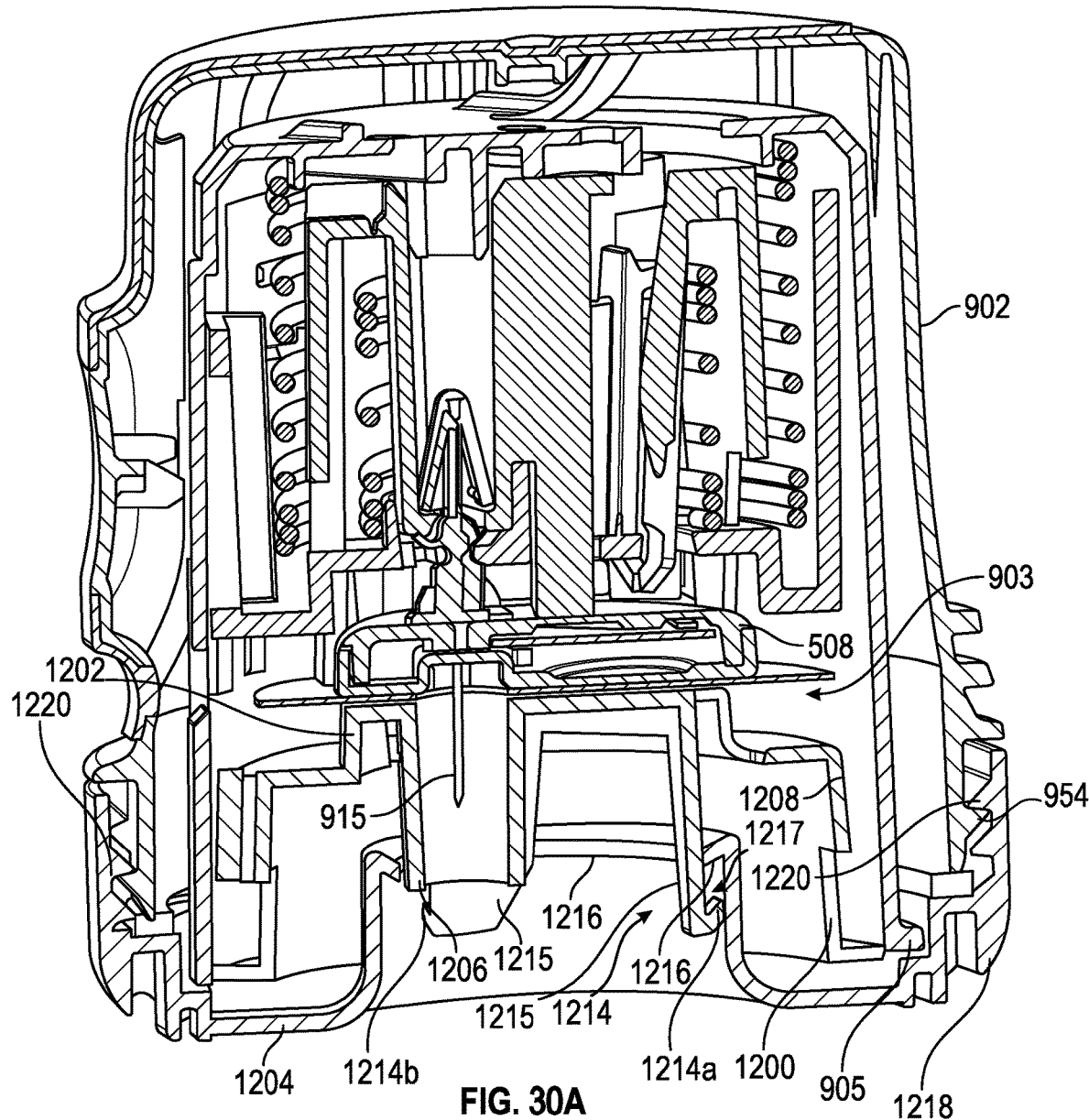
FIG. 30A illustrates a cross sectional view of a system.
Figure 30B:
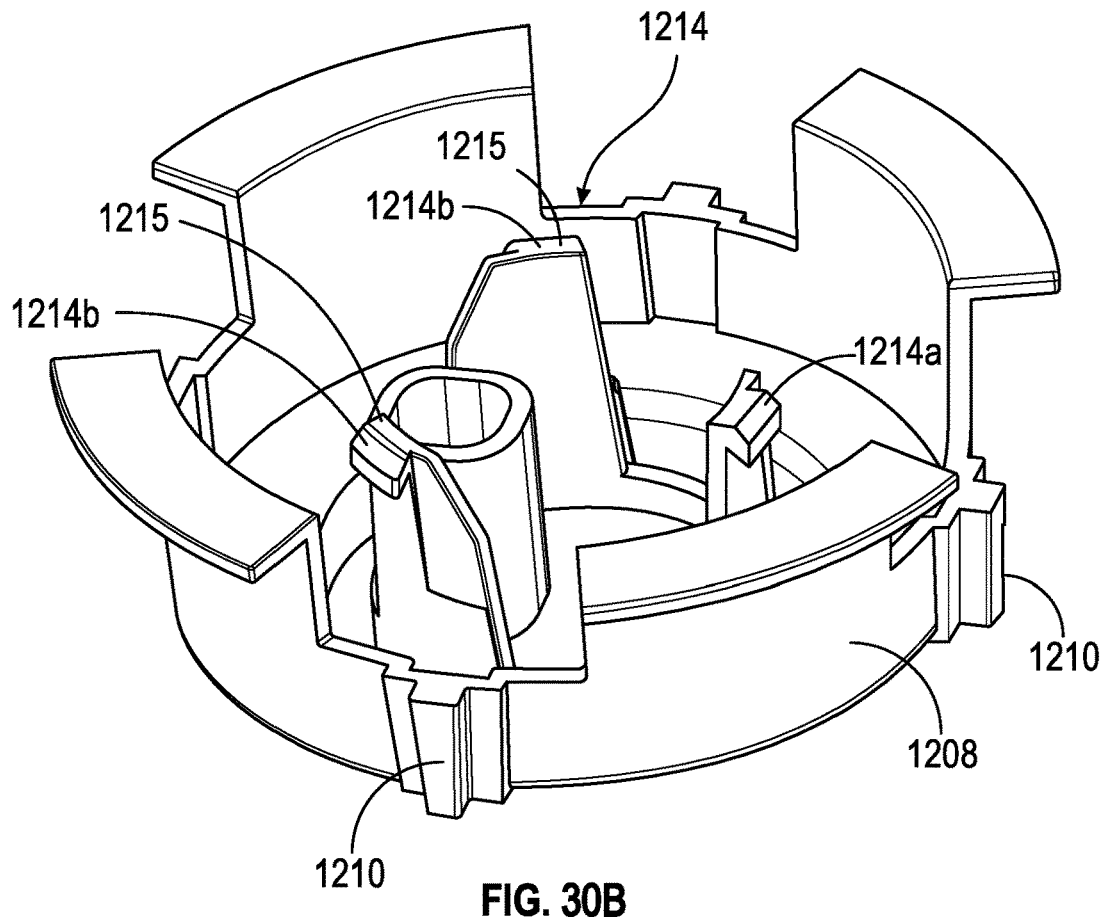
FIG. 30B illustrates a bottom perspective view of a portion of the liner removal component shown in FIG. 30A.
Figure 30C:
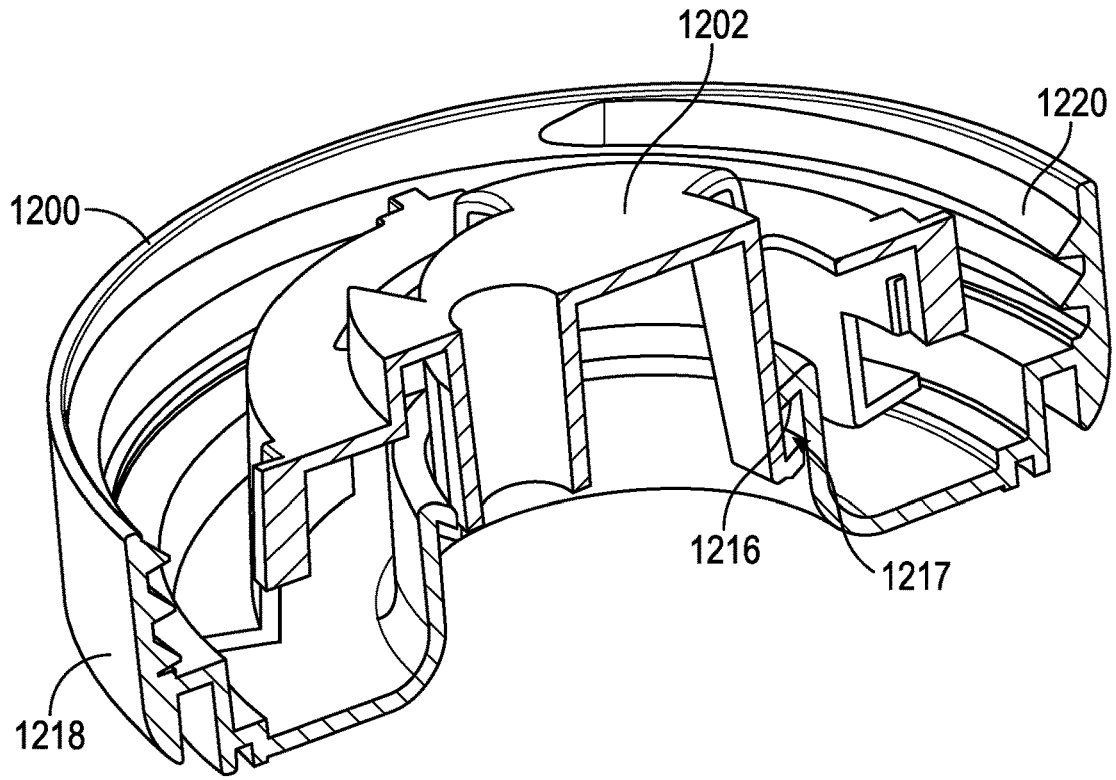
FIG. 30C illustrates a perspective cross sectional view of the liner removal component shown in FIG. 30A.
Figure 30D:
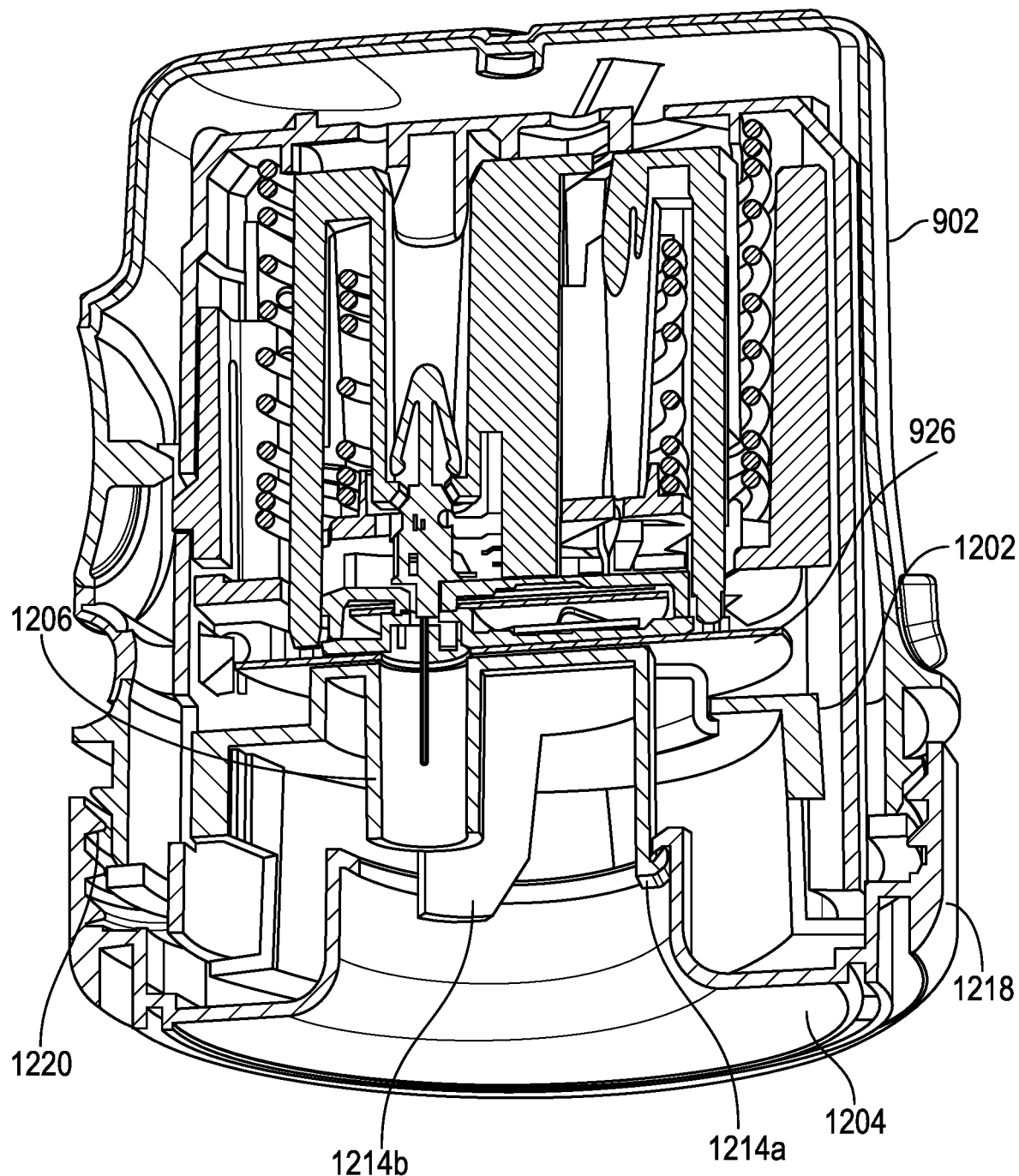
FIG. 30D illustrates a bottom perspective cross sectional view of the liner removal component shown in FIG. 30A.
Figure 30E:
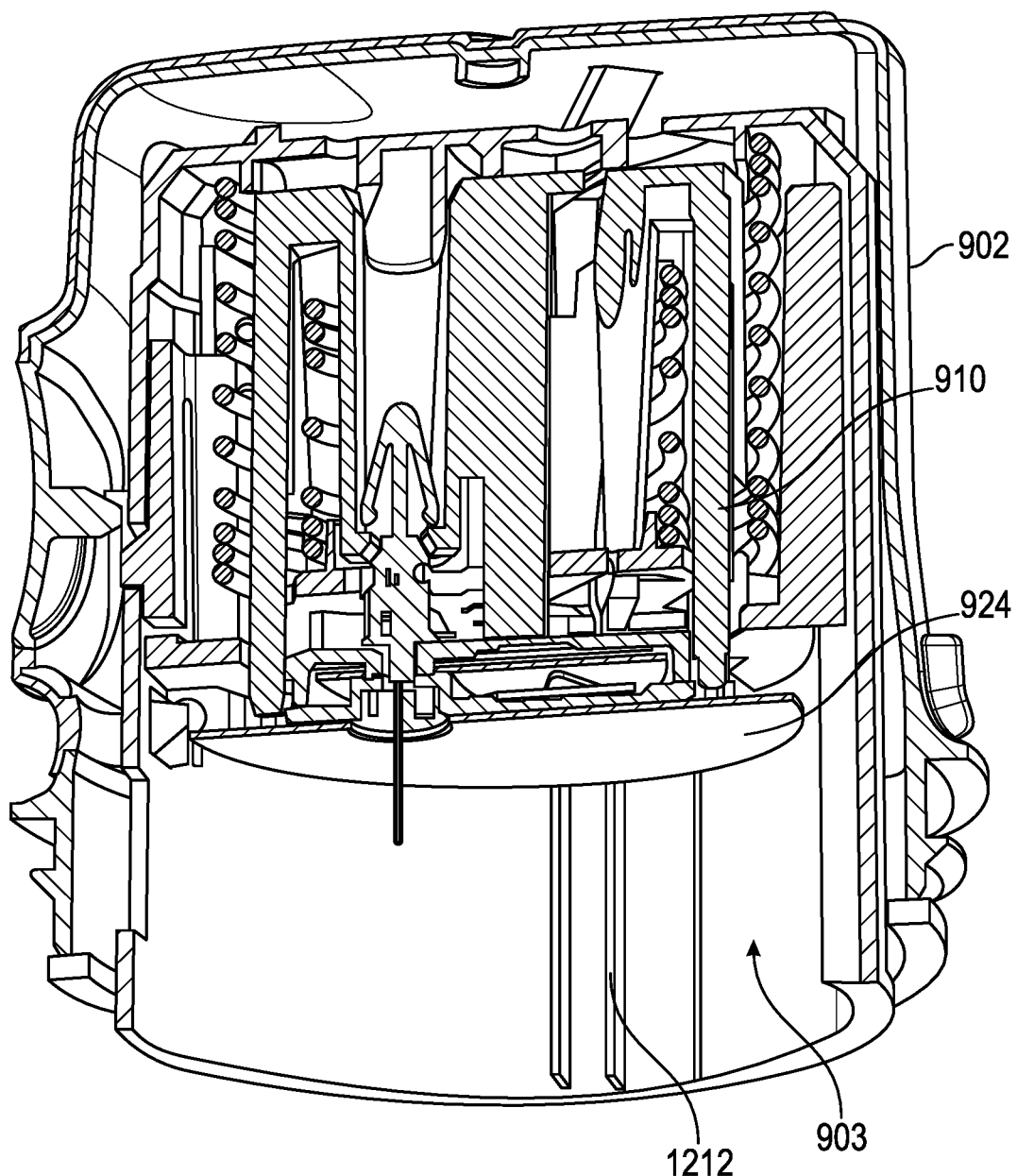
FIG. 30E illustrates a cross sectional view of the system shown in FIG. 30A.

For example, an intermediate portion 1208 in embodiments may include one or more guides 1210 (marked in FIG. 30B) that may extend along channels 1212 (marked in FIG. 30E). The one or more guides 1210 may be configured to engage an interior surface of the applicator housing 902 to prevent rotation of the first portion 1202 relative to the applicator housing 902. The channels 1212 in the interior surface of the housing 902 may prevent rotation of the first portion 1202 of the liner removal component 1200 prior to or during removal from the housing 902. The guides 1210 may extend axially along the internal cavity 903 to orient the liner removal component 1200 within the internal cavity 903. The guides 1210 may be configured to prevent rotation of the first portion 1202 relative to the applicator housing 902 upon the second portion 1204 rotating relative to the first portion 1202. The second portion 1204 may also rotate relative to the applicator housing 902. The prevention of rotation may prevent the rotation of the liner as it is peeled off the surface of the on-skin assembly. In embodiments, the guides 1210 may be configured to reduce rotation of the first portion 1202 relative to the applicator housing 902.

Referring to FIGS. 30A and 30B, the intermediate portion 1208 in embodiments may include one or more rotation couplers 1214 that may allow the first portion 1202 to rotate relative to the second portion 1204 while the first portion 1202 maintains its rotational position relative to the housing 902. The intermediate portion 1208 may comprise a non-rotating portion of the liner removal component 1200 in embodiments. The rotation couplers 1214 may be configured to engage one or more bearing surfaces 1216 of a second portion 1204 of the liner removal component 1200 in embodiments. The rotation couplers 1214 may have a form as desired. The rotation couplers 1214 for example, may comprise arms 1215 that engage the one or more bearing surfaces 1216 of the second portion 1204. The rotation couplers 1214 may include each include a bearing surface configured to engage the one or more bearing surfaces 1216 of the second portion 1204 to couple the first portion to the second portion and to allow for rotation of the first portion 1202 relative to the second portion 1204. The rotation couplers 1214 may be configured to rotate relative to the one or more bearing surfaces 1216.

The one or more rotation couplers 1214 may initially be spaced from the one or more bearing surfaces 1216 of the second portion 1204 with a gap 1217 as shown in FIG. 30A. Rotation of the first portion 1202 relative to the second portion 1204 may cause a size of the gap 1217 to decrease to allow the one or more rotation couplers 1214 to contact the one or more bearing surfaces 1216. Rotation of the first portion 1202 relative to the second portion 1204 may bring the one or more rotation couplers 1214 into contact with the one or more bearing surfaces 1216. The arms 1215 may engage the one or more bearing surfaces 1216 to allow the second portion 1204 to pull the first portion 1202 axially and withdraw the first portion 1202 from the internal cavity 903.

In embodiments, a height of the rotation couplers may be different from each other such that a first one of the rotation couplers is configured to contact the receiving portion prior to a second one of the rotation couplers. For example, a length of the rotation couplers 1214 may be different from each other to produce a desired asymmetric pull force against the liner 926. In embodiments, at least two rotation couplers may be provided. In embodiments, at least three rotation couplers may be provided. A greater number of rotation couplers may be provided in embodiments as desired.

A first rotation coupler 1214a may have a shorter length than a second rotation coupler 1214b, which may cause the first rotation coupler 1214a to engage and be pulled axially earlier than the second rotation coupler 1214b. As such, the first portion 1202 may be angled upon being withdrawn from the on-skin wearable medical device and may produce an asymmetric force upon the liner 926 during release. The initial pull force upon the liner 926 may be to one side of the liner 926, and thus may apply an asymmetric force upon the liner 926. The liner removal component 1200 may be configured to asymmetrically decouple the liner 926 from the surface of the on-skin wearable medical device upon the liner removal component 1200 being at least partially withdrawn from the surface. The liner removal component 1200 may be coupled to the liner 926 so that the liner removal component 1200 pulls the liner 926 off of the surface 924 when the user unscrews or otherwise removes the second portion 1204 from applicator housing 902. The asymmetric force may result in a peel of the liner 926, which may reduce the removal force. The peel of the liner 926 may be in a horizontal direction relative to the surface 924 in embodiments, as the liner removal component 1200 is withdrawn from the surface 924 axially.

The second portion 1204 may be configured to be positioned at the opening 905 of the housing 902 and may include a grip portion 1218 positioned at the second portion 1204. The second portion 1204 may comprise a base for the liner removal component 1200. The grip portion 1218 may be configured to be gripped to withdraw the liner removal component 1200 from the surface 924 of the on-skin wearable medical device. The grip portion 1218 may be positioned on an exterior surface of the second portion 1204 that is positioned on an outer surface of the housing 902. The second portion 1204 may be configured to extend over an outer surface of the applicator housing 902. The second portion 1204 may further include an engagement portion 1220 positioned at the second portion 1204 and configured to engage a portion of the housing 902 to retain the liner removal component 1200 to the housing 902. The engagement portion 1220 for example, may comprise threading that engages an engagement portion 954 on the housing, in the form of threading.

A central portion of the second portion 1204 may include the one or more bearing surfaces 1216 that engage the arms 1215 of the one or more rotation couplers 1214.

FIG. 30C illustrates a cross sectional view of the liner removal component 1200.

In operation, the second portion 1204 may be gripped and rotated to rotate the engagement portion 1220 relative to the housing 902. The rotation of the second portion 1204 may cause the second portion 1204 to slide axially distal with respect to the housing 902 and cause the one or more bearing surfaces 1216 of the second portion 1204 to engage the arms 1215 of the one or more rotation couplers 1214. FIG. 30D, for example, illustrates such a configuration. The second portion 1204 may be unscrewed from the applicator housing 902 to at least partially decouple the liner removal component 1200 from the applicator housing 902. As shown, the distance between the one or more bearing surface 1216 and the arms has reduced. In embodiments, the rotation coupler 1214a may engage prior to the rotation coupler 1214b and may produce an asymmetric force upon the liner 926. The second portion 1204 may continue to be rotated, causing the first portion 1202 to be withdrawn axially from the surface 924 of the on-skin sensor assembly 508.

The configuration of the rotation couplers 1214 allows the second portion 1204 to rotate freely, but only apply axial motion to the first portion 1202 to pull the first portion 1202 axially without rotation of the first portion 1202 relative to the housing 902. The guides 1210 shown in FIG. 30B for example, further prevent and/or reduce the possibility of rotation of the first portion 1202 relative to the housing 902.

The second portion 1204 of the liner removal component 1200 may continue to be rotated until the liner removal component 1200 is disengaged from the housing 902, and the liner removal component 1200 may be withdrawn from the internal cavity 903. The liner 926 may be withdrawn from the surface 924 of the on-skin sensor assembly 508. FIG. 30E illustrates a resulting configuration, with the surface 924 of the on-skin sensor assembly 508 exposed for deployment to the skin.

The liner removal component 1200 may comprise a base for the applicator housing 902. The liner removal component 1200 may cover the internal cavity 903. The liner removal component 1200 may comprise a cap in embodiments.

In embodiments, the liner removal component 1200 may be configured to be reinserted into the internal cavity 903 following deployment of the on-skin wearable medical device. The liner removal component 1200, for example, may be rotated back onto the applicator housing 902 to recouple to the housing.

In embodiments, during assembly, the second portion 1204 of the liner removal component 1200 may be installed into the bottom of the applicator housing 902 after the first portion 1202 and intermediate portion 1208 are inserted into the internal cavity 903 through the bottom of the applicator housing 902. The one or more bearing surfaces 1216 may be configured to snap over the ends of the arms 1215 as the second portion 1204 is installed or screwed onto the bottom of the applicator housing 902. The ends of the arms 1215 may be configured to deflect over the one or more bearing surfaces 1216 during assembly. At least a portion of the liner removal component 1200 may be configured to be assembled with the one or more arms 1215 deflected by the second portion 1204.

Figure 30F:
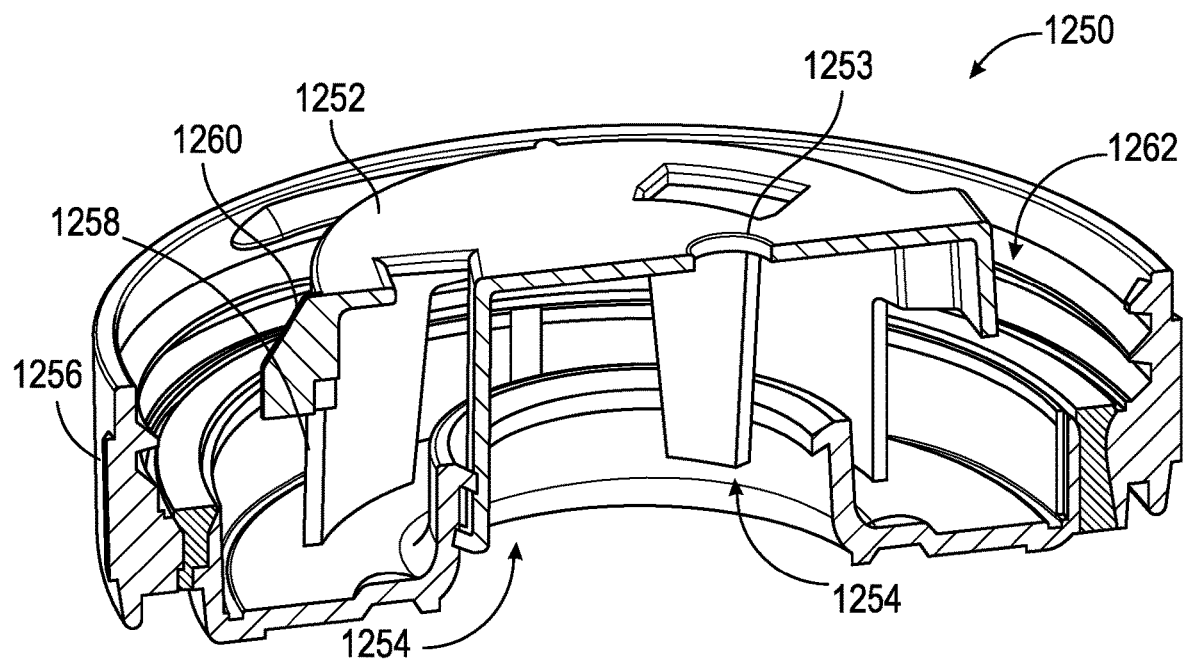
FIG. 30F illustrates a perspective cross sectional view of a liner removal component.

FIG. 30F illustrates a cross sectional view of a liner removal component 1250 configured similarly as the liner removal component 1200 shown in FIGS. 30A-30D, yet including a larger surface area of the first portion 1252. The first portion 1252 may be configured to cover at least a portion of the liner 926 and may support the liner 926, and may comprise a substrate for the liner 926 to be positioned upon. The first portion 1252 may have a flat shape as shown in FIG. 30F. A flat shape may provide a planar surface for secure adhesion of the liner 926 to the first portion 1252. The first portion 1252 may include an aperture 1253 for the insertion element 915 and the transcutaneous analyte sensor to pass through.

One or more rotation couplers 1254 may be configured similarly as the rotation couplers 1214 shown in FIGS. 30A-30D. The rotation couplers 1254 may allow the first portion 1252 to rotate relative to a second portion 1256 while the first portion 1252 maintains its rotational position relative to the housing 902. The second portion 1256 may be configured similarly as the second portion 1204 shown in FIGS. 30A-30D. An annular gap 1262 is shown between the first portion 1252 and the second portion 1256. An intermediate portion 1258 may include one or more guides 1260 configured similarly as the guides 1210 shown in FIG. 30B. The liner removal component 1250 may operate in a similar manner as the liner removal component 1200 shown in FIGS. 30A-30D. The liner removal component 1250 may be utilized with the systems and applicator housings disclosed herein.

Figure 30G:
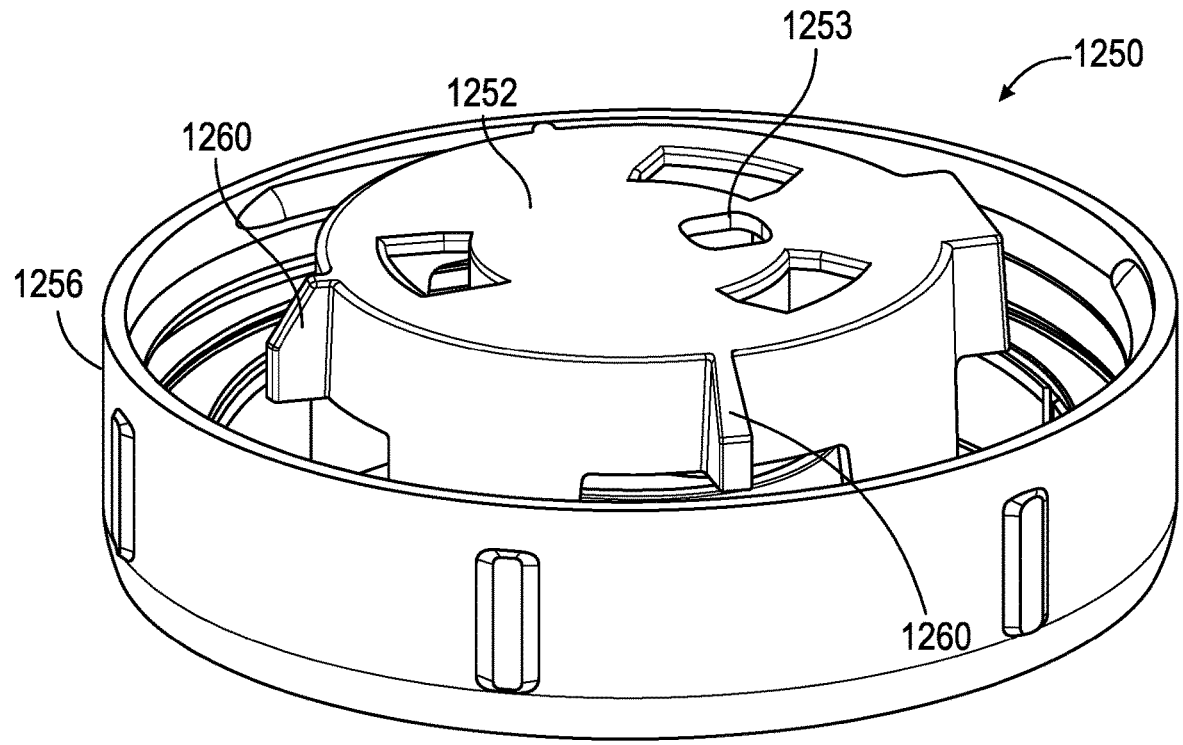
FIG. 30G illustrates a perspective view of the liner removal component shown in FIG. 30F.
Figure 30H:
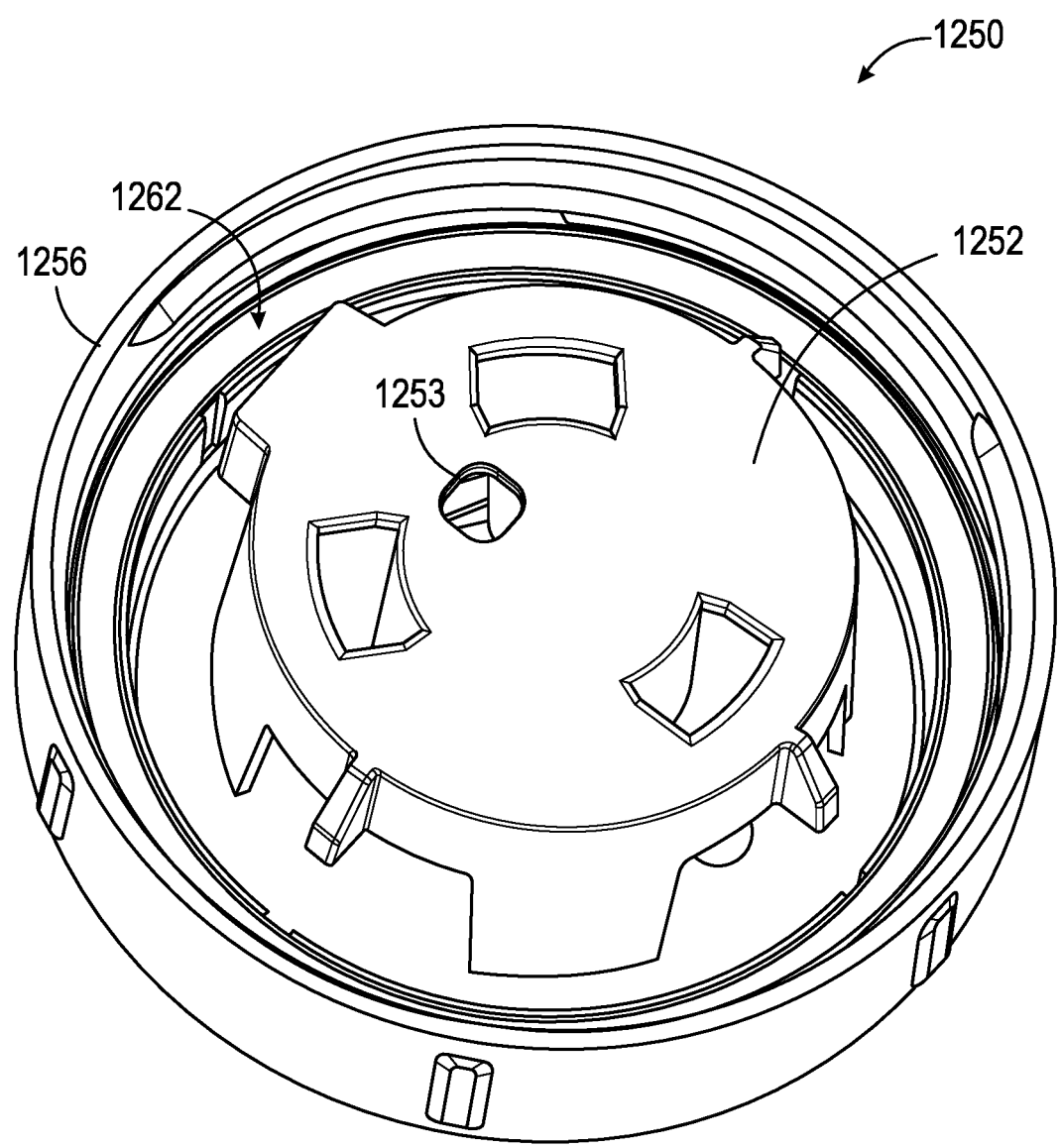
FIG. 30H illustrates a top perspective view of the liner removal component shown in FIG. 30F.

FIG. 30G illustrates a perspective view of the liner removal component 1250. FIG. 30H illustrates a top perspective view of the liner removal component 1250.

FIGS. 31A-31H illustrate an embodiment of a liner removal component 1300 in which the liner removal component 1300 is configured to be rotated relative to the housing 902 to release the liner removal component 1300 from the housing 902. The liner removal component 1300 may include a first portion 1302 that is configured to rotate relative to a second portion 1304 to allow the liner removal component 1300 to withdraw axially from the surface 924 of the on-skin sensor assembly 508. The first portion 1302 may be axially spaced from the second portion 1304.

A height of the first portion 1302 relative to the second portion 1304 is configured to be adjustable. The liner removal component 1300 may include a cam surface 1306 (marked in FIG. 31B) that is configured to adjust the height of the first portion 1302 relative to the second portion 1304.

The first portion 1302 may be configured similarly as the first portion 930 of the liner removal component 928 and may be configured to engage the liner 926. The first portion 1302 may cover at least a portion of the liner 926 and may support the liner 926. The first portion 1302 may include a sheath 1308 that is configured to receive the insertion element 915 and reduce the possibility of contact with the insertion element 915. The first portion 1302 may be configured to slide axially within the internal cavity 903 yet not rotate within the internal cavity 903.

For example, an intermediate portion 1310 in embodiments may include one or more guides 1312 (marked in FIG. 31B) that may extend along channels in the interior surface of the housing 902 that may prevent and/or reduce the possibility of rotation of the first portion 1302 of the liner removal component 1300 prior to or during removal from the housing 902. The guides 1312 may be configured to engage the interior surface of the housing 902. The guides 1312 may be in the form of arms that extend radially outward from the intermediate portion 1310 in embodiments, or may have another configuration. The guides 1312 may orient the liner removal component 1300 within the internal cavity 903. The guides 1312 may prevent and/or reduce the possibility of rotation of the first portion 1302 relative to the applicator housing 902 upon the second portion 1304 rotating relative to the first portion 1302, which may reduce the possibility of shear of the liner. The second portion 1304 may also rotate relative to the applicator housing 902.

Figure 31A:
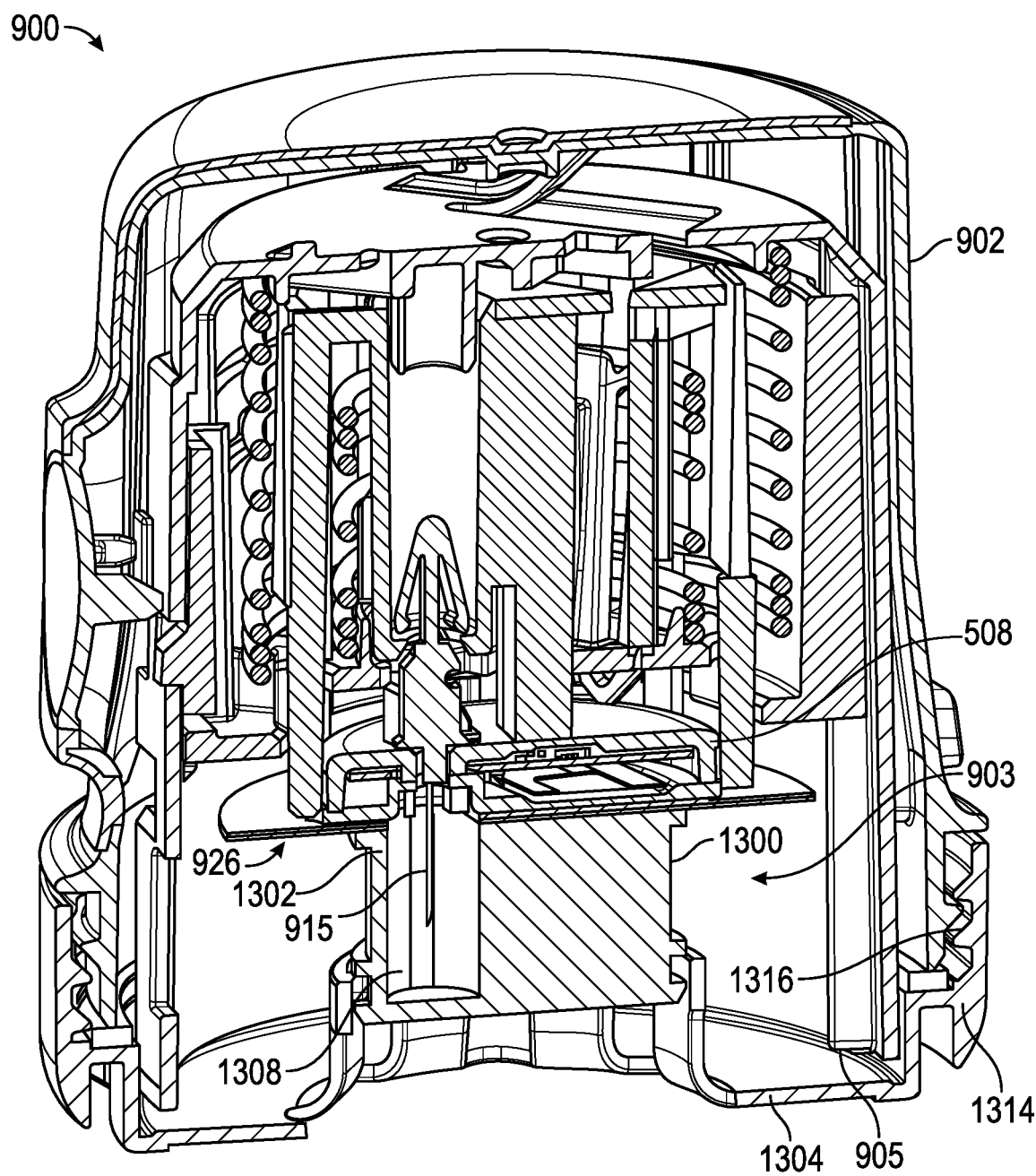
FIG. 31A illustrates a cross sectional view of a system.
Figure 31B:
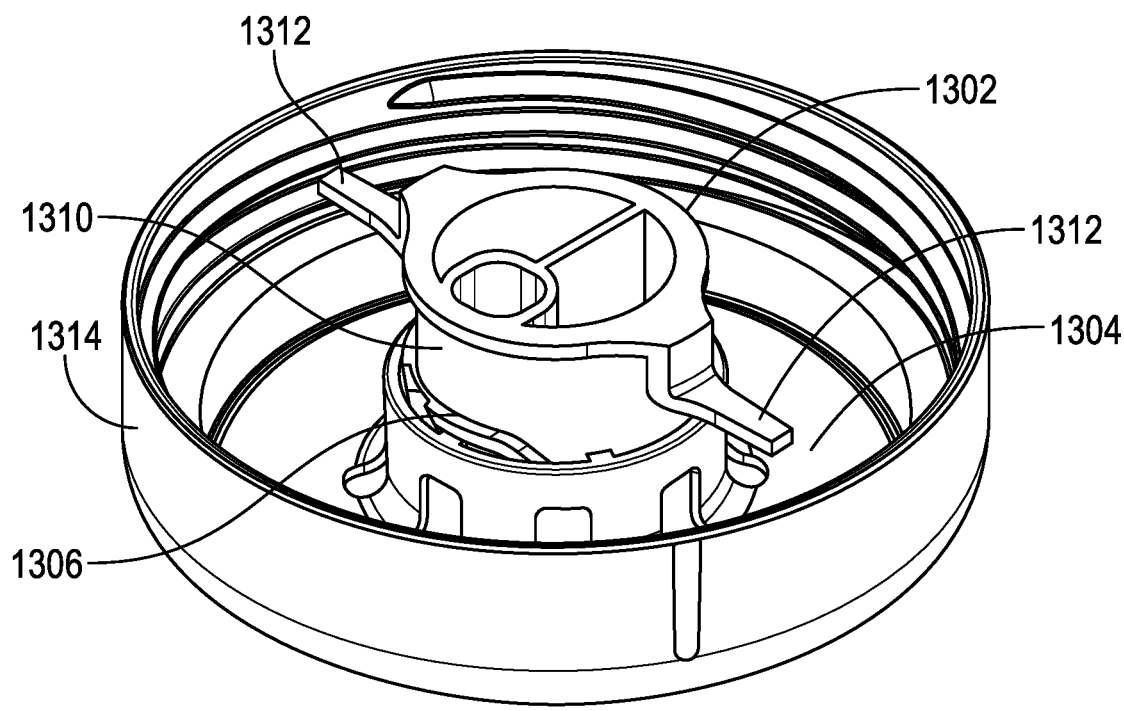
FIG. 31B illustrates a perspective view of the liner removal component shown in FIG. 31A.
Figure 31C:
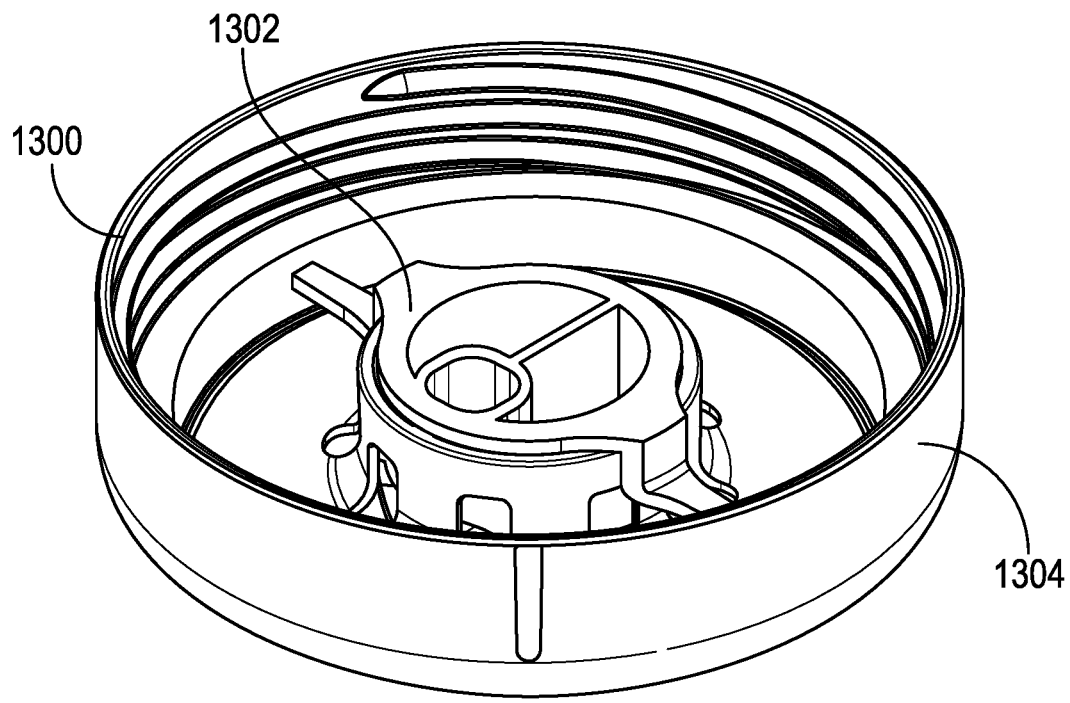
FIG. 31C illustrates a perspective view of the liner removal component shown in FIG. 31A.
Figure 31D:
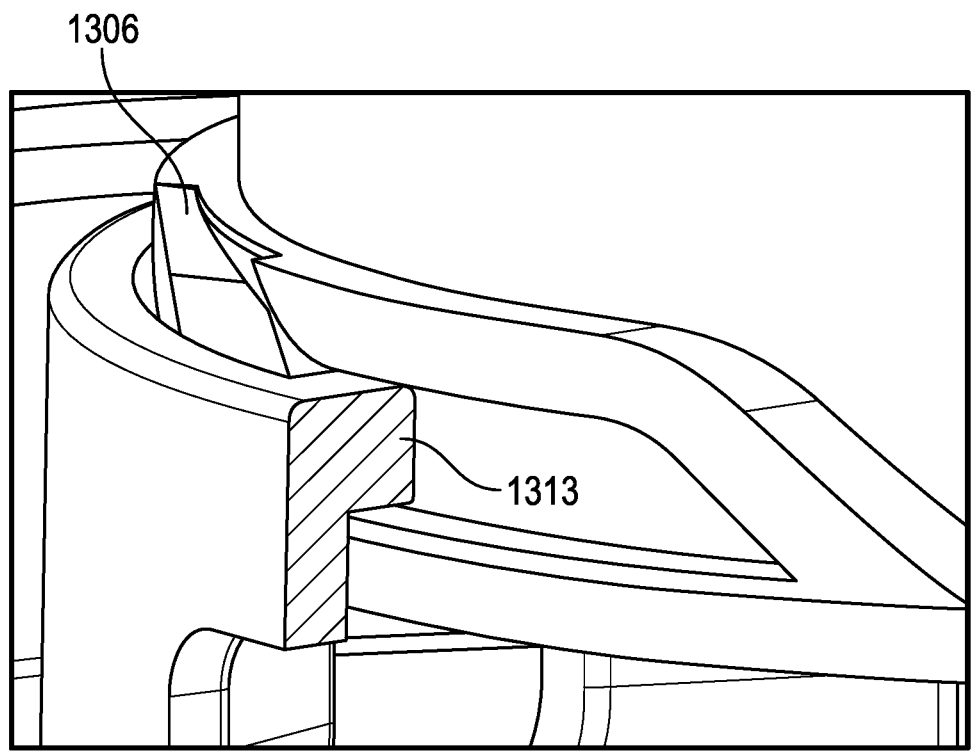
FIG. 31D illustrates a close-up view of a cam surface shown in FIG. 31A.

Referring to FIGS. 31B-31H, the intermediate portion 1310 in embodiments may have a rotation coupler including the cam surface 1306 that may be configured to adjust the height of the first portion 1302 relative to the second portion 1304. The cam surface 1306 may extend circumferentially about an outer surface of the intermediate portion 1310 in embodiments, and may comprise a surface that extends axially as the cam surface 1306 extends circumferentially. As such, the cam surface 1306 extends at an angle (as shown in FIG. 31D for example), which causes an axial movement of the first portion 1302 due to a rotational movement of the second portion 1304. The angle of the cam surface 1306 accordingly may define a rate at which the first portion 1302 moves axially due to the rotational movement of the second portion 1304.

Figure 31E:
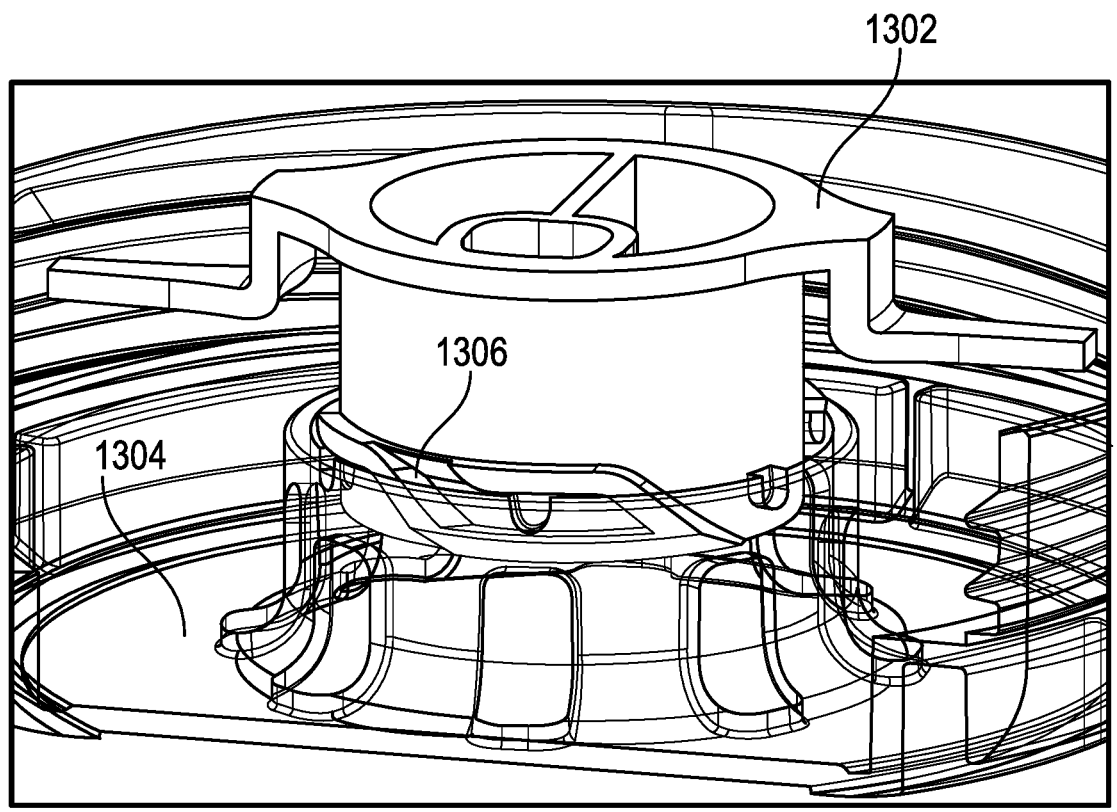
FIG. 31E illustrates a perspective view of the liner removal component shown in FIG. 31A.
Figure 31F:
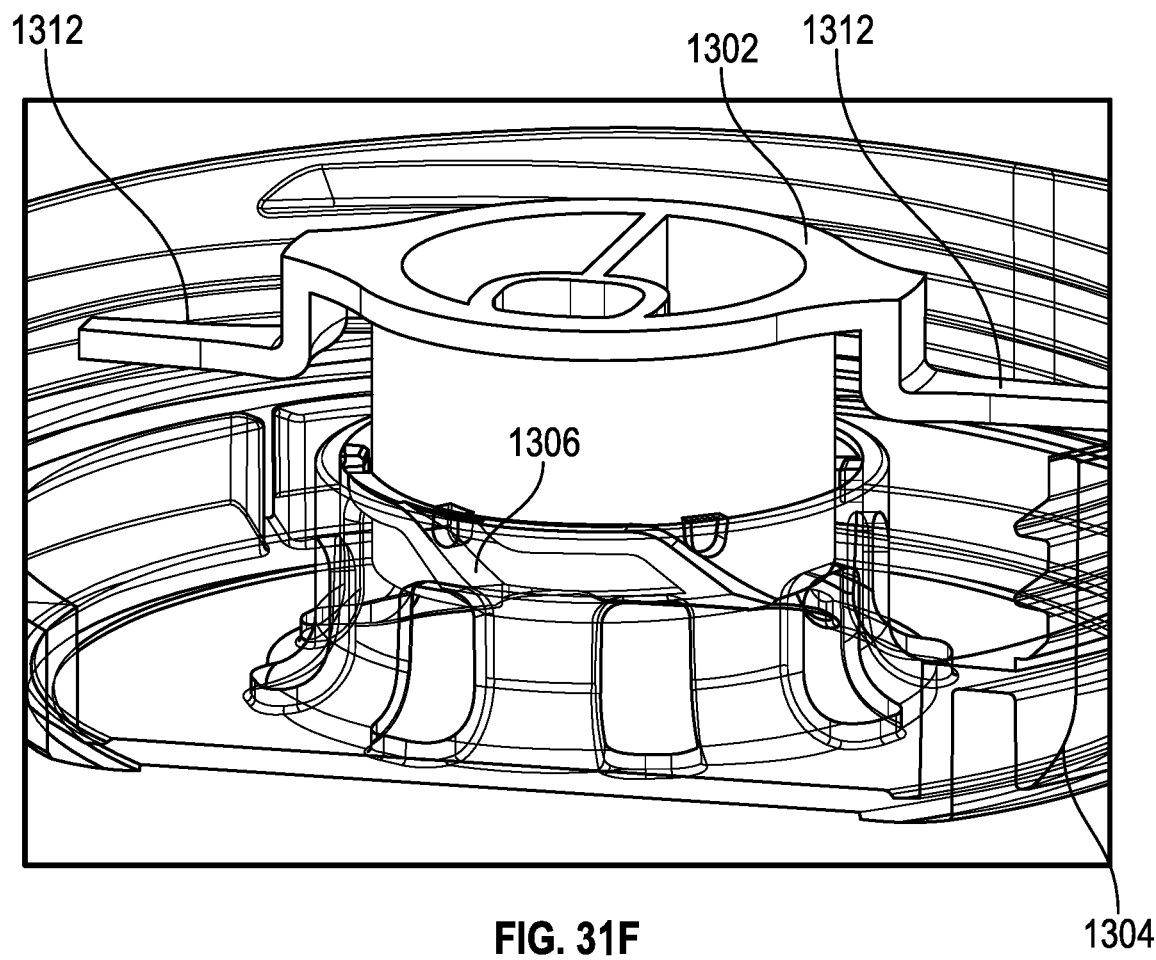
FIG. 31F illustrates a perspective view of the liner removal component shown in FIG. 31A.

FIG. 31D, for example, illustrates a view of the rotation coupler showing an arm 1313 extending within a channel including the cam surface 1306. A central portion of the second portion 1304 may include one or more arms 1313 that engage the cam surface 1306. FIG. 31E illustrates that the first portion 1302 may be at a height relative to the second portion 1304. FIG. 31F illustrates upon rotation of the second portion 1304, the arm 1313 may slide along the cam surface 1306 thus causing the first portion 1302 to slide axially distal. The guides 1312 may assist the first portion 1302 to only produce axial movement in response to the rotational movement of the second portion 1304. FIG. 31C illustrates a resulting variation in the height of the first portion 1302 relative to the second portion 1304.

Further, in embodiments, as shown in FIGS. 31G and 31H, the cam surface 1306 may be configured such that axial movement is only produced in one direction of rotation of the second portion 1304 relative to the intermediate portion 1310. For example, as shown in FIG. 31G, upon rotation of the second portion 1304 leftward, the arms 1313 will extend up the cam surface 1306 and produce axial movement. Upon rotation of the second portion 1304 rightward in FIG. 31G, the axial movement will not be produced, and rather the arms 1313 will pass to another cam surface, as represented by the path of the arrows in FIG. 31H. The cam surfaces 1306 may provide such a feature to prevent and/or reduce undesired axial movement of the first portion 1302 shown in FIG. 31E, such as a direction towards the on-skin wearable medical device.

Referring to FIG. 31A, the second portion 1304 may be configured to be positioned at the opening 905 of the housing 902 and may include a grip portion 1314 positioned at the second portion 1304. The grip portion 1314 may be configured to be gripped to withdraw the liner removal component 1300 from the surface 924 of the on-skin wearable medical device. The grip portion 1314 may be positioned on an exterior surface of the second portion 1304 that is positioned on an outer surface of the housing 902. The second portion 1304 may be configured to extend over an outer surface of the applicator housing 902. The second portion 1304 may further include an engagement portion 1316 positioned at the second portion 1304 and configured to engage a portion of the housing 902 to retain the liner removal component 1300 to the housing 902. The engagement portion 1316 for example, may comprise threading that engages an engagement portion on the housing, in the form of threading. The liner removal component 1300 may comprise a base for the applicator housing 902. The liner removal component 1300 may cover the internal cavity 903. The liner removal component 1300 may comprise a cap in embodiments.

In operation, the second portion 1304 may be gripped and rotated to rotate the engagement portion 1316 relative to the housing 902. The rotation of the second portion 1304 may cause the second portion 1304 to slide axially distal with respect to the housing 902 and cause the first portion 1302 to slide axially due to the cam surface 1306. The second portion 1304 may continue to be rotated, causing the first portion 1302 to be withdrawn axially from the surface 924 of the on-skin sensor assembly 508. The second portion 1304 may be unscrewed from the applicator housing 902 to at least partially decouple the liner removal component 1300 from the applicator housing 902.

The configuration of the cam surface 1306 allows the second portion 1304 to rotate and pull the first portion 1302 axially without rotation of the first portion 1302 relative to the housing 902. The guides 1312 shown in FIG. 31B for example, prevent and/or reduce the possibility of rotation of the first portion 1302 relative to the housing 902.

The second portion 1304 of the liner removal component 1300 may continue to be rotated until the liner removal component 1300 is disengaged from the housing 902, and the liner removal component 1300 may be withdrawn from the internal cavity 903. The liner 926 may be withdrawn from the surface 924 of the on-skin sensor assembly 508.

In embodiments, the liner removal component 1300 may be configured to be reinserted into the internal cavity 903 following deployment of the on-skin wearable medical device. The liner removal component 1300, for example, may be rotated back onto the applicator housing 902 to recouple to the housing. Referring to FIG. 31C, the intermediate portion 1310 has slid axially relative to the second portion 1304 and is positioned within the cavity of the second portion 1304. The intermediate portion 1310 fits within the cavity of the second portion 1304 and has slid into the cavity in a telescoping manner. The liner removal component 1300 is configured to be collapsed. The intermediate portion 1310 collapses into the second portion 1304. The reduced height of the first portion 1302 may allow the liner removal component 1300 to be recoupled to the applicator housing 902 after deployment of the on-skin wearable medical device.

Figure 32A:
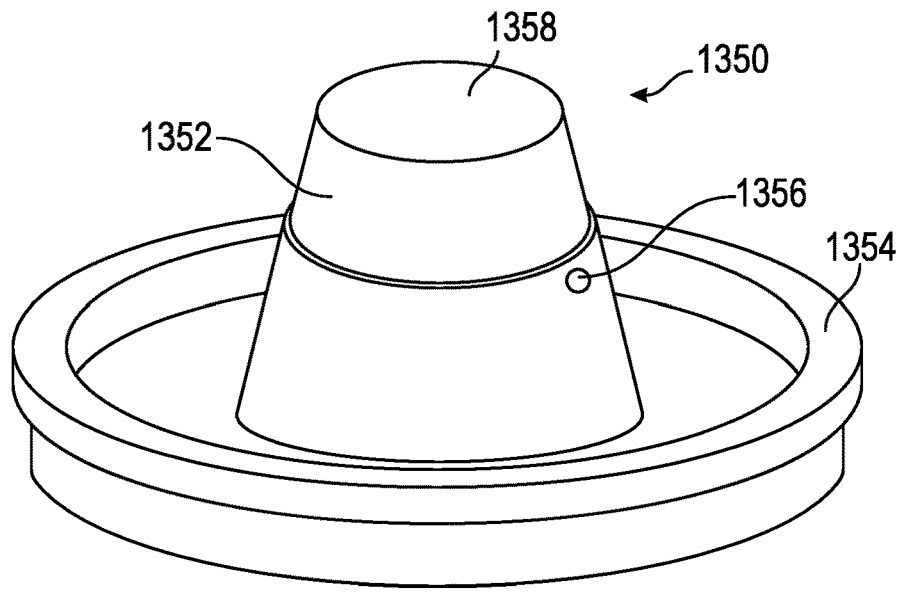
FIG. 32A illustrates a perspective view of a liner removal component.
Figure 32B:
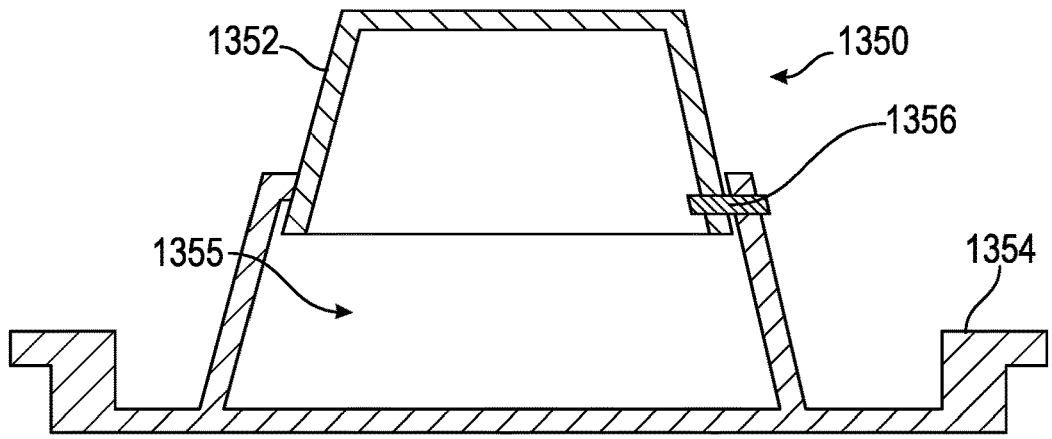
FIG. 32B illustrates a cross sectional view of the liner removal component shown in FIG. 32A.
Figure 32C:
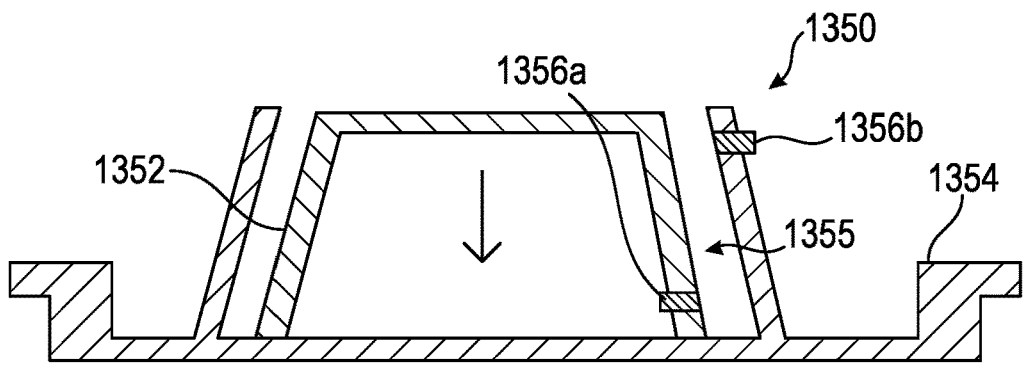
FIG. 32C illustrates a cross sectional view of the liner removal component shown in FIG. 32A.

FIGS. 32A-32C illustrate an embodiment of a liner removal component 1350 in which the intermediate portion 1352 may slide axially relative to the second portion 1354 upon a lock 1356 being released. The first portion 1358 may be configured similarly as the first portion 1302 of the liner removal component 1300 shown in FIG. 31B for example. The intermediate portion 1352 may include guides (not shown) similar to guides 1312 shown in FIG. 31B, that may prevent and/or reduce rotational movement of the intermediate portion 1352 and the first portion 1358 upon rotation of the second portion 1354. The first portion 1358 may be axially spaced from the second portion 1354.

The intermediate portion 1352 may be configured to slide axially relative to the second portion 1354 and fit within a cavity 1355 (marked in FIG. 32B) of the second portion 1354. The shape of the intermediate portion 1352, for example, may be conical and may fit within a conical cavity 1355 of the second portion 1354. In embodiments, the intermediate portion 1352 may have a different configuration as desired.

Referring to FIGS. 32A and 32B, the intermediate portion 1352 may be held at a raised position or a proximal position relative to the second portion 1354 via the lock 1356. The lock 1356 as shown in FIGS. 32A and 32B may comprise a pin or other structure for retaining the axial position of the intermediate portion 1352. The lock 1356 may comprise a deformable lock 1356 that may break upon rotation of the intermediate portion 1352 relative to the second portion 1354. For example, upon sufficient rotational force being applied to the lock 1356, the lock may break into two pieces 1356*a* and 1356*b* shown in FIG. 32C.

The second portion 1354 may include the cavity 1355, which may be shaped to receive the intermediate portion 1352. The intermediate portion 1352 may fit within the cavity 1355 of the second portion 1354 and may slide into the cavity 1355 in a telescoping manner. The intermediate portion 1352 may collapse into the second portion 1354.

In operation, the intermediate portion 1352 may be held at the raised or proximal position shown in FIG. 32A via the lock 1356. The first portion 1358 may support the liner 926 upon the engaging surface of the on-skin wearable medical device. At a time for deployment of the on-skin wearable medical device, the user may rotate the second portion 1354 relative to the first portion 1358, which may deform the lock 1356. The first portion 1358 may be impeded from rotating with the second portion 1354 due to the presence of the guides (not shown) similar to guides 1312 shown in FIG. 31B.

The lock 1356 may break into pieces 1356*a* and 1356*b* and allow the intermediate portion 1352 to slide into the cavity 1355 of the second portion 1354 in a telescoping manner. The liner removal component 1350 is configured to be collapsed. The intermediate portion 1352 collapses into the second portion 1354, as shown in FIG. 32C. The reduced height of the first portion 1358 may allow the liner removal component 1350 to be recoupled to the applicator housing 902 after deployment of the on-skin wearable medical device.

Figure 33A:
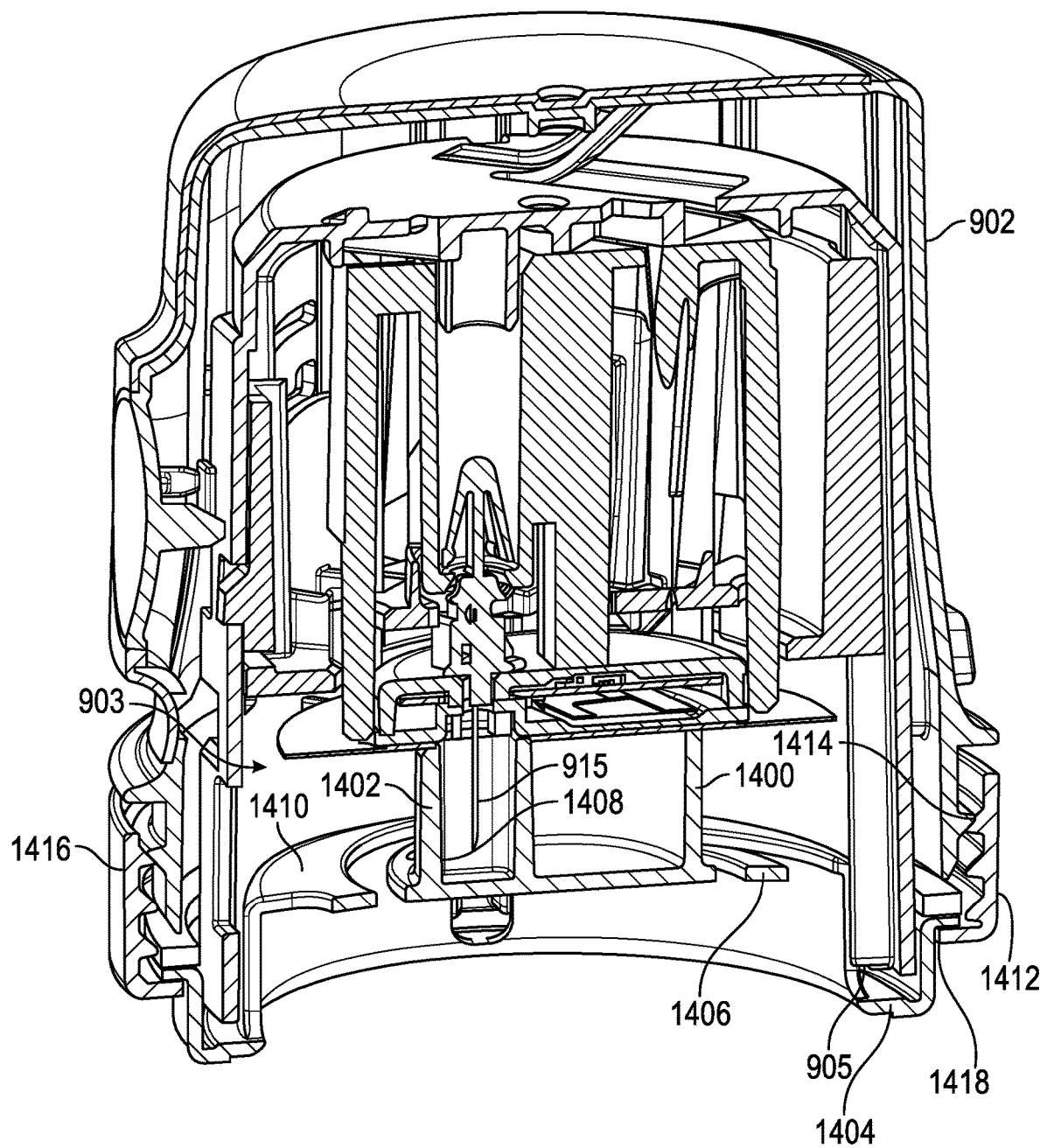
FIG. 33A illustrates a cross sectional view of a system.
Figure 33B:
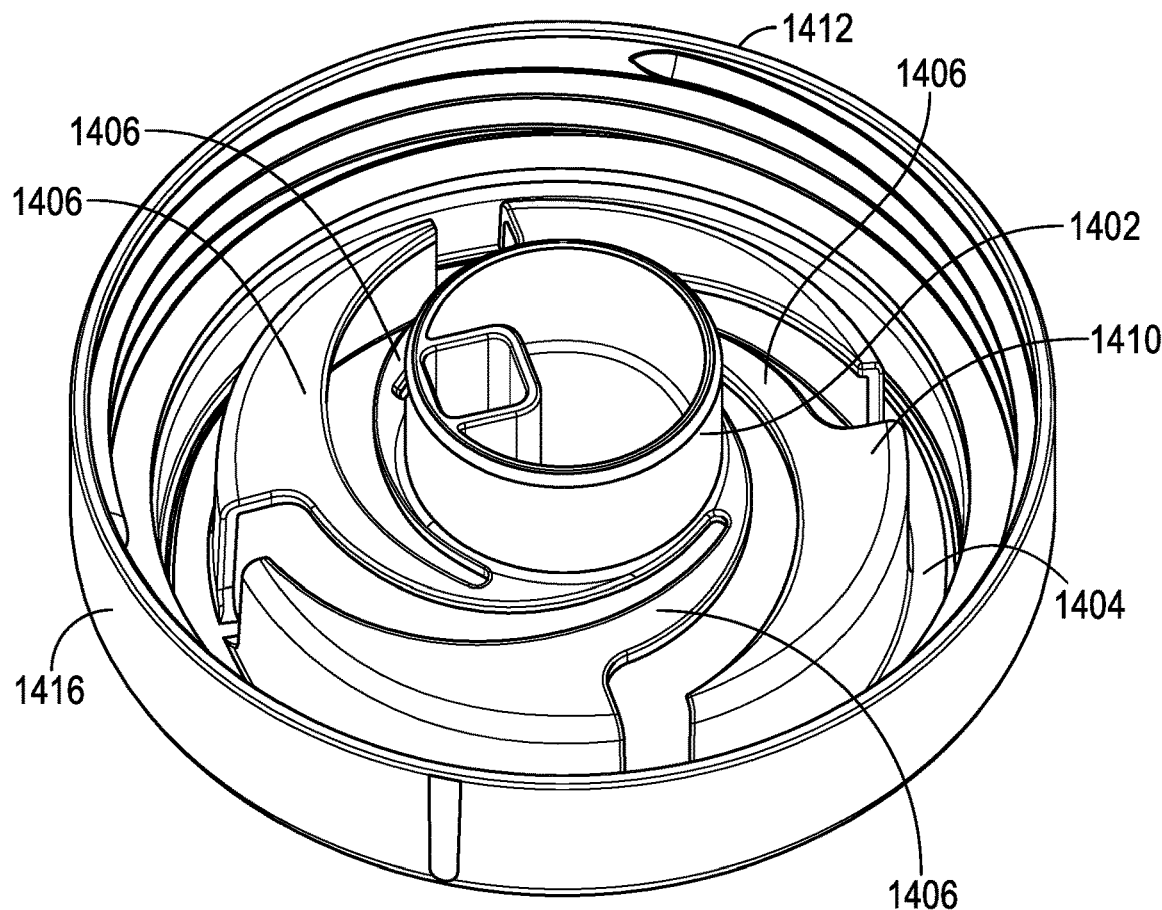
FIG. 33B illustrates a perspective view of the liner removal component shown in FIG. 33A.
Figure 33C:
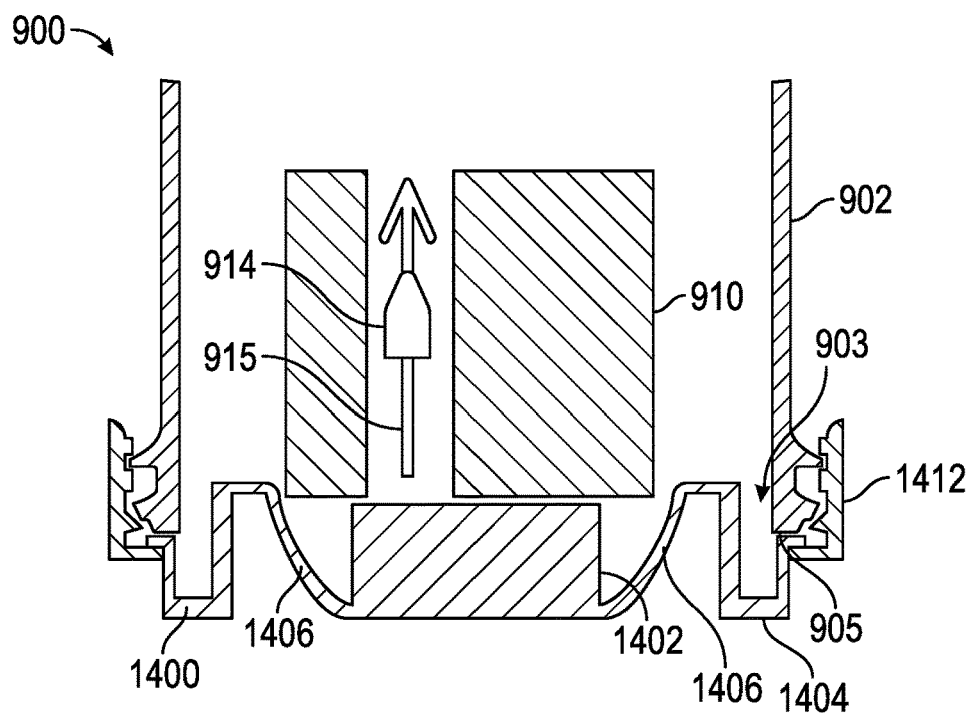
FIG. 33C illustrates a cross sectional view of the liner removal component shown in FIG. 33A.

FIGS. 33A-33C illustrate an embodiment of a liner removal component 1400 in which a height of the first portion 1402 relative to the second portion 1404 is configured to adjust. The liner removal component 1400 may include one or more deflectable arms 1406 that couple the first portion 1402 to the second portion 1404. The deflectable arms 1406 are configured to deflect to allow the liner removal component 1400 to collapse, to reduce the height of the liner removal component 1400 following use. The second portion 1404 is axially spaced from the first portion 1402.

The first portion 1402 may be configured similarly as the first portion 930 of the liner removal component 928 and may be configured to engage the liner 926. The first portion 1402 may cover at least a portion of the liner 926 and may support the liner 926. The first portion 1402 may include a sheath 1408 that is configured to receive the insertion element 915 and reduce the possibility of contact with the insertion element 915. The first portion 1402 may be configured to slide axially within the internal cavity 903.

The second portion 1404 may be configured to be positioned at the opening 905 of the housing 902. The second portion 1404 may extend radially outward from an intermediate portion 1410 to overlap a distal end portion of the housing 902 and prevent and/or reduce the possibility of undesired proximal movement of the liner removal component 1400.

A retaining body 1412 may be positioned at the second portion 1404 and may comprise a retaining ring that couples to the applicator housing 902 and the second portion 1404 of the liner removal component 1400. The retaining body 1412 may include an engagement portion 1414 that is positioned at the second portion 1404 and configured to engage a portion of the applicator housing 902 to retain the liner removal component 1400 to the housing 902. The retaining body 1412 may include a grip portion 1416 positioned at the second portion 1404 of the liner removal component 1400 and configured to be gripped by a user to withdraw the liner removal component from the surface 924 of the on-skin sensor assembly 508. The ring shape of the retaining body 1412 may form an opening 1418 that the second portion 1404 may pass through. The retaining body 1412 in embodiments may be configured to rotate without resulting in rotation of the liner removal component 1400.

Referring to FIG. 33B, the intermediate portion 1410 of the liner removal component 1400 may include the one or more deflectable arms 1406. The one or more deflectable arms 1406 may have a variety of configurations and may be arranged in a spiral in embodiments as shown in FIG. 33B. The deflectable arms 1406 may extend radially inward from the second portion 1404 to couple to the first portion 1402, although other configurations may be utilized in embodiments as desired.

In operation, the retaining body 1412 may be removed, and the second portion 1404 of the liner removal component 1400 may be withdrawn axially from the internal cavity 903 to withdraw the liner 926 from the surface 924 of the on-skin wearable medical device. The surface 924 of the on-skin wearable medical device may then be deployed to the skin of the host in a manner as disclosed herein. The liner removal component 1400 may comprise a base for the applicator housing 902 and may cover the internal cavity 903. The liner removal component 1400 may comprise a cap in embodiments.

Referring to FIG. 33C, in embodiments, the needle carrier assembly 910 of the applicator 900 may remain locked in a distal position following deployment. Such a feature may protect against user contact with the insertion element. As such, the size of the internal cavity 903 may be reduced and it may be difficult to recouple the liner removal component according to certain embodiments herein. With an embodiment as shown in FIGS. 33A-B, however, the deflectable arms 1406 may deflect to allow the height of the first portion 1402 to adjust relative to the second portion 1404. FIG. 33C for example illustrates the deflectable arms 1406 having deflected to allow the liner removal component 1400 to be recoupled to the housing 902. The deflection may accommodate the liner removal component 1400 being coupled to the applicator housing 902. As such, the liner removal component 1400 serves as a collapsible body configured to be collapsed to allow for recoupling following use.

The liner removal component 1400 in embodiments may further comprise a single body, which may be formed in a single mold if desired. Other configurations of the liner removal component 1400 may be utilized in embodiments.

FIGS. 34A-34G illustrate an embodiment of a liner removal component 1500 in which a height of the first portion 1502 relative to the second portion 1504 is configured to be adjustable. The liner removal component 1500 may include one or more deflectable arms 1506 that couple the first portion 1502 to the second portion 1504. The deflectable arms 1506 are configured to deflect to allow the liner removal component 1500 to collapse, to reduce the height of the liner removal component 1500. The first portion 1502 may be axially spaced from the second portion 1504.

In the embodiment of FIGS. 34A-34G, the height of the liner removal component 1500 may adjust to allow the liner 926 to be withdrawn from the surface 924 of the on-skin sensor assembly 508.

The first portion 1502 may be configured similarly as the first portion 930 of the liner removal component 928 and may be configured to engage the liner 926. The first portion 1502 may cover at least a portion of the liner 926 and may support the liner 926. The first portion 1502 may be configured to slide axially within the internal cavity 903. The first portion 1502, for example, may include one or more guides 1508 that may be configured to extend along channels 1510 of the housing 902. The guides may be configured to engage an interior surface of the applicator housing to prevent and/or reduce rotation of the first portion 1502 relative to the applicator housing 902. The guides 1508 may prevent and/or reduce the possibility of the first portion 1502 rotating within the internal cavity 903. The guides 1508 may prevent and/or reduce the possibility of rotation of the first portion 1502 to reduce the possibility of shear of the liner.

The second portion 1504 may be configured to be positioned at the opening 905 of the housing 902. The second portion 1504 may extend radially outward from an intermediate portion 1520 to overlap a distal end portion of the housing 902 and prevent and/or reduce the possibility of undesired proximal movement of the liner removal component 1500.

A retaining body 1512 may be positioned at the second portion 1504 and may comprise a retaining ring that couples to the housing 902 and the second portion 1504 of the liner removal component 1500. The retaining body 1512 may include an engagement portion 1514 that is positioned at the second portion 1504 and configured to engage a portion of the housing 902 to retain the liner removal component 1500 to the housing 902. The retaining body 1512 may include a grip portion 1516 positioned at the second portion 1504 of the liner removal component 1500 and configured to be gripped by a user to withdraw the liner removal component from the surface 924 of the on-skin sensor assembly 508. The ring shape of the retaining body 1512 may form an opening 1518 that the second portion 1504 may pass through. The retaining body 1512 in embodiments may be configured to rotate without resulting in rotation of the liner removal component 1500.

Figure 34A:
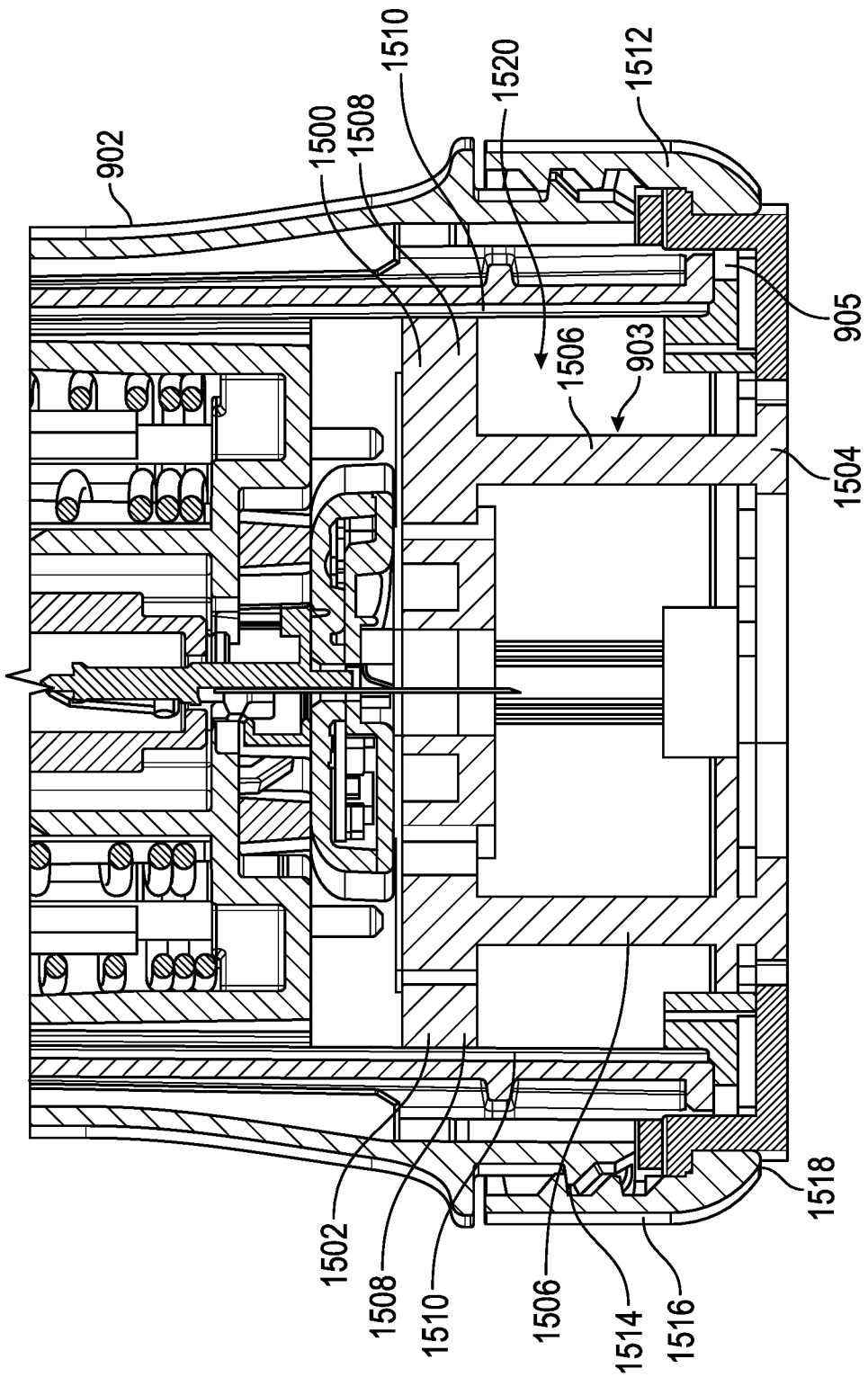
FIG. 34A illustrates a cross sectional view of a system.
Figure 34B:
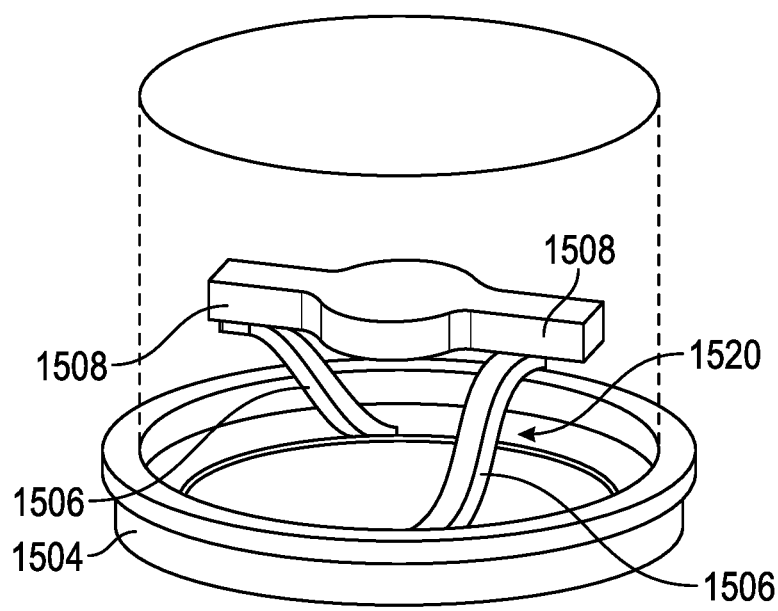
FIG. 34B illustrates a perspective schematic view of the system shown in FIG. 34A.
Figure 34C:
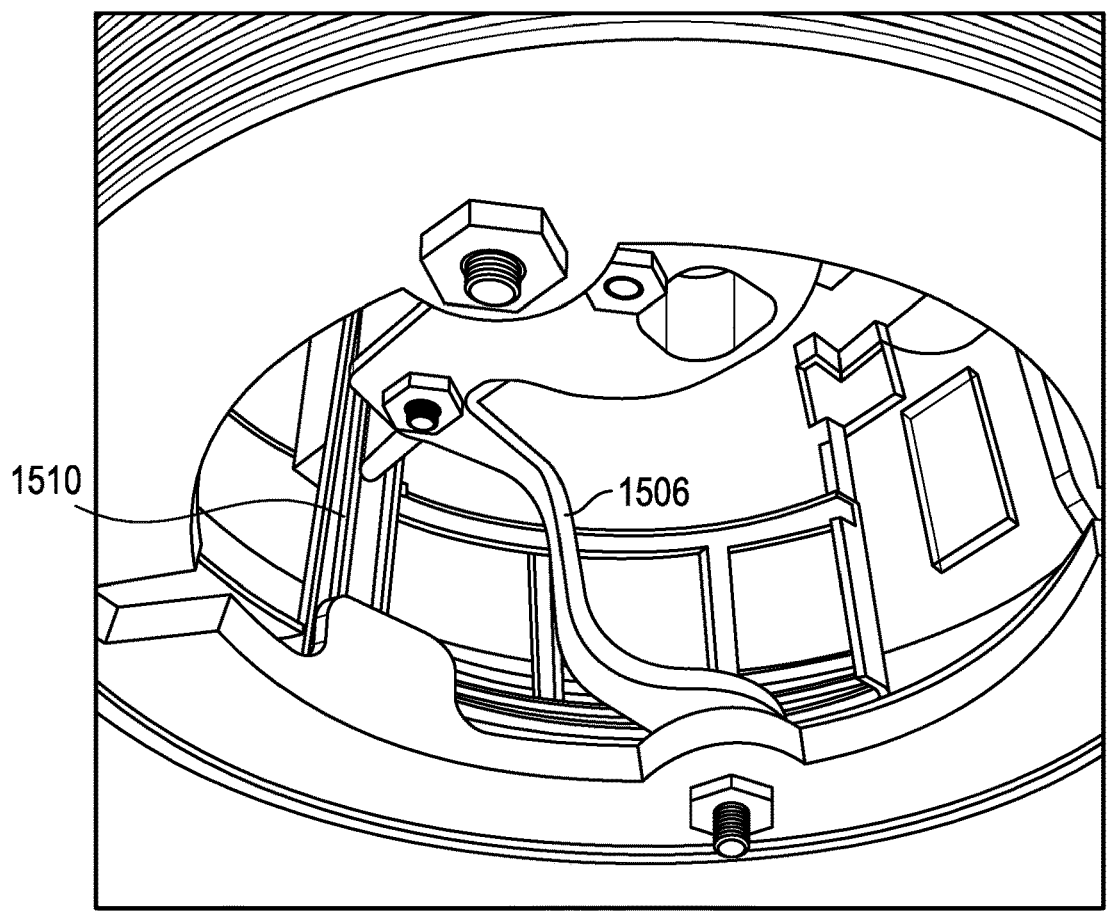
FIG. 34C illustrates a bottom perspective view of the system shown in FIG. 34A.

Referring to FIG. 34B, the intermediate portion 1520 of the liner removal component 1500 may include the one or more deflectable arms 1506. The one or more deflectable arms 1506 may have a variety of configurations and may be arranged in a spiral in embodiments as shown in FIG. 34B. The deflectable arms 1506 may extend proximally and may form a height between the first portion 1502 and the second portion 1504. The height may be formed by the second portion 1504 being rotated circumferentially in a manner that circumferentially compresses the deflectable arms 1506. The deflectable arms 1506 accordingly may advance axially proximal to form a height between the first portion 1502 and the second portion 1504 due to the compression applied to the deflectable arms 1506. FIG. 34C, for example, illustrates the deflection of the deflectable arms 1506 in an axially proximal direction due to the compression applied to the arms 1506.

Figure 34D:
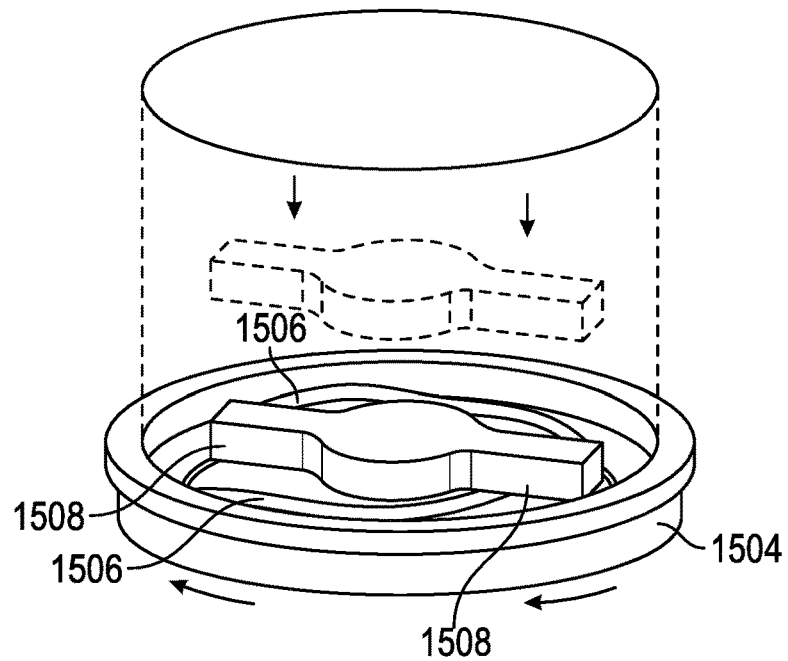
FIG. 34D illustrates a perspective schematic view of the system shown in FIG. 34A.

Upon the circumferential compression being reduced due to an un-twisting or unscrewing motion (e.g., the second portion 1504 being rotated clockwise in the view of FIG. 34B), the height between the first portion 1502 and the second portion 1504 may be reduced. FIG. 34D, for example, illustrates such a variation in height, in which the deflectable arms 1506 have moved distally due to the rotation of the second portion 1504.

The distal movement of the deflectable arms 1506 may cause the first portion 1502 to withdraw the liner from the surface 924 of the on-skin sensor assembly 508. The first portion 1502 may be withdrawn axially from the surface 924 of the on-skin sensor assembly 508.

In operation, the deflectable arms 1506 may be held in position with the circumferential compression applied to the arms. The retaining body 1512 for example, may hold the deflectable arms 1506 in the compressed state as shown in FIG. 34B. Upon releasing the retaining body 1512, the second portion 1504 of the liner removal component 1500 may be allowed to rotate and cause the deflectable arms 1506 to move distally.

Figure 34E:
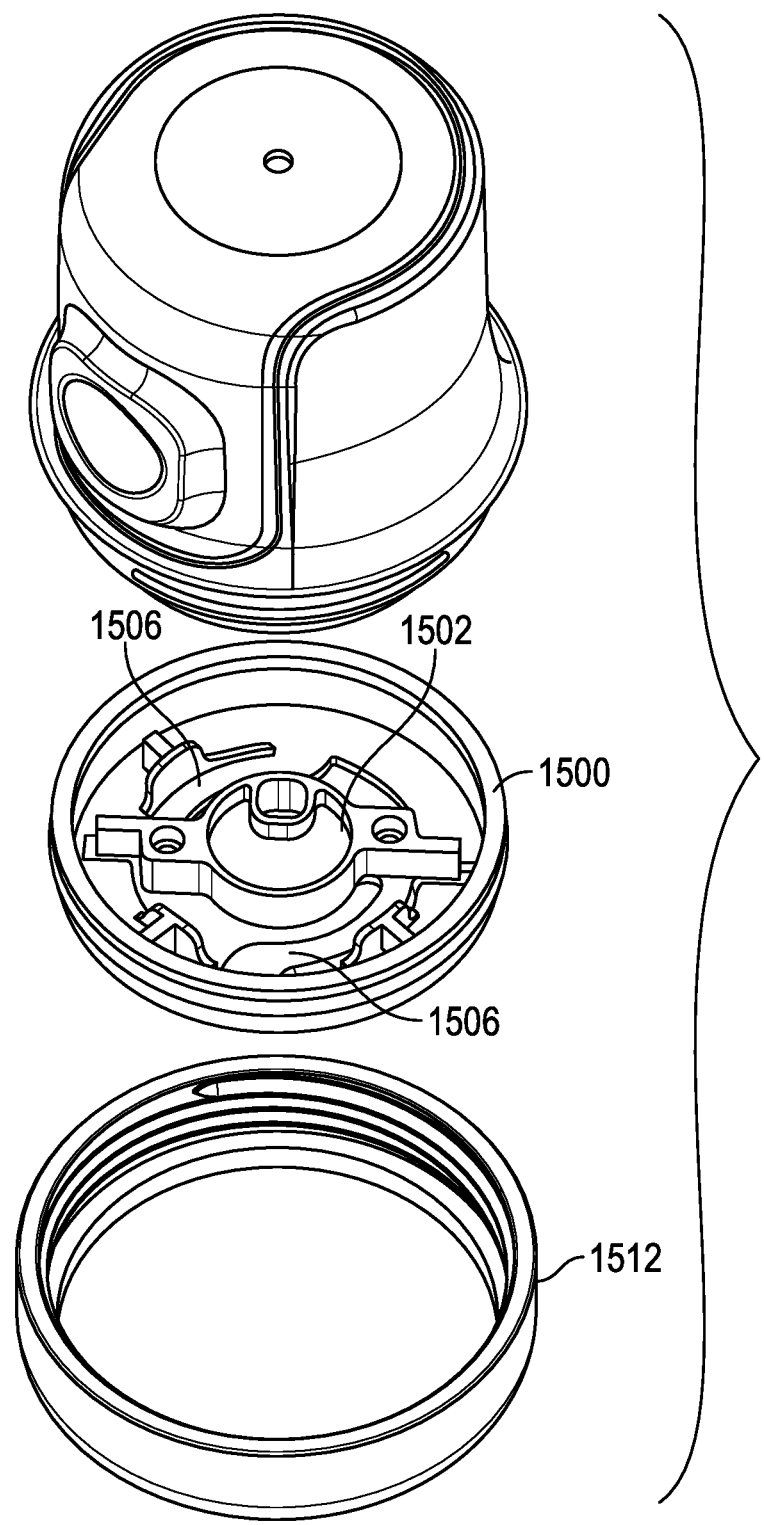
FIG. 34E illustrates a perspective view of the system shown in FIG. 34A.

A resulting configuration of the retaining body 1512 and the liner removal component 1500 is shown in FIG. 34E. The deflectable arms 1506 may have flattened to move the first portion 1502 distally, thus removing the liner from the surface 924 of the on-skin sensor assembly 508.

Figure 34F:
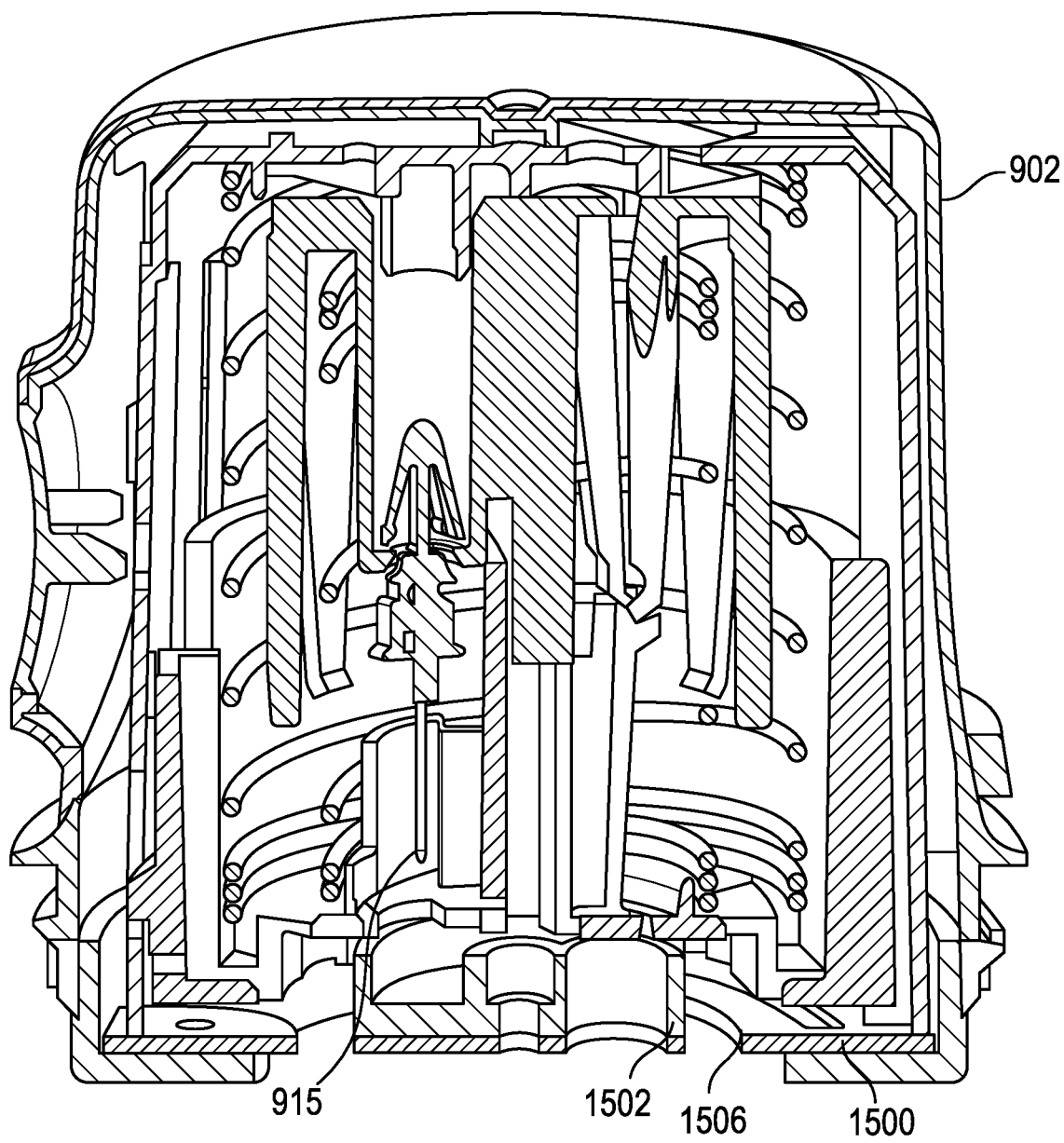
FIG. 34F illustrates a cross sectional perspective view of a system.

Upon the deflectable arms 1506 being flattened, the liner removal component 1500 may be recoupled to the applicator housing 902. FIG. 34F shows the deflectable arms 1506 having been lowered and the liner removal component 1500 collapsed. The deflectable arms 1506 may be configured to deflect to accommodate the liner removal component 1500 being coupled to the applicator housing 902. The liner removal component 1500 may be recoupled to the applicator housing 902 following deployment of the on-skin wearable medical device and retraction of the insertion element 915.

In embodiments, the retaining body 1512 may be configured to rotate relative to the liner removal component 1500 such that rotation of the retaining body 1512 does not rotate the liner removal component 1500. In such an embodiment, a user may rotate the retaining body 1512 to release the retaining body 1512 from the applicator housing 902 and then axially withdraw the liner removal component 1500 from the internal cavity 903 of the applicator housing 902. The axial movement may continue until the liner removal component 1500 is released from the applicator housing 902, at which point the deflectable arms 1506 may rotate to the flattened configuration shown in FIG. 34E. The liner removal component 1500 may then be recoupled to the applicator housing 902 following deployment of the on-skin wearable medical device and retraction of the insertion element 915.

Figure 34G:
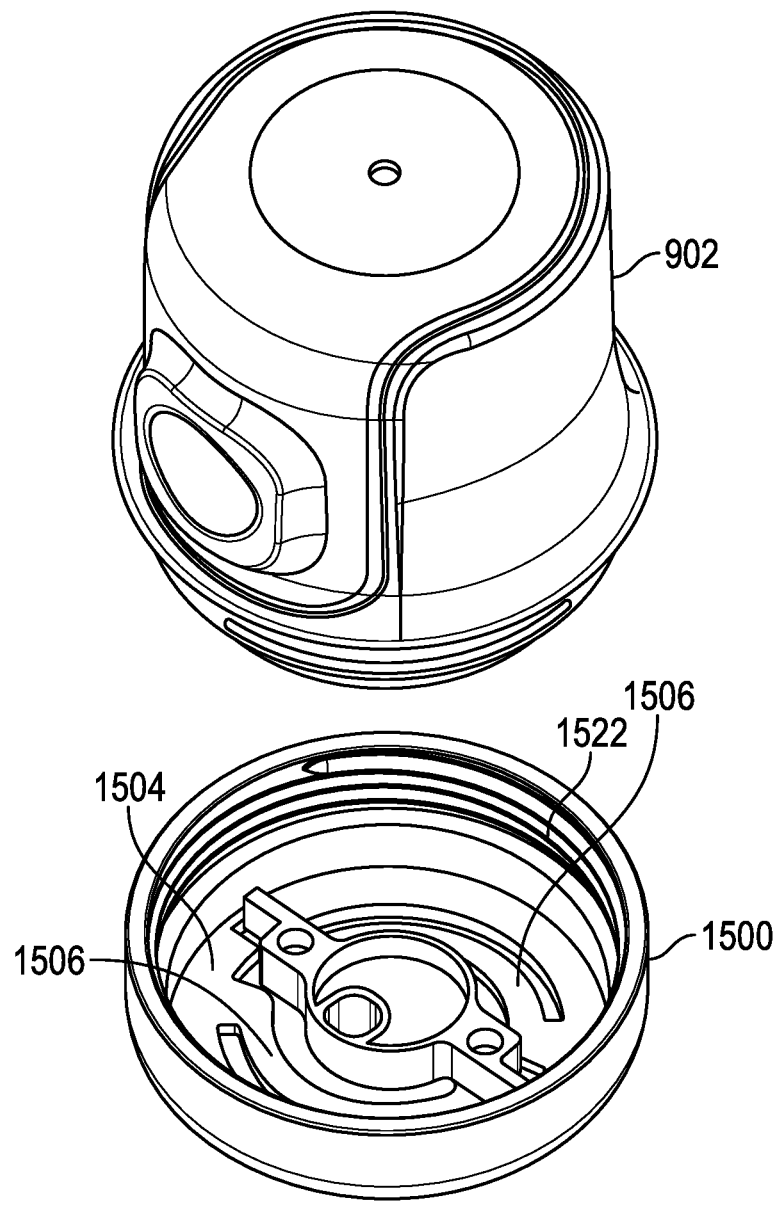
FIG. 34G illustrates a perspective view of a system.

In embodiments, the engagement portion of the liner removal component 1500 may be integral with the liner removal component 1500. FIG. 34G for example illustrates the liner removal component 1500 having an engagement portion 1522 that rotates with the liner removal component 1500. The rotation of the engagement portion 1522 may cause the second portion 1504 of the liner removal component to rotate and thus may adjust the height of the deflectable arms 1506.

With an embodiment as shown in FIGS. 34A-G, the deflectable arms 1506 may deflect to allow the height of the first portion 1502 to adjust relative to the second portion 1504. As such, if the liner removal component 1500 is recoupled to the housing 902 following deployment, then the deflectable arms 1506 may be deflected to allow the liner removal component 1500 to be recoupled to the housing 902. As such, the liner removal component 1500 serves as a collapsible body configured to be collapsed to allow for recoupling following use. The liner removal component 1500 may comprise a base for the applicator housing 902 and may cover the internal cavity 903. The liner removal component 1500 may comprise a cap in embodiments.

Figure 35:
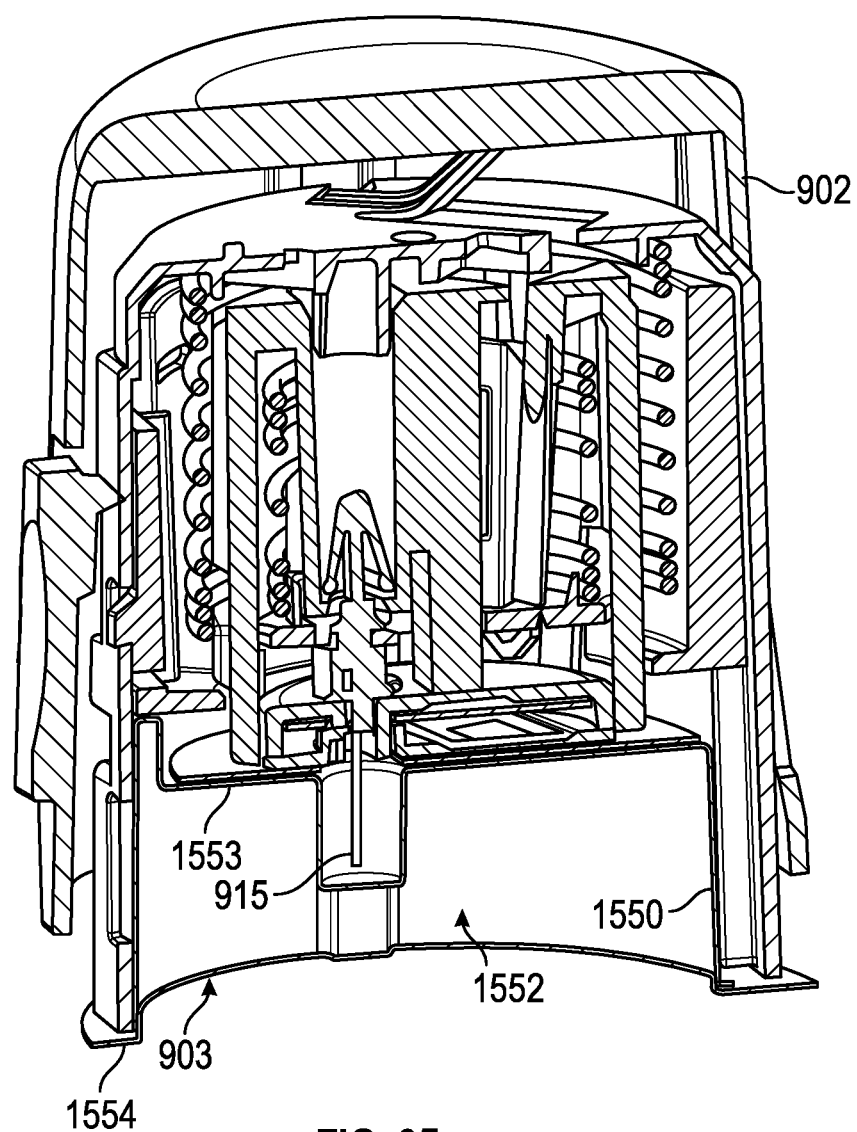
FIG. 35 illustrates a cross sectional view of a system.

FIG. 35 illustrates an embodiment of a liner removal component 1550 comprising a single body insert that may extend axially within the internal cavity 903. The liner removal component 1550 may form a cavity 1552 within the internal cavity 903. The liner removal component 1550 may include a first portion 1553 for supporting the liner, and may include a second portion 1554 positioned at a distal opening of the internal cavity 903. The second portion 1554 may comprise a grip portion for gripping by a user. The first portion 1553 may be axially spaced from the second portion 1554.

In embodiments, the liner removal component 1550 may be made of a flexible plastic, which may form a blister pack configuration within the internal cavity 903. The liner removal component 1550 may comprise a base for the applicator housing 902 and may cover the internal cavity 903. The liner removal component 1550 may comprise a cap in embodiments.

Figure 36A:
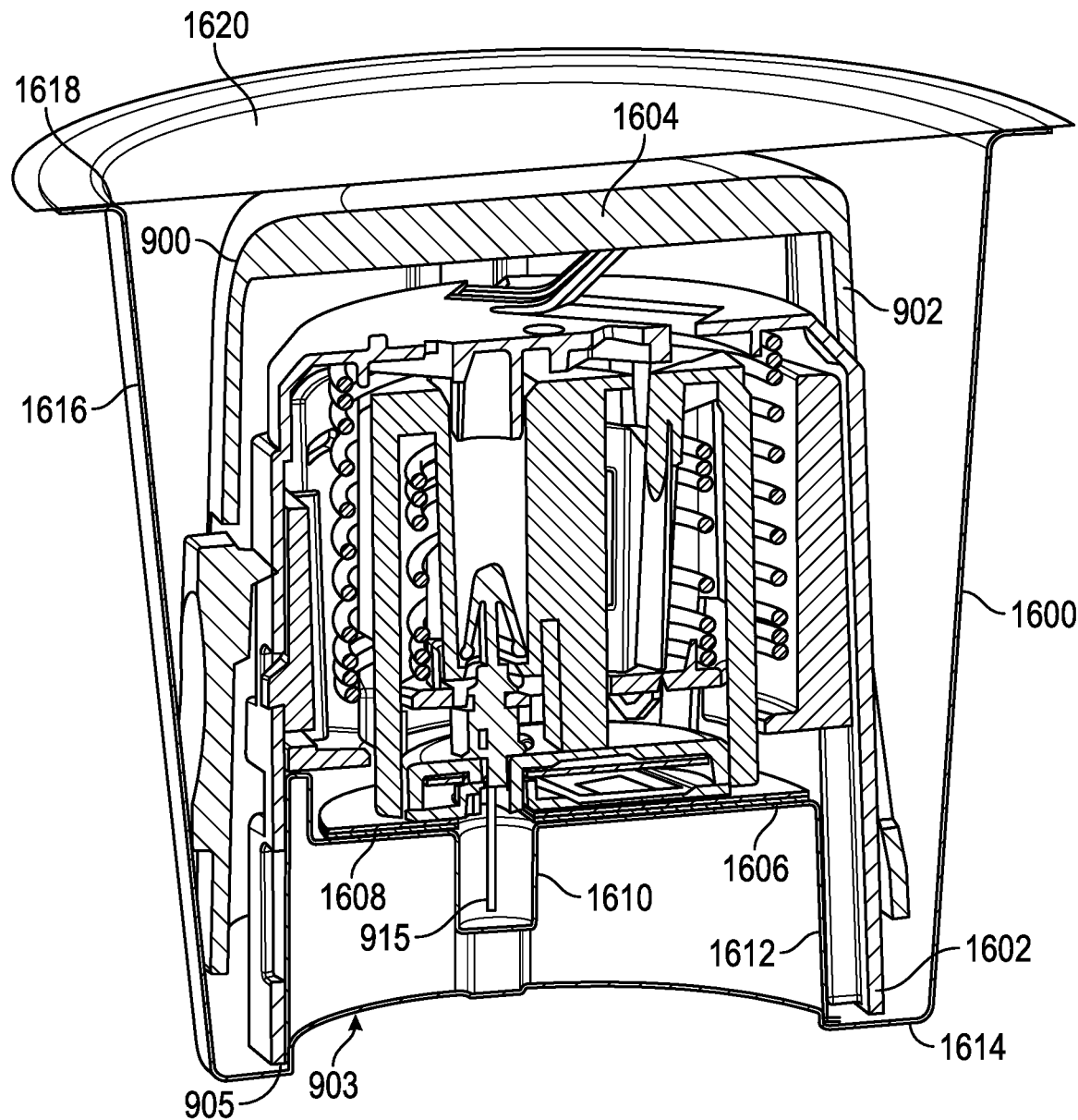
FIG. 36A illustrates a cross sectional view of a system.
Figure 36B:
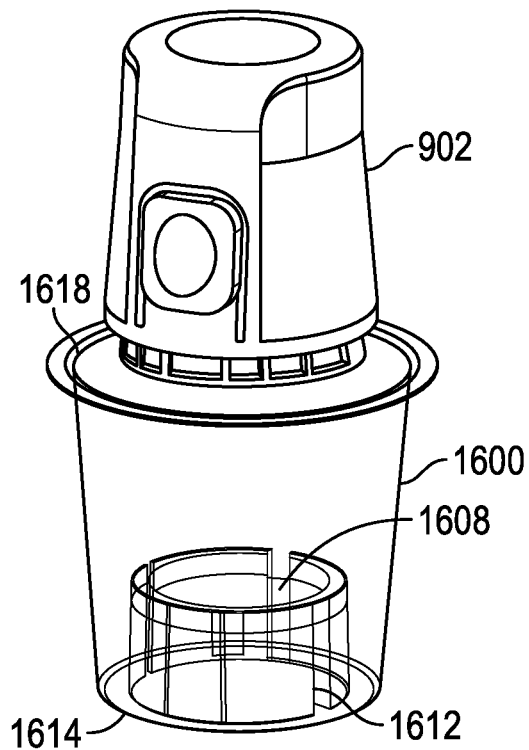
FIG. 36B illustrates a perspective view of the system shown in FIG. 36A.

FIGS. 36A-36B illustrate an embodiment of a liner removal component 1600 in which the liner removal component 1600 includes a portion that extends external to the housing 902. The liner removal component 1600 may comprise all or a portion of packaging for the applicator 900.

The applicator housing 902 may include a distal end portion 1602 and a proximal end portion 1604. The opening 905 may be positioned at the distal end portion 1602.

The liner removal component 1600 may include a first portion 1606 that is configured to support the liner 1608 by engaging the periphery of the liner 1608. The liner 1608 in embodiments may be integral with the first portion 1606 of the liner removal component 1600. In embodiments, the liner 1608 may comprise a separate liner that is positioned upon the first portion 1606 (as shown in FIG. 36A). The first portion 1606 may include a sheath 1610 that covers the insertion element 915. The sheath 1610 may extend distally from the liner 1608 in embodiments.

The first portion 1606 may couple to an intermediate portion 1612 that extends distally within the internal cavity 903 to the second portion 1614 of the liner removal component 1600. The second portion 1614 may be axially spaced from the first portion 1606. The second portion 1614 may couple to a third portion 1616 that extends exterior of the housing 902 and extends to the proximal end portion 1604 of the housing 902. The third portion 1616 may include an opening 1618 for the applicator housing 902 to be passed through. A cover 1620 may be positioned at the opening 1618 of the third portion 1616 for covering the housing 902. The cover 1620 and the liner removal component 1600 may comprise the packaging for the applicator 900.

In operation, the cover 1620 may be removed from the opening 1618 and the liner removal component 1600 may be pulled distally relative to the applicator 900. The first portion 1606 may withdraw the liner 1608 and expose the surface 924 of the on-skin sensor assembly 508. The liner removal component 1600 may comprise a base for the applicator housing 902 and may cover the internal cavity 903. The liner removal component 1600 may comprise a cap in embodiments.

FIG. 36B illustrates the liner removal component 1600 having been withdrawn from the housing out of the opening 1618.

The coupling surfaces for coupling the liner to the liner removal component may have a variety of configurations. As discussed herein, the coupling surfaces may be adhesive surfaces, which may comprise a variety of forms of adhesives. Pressure sensitive adhesives may be utilized as desired. In embodiments, other forms of adhesives may be utilized. In embodiments, other forms of coupling surfaces may be utilized.

The coupling surfaces may be positioned on a distal surface 1702 of a liner 1700 that faces opposite a proximal surface that contacts the engaging surface of the on-skin wearable medical device. The coupling surfaces may be configured to engage a body for withdrawing the liner 1700 from the surface of the patch of the on-skin wearable medical device. In embodiments, the liner 1700 may include an aperture 1704 for the transcutaneous analyte sensor and the insertion element to pass through. The liner 1700 may include a central portion 1703 and an edge portion 1705 proximate an edge of the liner 1700. The central portion 1703 may be proximate the aperture 1704 in embodiments.

Figure 37A:
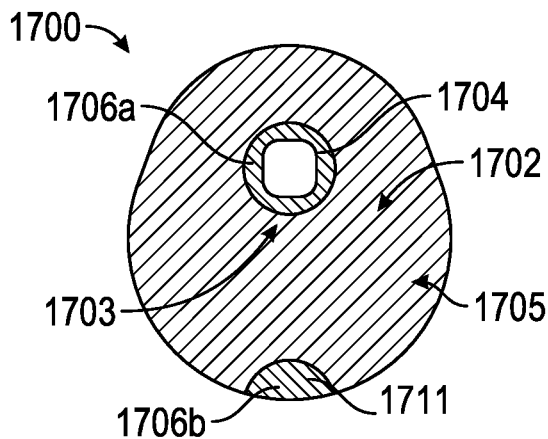
FIGS. 37A-J each illustrate top views of liners.

The one or more coupling surfaces may have a variety of forms and may comprise a plurality of sections positioned on the distal surface 1702 of the liner. In embodiments, the sections may be positioned at one or more of the central portion 1703 or the edge portion 1705, among other combinations. For example, a section may be positioned at an edge portion as shown in FIG. 37F. A section may be positioned at a central portion as shown in FIG. 37D. A section may be positioned at both a central portion and an edge portion as shown in FIG. 37A for example. A central portion 1703 may be proximate an aperture in embodiments. An edge portion may be proximate an edge of the liner. The liner may include one or more coupling regions in embodiments for coupling the liner to the liner removal component.

Referring to FIG. 37A, in embodiments herein, a section 1706a may surround the aperture 1704 and may form a ring about the aperture 1704. A section 1706b may be positioned at an edge portion 1705 of the distal surface 1702 of the liner and may form a dot 1711 at the edge.

In embodiments, an edge portion as disclosed herein may comprise a skirt portion of a liner. Referring to FIG. 2C, a skirt portion 1707 of a patch 204 may comprise a portion extending radially outward from a housing 1709. The skirt portion 1707 accordingly may form a skirt about the housing 1709. Referring back to FIG. 37A, an edge portion 1705 of a liner may comprise a skirt portion of the liner, which covers a skirt portion of a patch. In embodiments, positioning one or more coupling surfaces at a skirt portion of a liner may reduce the force required to at least partially decouple the liner from the surface of the patch.

Figure 37B:
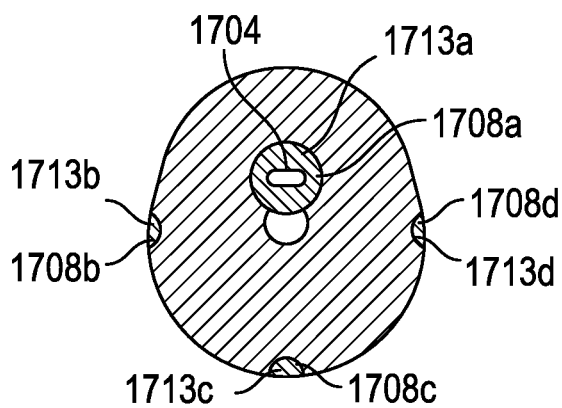

Referring to FIG. 37B, in embodiments herein, sections 1708a, b, c, d may comprise dots 1713a, b, c, d, positioned centrally and at the edge portions of the liner. The section 1708a may comprise a ring extend around the aperture 1704. The sections 1708b, c, d may each comprise dots 1713a, b, c, d positioned at the edges of the liner. In embodiments, one or more dots may be utilized as desired.

Figure 37C:
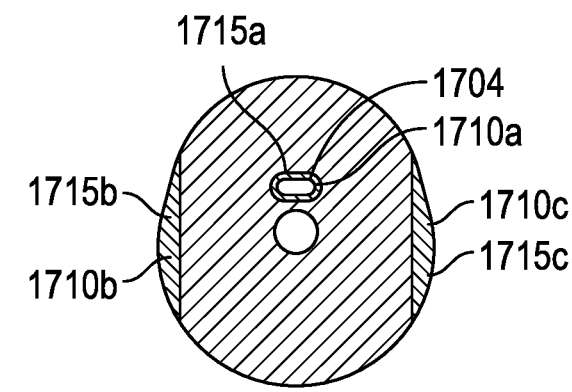
Figure 37D:
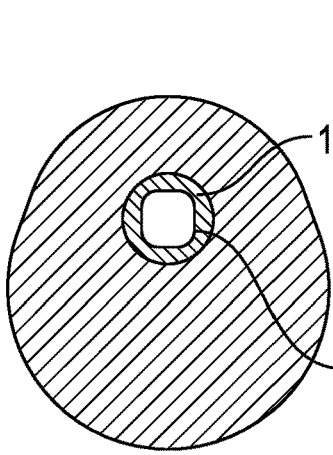

Referring to FIG. 37C, in embodiments herein, sections 1710a, b, c may comprise dots 1715a, b, c, positioned centrally and at the edge portions of the liner. The section 1710a may comprise a ring extending around the aperture 1704. The sections 1710b, c may each comprise strips positioned at the edges of the liner. In embodiments, one or more strips may be utilized as desired.

The external dots and plurality of strips at the edge of the liner in FIGS. 37A-C may have the benefit of locating the coupling surfaces radially outward of the housing of the on-skin sensor assembly 508. The positioning may allow for a more controlled release at a lower release distance.

Referring to FIG. 37D, in embodiments herein, a section 1712a may surround the aperture 1704 and may form a ring about the aperture 1704.

In embodiments, asymmetric and varied surface areas of the coupling surfaces may result in lower release forces for the liners.

Figure 37E:
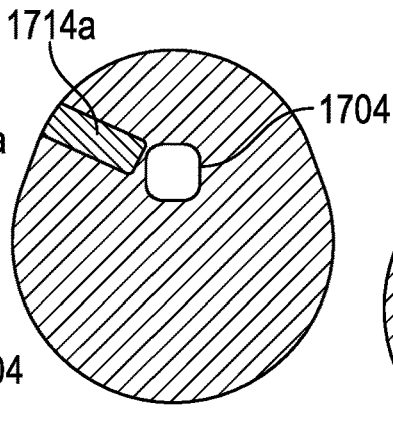
Figure 37F:
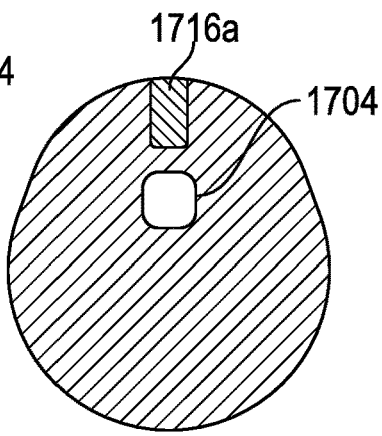

Referring to FIG. 37E, in embodiments herein, a section 1714a may comprise a strip extending at an angle with respect to the aperture 1704.

Referring to FIG. 37F, in embodiments herein, a section 1716a may comprise a strip extending along a longitudinal axis with respect to the aperture 1704.

Figure 37G:
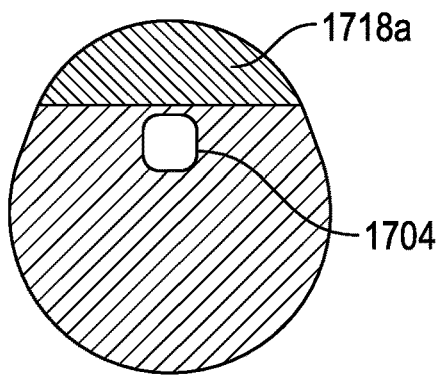

Referring to FIG. 37G, in embodiments herein, a section 1718a may comprise a strip extending transverse relative to a longitudinal axis with respect to the aperture 1704 from edge to edge of the liner. Such a configuration may result in a peel of the liner in the longitudinal direction.

Figure 37H:
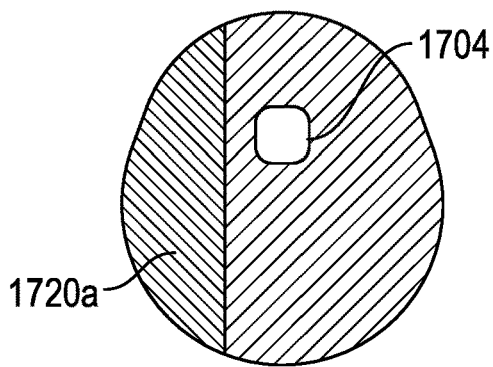

Referring to FIG. 37H, in embodiments herein, a section 1720a may comprise a strip extending along a longitudinal axis with respect to the aperture 1704 from edge to edge of the liner. Such a configuration may result in a peel of the liner in a transverse direction.

Figure 37I:
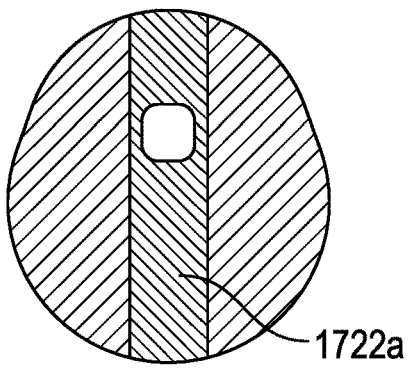

Referring to FIG. 37I, in embodiments herein, a section 1722a may comprise a strip extending centrally along a longitudinal axis with respect to the aperture 1704 from edge to edge of the liner.

Figure 37J:
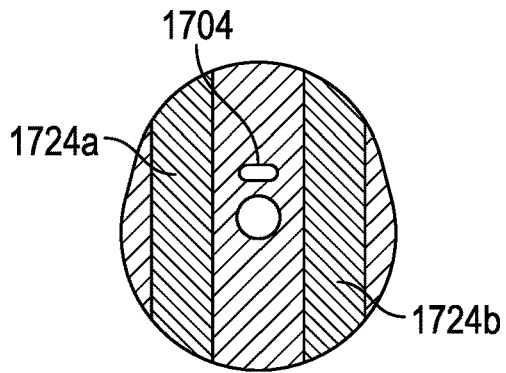

Referring to FIG. 37J, in embodiments herein, sections 1724a, b may comprise strips extending centrally along both sides of the aperture 1704, along a longitudinal axis with respect to the aperture 1704 from edge to edge of the liner.

Figure 37K:
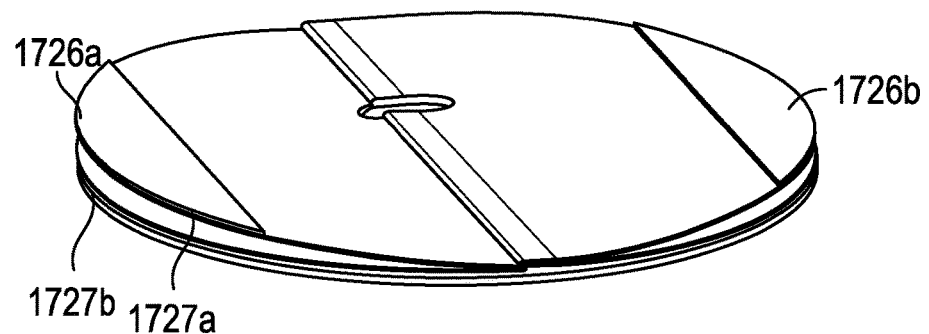
FIG. 37K illustrates a perspective view of a liner.
Figure 37L:
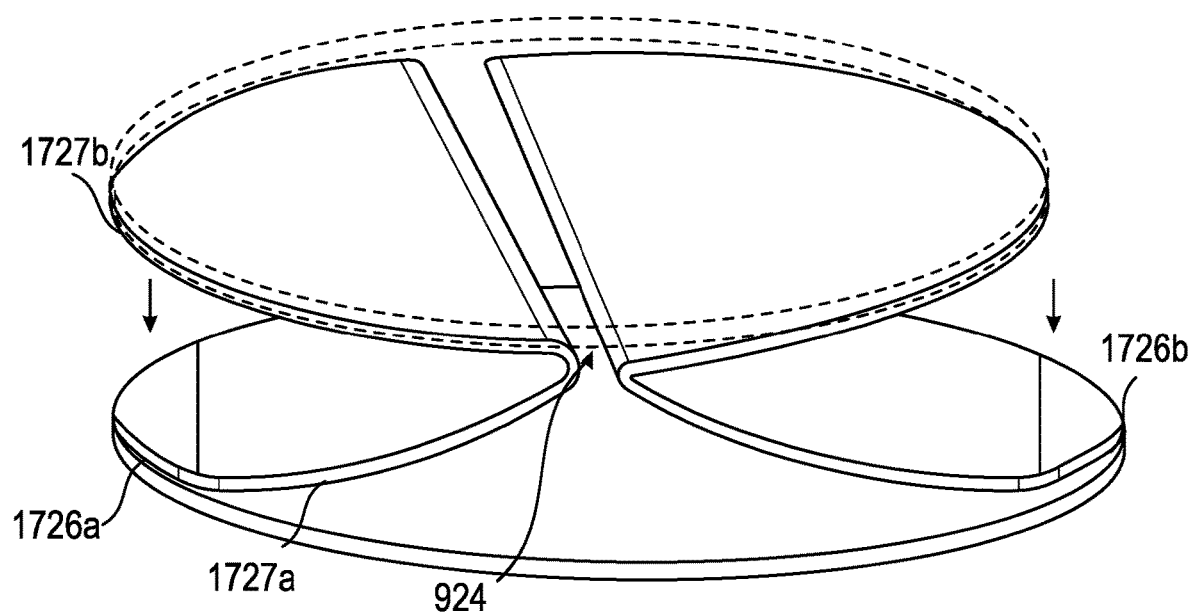
FIG. 37L illustrates a perspective schematic view of the liner shown in FIG. 37K being decoupled.

Referring to FIG. 37K, in embodiments herein, the liner may include multiple layers. The liner may include coupling surfaces in sections 1726a, b that may comprise strips positioned at the edge portions of the liner. A layer of the liner may include a first portion 1727a and a second portion 1727b, with the first portion 1727a folded upon the second portion 1727b. The liner may be folded in a butterfly configuration. FIG. 37L illustrates the liner shown in FIG. 37K being withdrawn from a surface 924 of an on-skin wearable medical device. In embodiments, the fold of the liner may reduce the release force, which may yet increase the release distance.

Figure 37M:
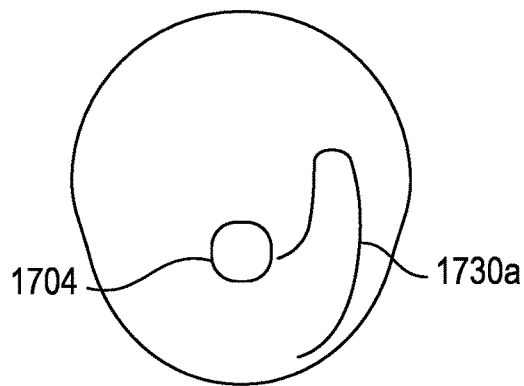
FIGS. 37M-P each illustrate top views of liners.
Figure 37N:
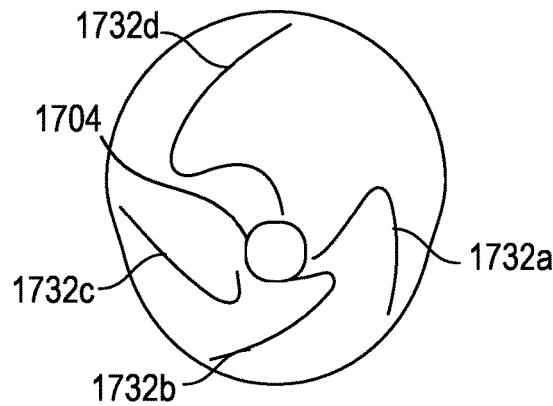
Figure 37O:
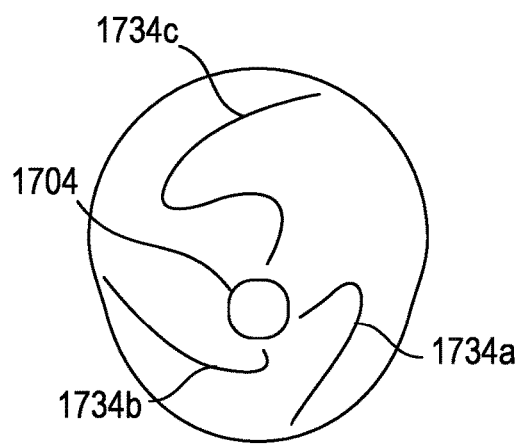

In embodiments, a liner may include one or more curved cuts that may extend radially outward from the aperture of the liner. FIG. 37M, for example, illustrates a curved cut 1730a upon a liner. FIG. 37N, for example, illustrates a plurality of curved cuts 1732a, b, c, d upon a liner. FIG. 37O, for example, illustrates a plurality of curved cuts 1734a, b, c upon a liner. The curved cuts of FIGS. 37M-37O may result in a spiral peel of the liner, which may reduce the release force, yet increase the release distance.

Figure 37P:
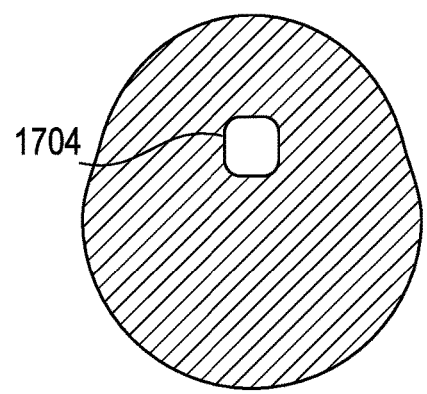

In FIG. 37P, the coupling surface may cover an entirety of a distal surface of a liner.

Various other configurations of coupling surfaces may be utilized in embodiments herein.

Figure 38A:
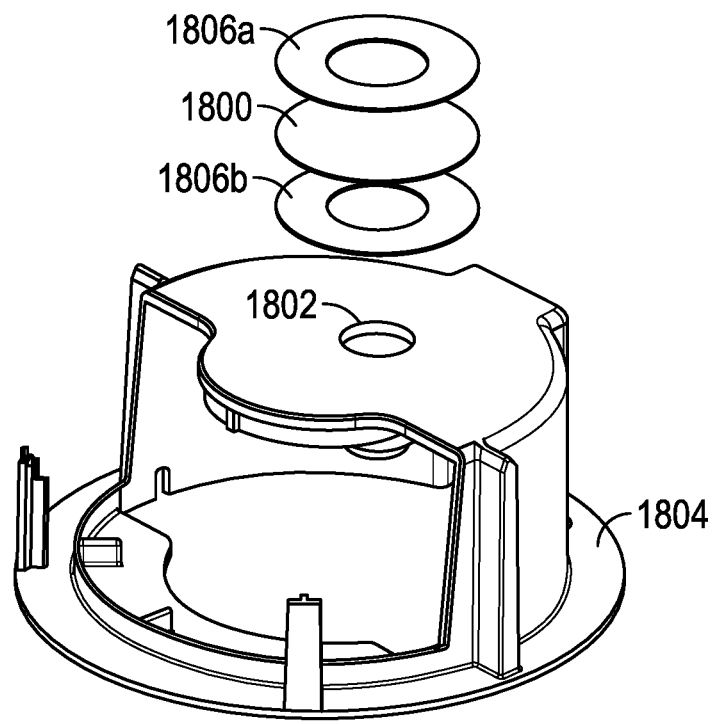
FIG. 38A illustrates a perspective assembly view of a liner removal component having a puncture layer.

In embodiments, a liner removal component may include a puncture layer for an insertion element 915 such as a needle to pass through. Referring to FIG. 38A, a liner removal component may include such a puncture layer 1800 over an aperture 1802 of the liner removal component. The component 1804, for example, may be configured similarly as the liner removal component 928 or any other embodiment of component disclosed herein. The aperture 1802 may be configured similarly as the aperture 937 or any other embodiment of aperture disclosed herein.

As shown in FIG. 38A, the puncture layer 1800 may be positioned over the aperture 1802 and may be positioned for the insertion element 915 such as a needle to pass through. A sheath, such as sheath 939 may be positioned on the opposite surface of the component 1804 than shown in FIG. 38A. The puncture layer 1800 may be sandwiched between ring shaped coupling portions 1806a, b, although other configurations may be utilized as desired.

Figure 38B:
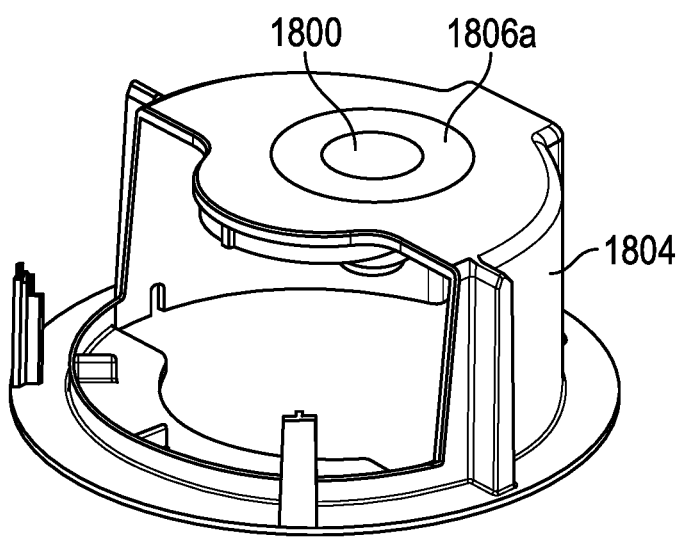
FIG. 38B illustrates a perspective view of the liner removal component shown in FIG. 38A.

FIG. 38B illustrates the aperture 1802 including a puncture layer 1800 in position upon the component 1804.

Figure 38C:
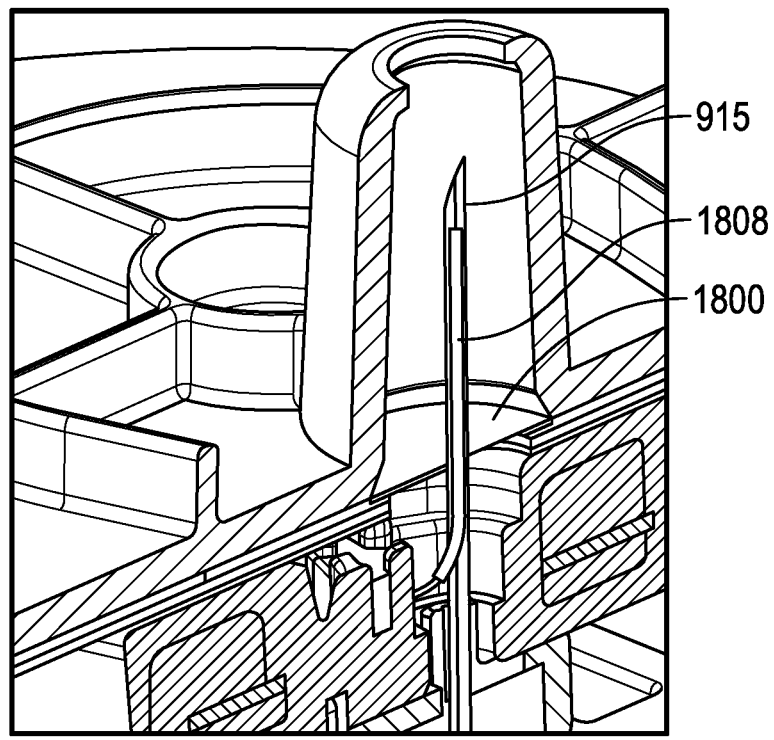
FIG. 38C illustrates a bottom cross sectional perspective view of the liner removal component shown in FIG. 38A.

The insertion element 915 such as a needle may extend through the puncture layer 1800 to stabilize the transcutaneous analyte sensor 1808 (shown in FIG. 38C) relative to the insertion element 915. As such, the sensor 1808 may be stabilized from dislodging from the insertion element 915 or otherwise being mis-positioned. The stabilization may occur during transport of the applicator prior to use, or immediately prior to use. The stabilization may occur in horizontal dimensions as well as vertical dimensions. The puncture layer 1800 accordingly may form a tight seal about the insertion element 915 that retains the sensor 1808 in position relative to the insertion element 915.

Figure 38D:
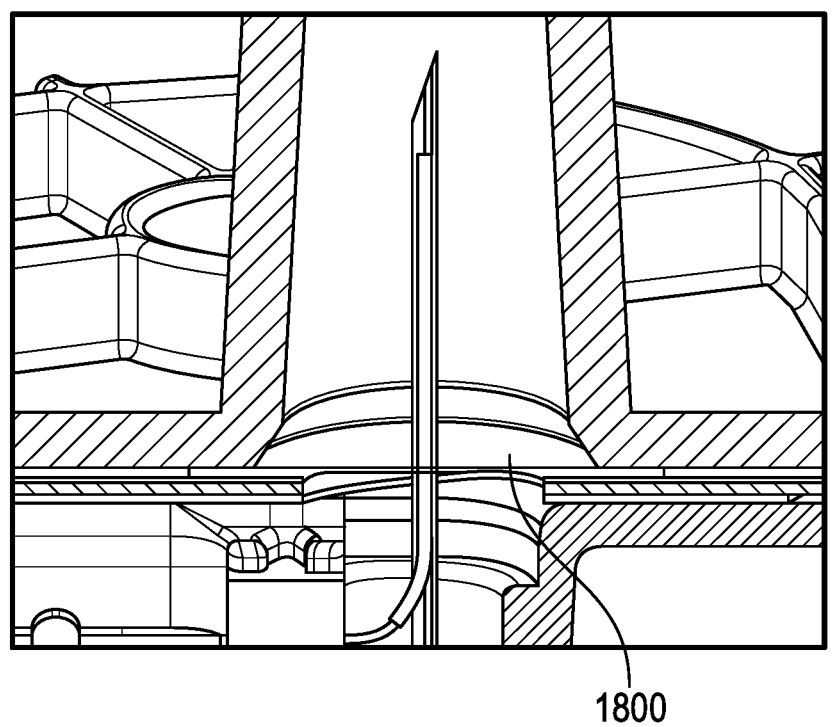
FIG. 38D illustrates a side cross sectional perspective view of the liner removal component shown in FIG. 38A.
Figure 38E:
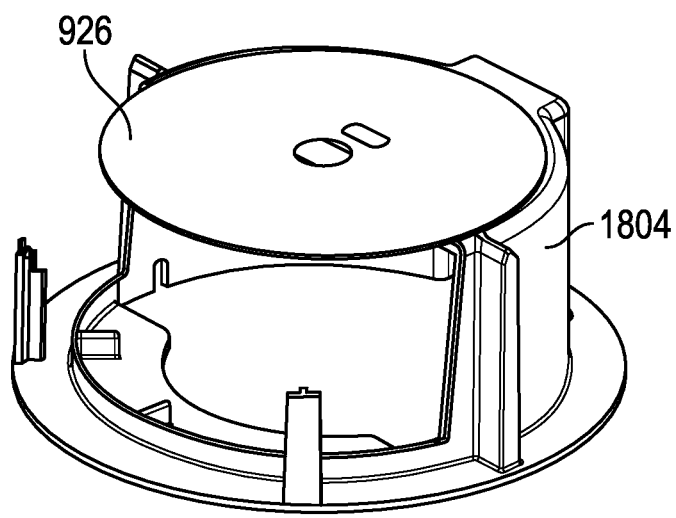
FIG. 38E illustrates a perspective view of the liner removal component shown in FIG. 38A.

FIG. 38D for example, illustrates a side view of the stabilization provided by a puncture layer 1800. Upon withdrawal of the liner removal component 1804, a liner 926 may be withdrawn, as shown in FIG. 38E for example.

Any embodiment of liner removal component disclosed herein may include a puncture layer as desired.

Referring to FIGS. 39A-39E, in embodiments, a patch 1900 may include a puncture layer 1902 for an insertion element 915 such as a needle to pass through. The puncture layer 1902 may be configured for a transcutaneous analyte sensor to pass through. The puncture layer 1902 may be for one or more of a transcutaneous analyte sensor or an insertion element to pass through. The patch 1900 may further include an aperture 1904 for a needle and the transcutaneous analyte sensor to pass through.

Figure 39A:
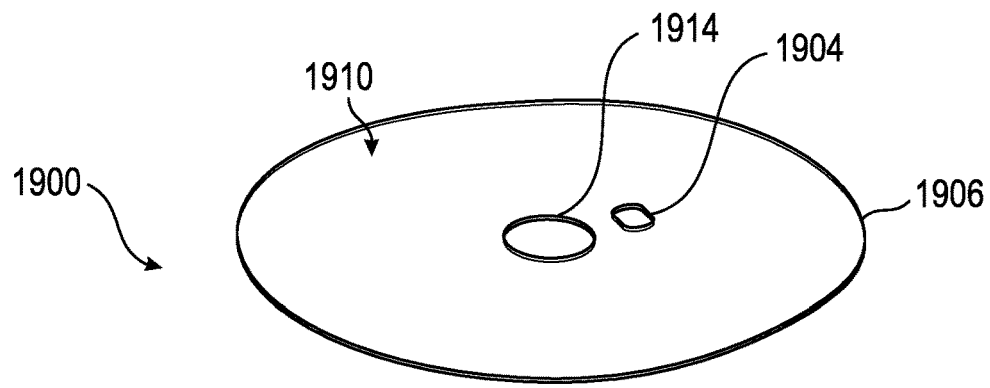
FIG. 39A illustrates a bottom perspective view of a patch.
Figure 39A:
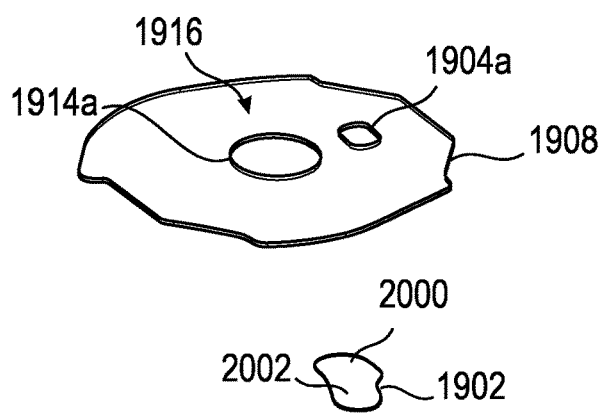

FIG. 39A illustrates an assembly view of the patch 1900, in which the patch 1900 may include a plurality of layers. The patch 1900, for example, may include a base layer 1906, an adhesive layer 1908, and the puncture layer 1902 in embodiments.

The base layer 1906 may include a distal surface comprising the surface 1910 for engaging skin. The surface 1910 may comprise an adhesive surface in embodiments, or other forms of surfaces. The base layer 1906 may include a proximal surface 1912 (marked in FIG. 39B) facing opposite the distal surface of the base layer 1906. In embodiments, the base layer 1906 may include a central aperture 1914 that may be configured for a central support 952 of a retaining body 942 (as shown in FIG. 26C) to pass through, to contact the housing of the on-skin wearable medical device, although in embodiments the central aperture 1914 may be excluded as desired.

Figure 39B:
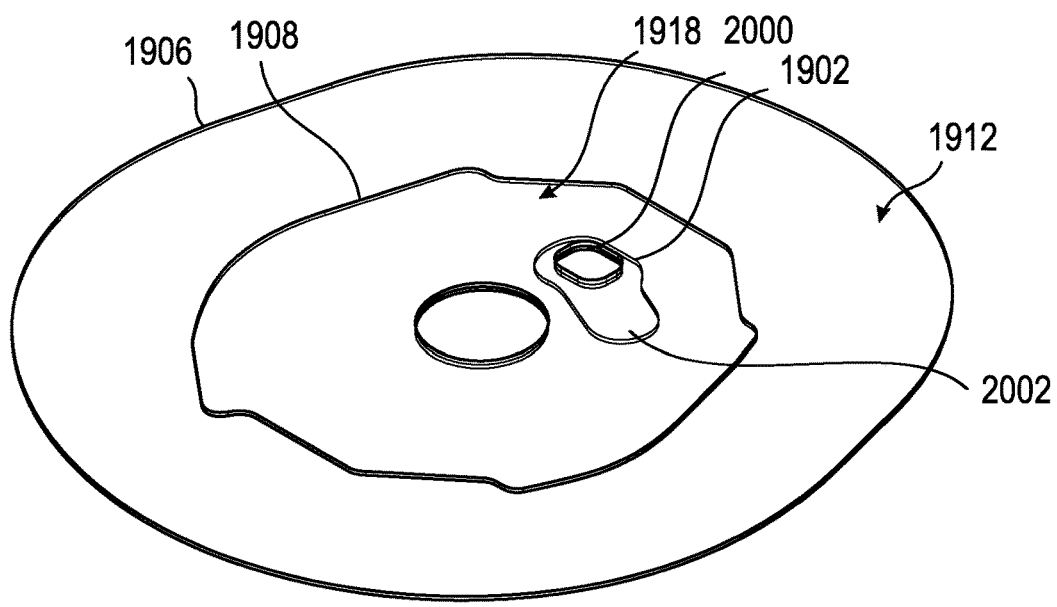
FIG. 39B illustrates a top perspective view of the patch shown in FIG. 39A.

The adhesive layer 1908 may be positioned upon the proximal surface 1912 of the base layer 1906 and may be configured to couple the base layer 1906 to the housing of the on-skin wearable medical device. The adhesive layer 1908 accordingly may be sized to a width and length of the housing of the on-skin wearable medical device, which may be a lesser width and length than the entirety of the base layer 1906. FIG. 39B, for example, shows an exemplary size of the adhesive layer 1908 relative to the base layer 1906. The adhesive layer may include a distal surface 1916 and a proximal surface 1918 (marked in FIG. 39B). The proximal surface 1918 may be configured to couple to a distal surface of the housing of the on-skin wearable medical device in embodiments. The proximal surface 1918 may comprise an adhesive surface for adhering the patch 1900 to the housing. In embodiments, the adhesive layer 1908 may include a central aperture 1914a that may be aligned with the central aperture 1914 of the base layer 1906 and may provide a similar function as the central aperture 1914 of the base layer 1906. In embodiments, the adhesive layer 1908 may include an aperture 1904a that may be aligned with the aperture 1904 and may provide a similar function as the aperture 1904 of the base layer 1906.

The puncture layer 1902 may be positioned upon the adhesive layer 1908 with the adhesive layer 1908 sandwiched between the puncture layer 1902 and the base layer 1906. The puncture layer 1902 may be a first layer of a plurality of layers of the patch 1900 layered adjacent to a second layer (e.g., the adhesive layer 1908) of the plurality of layers. The puncture layer 1902 may be sandwiched between the base layer 1906 and the housing of the on-skin wearable medical device, and between the adhesive layer 1908 and the housing of the on-skin wearable medical device. The adhesive layer 1908 may be sandwiched between the base layer 1906 and the puncture layer 1902. The puncture layer 1902 may be positioned upon the proximal surface 1918 of the adhesive layer 1908 and on the proximal side of the base layer 1906. In embodiments, the position of the puncture layer 1902 may vary, for example, sandwiched between the adhesive layer 1908 and the base layer 1906 or upon the surface 1910 of the base layer 1906. In embodiments, the puncture layer 1902 may be integral with either the base layer 1906 or the adhesive layer 1908.

The puncture layer 1902 may cover the aperture 1904 of the base layer 1906 and the aperture 1904a of the adhesive layer 1908 in embodiments. FIG. 39B, for example, illustrates an assembled view of the patch 1900, with the adhesive layer 1908 upon the base layer 1906 and the puncture layer 1902 covering the apertures 1904a, 1904.

Figure 39C:
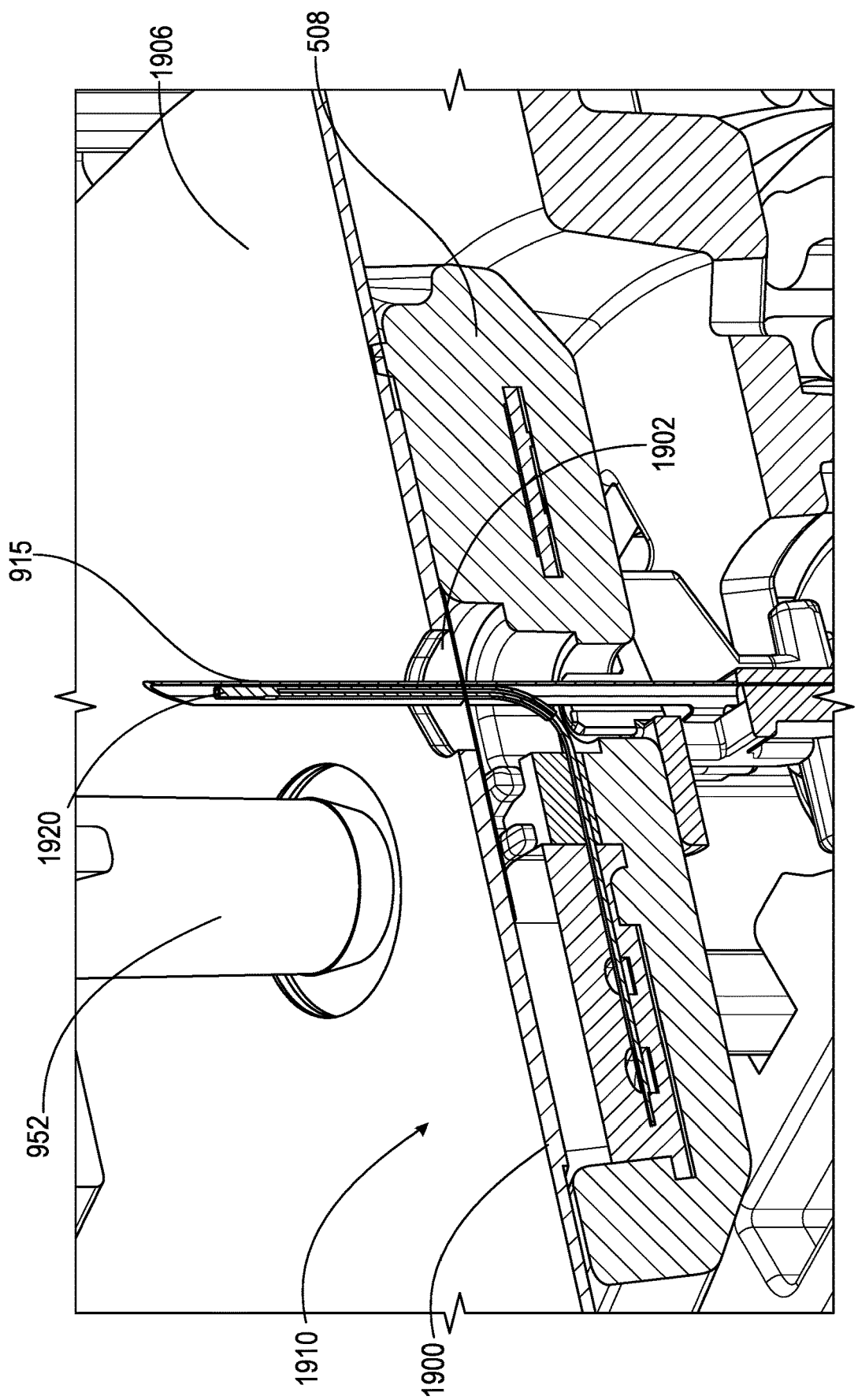
FIG. 39C illustrates a cross sectional perspective view of an on-skin wearable medical device including the patch shown in FIG. 39A and positioned within an applicator housing.

The insertion element 915 such as a needle may extend through the puncture layer 1902 to stabilize a transcutaneous analyte sensor relative to the insertion element 915. FIG. 39C, for example, illustrates a housing of an on-skin wearable medical device positioned upon the patch 1900, with the transcutaneous analyte sensor 1920 passing through the puncture layer 1902. The on-skin wearable medical device is positioned within an internal cavity of an applicator housing and is retained by the applicator housing. The insertion element 915 passes through the puncture layer 1902, with the transcutaneous analyte sensor 1920 positioned within a channel of the insertion element 915. As shown, the puncture layer 1902 may be configured to retain the transcutaneous analyte sensor in the channel of the insertion element 915. The insertion element 915 and transcutaneous analyte sensor 1920 are shown prior to deployment, in which the insertion element 915 is in position to deploy the transcutaneous analyte sensor 1920 to skin.

As such, the puncture layer 1902 may stabilize the sensor 1920 from dislodging from the insertion element 915 or otherwise being mis-positioned. The stabilization may occur during transport of the applicator prior to use, or immediately prior to use. The stabilization may occur in horizontal dimensions as well as vertical dimensions. The puncture layer 1902 may stabilize the analyte sensor from dislodging from a channel of the insertion element in a horizontal dimension as well as a vertical dimension. The puncture layer 1902 accordingly may form a tight seal about the insertion element 915 that retains the sensor 1920 in position relative to the insertion element 915, in the channel of the insertion element 915 for example.

Figure 39D:
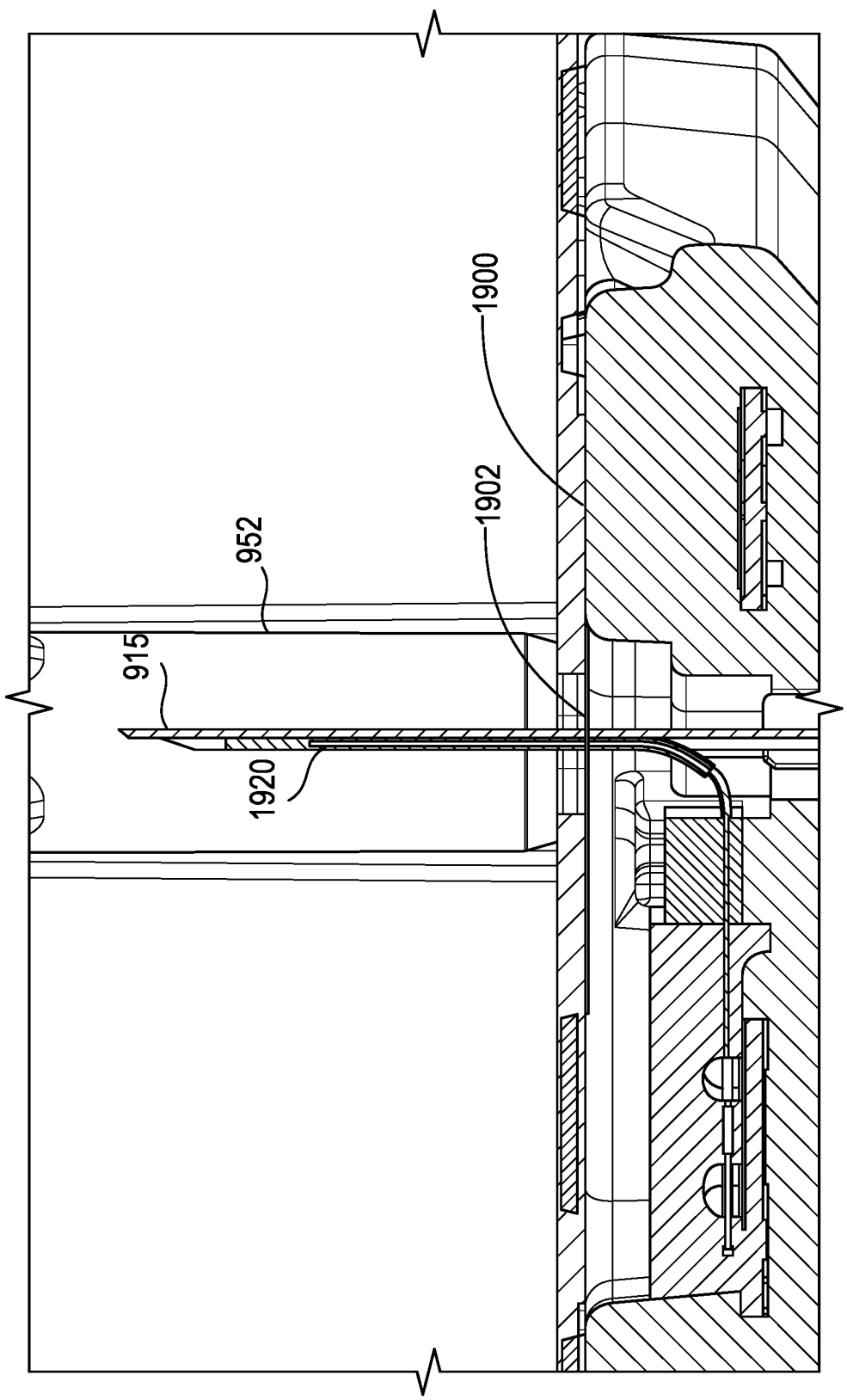
FIG. 39D illustrates a side cross sectional view of the on-skin wearable medical device shown in FIG. 39C positioned within an applicator housing.
Figure 39E:
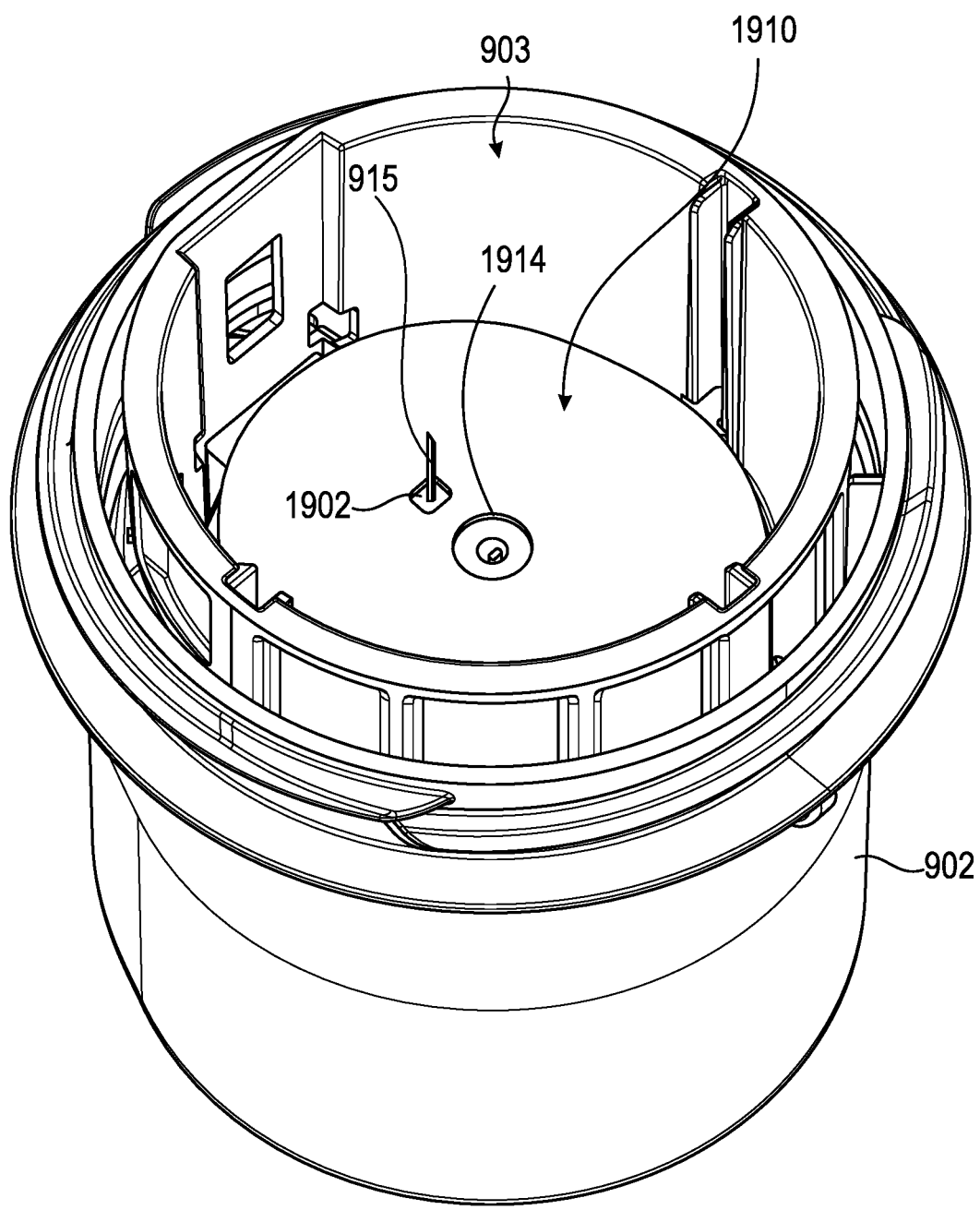
FIG. 39E illustrates a bottom perspective view of the on-skin wearable medical device shown in FIG. 39C positioned within an applicator housing.

FIG. 39D illustrates a side view of the sensor 1920 and insertion element 915 stabilized by the puncture layer 1902. FIG. 39E illustrates a bottom perspective view of the insertion element 915 shown stabilized by the puncture layer 1902.

Upon deployment, the insertion element 915 may be withdrawn or retracted proximally through the puncture layer 1902, with the transcutaneous analyte sensor 1920 remaining passing through or extending through the puncture layer 1902 and passing into the host's skin.

Any embodiment of liner removal component disclosed herein may be utilized in combination with a puncture layer of a patch as desired. In embodiments, a puncture layer of a patch may be utilized in combination with a puncture layer of liner removal component as desired. Various other combinations may be utilized in embodiments.

Referring to FIGS. 39A and 39B, in embodiments, the puncture layer 1902 may include a puncture portion 2000 and may include a support portion 2002 positioned radially outward of the puncture portion 2000. The puncture portion 2000 may comprise a portion of the puncture layer 1902 for one or more of the transcutaneous analyte sensor or the insertion element 915 to pass through. For example, the puncture portion 2000 may be aligned at a position that is interior of the perimeters of the apertures 1904, 1904a of the respective base layer 1906 and the adhesive layer 1908 (as shown in FIG. 39B, for example).

The support portion 2002 may be configured to support the puncture portion 2000. Such support may reduce the possibility of the puncture layer 1902 from becoming separated or delaminated from the remainder of the patch 1900 or another component of the on-skin wearable medical device upon a force being applied to the puncture portion 2000. For example, a reduced possibility of the puncture portion 2000 being separated or delaminated may occur upon initial puncture by the sensor or insertion element through the puncture portion 2000, or upon withdrawal of the insertion element through the puncture portion 2000 following insertion of the sensor into the host's skin. A reduced possibility of separation or delamination may occur during transport of the on-skin sensor assembly (e.g., a force applied to the puncture layer 1902 due to movement of the on-skin sensor assembly).

The support portion 2002 may be configured to overlap a portion of the patch to support the puncture portion 2000. For example, in embodiments in which the patch includes a plurality of layers, the support portion 2002 may overlap another layer of the plurality of layers to support the puncture portion 2000. The layer that may be overlapped may include one or more of the adhesive layer 1908 or the base layer 1906. Referring to FIG. 39B, for example, the support portion 2002 overlaps the adhesive layer 1908 and is adhered to the adhesive layer 1908. The support portion 2002 may be adhered to the adhesive proximal surface 1918 of the adhesive layer 1908.

Figure 40:
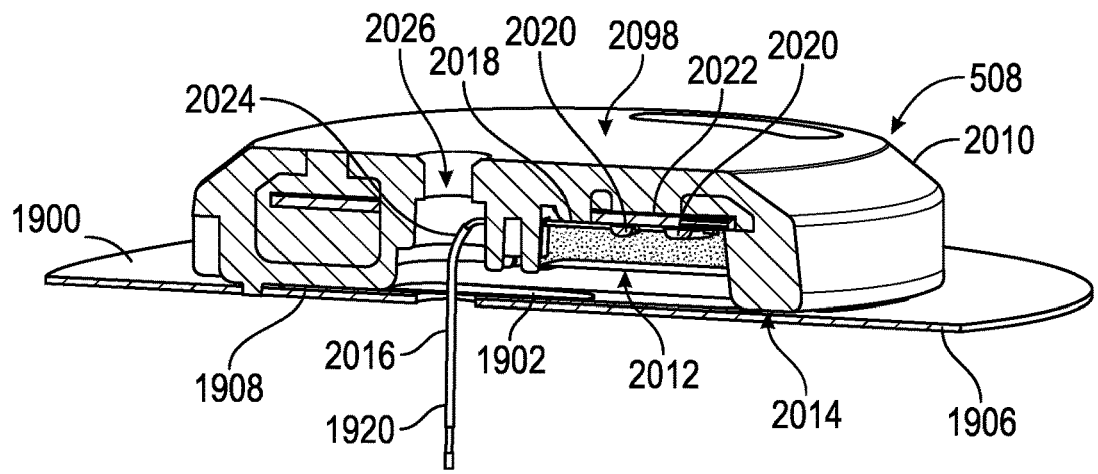
FIG. 40 illustrates a cross sectional perspective view of an on-skin wearable medical device.

In embodiments, the support portion 2002 may be positioned within a cavity of the housing of the on-skin sensor assembly 508. Such positioning may reduce any adverse impact of the height or thickness of the support portion 2002 in relation to the fit of the patch 1900 upon the housing. In embodiments, at least a portion of the puncture layer 1902 may extend along the cavity. Referring to FIG. 40, for example, a housing 2010 of the on-skin sensor assembly 508 may include a cavity 2012. The cavity 2012 may extend proximally from the distal surface 2014 of the housing 2010 and may comprise a recess in the distal surface 2014 of the housing 2010.

The cavity 2012 may be configured to receive a portion of the transcutaneous analyte sensor 1920. For example, the transcutaneous analyte sensor 1920 may include an insertion portion 2016 configured to be disposed within the skin of a host, and may include a coupling portion 2018 configured to couple to the housing 2010. A bend portion 2024 may be positioned between the insertion portion 2016 and the coupling portion 2018. The cavity 2012 may receive the coupling portion 2018 of the transcutaneous analyte sensor 1920 and one or more electrical connections 2020 of the coupling portion 2018 to electronics 2022 (e.g., an electronic substrate or a printed circuit board, among others) of the on-skin sensor assembly. In embodiments, the cavity 2012 may receive the bend portion 2024 of the transcutaneous analyte sensor 1920. The cavity 2012 may include an insertion channel 2026 that the bend portion 2024 may be aligned with. The insertion channel 2026 may be configured for the insertion element 915 to pass through to insert the transcutaneous analyte sensor 1920 into the host's skin.

Figure 41A:
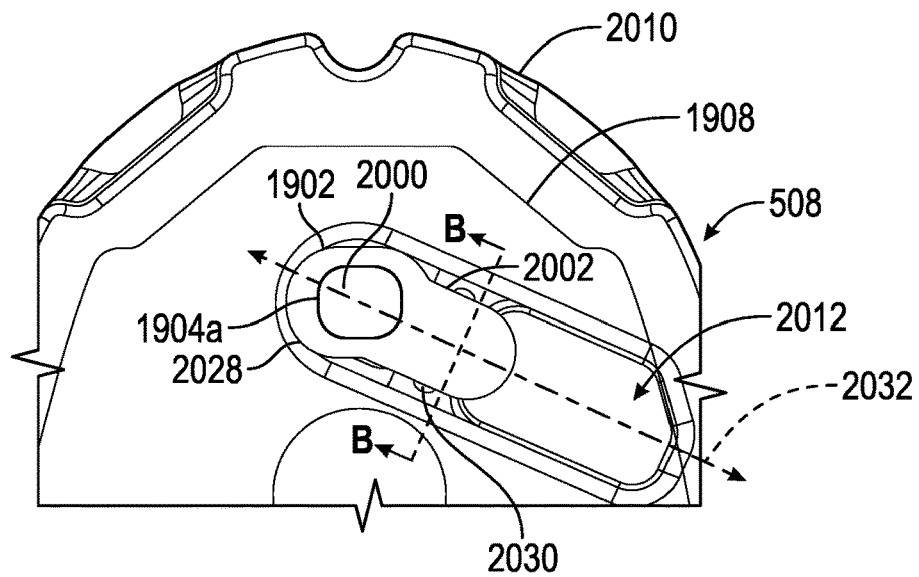
FIG. 41A illustrates a distal view of the on-skin wearable medical device shown in FIG. 40.

FIG. 41A illustrates a bottom view or distal view of the on-skin sensor assembly 508. The outer edge of the base layer 1906 is excluded from view in FIG. 41A. The puncture layer 1902 is shown positioned within the cavity 2012 of the housing 2010.

The support portion 2002 may include a ring portion 2028 that may extend circumferentially about the entirety of the puncture portion 2000 and that overlaps the adhesive layer 1908. The support portion 2002 may include an elongate arm 2030 that extends radially outward from the puncture portion 2000. In embodiments the elongate arm 2030 may extend along the cavity 2012. For example, the elongate arm 2030 may extend along a longitudinal axis 2032 of the cavity 2012. The elongate arm 2030 may extend along the cavity 2012 to increase the amount of the support portion 2002 that overlaps the adhesive layer 1908, yet remains positioned within the cavity 2012 to reduce any adverse impact of the height or thickness of the support portion 2002 in relation to the fit of the patch 1900 upon the housing 2010.

Figure 41B:
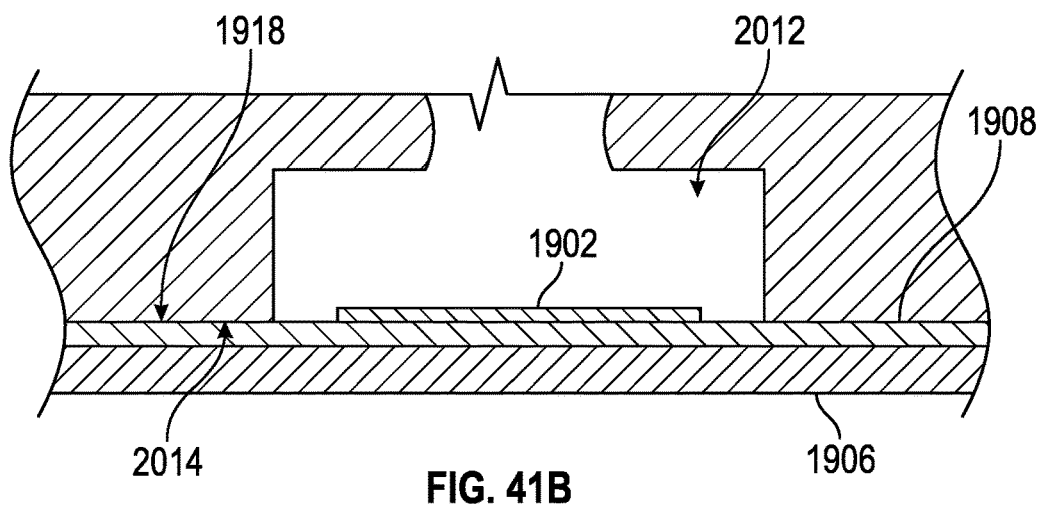
FIG. 41B illustrates a cross sectional schematic view of the on-skin wearable medical device shown in FIG. 41A along line B-B in FIG. 41.

FIG. 41B, for example, illustrates a cross sectional view of the puncture layer 1902 in relation to the cavity 2012 along line B-B shown in FIG. 41A. The puncture layer 1902 is shown to be positioned within the cavity 2012 of the housing 2010, with the adhesive proximal surface 1918 of the adhesive layer 1908 being flush or coplanar with the distal surface 2014 of the housing 2010.

Figure 42:
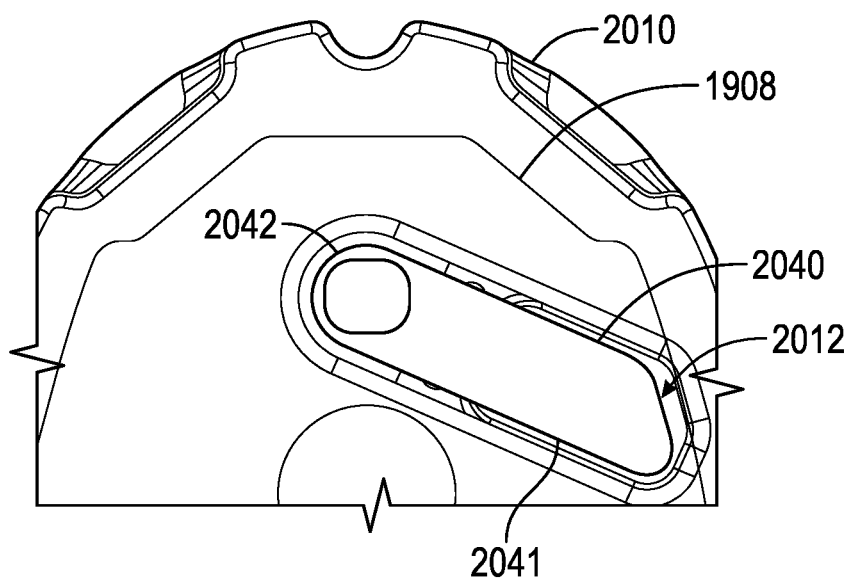
FIG. 42 illustrates a distal view of an on-skin wearable medical device.

In embodiments, the configuration of the puncture layer 1902 may be varied. FIG. 42, for example, illustrates an embodiment in which a puncture layer 2040 has an elongate arm 2041 with a greater length than the elongate arm 2030 shown in FIG. 41A. The elongate arm 2041 may extend for the entirety of the length of the cavity 2012 (whereas the elongate arm 2030 shown in FIG. 41A may extend for a portion or about half of the length of the cavity 2012). The puncture layer 2040 may have a ring portion 2042 with a lesser diameter of overlap of the adhesive layer 1908 than the ring portion 2028 shown in FIG. 41A. Various other configurations of puncture layers may be utilized as desired.

The puncture layers disclosed herein may comprise stabilizing bodies that may be configured to stabilize a position of the transcutaneous analyte sensor relative to an insertion element for the transcutaneous analyte sensor. The stabilizing bodies may stabilize the transcutaneous analyte sensor from dislodging from a channel of the insertion element in a horizontal dimension. In embodiments, the stabilizing bodies may be configured to contact the transcutaneous analyte sensor to stabilize the transcutaneous analyte sensor from dislodging from the channel of the insertion element. The stabilizing bodies may have a variety of forms.

Figure 43A:
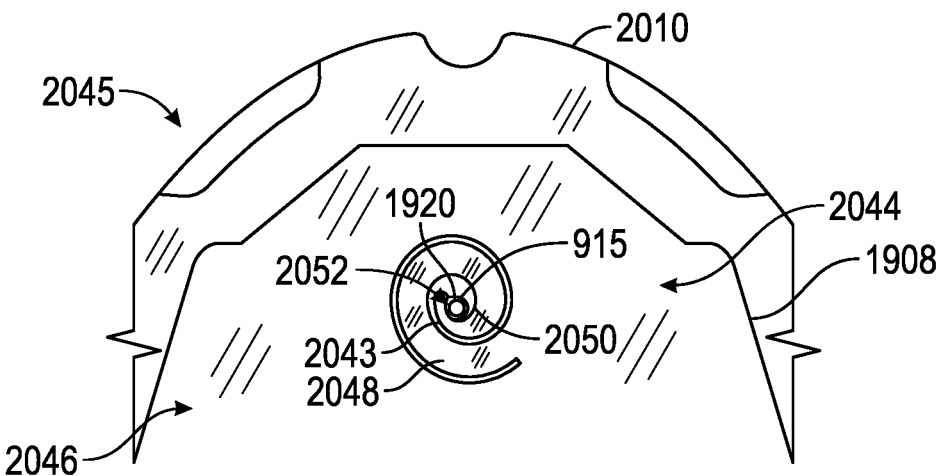
FIG. 43A illustrates a distal view of an on-skin wearable medical device.
Figure 43B:
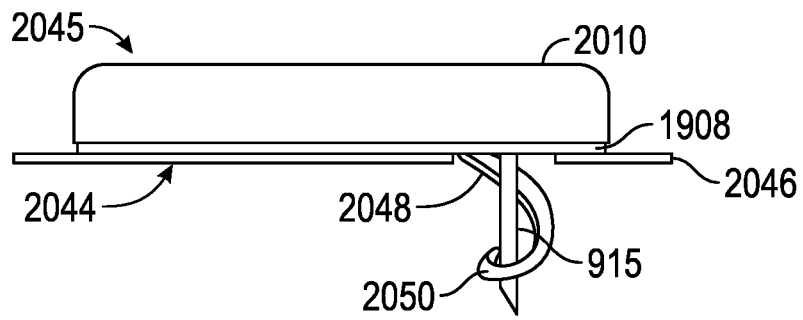
FIG. 43B illustrates a side schematic view of the on-skin wearable medical device shown in FIG. 43A, with a spiral body moved from the position shown in FIG. 43A.
Figure 43C:
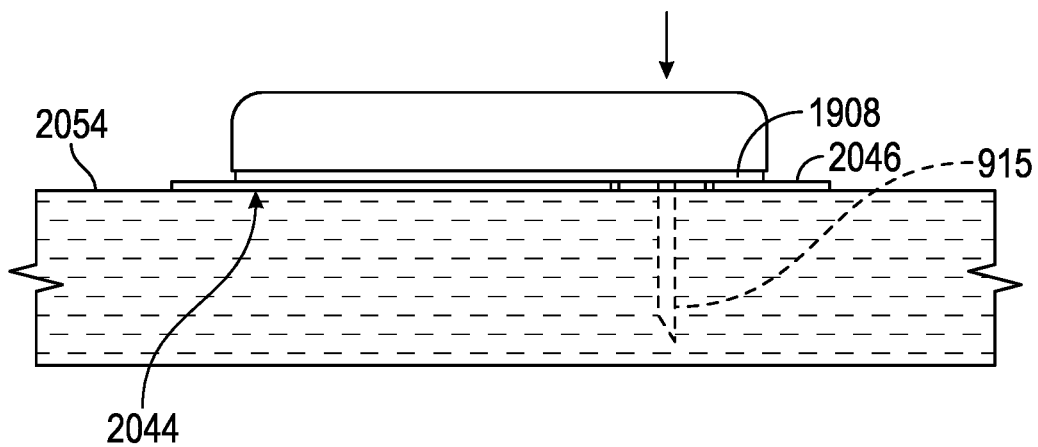
FIG. 43C illustrates a side schematic view of the on-skin wearable medical device shown in FIG. 43A applied to skin.

For example, referring to FIGS. 43A-C, a stabilizing body may comprise a spiral body 2043. The spiral body 2043 may be configured to extend around an insertion element 915 for the transcutaneous analyte sensor to stabilize a position of the transcutaneous analyte sensor relative to the insertion element 915.

FIG. 43A, for example, illustrates a bottom view or distal view of an on-skin sensor assembly 2045. The on-skin sensor assembly 2045 may be configured similarly as the on-skin sensor assembly 508 unless stated otherwise. The on-skin sensor assembly 2045 may include the housing 2010 and may include a patch. The outer edge of a base layer of the patch is excluded from view in FIG. 43A.

The patch may be coupled to the housing 2010 and may include a first surface 2044 for engaging skin, similar to the surface 1910 of the base layer 1906 shown in FIG. 39A. At least a portion of the patch may comprise the spiral body 2043 configured to extend around the insertion element 915. For example, the patch may include a single layer, and may have a portion cut into a spiral shape as shown in FIG. 43A. In embodiments, the patch may include multiple layers and one or more of the layers may be cut into the spiral shape. In the embodiment shown in FIG. 43A, a base layer 2046 may include the spiral body 2043. The base layer 2046 may otherwise be configured similarly as the base layer 1906 shown in FIG. 39A, and may couple to the housing 2010 through an adhesive layer 1908.

The spiral body 2043 is shown in a flat coil shape in FIG. 43A. The spiral body 2043 may include an outer arm 2048 that spirals inward to an inner arm 2050. The outer arm 2048 may be positioned radially outward of the inner arm 2050. The inner arm 2050 may extend around an outer surface of the insertion element 915 and may cover an opening 2052 of the channel of the insertion element 915. As such, the inner arm 2050 may block or impede the transcutaneous analyte sensor 1920 from dislodging from the channel of the insertion element in a horizontal dimension. The spiral body 2043 accordingly may stabilize a position of the transcutaneous analyte sensor 1920 relative to the insertion element 915. The spiral body 2043 may contact the transcutaneous analyte sensor 1920 to stabilize the transcutaneous analyte sensor from dislodging from a channel of the insertion element 915 in a horizontal dimension.

The spiral body 2043 that is shown in the flat coil shape in FIG. 43A may be extended in a distal direction to form a helical shape in an extended position as shown in FIG. 43B. The extended position may be a configuration for transport or storage of the on-skin sensor assembly 2045. The spiral body 2043 may stabilize a position of the transcutaneous analyte sensor 1920 relative to the insertion element 915 in such a configuration.

The spiral body 2043 may protrude from the first surface 2044 of the patch in the extended position shown in FIG. 43B. The inner arm 2050 in the extended position may yet extend around an outer surface of the insertion element 915 and may cover the opening 2052 (marked in FIG. 43A) of the channel of the insertion element 915. The helical shape of the spiral body 2043 may extend along the longitudinal axis of the insertion element 915.

Upon insertion of the insertion element 915 and the transcutaneous analyte sensor 1920 into the host's skin, the spiral body 2043 may be pressed in a proximal direction towards the housing 2010 by the host's skin. The spiral body 2043 may then move from the extended position shown in FIG. 43B to a retracted position shown in FIGS. 43A and 43C. The spiral body 2043, for example, may collapse to the retracted position and may have a flat coil shape. The spiral body 2043 may be positioned co-planar or retracted from the first surface 2044 of the patch in the retracted position. The insertion element 915 may then be retracted from the host's skin 2054 with the transcutaneous analyte sensor 1920 remaining in position within the host's skin 2054.

The features of FIGS. 43A-C may be utilized solely or with any method, apparatus or system disclosed herein.

Figure 44:
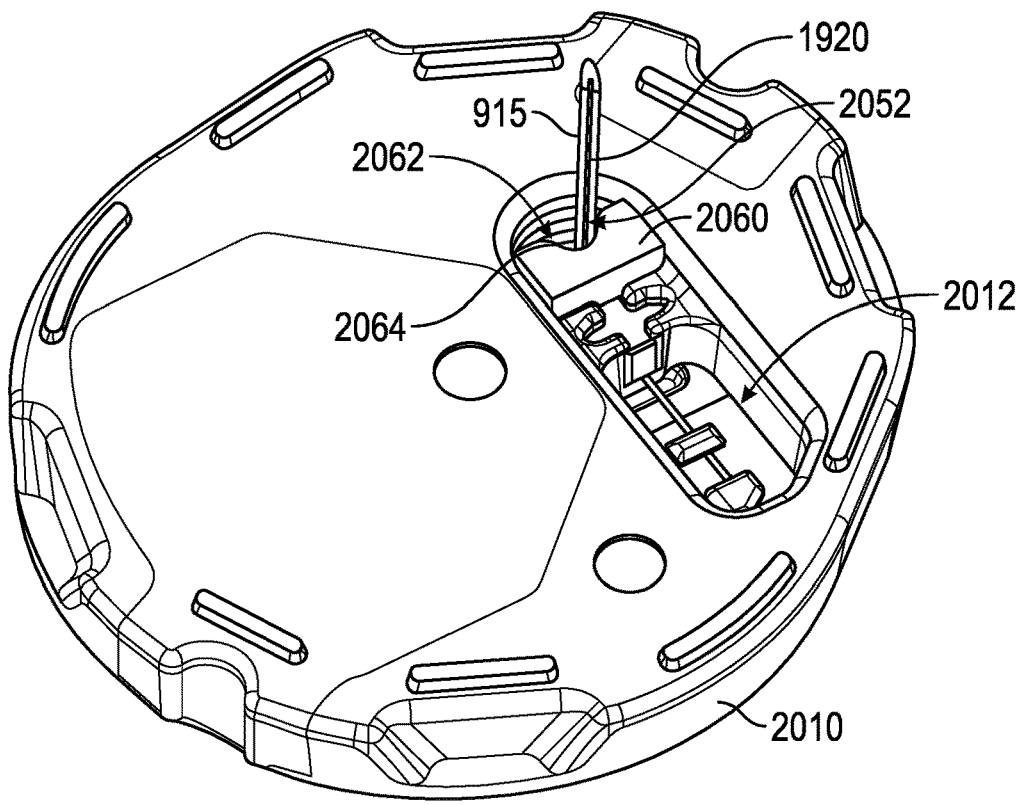
FIG. 44 illustrates a distal perspective view of an on-skin wearable medical device.

FIG. 44 illustrates an embodiment including a stabilizing body 2060 configured to be positioned within a cavity of a housing of the on-skin sensor assembly. The cavity may comprise a cavity 2012 configured to receive a portion of the transcutaneous analyte sensor 1920.

The stabilizing body 2060 may comprise a body configured to be positioned axially offset from the longitudinal axis of the insertion element 915. The stabilizing body 2060 may be positioned to cover an opening 2052 of the channel of the insertion element 915. As such, the stabilizing body 2060 may block or impede the transcutaneous analyte sensor 1920 from dislodging from the channel of the insertion element in a horizontal dimension. The stabilizing body 2060 may be configured to contact the transcutaneous analyte sensor 1920 to stabilize the transcutaneous analyte sensor 1920 from dislodging from the channel of the insertion element 915 in a horizontal dimension.

In embodiments, the stabilizing body 2060 may have a recess 2062 that the insertion element 915 may be positioned within. An inner surface 2064 of the recess 2062 may be positioned to cover the opening 2052 of the channel of the insertion element 915.

In embodiments, the stabilizing body 2060 may comprise an insert for the cavity 2012. The stabilizing body 2060 may be form fit to fit within the inner walls of the cavity 2012 and positioned with the insertion element 915 within the recess 2062. In embodiments, the stabilizing body 2060 may comprise a foam body or may have other forms as desired.

The stabilizing body 2060 may stabilize the transcutaneous analyte sensor 1920 prior to insertion of the transcutaneous analyte sensor 1920 into the host's skin. The stabilization may occur during transport or otherwise prior to the insertion of the sensor 1920 into the host's skin. Upon insertion into the host's skin, the insertion element 915 may be withdrawn from the host's skin and from the housing 2010, with the transcutaneous analyte sensor 1920 remaining positioned within the host's skin. The insertion element 915 accordingly may slide proximally relative to the inner surface 2064 of the recess 2062 of the stabilizing body 2060.

The features of FIG. 44 may be utilized solely or with any embodiment method, apparatus or system disclosed herein.

Figure 45A:
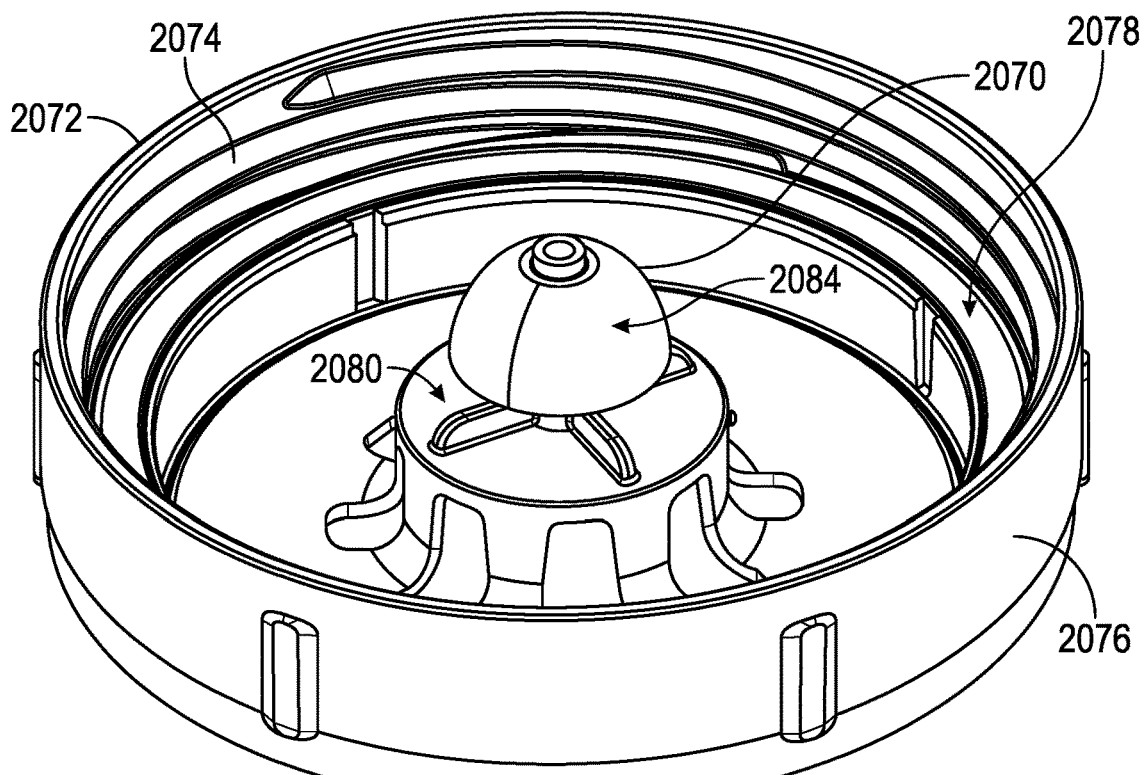
FIG. 45A illustrates a proximate perspective view of a cap.
Figure 45B:
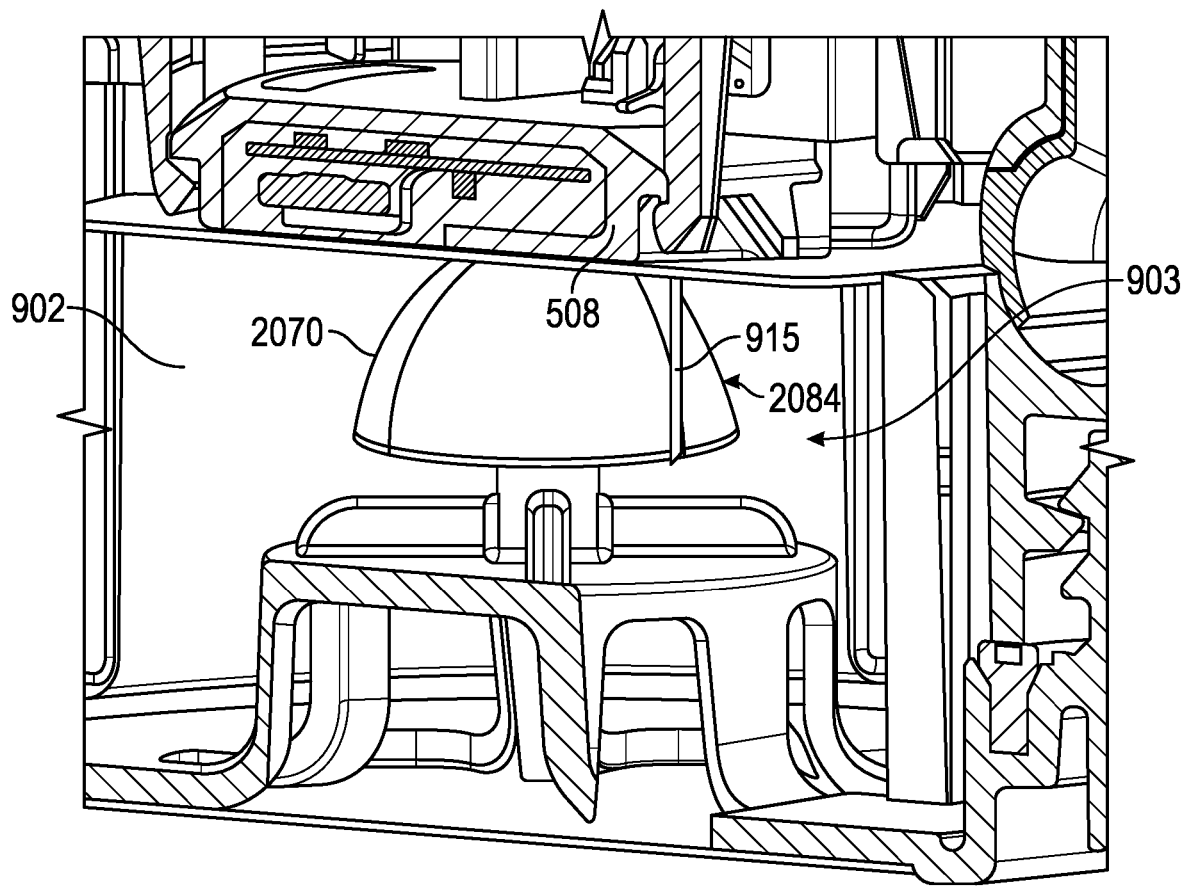
FIG. 45B illustrates a cross sectional perspective view of an applicator housing including the cap shown in FIG. 45A.
Figure 45C:
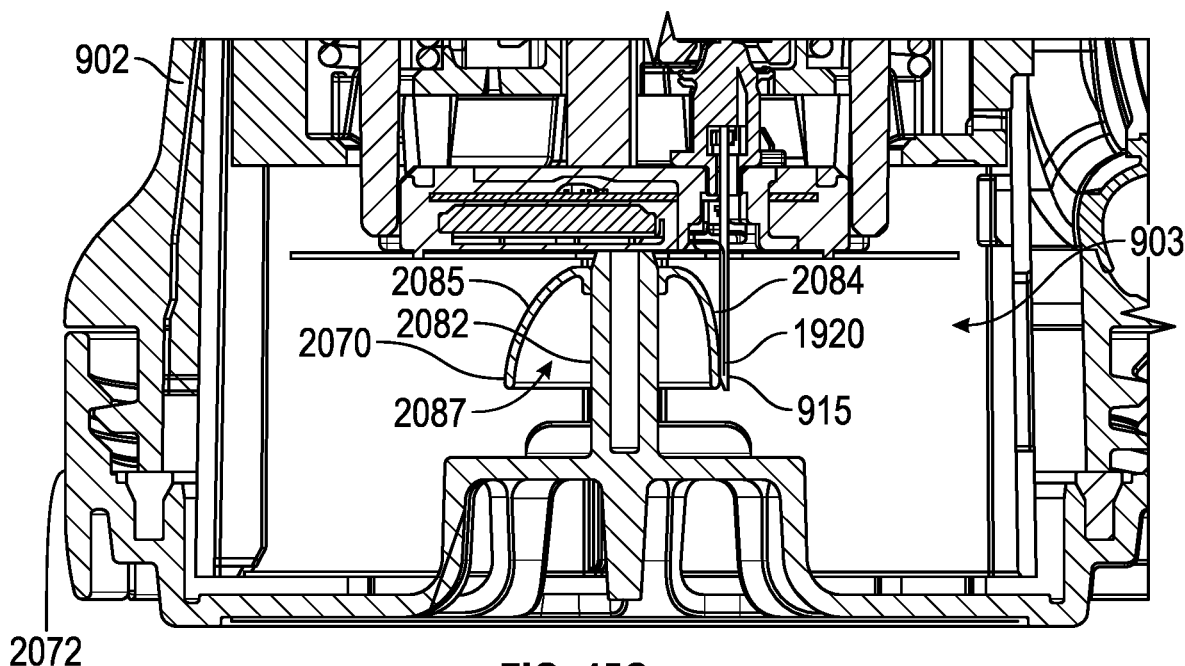
FIG. 45C illustrates a cross sectional view of an applicator housing including the cap shown in FIG. 45A.

FIGS. 45A-C illustrate an embodiment including a stabilizing body 2070 that may be coupled to a cap 2072 of an applicator system. The cap 2072, for example, may be configured similarly as the retaining body 942 or cap shown in FIG. 26C, unless stated otherwise. The cap 2072 may include an engagement portion 2074 configured to engage a portion of an application housing, and may include an outer surface or grip portion 2076 that may be configured to be gripped by a user. The engagement portion 2074 may be configured to engage an outer surface of the applicator housing. The engagement portion 2074, for example, may comprise threading configured to engage threading of the outer surface of the applicator housing, or may have other forms as desired. The outer surface or grip portion 2076 may be configured to be gripped by a user to disengage the engagement portion 2074 from the applicator housing. For example, a user may grip the grip portion 2076 to rotate the cap 2072 to release the threading of the engagement portion 2074 from the outer surface of the applicator housing. The cap 2072 may have other configurations in embodiments. The cap 2072 may comprise a retaining body for the applicator system, similar to the retaining body 942 shown in FIG. 26C.

The cap 2072 may include an outer portion 2078 comprising the grip portion 2076 and may include a central portion 2080. The central portion 2080 may include a central support 2082 (marked in FIG. 45C) that may be configured similarly as the central support 952 shown in FIG. 26C unless stated otherwise.

The cap 2072 may comprise a cap for a cavity 903 (marked in FIG. 45B) for an on-skin wearable medical device to be retained within. The cavity 903 and the applicator housing 902 marked in FIG. 45B may be configured similarly as the respective cavity 903 and applicator housing 902 shown in FIG. 26A unless stated otherwise.

Referring to FIG. 45A, the stabilizing body 2070 may include a bearing surface 2084 configured to stabilize a position of a transcutaneous analyte sensor relative to the insertion element. The bearing surface 2084, for example, may be configured to cover an opening of the channel of the insertion element 915 (marked in FIG. 45C). As such, the bearing surface 2084 may block or impede a transcutaneous analyte sensor from dislodging from the channel of the insertion element in a horizontal dimension. The bearing surface 2084 may be configured to contact the transcutaneous analyte sensor to stabilize the transcutaneous analyte sensor from dislodging from the channel of the insertion element 915 in a horizontal dimension.

The bearing surface 2084 may comprise a curved bearing surface. As such, upon rotation of the stabilizing body 2070 and the bearing surface 2084, the bearing surface 2084 may be configured to rotate relative to the insertion element 915. In embodiments, the stabilizing body 2070 may have a conical shape (as shown in FIG. 45A). As such, upon axial movement of the stabilizing body 2070 in a distal direction, the diameter of the bearing surface 2084 incident upon the insertion element 915 may be reduced. Such a feature may progressively reduce a friction of the bearing surface 2084 upon the insertion element 915 as the stabilizing body 2070 is moved axially distal. In embodiments, the stabilizing body 2070 may have other shapes (e.g., cylindrical) as desired.

Referring to FIG. 45C, in embodiments, the stabilizing body 2070 may be compliant and configured to deflect to accommodate the position of the insertion element 915. The stabilizing body 2070, for example may include a layer 2085 of compliant material that surrounds a cavity 2087. The layer 2085 may include bearing surface 2084 as an outer surface of the stabilizing body 2070. As shown in FIG. 45C, the bearing surface 2084 may contact an outer surface of the insertion element 915 and cover the opening of the channel of the insertion element 915 to retain the transcutaneous analyte sensor within the channel.

The stabilizing body 2070 may be coupled to the central support 2082, although other coupling locations may be utilized as desired. The position on the central support 2082 may allow the stabilizing body 2070 to rotate about a central axis of the cap 2072 in embodiments.

FIGS. 45B and 45C illustrate the cap 2072 coupled to the applicator housing 902. At a desired time, the cap 2072 may be removed from the applicator housing 902. In embodiments, the cap 2072 may be rotated relative to the applicator housing 902 for removal (e.g., via threading comprising the engagement portion 2074 of the cap 2072). For example, the cap 2072 may be configured to couple to the applicator housing 902 and be unscrewed from the applicator housing 902 to decouple from the applicator housing 902. In embodiments, other forms of removal may be utilized (e.g., an axial pull or other form of release from the applicator housing 902).

The bearing surface 2084 may be configured to rotate with the cap 2072. For example, upon the cap 2072 being unscrewed from the applicator housing 902, the bearing surface 2084 may rotate with the cap 2072 and relative to the insertion element 915. The stabilizing body 2070 may be moved axially distal relative to the insertion element 915 when the cap 2072 is unscrewed from the applicator housing 902. The bearing surface 2084 may slide relative to the outer surface of the insertion element 915 upon the stabilizing body 2070 being rotated with the cap 2072. The diameter of the bearing surface 2084 incident upon the insertion element 915 may be reduced during axial movement of the stabilizing body 2070, due to the conical shape of the stabilizing body 2070.

With the cap 2072 removed from the applicator housing 902, the on-skin wearable medical device may be in position for deployment to the skin of the host. The stabilizing body 2070 may stabilize the transcutaneous analyte sensor 1920 prior to insertion of the transcutaneous analyte sensor 1920 into the host's skin. The stabilization may occur during transport or otherwise prior to the insertion of the sensor 1920 into the host's skin.

The features of FIGS. 45A-C may be utilized solely or with any embodiment of method, apparatus or system disclosed herein.

In embodiments, systems and apparatuses may include one or more moisture passageways configured for removal of moisture. In embodiments, the moisture may be positioned distal of a housing of an on-skin wearable medical device system.

Moisture, for example, may be positioned in a variety of locations relative to an on-skin wearable medical device system. In embodiments in which the on-skin wearable medical device system includes a housing, the moisture may be positioned distal of the housing due to moisture emanating from an external environment (e.g., from a shower, pool, rain, or other source of moisture) or due to moisture emanating from the host's body (e.g., sweat, blood, or other sources of moisture). Moisture distal of the housing may be undesirable for a variety of reasons, including irritation to the host's skin or adverse effects upon the components of the on-skin wearable medical device system. In embodiments, moisture proximate an insertion site of a transcutaneous analyte sensor into the skin may be undesirable. Such moisture may produce an infection or undesirable result at the insertion site into the skin. It thus may be desirable for removal of moisture, particularly moisture positioned distal of such a housing.

Figure 46:
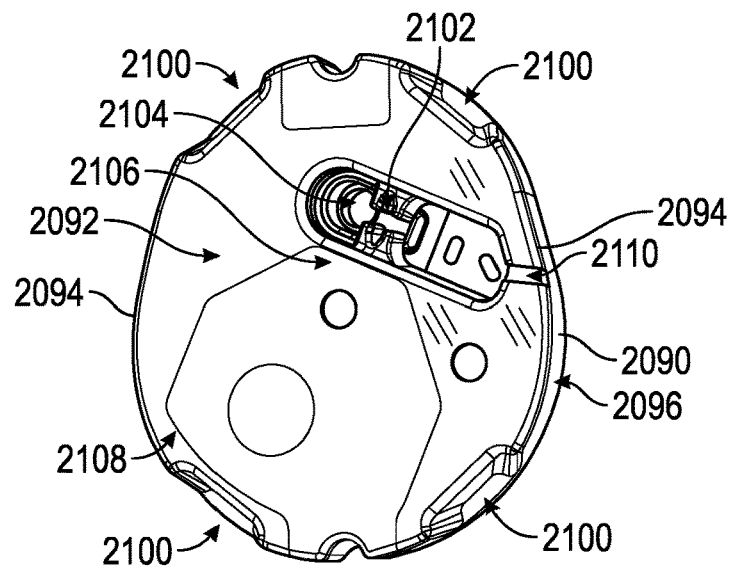
FIG. 46 illustrates a distal perspective view of an on-skin wearable medical device.

Referring to FIG. 46, a distal perspective view of a housing 2090 for an on-skin wearable medical device system is shown. The housing 2090 may be configured similarly as the housing 2010 shown in FIG. 40 unless stated otherwise. The housing 2090 may include a distal surface 2092 configured to face towards skin. The distal surface 2092 may extend radially outward to an outer perimeter 2094 of the housing 2090. The housing 2090 may include one or more side surfaces 2096 that may meet the distal surface 2092 at the outer perimeter 2094. The housing 2090 may include a proximal surface that may be configured similarly as the proximal surface 2098 shown in FIG. 40 for example.

The housing 2090, in examples, may include recesses 2100 at the outer perimeter 2094 of the housing 2090. The recesses 2100 may extend radially inward on the distal surface 2092 of the housing 2090. The recesses 2100 may comprise cavities in the side surfaces 2096 of the housing 2090. The recesses 2100 may be configured to receive retention elements 920a, b shown in FIG. 26A for example, or may have other uses as desired.

The distal surface 2092 of the housing 2090 may include a cavity 2102 that may be configured similarly as the cavity 2012 shown in FIG. 40 for example. The cavity 2102, for example, may comprise a recess in the distal surface 2092 of the housing 2090 that may extend proximally from the distal surface 2092. The cavity 2102 may be configured to receive a portion of a transcutaneous analyte sensor, similar to the configuration of the cavity 2012 shown in FIG. 40. The cavity 2102 may further include an insertion channel 2104 configured for the insertion element 915 to pass through to insert a transcutaneous analyte sensor into the host's skin, similar to the configuration of the insertion channel 2026 shown in FIG. 40.

The distal surface 2092 of the housing 2090 may include a central region 2106 and a peripheral region 2108 positioned radially outward of the central region 2106. The central region 2106 may comprise a region of the distal surface 2092 that the transcutaneous analyte sensor may insert into the skin at (e.g., at the insertion channel 2104 of the housing 2090). The peripheral region 2108 may be positioned proximate the outer perimeter 2094 of the housing 2090.

Referring to FIG. 46, in embodiments, the distal surface 2092 of the housing 2090 may include at least one channel forming at least a portion of one or more moisture passageways configured for removal of moisture positioned distal of the housing. For example, a channel 2110 may comprise a cut out portion or recess in the distal surface 2092 extending proximally from the distal surface 2092. The channel 2110 may be configured for moisture to pass through for removal of the moisture from distal of the housing. The channel 2110, for example, may extend from the cavity 2102 outward to the outer perimeter 2094 of the housing 2090. The channel 2110 may connect the cavity 2102 to the side surface 2096 and may comprise a cut out portion of the side surface 2096.

The channel 2110 may be configured for removal of moisture in a direction towards the outer perimeter 2094 of the housing 2090. The channel 2110, for example, may allow moisture to move through the channel 2110 to the outer perimeter 2094 of the housing 2090. The moisture may be present in the cavity 2102 or elsewhere relative to the housing 2090.

In embodiments, the channel 2110 may be configured for removal of moisture positioned proximate an insertion site of a transcutaneous analyte sensor into the skin. The transcutaneous analyte sensor, for example, may insert into the skin distal of the insertion channel 2104. Moisture proximate the insertion site of the transcutaneous analyte sensor into the skin may be positioned within the cavity 2102. The moisture may be conveyed to the channel 2110 for removal outward of the outer perimeter 2094 of the housing 2090. The moisture may be removed for evaporation or other removal of the moisture from proximate the system.

In embodiments, the channel 2110 may be configured for wicking moisture that is positioned distal of the housing 2090. The channel 2110, for example, may have a geometry or other configuration that produces wicking. The wicking may convey the moisture outward of the outer perimeter 2094 of the housing 2090, for evaporation or other removal of the moisture from proximate the system.

A patch may be coupled to the housing 2090 and may be configured similarly as embodiments of patches disclosed herein. A patch, for example, may include a first surface for engaging skin, similar to the surface 1910 shown in FIG. 39A. The patch may be positioned distal of the housing 2090. The patch may overlay the distal surface 2092 of the housing 2090 and may cover the cavity 2102 and the channel 2110. The channel 2110, however, may be raised proximally from a proximal surface of the patch, and may be configured to remove moisture positioned between the patch and the distal surface 2092 of the housing 2010.

The patch may have a variety of configurations in embodiments. For example, the patch may lack a puncture layer in embodiments, and may comprise a single layer or multiple layers as desired. The patch may include an adhesive layer 1908 and a base layer 1906 as shown in FIG. 39A, for example, yet may exclude a puncture layer. In embodiments, the patch may include a puncture layer.

Figure 47A:
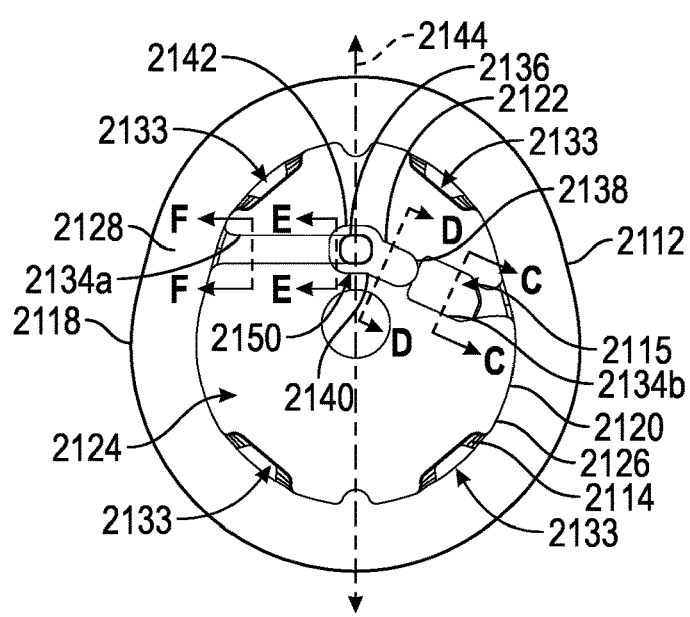
FIG. 47A illustrates a distal view of an on-skin wearable medical device.

FIG. 47A illustrates a distal view of a patch 2112 including one or more moisture passageways configured for removal of moisture. The moisture may be positioned distal of a housing 2114 of an on-skin wearable medical device system. The housing 2114 may be configured similarly as the housing 2090 shown in FIG. 46. The housing 2114, for example, may include a cavity 2115 that may be configured similarly as the cavity 2102 shown in FIG. 46. The housing 2114, however, may exclude or include the channel 2110 shown in FIG. 46 in embodiments.

The patch 2112 may include at least one channel that may form at least a portion of the one or more moisture passageways. The at least one channel may be formed in a variety of manners. For example, the at least one channel may be formed as a cut out in a surface or portion of the patch that may form the channel. In embodiments, the patch may be configured to include a plurality of layers that are layered together in a manner to form at least one channel. Combinations of layers and cut outs, or other features, may be utilized in embodiments as desired.

Figure 47B:
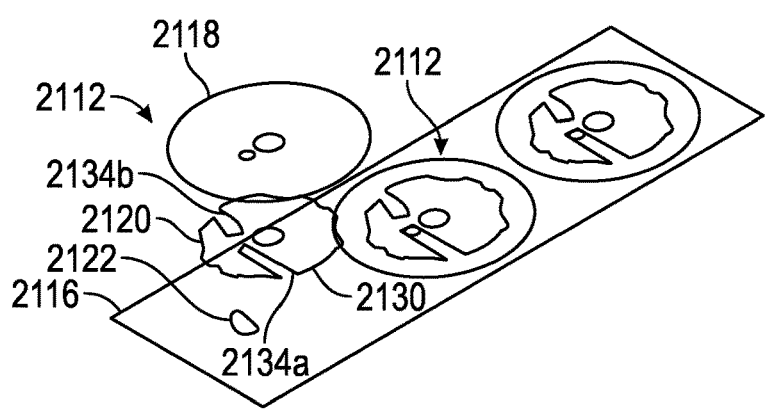
FIG. 47B illustrates an assembly view of the patch shown in FIG. 47A.

FIG. 47B, for example, illustrates an assembly view of the patch 2112. FIG. 47B illustrates the patch 2112 with the layers of the patch 2112 separated, and illustrates patches 2112 assembled upon a backing layer 2116.

The patch 2112 may include a plurality of layers, which may include a base layer 2118, an adhesive layer 2120, and a puncture layer 2122. The base layer 2118 may be configured similarly as the base layer 1906 shown in FIG. 39A, for example. The base layer 2118 may include a first surface 2124 for engaging skin, similar to the surface 1910 shown in FIG. 39A. The base layer 2118 may be configured to protrude radially outward from the outer perimeter 2126 of the housing 2114 to form a skirt portion 2128 (marked in FIG. 47A) of the patch 2112.

The base layer 2118 may be positioned distal of the adhesive layer 2120. The adhesive layer 2120 may be configured similarly as the adhesive layer 1908 shown in FIG. 39A, yet may include different features identified herein. For example, the adhesive layer 2120 may be shaped to have an outer perimeter 2130 that extends to an outer perimeter 2126 of the housing 2114. The adhesive layer 2120 may include recesses at the outer perimeter of the adhesive layer 2120 that may match a shape of recesses 2133 in the outer perimeter 2126 of the housing 2114.

The adhesive layer 2120 may include cut outs 2134a, b forming channels in the adhesive layer 2120. Two cut outs 2134a, b are shown in FIGS. 47A and 47B, yet a greater or lesser number may be provided in embodiments. The cut outs 2134a, b may comprise channels that form at least a portion of the one or more moisture passageways.

The adhesive layer 2120 may be layered proximally upon the base layer 2118 and may include a distal adhesive surface for coupling with the base layer 2118. The adhesive layer 2120 may further include a proximal adhesive surface for adhering to a distal surface of the housing 2114 and for adhering to a distal surface of the puncture layer 2122.

The puncture layer 2122 may be configured similarly as the puncture layer 1902 shown in FIG. 39A unless stated otherwise. The puncture layer 2122 may be positioned upon the adhesive layer 2120 and may be sandwiched between the adhesive layer 2120 and a distal surface of the housing 2114. The puncture layer 2122 may be adhered to the adhesive layer 2120.

In embodiments, the puncture layer 2122 may lack an adhesive. Such a feature may reduce the possibility of adhesion between the puncture layer 2122 and an insertion element or transcutaneous analyte sensor passing through the puncture layer 2122. In embodiments, the puncture layer 2122 may include an adhesive.

Referring to FIG. 47A, the puncture layer 2122 may include a puncture portion 2136 and a support portion 2138 positioned radially outward of the puncture portion 2136. The support portion 2138 may be configured similarly as the support portion 2002 shown in FIG. 39B, for example, and may include an elongate arm 2140 and a ring portion 2142 surrounding the puncture portion 2136.

The elongate arm 2140 may extend at an angle relative to a longitudinal axis 2144 of the housing 2114. The elongate arm 2140 may extend along a longitudinal axis of the cavity 2115, similar to the elongate arm 2030 shown in FIG. 41A for example. The puncture layer 2122 may form a V-shape as shown in FIG. 47A. The V-shape may be formed by the angle between the elongate arm 2140 and the ring portion 2142.

The cut-out portion 2134b of the adhesive layer 2120 may comprise a channel that forms at least a portion of a moisture passageway for removal of moisture positioned distal of the housing 2114. The cut-out portion 2134b, for example, extends outward to the outer perimeter 2126 of the housing 2114 for removal of moisture. The cut-out portion 2134b may extend along the cavity 2115 of the housing 2114 to convey moisture that may be positioned along the cavity 2115 towards the outer perimeter 2126 of the housing 2114.

Figure 47C:
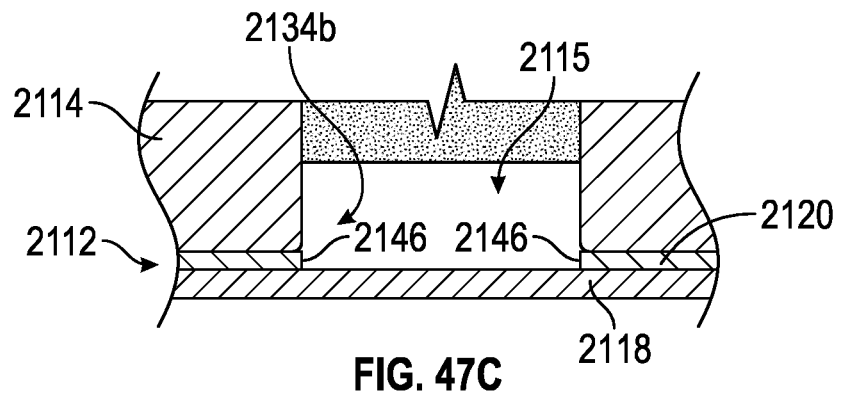
FIG. 47C illustrates a cross sectional schematic view of a portion of the on-skin wearable medical device shown in FIG. 47A, along line C-C shown in FIG. 47A.

FIG. 47C illustrates a cross sectional view of the housing 2114 and patch 2112 along line C-C shown in FIG. 47A. The cut-out portion 2134b of the adhesive layer 2120 is shown to include side walls 2146 that bound the channel extending along the cavity 2115 for removal of moisture distal of the housing 2114.

Figure 47D:
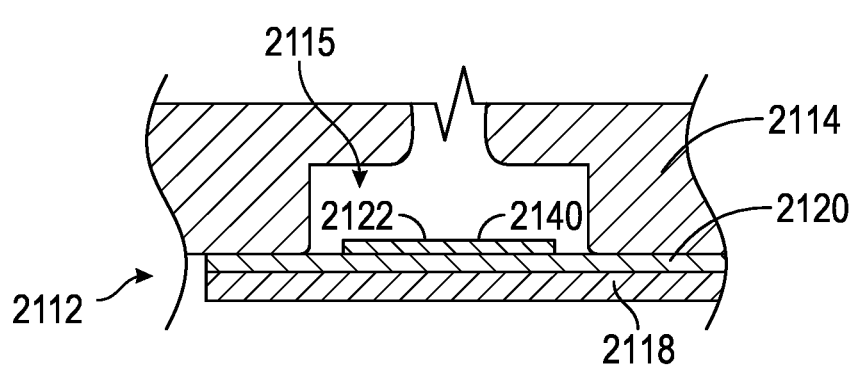
FIG. 47D illustrates a cross sectional schematic view of a portion of the on-skin wearable medical device shown in FIG. 47A, along line D-D shown in FIG. 47A.

FIG. 47D illustrates a cross sectional view of the housing 2114 and patch 2112 along line D-D shown in FIG. 47A. The elongate arm 2140 of the puncture layer 2122 is shown to extend along the cavity 2115. The space provided around the puncture layer 2122 may comprise a channel allowing moisture to pass into the portion of the channel shown in FIG. 47C and to the outer perimeter 2126 of the housing 2114 (marked in FIG. 47A).

The configuration of the channel shown in FIGS. 47C and 47D may allow for removal of moisture proximate an insertion site of the transcutaneous analyte sensor into the skin. For example, moisture positioned at the puncture portion 2136 shown in FIG. 47A may be able to travel along the elongate arm 2140 of the support portion 2138 and to the channel shown in FIG. 47C. As such, a reduced possibility of moisture accumulation and possible infection or other adverse results at the insertion site may result. The moisture may be removed in a direction towards the outer perimeter 2126 of the housing 2114 (marked in FIG. 47A). The moisture may comprise moisture positioned between the patch 2112 and the distal surface of the housing 2114.

Referring to FIG. 47A, the channel shown in FIGS. 47C and 47D may extend in a direction from a region 2150 of the patch 2112 that is proximate an insertion site of the transcutaneous analyte sensor into the skin towards the outer perimeter 2126 of the housing 2114.

The cut-out portion 2134a of the adhesive layer 2120 may comprise a second channel that forms at least a portion of a moisture passageway for removal of moisture positioned distal of the housing 2114. The cut-out portion 2134a of the adhesive layer 2120 may extend from the outer perimeter 2126 of the housing 2114 inward to the puncture portion 2136 of the puncture layer 2122. The cut-out portion 2134a may extend perpendicular with respect to the longitudinal axis 2144 of the housing 2114 or may have another angle as desired.

Figure 47E:
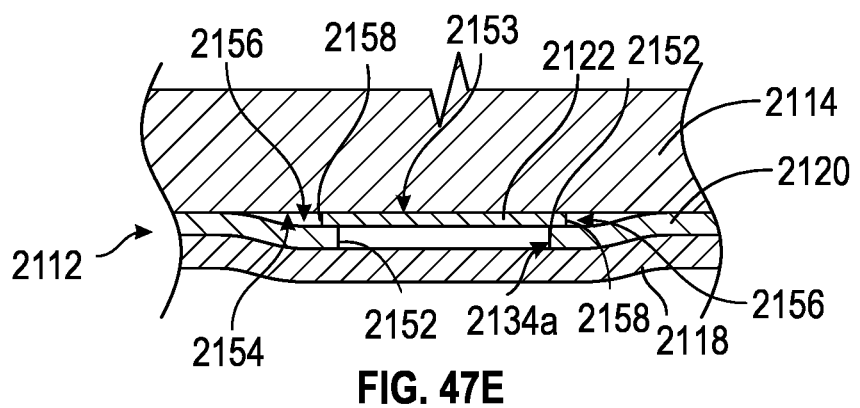
FIG. 47E illustrates a cross sectional schematic view of a portion of the on-skin wearable medical device shown in FIG. 47A, along line E-E shown in FIG. 47A.

The puncture layer 2122 may overlap the cut-out portion 2134a proximate the insertion site of the transcutaneous analyte sensor into the skin and at the ring portion 2142 of the puncture layer 2122. FIG. 47E illustrates a cross sectional view of the housing 2114 and patch 2112 along line E-E in FIG. 47A. The cut-out portion 2134a of the adhesive layer 2120 is shown to include side walls 2152 that bound the channel positioned between the base layer 2118 and the distal surface 2154 of the housing 2114, and the puncture layer 2122, for removal of moisture distal of the housing 2114. The channel shown in FIG. 47E may connect with the channel shown in FIG. 47F.

The puncture layer 2122 may further space the adhesive layer 2120 from the distal surface 2154 of the housing 2114 to form channels 2156 along the side walls 2158 of the puncture layer 2122. The channels 2156 may comprise gaps formed by the adhesive layer 2120 bending about the puncture layer 2122 to contact the distal surface 2154 of the housing 2114. The channels 2156 may comprise moisture passageways for removal of moisture. The channels 2156 may convey the moisture to the channel shown in FIG. 47F for removal.

In embodiments, one or more moisture passageways may be formed between a proximal surface 2153 of the puncture layer 2122 and the distal surface 2154 of the housing 2114. For example, the proximal surface 2153 of the puncture layer 2122 may lack an adhesive to the distal surface 2154 of the housing 2114. As such, moisture may be conveyed in a passageway between the proximal surface 2153 of the puncture layer 2122 and the distal surface 2154 of the housing 2114.

Figure 47F:
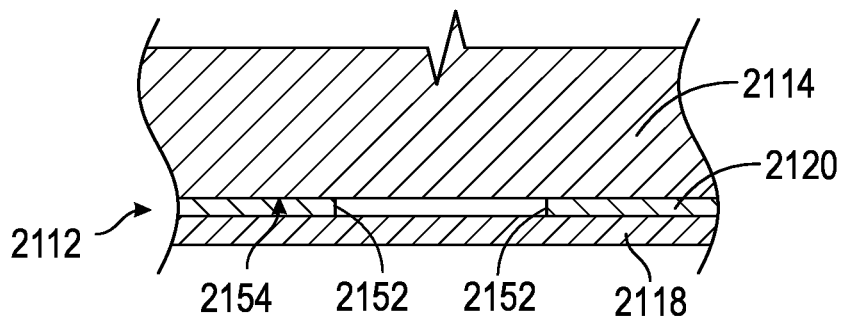
FIG. 47F illustrates a cross sectional schematic view of a portion of the on-skin wearable medical device shown in FIG. 47A, along line F-F shown in FIG. 47A.

FIG. 47F illustrates a cross sectional view of the housing 2114 and patch 2112 along line F-F shown in FIG. 47A. The side walls 2152 are shown to bound the channel positioned between the base layer 2118 and the distal surface 2154 of the housing 2114. The channel shown in FIG. 47F may convey moisture to the outer perimeter 2126 of the housing 2114.

The configuration of the channels shown in FIGS. 47E and 47F may allow for removal of moisture proximate an insertion site of the transcutaneous analyte sensor into the skin. For example, moisture positioned at the puncture portion 2136 shown in FIG. 47A may be able to travel through the channels shown in FIGS. 47E and 47F. As such, a reduced possibility of moisture accumulation and possible infection or other adverse results at the insertion site may result. The moisture may be removed in a direction towards the outer perimeter 2126 of the housing 2114 (marked in FIG. 47A). The moisture may comprise moisture positioned between the patch 2112 and the distal surface of the housing 2114.

Referring to FIG. 47A, the channels shown in FIGS. 47E and 47F may extend in a direction from a region 2150 of the patch 2112 that is proximate an insertion site of the transcutaneous analyte sensor into the skin towards the outer perimeter 2126 of the housing 2114.

In embodiments, one or more of the channels or moisture passageways referred to in FIGS. 47A-F may be configured for wicking moisture that is positioned distal of the housing 2114. The channels or moisture passageways, for example, may have a geometry or other configuration that produces wicking. The wicking may convey the moisture outward of the outer perimeter 2126 of the housing 2114, for evaporation or other removal of the moisture from proximate the system.

In embodiments, the configuration of the moisture passageways may be varied as desired.

Figure 48A:
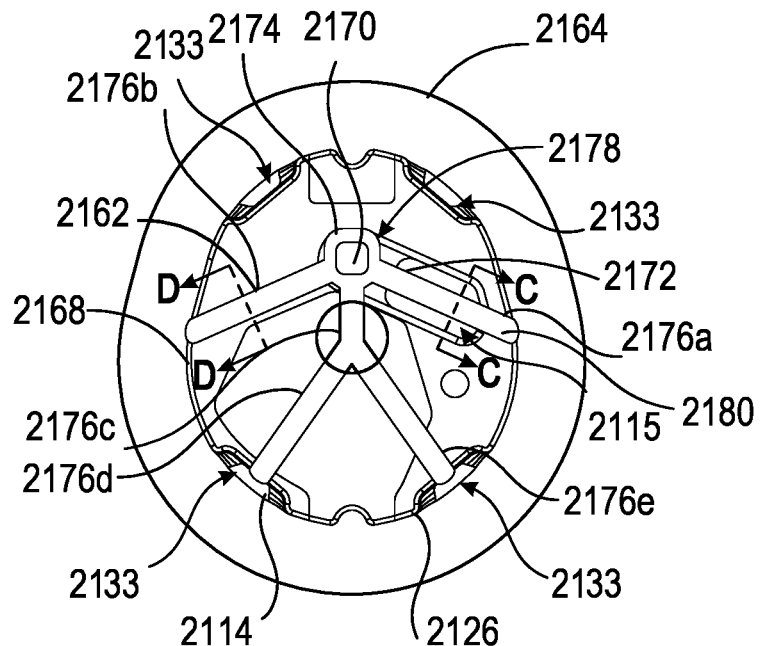
FIG. 48A illustrates a distal view of an on-skin wearable medical device.

FIG. 48A illustrates an embodiment including the housing 2114 and the base layer 2118 shown in FIG. 47A, for example. The configuration of the adhesive layer 2160 and the puncture layer 2162 may be similar to the configuration of the respective adhesive layer 2120 and puncture layer 2122 shown in FIG. 47A unless stated otherwise.

Figure 48B:
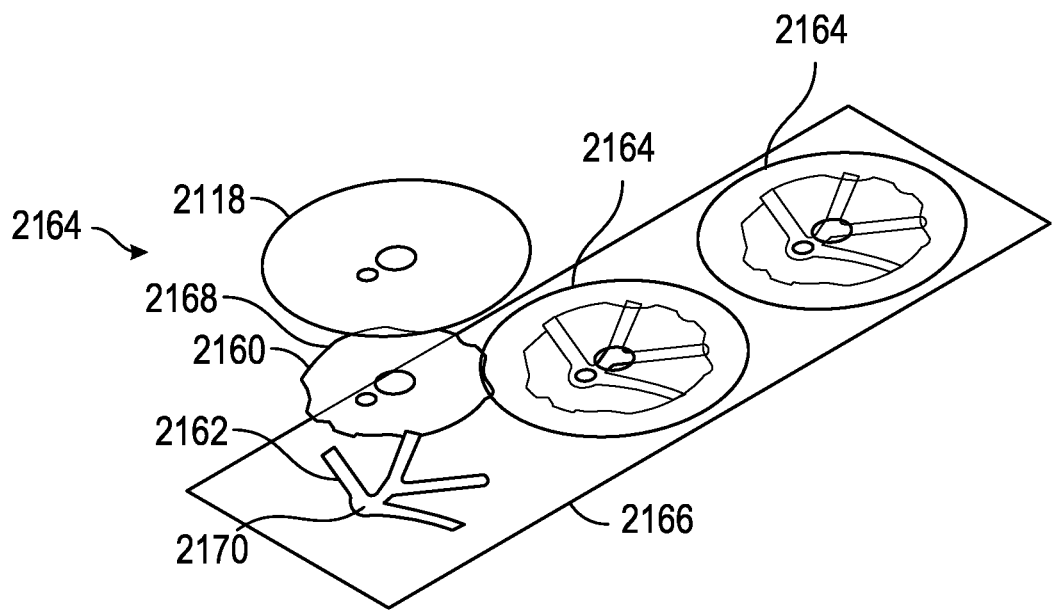
FIG. 48B illustrates an assembly view of the patch shown in FIG. 48A.

FIG. 48B illustrates an assembly view of the patch 2164. FIG. 48B illustrates the patch 2164 with the layers of the patch 2164 separated, and illustrates patches 2164 assembled upon a backing layer 2166.

Referring to FIGS. 48A and 48B, the adhesive layer 2160 may be shaped to have an outer perimeter 2168 that extends to an outer perimeter 2126 of the housing 2114. The adhesive layer 2160 may include recesses at the outer perimeter of the adhesive layer 2160 that may match a shape of recesses 2133 in the outer perimeter 2126 of the housing 2114. The adhesive layer 2160 may include a distal adhesive surface configured to adhere to the base layer 2118 and may include a proximal adhesive surface configured to adhere to a distal surface of the housing 2114 and the puncture layer 2162.

The puncture layer 2162 may include a puncture portion 2170 that may be configured similarly as the puncture portion 2136 shown in FIG. 47A. The support portion 2172 of the puncture layer 2162 may include a ring portion 2174 that may be positioned circumferentially about the puncture portion 2170. The support portion 2172 may include one or more elongate arms 2176a-e that may each extend radially outward from the puncture portion 2170 of the puncture layer 2162.

In embodiments, the elongate arms 2176a-e may extend in a direction from a region 2178 of the patch 2164 proximate an insertion site of the transcutaneous analyte sensor into the skin towards the outer perimeter 2126 of the housing 2114. The elongate arms 2176a, b, d, e may be angled with respect to the longitudinal axis of the housing 2114, and the elongate arm 2176c may be centered along the longitudinal axis of the housing 2114 and may extend along the longitudinal axis of the housing 2114.

At least two of the elongate arms 2176a-e may intersect. For example, the elongate arm 2176e may intersect with the elongate arm 2176c. The elongate arm 2176d may also intersect with the elongate arm 2176c. The elongate arms 2176d, e may form a V-shape for the puncture layer 2162 due to the angle of the elongate arm 2176d relative to the elongate arm 2176e. The elongate arms 2176a, 2176b may similarly form a V-shape for the puncture layer 2162 due to the angle between the elongate arms 2176a, b.

The elongate arm 2176a may extend along the longitudinal axis of the cavity 2115. The elongate arm 2176a may extend from the puncture portion 2170 to the outer perimeter 2126 of the housing 2114. In embodiments, the elongate arm 2176a may protrude from the outer perimeter 2126 of the housing 2114 as shown FIG. 48A for example.

Figure 48C:
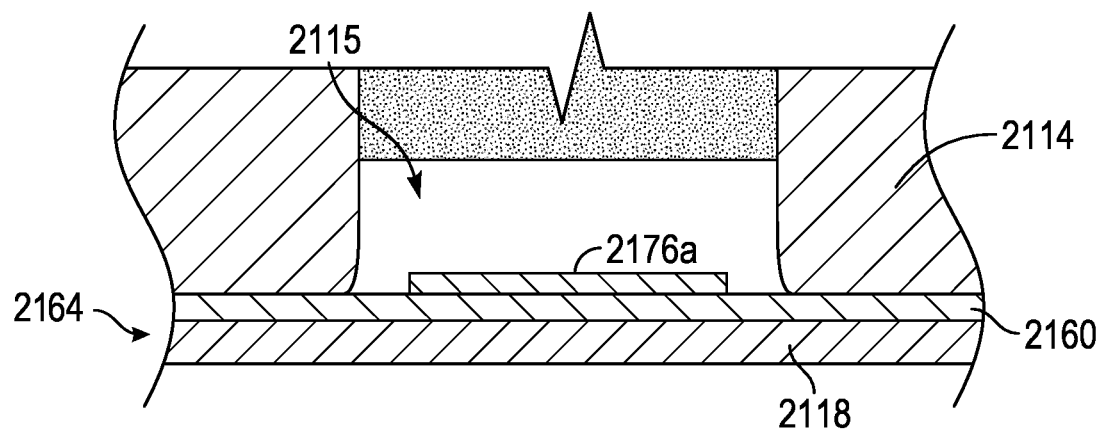
FIG. 48C illustrates a cross sectional schematic view of a portion of the on-skin wearable medical device shown in FIG. 48A, along line C-C shown in FIG. 48A.

FIG. 48C illustrates a cross sectional view of the patch 2164 and the housing 2114 along line C-C shown in FIG. 48A. The elongate arm 2176a of the puncture layer 2162 is shown to extend along the cavity 2115. The space provided around the elongate arm 2176a may comprise a channel allowing moisture to pass outward from the outer perimeter 2126 of the housing 2114 (marked in FIG. 48A). At a portion 2180 of the elongate arm 2176a positioned outward of the cavity 2115 (marked in FIG. 48A), the elongate arm 2176a may form channels for removal of moisture in a similar manner as discussed with regard to the elongate arm 2176b.

The elongate arm 2176b may extend from the puncture portion 2170 to the outer perimeter 2126 of the housing 2114. In embodiments, the elongate arm 2176b may protrude from the outer perimeter 2126 of the housing 2114 as shown FIG. 48A for example.

Figure 48D:
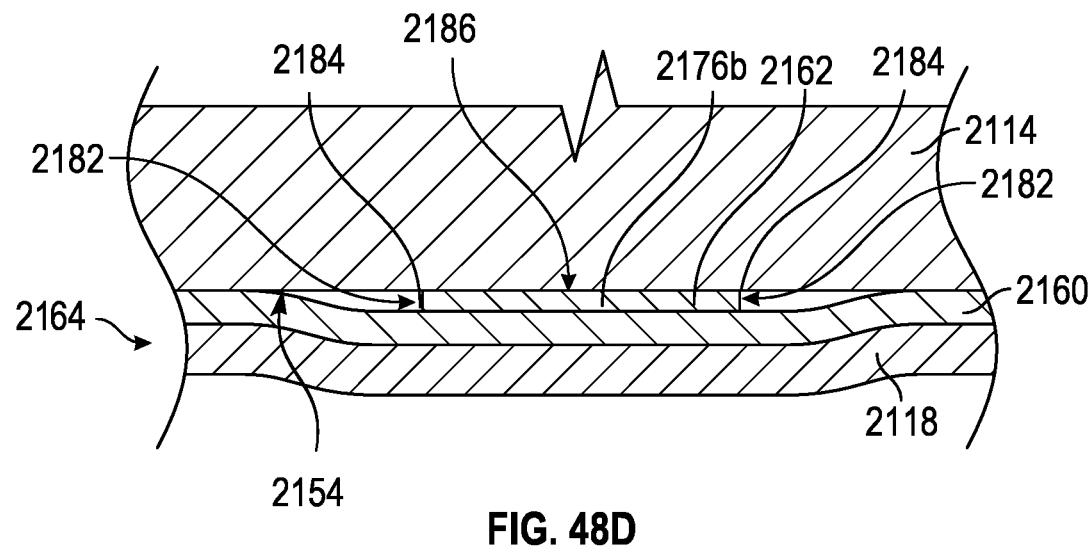
FIG. 48D illustrates a cross sectional schematic view of a portion of the on-skin wearable medical device shown in FIG. 48A, along line D-D shown in FIG. 48A.

FIG. 48D illustrates a cross sectional view of the patch 2164 and the housing 2114 along line D-D shown in FIG. 48A.

The elongate arm 2176b may space the adhesive layer 2160 from the distal surface 2154 of the housing 2114 to form channels 2182 along the side walls 2184 of the puncture layer 2162. The channels 2182 may comprise gaps formed by the adhesive layer 2160 bending about the elongate arm 2176b to contact the distal surface 2154 of the housing 2114. The channels 2182 may comprise moisture passageways for removal of moisture. The channels 2182 may convey the moisture to the outer perimeter 2126 of the housing 2114 as shown FIG. 48A for example.

In embodiments, one or more moisture passageways may be formed between a proximal surface 2186 of the puncture layer 2162 and the distal surface 2154 of the housing 2114. For example, the proximal surface 2186 of the puncture layer 2162 may lack an adhesive to the distal surface 2154 of the housing 2114. As such, moisture may be conveyed in a passageway between the proximal surface 2186 of the puncture layer 2162 and the distal surface 2154 of the housing 2114. The moisture passageways may extend along one or more of the elongate arms 2176a-e or the ring portion 2174 shown in FIG. 48A.

The elongate arms 2176a, b may extend laterally outward from the puncture portion 2170 to the outer perimeter 2126 of the housing 2114. The elongate arm 2176c may extend longitudinally along the housing 2114 from the puncture portion 2170. The elongate arms 2176d, e may join with the elongate arm 2176c and may be angled laterally with respect to the elongate arm 2176c.

The elongate arm 2176d may extend to a cavity or recess 2133 of the housing 2114 and may protrude from the recess 2133 (as shown in FIG. 48A). The elongate arm 2176e may extend to the recess 2133 of the housing 2114 and may protrude from a circumferentially adjacent recess 2133 (as shown in FIG. 48A). The position of the elongate arms 2176d, e protruding from the cavities or recesses 2133 may aid with removal of moisture from distal of the housing 2114.

The elongate arms 2176c, d, e may be configured to form one or more moisture passageways in a similar manner as the elongate arm 2176b.

The configuration of the channels resulting from the puncture layer 2162 may allow for removal of moisture proximate an insertion site of the transcutaneous analyte sensor into the skin. For example, moisture positioned at the puncture portion 2170 may be able to travel through channels produced by the elongate arms 2176a-e. As such, a reduced possibility of moisture accumulation and possible infection or other adverse results at the insertion site may result. The moisture may be removed in a direction towards the outer perimeter 2126 of the housing 2114 (marked in FIG. 48A). The moisture may comprise moisture positioned between the patch 2164 and the distal surface of the housing 2114.

The channels formed by the puncture layer 2162 may extend in a direction from a region 2178 of the patch 2164 that is proximate an insertion site of the transcutaneous analyte sensor into the skin towards the outer perimeter 2126 of the housing 2114.

In embodiments, one or more of the channels or moisture passageways referred to in FIGS. 48A-D may be configured for wicking moisture that is positioned distal of the housing 2114. The channels or moisture passageways, for example, may have a geometry or other configuration that produces wicking. The wicking may convey the moisture outward of the outer perimeter 2126 of the housing 2114, for evaporation or other removal of the moisture from proximate the system.

Figure 49A:
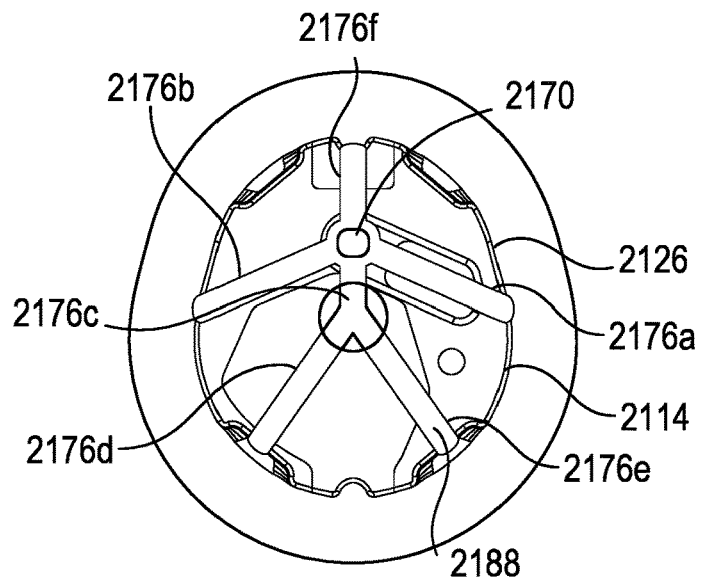
FIG. 49A illustrates a distal view of an on-skin wearable medical device.
Figure 49B:
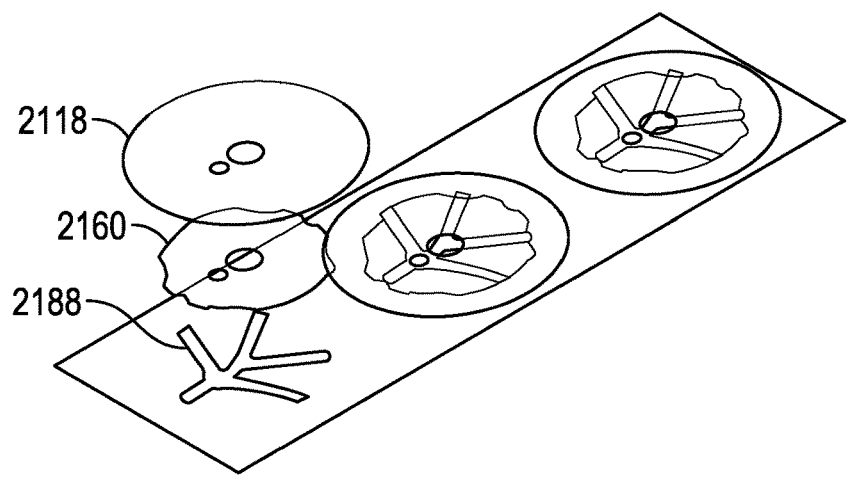
FIG. 49B illustrates an assembly view of the patch shown in FIG. 49A.

The configuration of the puncture layer 2162 may be varied in embodiments. FIGS. 49A and 49B, for example, illustrate an embodiment in which an additional elongate arm 2176f may be utilized. The elongate arm 2176f may extend longitudinally with respect to the housing 2114 and may couple to the puncture portion 2170. The elongate arm 2176f of the puncture layer 2188 may protrude from the outer perimeter 2126 of the housing 2114. The elongate arm 2176f may be configured to form one or more moisture passageways in a similar manner as the elongate arm 2176b shown in FIG. 48A.

Figure 50:
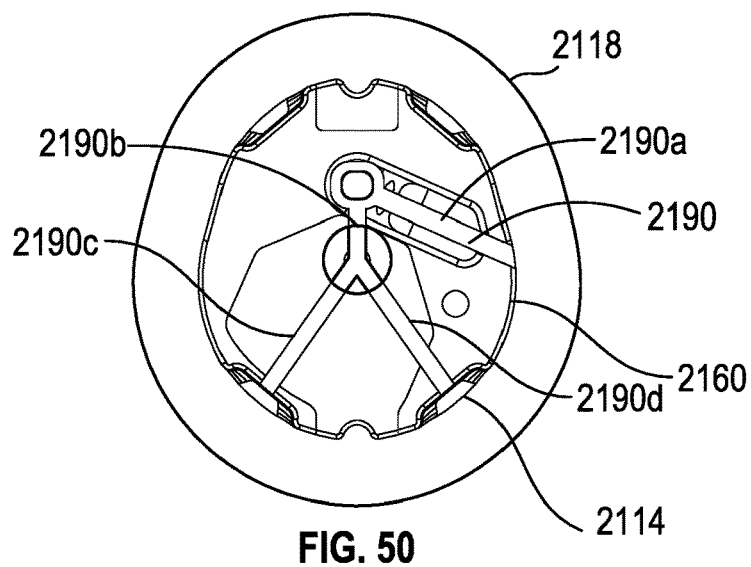
FIG. 50 illustrates a distal view of an on-skin wearable medical device.

FIG. 50 illustrates an embodiment in which the puncture layer 2190 includes four elongate arms 2190a-d. The elongate arms 2190a-d may be configured similarly as the respective elongate arms 2176a, c, d, e shown in FIG. 48A.

Figure 51:
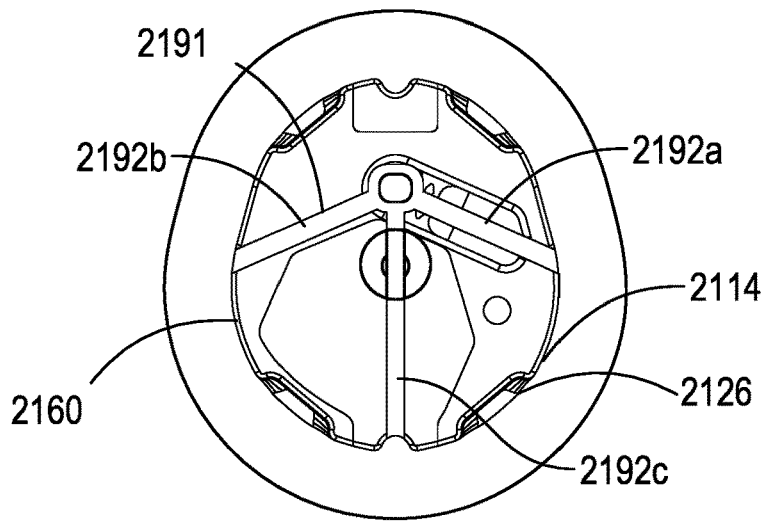
FIG. 51 illustrates a distal view of an on-skin wearable medical device.

FIG. 51 illustrates an embodiment in which the puncture layer 2191 includes three elongate arms 2192a-c. The elongate arms 2192a, b may be configured similarly as the respective elongate arms 2176a, b shown in FIG. 48A. The elongate arm 2192c may extend longitudinally with respect to the housing 2114 to the outer perimeter 2126 of the housing 2114.

Figure 52:
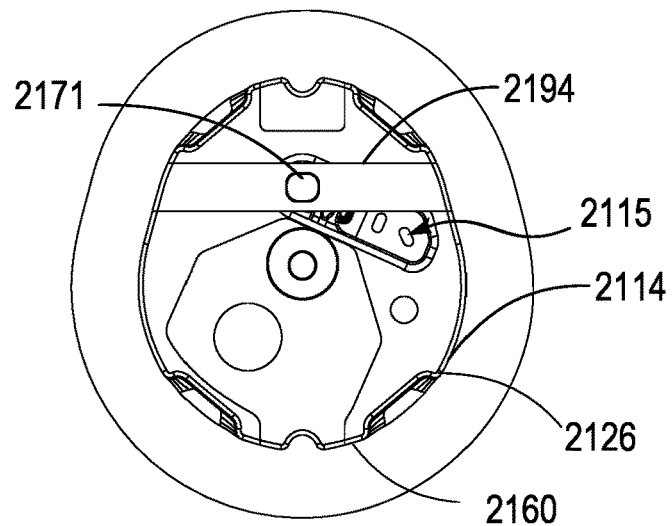
FIG. 52 illustrates a distal view of an on-skin wearable medical device.

FIG. 52 illustrates an embodiment in which a single elongate arm 2194 may be utilized that may extend from the puncture portion 2171 radially outward to the outer perimeter 2126 of the housing 2114. The elongate arm 2194 may be a straight elongate arm 2194 that may extend transverse or perpendicular to the longitudinal axis of the housing 2114. At least a portion of the elongate arm 2194 may overlap the cavity 2115. The elongate arm 2194 may be configured to provide one or more moisture passageways in a similar manner as discussed in regard to the elongate arms 2176a, b shown in FIG. 48A.

Figure 53:
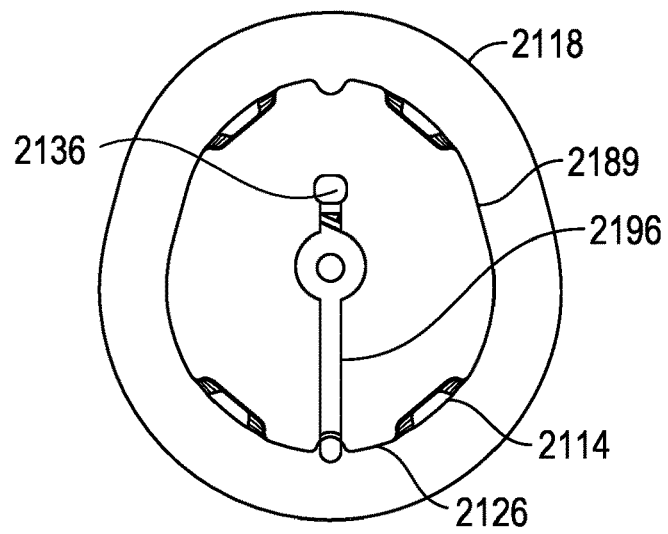
FIG. 53 illustrates a distal view of an on-skin wearable medical device.

In embodiments, variations of cut outs or channels in an adhesive layer may be provided. FIG. 53, for example illustrates an embodiment in which an adhesive layer 2189 may be provided between a puncture layer (such as the puncture layer 2122 shown in FIG. 47A) and a base layer (such as the base layer 2118 shown in FIG. 47B). The adhesive layer 2189 may include a cut out 2196 or channel that may extend longitudinally with respect to the housing 2114 from the puncture portion 2136 to the outer perimeter 2126 of the housing 2114. The cut out 2196 may extend along the longitudinal axis of the housing 2114. The cut out 2196 may form one or more moisture passageways in a similar manner as discussed with regard to the cut out shown in FIG. 47F for example.

Figure 54A:
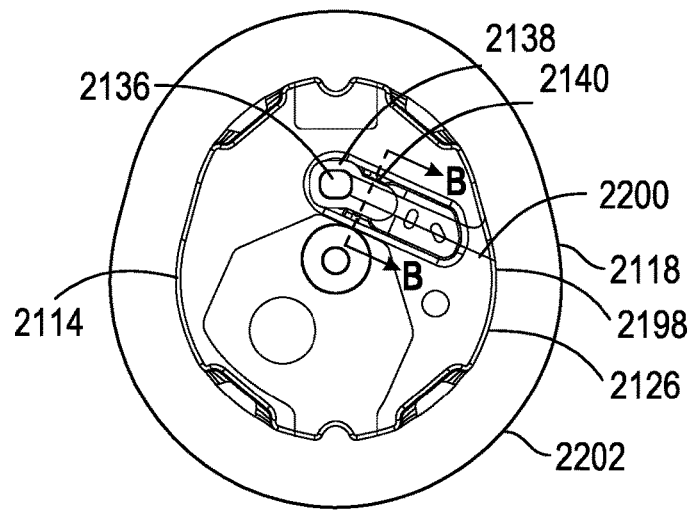
FIG. 54A illustrates a distal view of an on-skin wearable medical device.
Figure 54B:
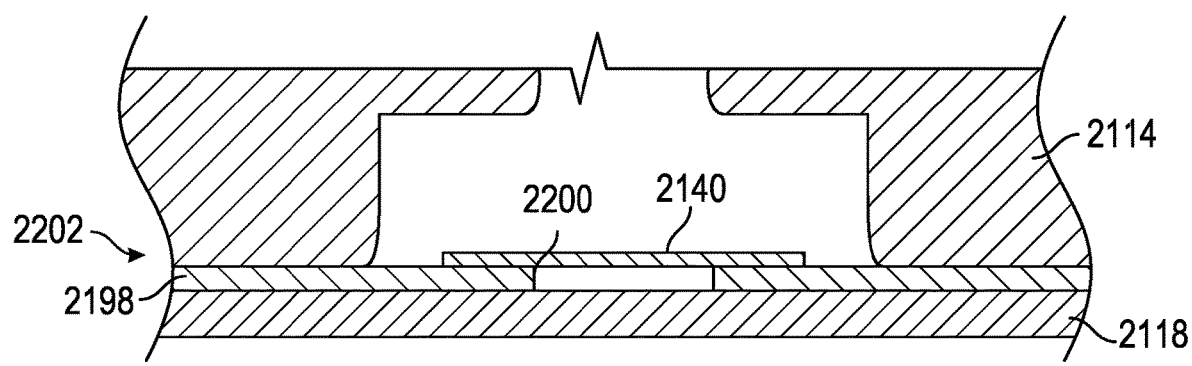
FIG. 54B illustrates a cross sectional schematic view of a portion of the on-skin wearable medical device shown in FIG. 54A, along line B-B shown in FIG. 54A.

FIG. 54A illustrates a variation of the configuration of the cut out 2134b shown in FIG. 47A. In the embodiment of FIG. 54A, an adhesive layer 2198 may include a cut out 2200 that may overlap the elongate arm 2140 of the support portion 2138 that is shown in FIG. 47A. The cut out 2200 may provide a channel distal of the elongate arm 2140 for removal of moisture. The cut out 2200 may extend from the puncture portion 2136 to the outer perimeter 2126 of the housing 2114. FIG. 54B, for example, illustrates a cross sectional view of the housing 2114 and patch 2202 along line B-B in FIG. 54A.

Figure 55A:
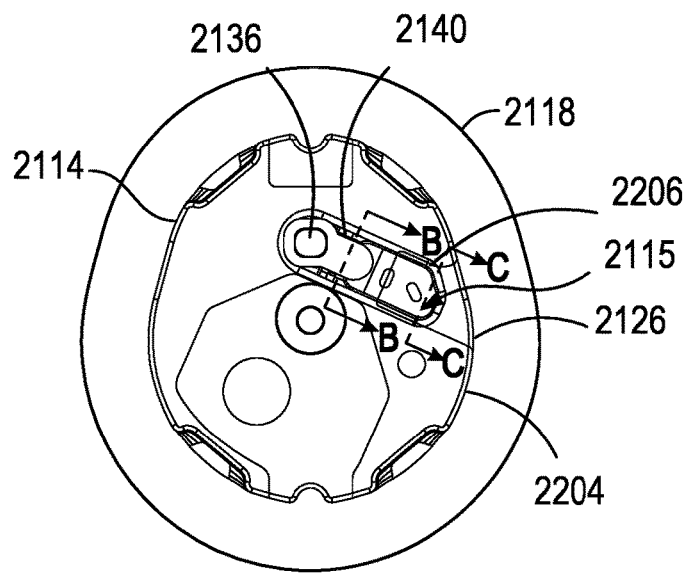
FIG. 55A illustrates a distal view of an on-skin wearable medical device.

In embodiments, a cut out of an adhesive layer 2204 may be spaced laterally from the puncture portion 2136. FIG. 55A, for example, illustrates a cut out 2206 of an adhesive layer 2204 laterally spaced from the elongate arm 2140 shown in FIG. 47A for example. Moisture may be conveyed from the cavity 2115 to the outer perimeter 2126 of the housing 2114 in a similar manner as discussed regarding the channels shown in FIGS. 47C and 47D for example.

Figure 55B:
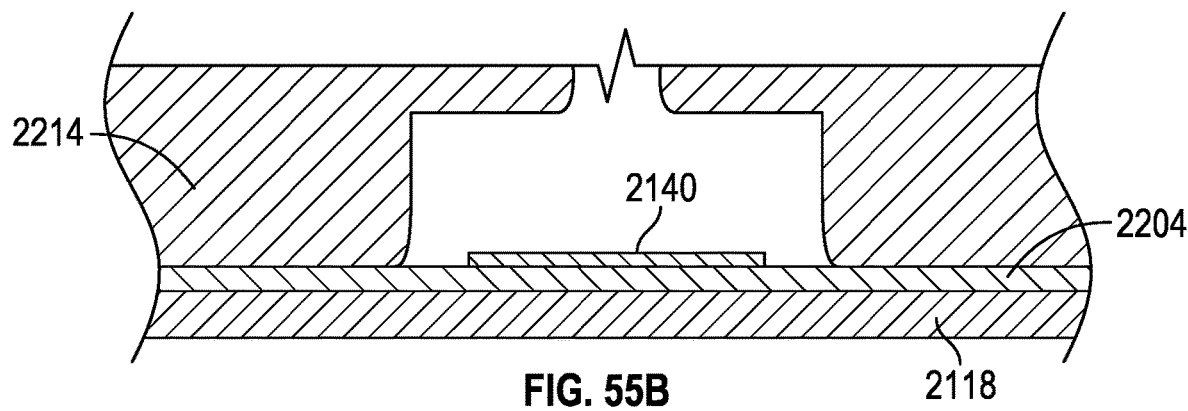
FIG. 55B illustrates a cross sectional schematic view of a portion of the on-skin wearable medical device shown in FIG. 55A, along line B-B shown in FIG. 55A.
Figure 55C:
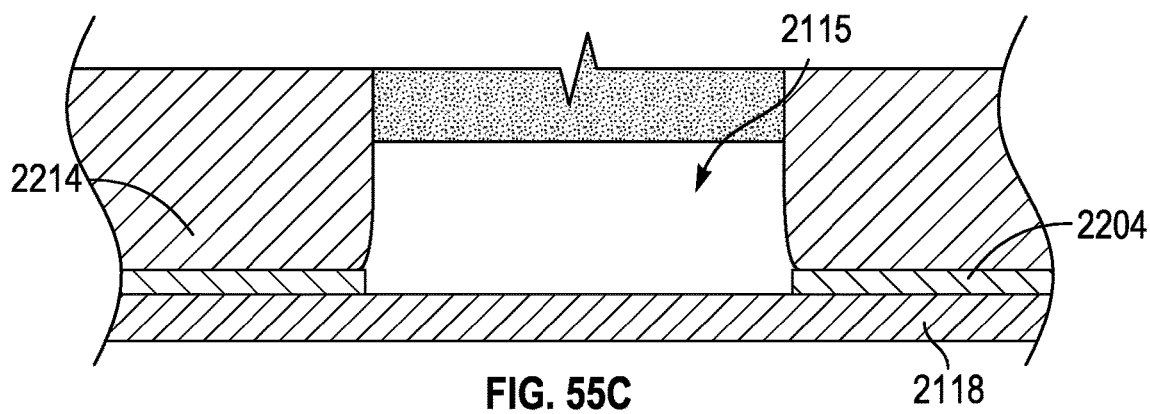

FIG. 55B, for example, illustrates a cross sectional view along line B-B in FIG. 55A. FIG. 55C illustrates a cross sectional view along line C-C in FIG. 55A.

Figure 56:
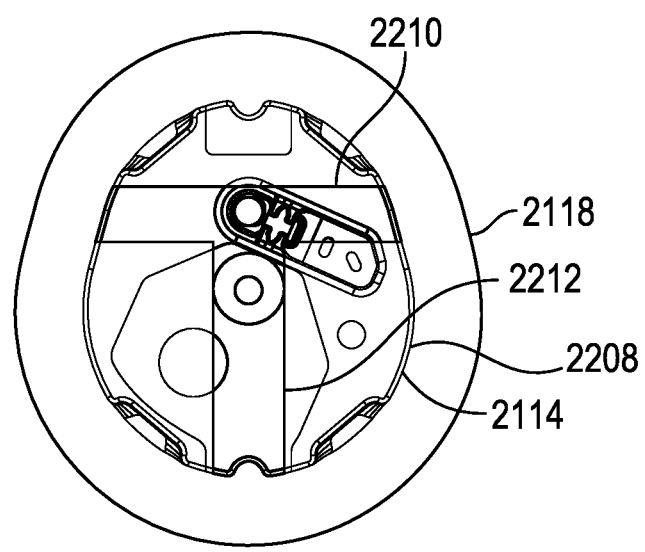

FIG. 56 illustrates an embodiment lacking a puncture layer. The adhesive layer 2208 may include a cut out 2210 extending laterally, in a similar manner as the elongate arm 2194 shown in FIG. 52. The adhesive layer 2208 may include a cut out 2212 extending longitudinally along the longitudinal axis of the housing 2114, and joining with the cut out 2210. The cut outs 2210, 2212 may form a "T" shape. The cut outs 2210, 2212 may be configured to form moisture passageways in a similar manner as shown in FIG. 47F.

The configuration of the moisture passageways shown in FIGS. 46-56 may allow for removal of moisture proximate an insertion site of the transcutaneous analyte sensor into the skin. For example, moisture positioned at a puncture portion may be able to travel through moisture passageways. As such, a reduced possibility of moisture accumulation and possible infection or other adverse results at the insertion site may result. The moisture may be removed in a direction towards an outer perimeter of a housing. The moisture may comprise moisture positioned between a patch and a distal surface of a housing in embodiments.

The moisture passageways may extend in a direction from a region of the patch that is proximate an insertion site of the transcutaneous analyte sensor into the skin towards an outer perimeter of the housing.

In embodiments, one or more of the moisture passageways may be configured for wicking moisture that is positioned distal of the housing. The moisture passageways, for example, may have a geometry or other configuration that produces wicking. The wicking may convey the moisture outward of the outer perimeter of the housing, for evaporation or other removal of the moisture from proximate the system.

In embodiments, combinations of one or more channels on a distal surface of a housing and on a patch may be utilized. In embodiments, one or more channels on a distal surface of a housing may be utilized solely, or one or more channels on a patch may be utilized solely.

The features of FIGS. 46-56 may be utilized solely or in combination with any method, system, or apparatus disclosed herein.

Figure 57:
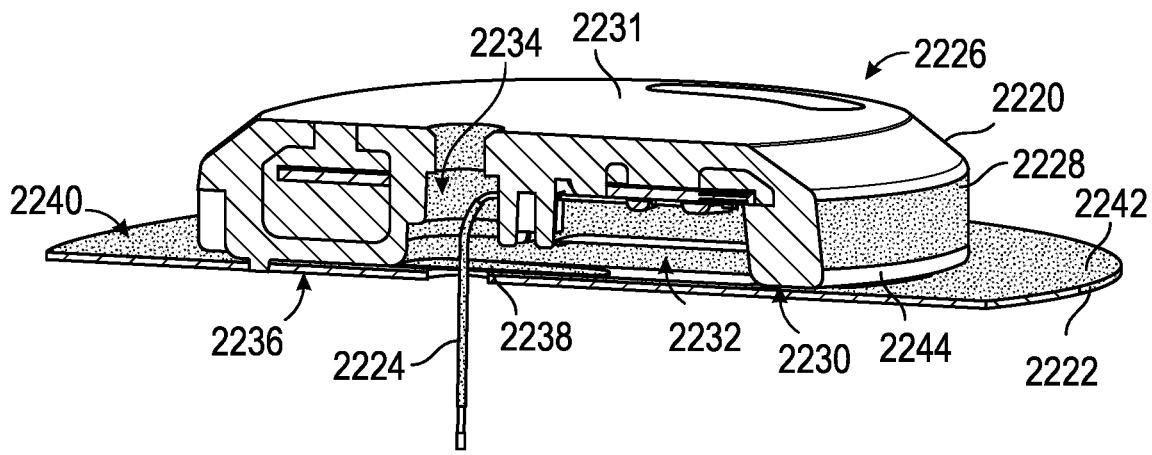

In embodiments, an antimicrobial agent may be coupled to at least a portion of a system. The system may comprise an on-skin wearable medical device system in embodiments. Referring to FIG. 57, for example, an on-skin wearable medical device system may include a housing 2220, a patch 2222, and a transcutaneous analyte sensor 2224. The housing 2220 may be configured similarly as the housing 2010 shown in FIG. 40 unless stated otherwise. The patch 2222 may be configured similarly as the patch 1900 shown in FIG. 40 unless stated otherwise. The transcutaneous analyte sensor 2224 may be configured similarly as the transcutaneous analyte sensor 1920 shown in FIG. 40 unless stated otherwise. The system may include a greater or lesser number of components as desired.

In embodiments, the antimicrobial agent may be positioned on at least a portion of the system to reduce the possibility of microbes or other pathogens from developing or propagating either prior to application of the system to a host's skin or following application of the system to a host's skin. The antimicrobial agent may comprise at least a portion of a surface of one or more of the housing 2220, the transcutaneous analyte sensor 2224, or the patch 2222, or other components of the system.

For example, referring to FIG. 57, an outer surface 2226 of the housing 2220 may include the antimicrobial agent. A portion of the outer surface 2226 comprising a side surface 2228 is shown in FIG. 57 having an antimicrobial agent applied to the surface. Other portions of an outer surface 2226 (e.g., a proximal surface 2231) may have an antimicrobial agent applied to the surface as desired. In embodiments, a distal surface 2230 of the housing 2220 for facing towards the skin may include the antimicrobial agent. A portion of the cavity 2232 may include the antimicrobial agent. For example, the surface of the insertion channel 2234 may include an antimicrobial agent. Such a position may reduce the possibility of microbes or other pathogens from being positioned proximate the insertion side of the sensor 2224 into the host's skin. In embodiments, an interior surface of a housing 2220 may include an antimicrobial agent.

A portion of the housing 2220 proximate an insertion site of the transcutaneous analyte sensor into the skin may include the antimicrobial agent.

At least a portion of a patch 2222 may include an antimicrobial agent. For example, a first surface or distal surface 2236 of the patch 2222 for engaging skin may include an antimicrobial agent. A region of the distal surface 2236 proximate an insertion site of the sensor 2224 into the skin may include an antimicrobial agent to reduce the possibility of microbes or other pathogens from being positioned at an entry site into the host's skin. In embodiments, a puncture layer 2238 of the patch 2222 may include an antimicrobial agent. Such a position may reduce the possibility of such pathogens proximate an entry site into the host's skin. Further, such a position may reduce the possibility of transfer of such pathogens to the sensor 2224. In embodiments a proximal surface 2240 of the patch 2222 may include the antimicrobial agent. The proximal surface 2240 may face opposite the distal surface 2230 of the housing 2220 and towards the distal surface 2230 of the housing 2220. The antimicrobial agent may be coupled to an adhesive for coupling the patch 2222 to the housing 2220.

A portion of the patch 2222 proximate an insertion site of the transcutaneous analyte sensor into the skin may include the antimicrobial agent.

In embodiments, the patch 2222 may include a skirt 2242 that may be positioned radially outward of the outer perimeter 2244 of the housing 2220. An antimicrobial agent may be coupled to a portion of the skirt 2242 in embodiments. Various portions of the patch 2222 or components of a patch may include an antimicrobial agent.

In embodiments, at least a portion of the transcutaneous analyte sensor 2224 may include an antimicrobial agent. For example, an outer surface that may be inserted into the skin of the host or another portion may include an antimicrobial agent.

The antimicrobial agents may be applied as a surface coating to the portion of the system or in another manner of application to the system. The antimicrobial agents may have a variety of forms, including one or more of iodine, silver, or chlorhexidine gluconate, among others.

In embodiments, the antimicrobial agents may include an antimicrobial adhesive. Such an adhesive may be utilized as any adhesive disclosed herein, for example an adhesive for adhering to skin of a host or an adhesive for coupling a patch to a housing, among other uses.

An antimicrobial agent may be utilized with any system disclosed herein.

A patch for use with a system may have a variety of forms. The patch, for example, may extend radially outward from an outer perimeter of a housing to form a skirt in embodiments. FIG. 57, for example, illustrates a patch 2222 extending radially outward from the outer perimeter 2244 of the housing 2220 and forming a skirt 2242.

Figure 58:
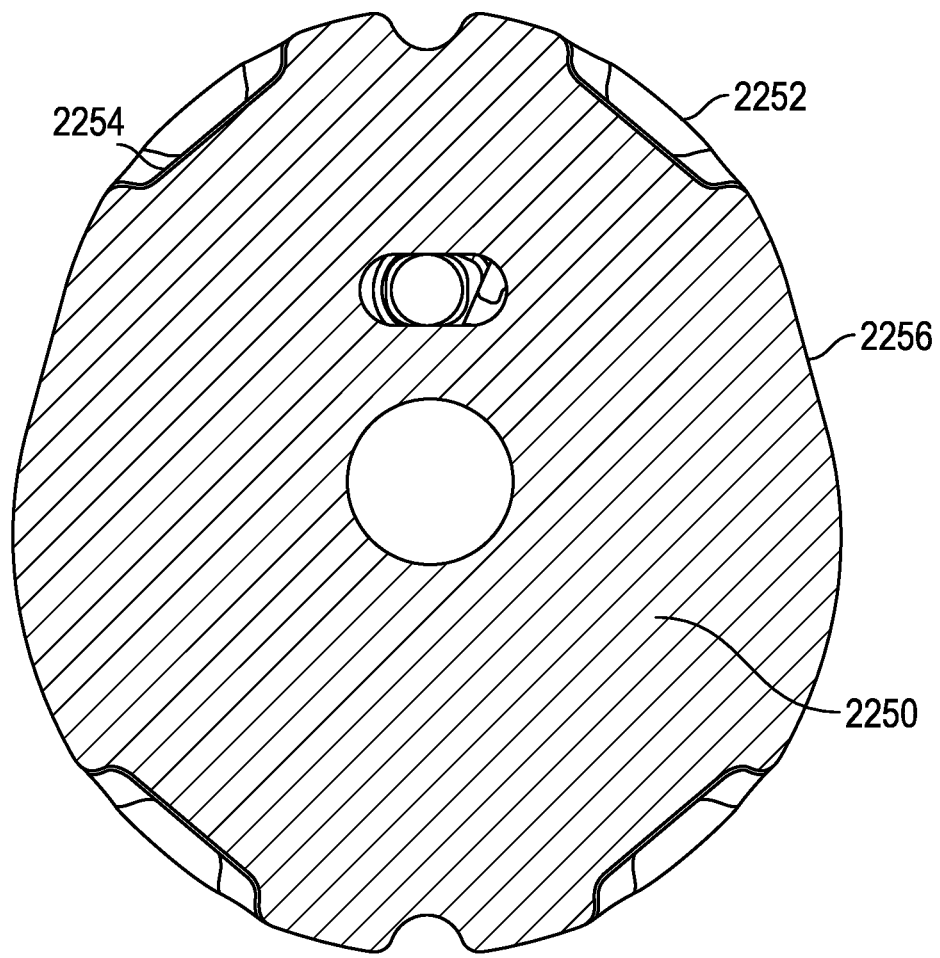

In embodiments, however, a patch may not extend outward from the outer perimeter of a housing. Referring to FIG. 58, for example, a patch 2250 may have the same radial extent as the housing 2252. The housing 2252 may be configured similarly as the housing 2010 shown in FIG. 40 unless stated otherwise. The housing 2252, for example, may have an outer perimeter 2254, and the outer perimeter 2256 of the patch 2250 may extend to the outer perimeter 2254 of the housing 2252. The shape of the outer perimeter 2256 of the patch 2250 may match the shape of the outer perimeter 2254 of the housing 2252.

Figure 59:
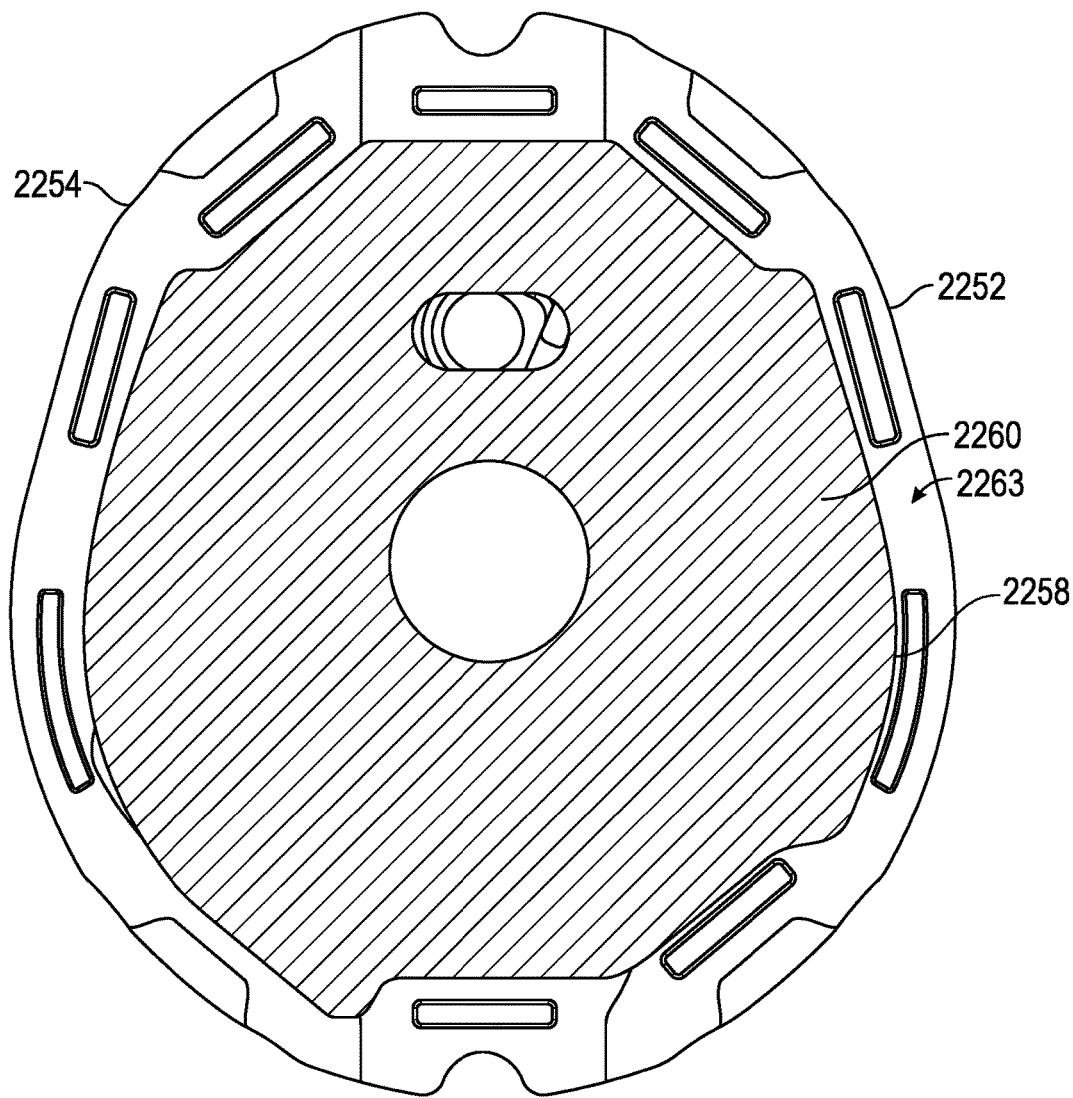

In embodiments, an outer perimeter 2258 of a patch 2260 may be recessed from an outer perimeter 2254 of a housing 2252. FIG. 59, for example, illustrates such a configuration. A circumferential buffer area 2263 may extend around the patch 2260 and may be positioned between the outer perimeter 2258 of the patch 2260 and the outer perimeter 2254 of the housing 2252.

Figure 60:
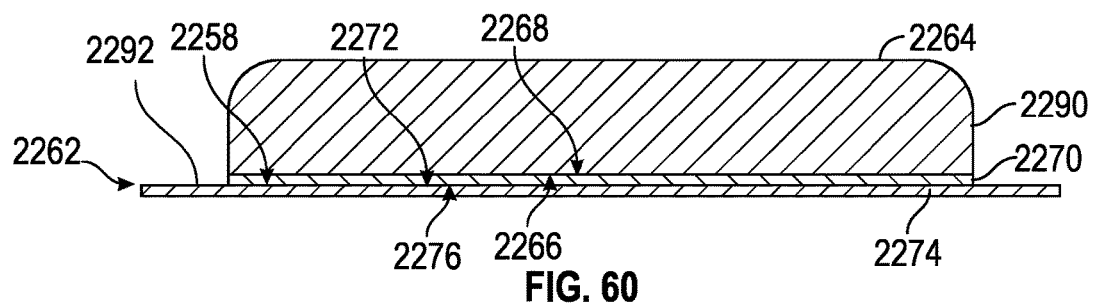

The features of the patches 2250, 2260 shown in FIGS. 58 and 60 may be utilized solely or with any method, apparatus, or system disclosed herein.

In embodiments, patches may be coupled to a housing solely with an adhesive. For example, FIG. 60 illustrates a cross sectional schematic view of a patch 2262 coupled to a housing 2264. The housing 2264 may be configured similarly as the housing 2010 shown in FIG. 40 unless stated otherwise. The patch 2262 may solely couple to the housing 2264 with an adhesive, for example to the distal surface 2266 of the housing 2010. The patch 2262 may couple to the housing 2010 in a variety of manners.

For example, an adhesive may be applied to a proximal surface 2268 of the patch 2262 that may adhere the proximal surface 2268 to the distal surface 2266 of the housing 2264. The adhesive may be positioned between the patch 2262 and the distal surface 2266 of the housing 2264. The adhesive may extend for the entirety of the surface area of the distal surface 2266 or only a portion of the surface area in embodiments. In embodiments, the patch 2262 may include a plurality of layers, in which an adhesive layer 2270 is sandwiched between a proximal surface 2272 of a base layer 2274 of the patch 2262 and the distal surface 2266 of the housing 2264. The adhesive layer 2270 may include a distal surface 2276 that may adhere to the proximal surface 2272 of the base layer 2274.

FIG. 61, for example, illustrates a cross sectional schematic view of the patch 2262, with the base layer 2274 shown separated from the adhesive layer 2270. The adhesive layer 2270 may include one or more sub-layers as desired. For example, the adhesive layer 2270 may include a carrier sub-layer 2280 that may be sandwiched between a proximal adhesive sub-layer 2282 and a distal adhesive sub-layer 2284. The proximal adhesive sub-layer 2282 may adhere to the distal surface 2266 of the housing 2264 (marked in FIG. 60). The distal adhesive sub-layer 2284 may adhere to the proximal surface 2272 of the base layer 2274. The carrier sub-layer 2280 may be breathable in embodiments. The carrier sub-layer 2280 may comprise a material such as polyethylene or another material as desired.

The base layer 2274 may include a backing or backing sub-layer 2286 and may include an adhesive or skin adhesive sub-layer 2288 positioned distal of the backing sub-layer. The backing sub-layer 2286 may be made of a material such as a non-woven material, among others. Such non-woven material may comprise a non-woven polyester or non-woven polyurethane, among others.

The adhesive layer 2270 may extend over the entirety of the distal surface 2266 of the housing 2264 (marked in FIG. 60) or may extend over only a portion of the distal surface 2266.

The base layer 2274 may protrude from the outer perimeter 2290 of the housing 2264 to form a skirt 2292 as shown in FIG. 60 for example. As such, the backing sub-layer 2286 may comprise a proximal surface of the patch 2262 outward of the housing 2264. In embodiments, the patch 2262 may not extend outward of the outer perimeter 2290 of the housing 2264 as shown in FIG. 58, or may be recessed from the outer perimeter 2290 of the housing as shown in FIG. 59.

The sole use of an adhesive to couple the patch 2262 to the housing 2264 may provide a variety of benefits. For example, reduced complexity in the manufacture of the on-skin wearable medical device may result. Methods such as heat staking or other forms of mechanical or friction attachment of the patch to the housing may be excluded as desired. Further, increased retention between the patch 2262 and the housing 2264 may result.

In embodiments, a method may include manufacturing an on-skin wearable medical device, with a patch being coupled solely with an adhesive. The method may include providing a housing. The method may include providing a patch, which may have an adhesive surface in a manner disclosed herein. The adhesive surface may be applied to the patch or an adhesive layer may be formed that may include an adhesive surface. For example, an adhesive layer 2270 as shown in FIG. 61 may be fabricated, which may include one or more adhesive sub-layers for coupling to the housing (and to the base layer 2274). A base layer 2274 may be fabricated. The base layer 2274 may be adhered to the adhesive layer 2270, and the adhesive layer 2270 may be adhered to a distal surface 2266 of the housing 2264. The patch 2262 may be pressed to the distal surface 2266 of the housing 2264 until the adhesive cures.

Steps in the method may be rearranged, excluded, or added to as desired.

In embodiments, the backing sub-layer 2286 may comprise a proximal surface of the patch 2262 outward of the housing 2264 (e.g., the skirt 2292 shown in FIG. 60). In embodiments, an additional layer may be provided upon the backing sub-layer 2286 to form an overlay upon the backing sub-layer 2286. The overlay may form a skirt positioned radially outward of an outer perimeter of a housing. For example, referring to FIG. 62, the base layer 2274 may be duplicated and adhered to itself to form an overlay 2300 upon the backing sub-layer 2286. The overlay 2300 may include a sub-layer 2302 that may comprise a duplicate of the skin adhesive sub-layer 2288. The sub-layer 2302 may adhere to the proximal surface of the backing sub-layer 2286. The overlay 2300 may include a sub-layer 2304 that may comprise a duplicate of the backing sub-layer 2286. The sub-layer 2304 may comprise the proximal surface of the assembled patch 2306 shown in FIG. 62. In embodiments, the overlay 2300 may surround an exposed portion 2308 of the patch 2262 that does not include the overlay 2300, and in which the backing sub-layer 2286 comprises the proximal surface of the patch 2262.

In embodiments, the overlay 2300 may be cut to match a shape of the outer perimeter of a housing. For example, FIG. 63 illustrates a top view of the patch 2306 shown in FIG. 62. The overlay 2300 is shown to be cut to produce an exposed portion 2308 having the shape of the outer perimeter of a housing. The patch 2306 may be applied to a distal surface of a housing with the overlay 2300 forming a skirt extending radially outward from the housing.

Figure 64:
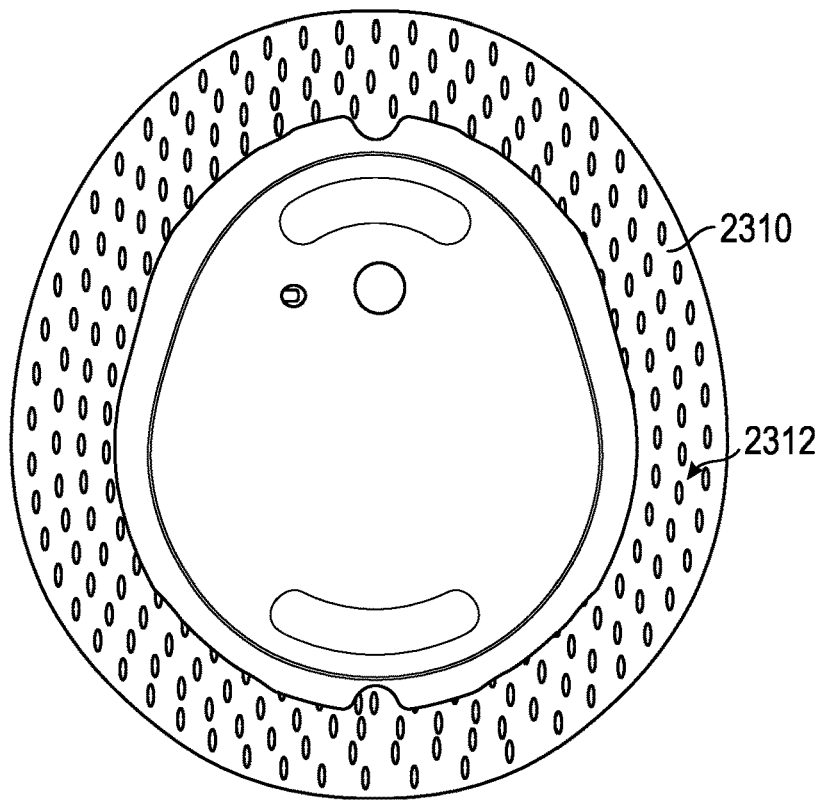
Figure 65:
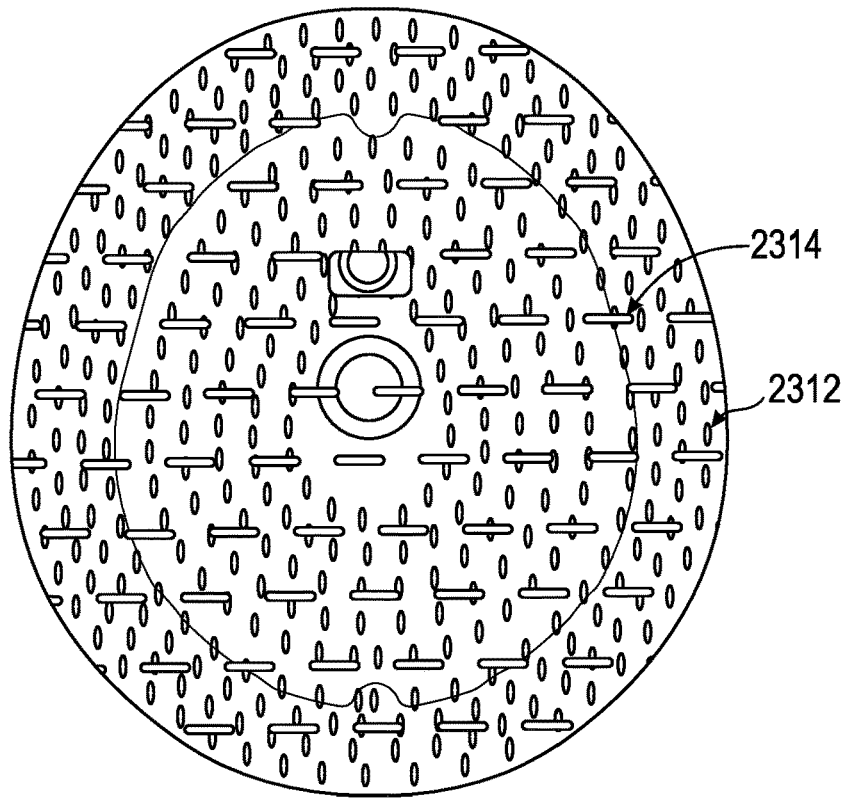

Materials that may comprise a patch may be varied in embodiments. For example, referring to FIG. 64, a patch 2310 may include a plurality of perforations 2312 as desired. FIG. 65, for example, illustrates a distal view of the on-skin wearable medical device shown in FIG. 64, in which the orientation of the perforations may vary (e.g., longitudinally aligned perforations and laterally aligned perforations 2314). Perforations may be utilized to enhance breathability of a patch disclosed herein.

Figure 66:
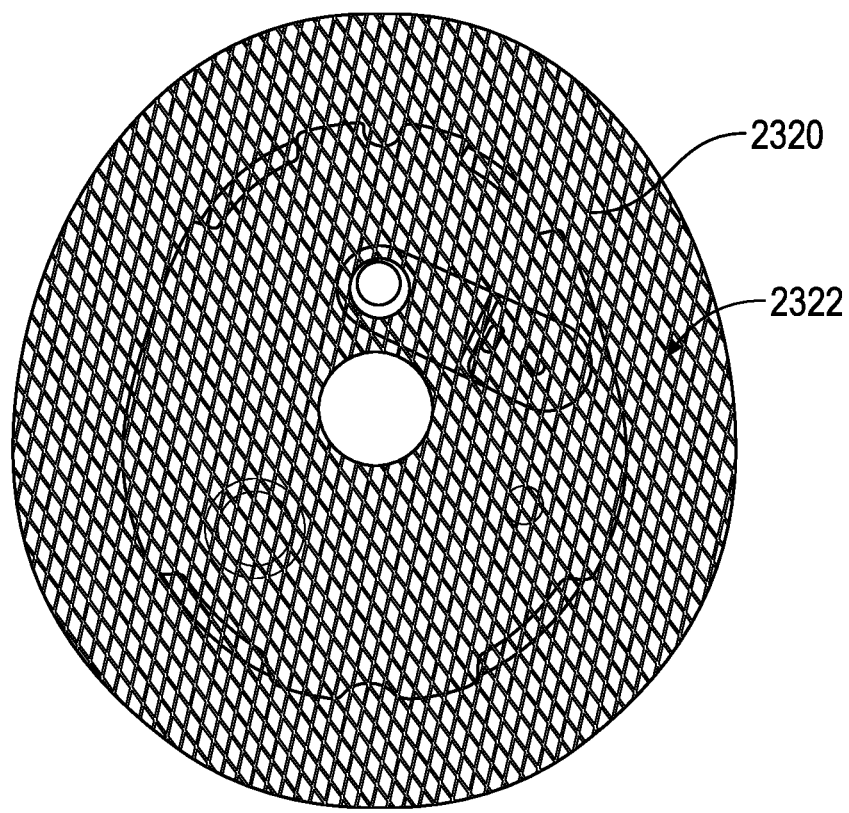

FIG. 66 illustrates an embodiment in which a patch 2320 may comprise a scrim. The patch 2320 may include a plurality of openings 2322 formed by the scrim, which may enhance a breathability of the patch 2320. In embodiments, the patches disclosed herein may include a skirt, or may not extend outward of the outer perimeter of the housing as represented in FIGS. 58 and 59 for example.

The features of FIGS. 58-66 may be utilized solely or with any method, system, or apparatus disclosed herein.

Embodiments of liner removal components disclosed herein may include a sheath that may cover at least a portion of a needle or at least a portion of a transcutaneous analyte sensor. The sheath may include one or more openings that may allow for exposure to an environment within an applicator housing. For example, referring to FIG. 27A, a sheath 1010 may include a plurality of openings for exposing the insertion element 915 or a transcutaneous analyte sensor to any sterilizing material such as sterilizing gas that may be utilized and may be positioned within the cavity 903 of the applicator housing.

In embodiments, a sheath may seal at least a portion of a needle or at least a portion of a transcutaneous analyte sensor. For example, FIG. 67 illustrates a distal perspective view of a liner removal component 2330 including a sheath 2332 for sealing at least a portion of a needle or at least a portion of a transcutaneous analyte sensor. The liner removal component 2330 may be configured similarly as embodiments of liner removal components disclosed herein, unless stated otherwise.

FIG. 68 illustrates a cross sectional schematic view of the liner removal component 2330 shown in FIG. 67. The sheath 2332 lacks openings about the insertion element 915 and transcutaneous analyte sensor 1920, unlike the embodiment shown in FIG. 27A. The sheath 2332 accordingly may impede a sterilizing gas or other material from contacting the insertion element 915 or transcutaneous analyte sensor 1920. Further, the coupling surfaces 2334 may form a ring about the aperture 2336 that the insertion element 915 and transcutaneous analyte sensor 1920 extend through. Such coupling surfaces 2334 may further seal the internal cavity 2338 surrounded by the sheath 2332 and that receives the insertion element 915 and transcutaneous analyte sensor 1920. A needle hub 2340 may include a sealing member such as a gasket 2342 configured to seal the internal cavity 2338. The gasket may comprise an o-ring in embodiments, or may have other forms. An embodiment as shown in FIG. 68 may be sterilized through non-gas methods, such as e-beam sterilization or other non-contact methods of sterilization.

The liner removal component 2330 may be removed at a desired time to breach the seal of the internal cavity 2338, and allow for insertion of the insertion element 915 and transcutaneous analyte sensor 1920 into the skin.

In embodiments, at least a portion of a sheath may include a layer configured to allow sterilizing gas to permeate through the layer to contact at least a portion of the insertion element 915 or at least a portion of the transcutaneous analyte sensor 1920. For example, referring to FIG. 69, a layer 2344 may be provided over an opening 2346 in a sheath 2348 that may otherwise be configured similarly as the sheath 2332 shown in FIG. 68. The layer 2344 may comprise a gas permeable layer, such as Tyvek or other form of gas permeable material that may allow for ingress into the internal cavity 2338 for sterilization of at least a portion of the insertion element 915 or at least a portion of the transcutaneous analyte sensor 1920.

FIG. 70 illustrates a variation of the embodiment shown in FIG. 69, in which a coupling surface 2350 such as an adhesive may be utilized to seal the connection between the on-skin sensor assembly 508 and the needle hub 914, and seal the internal cavity 2338. The gasket 2342 shown in FIG. 68 or 69 may accordingly be replaced by another form of sealing element.

FIG. 71 illustrates an embodiment of a liner removal component 2360 including an engagement portion 2362 configured to engage an outer surface of an applicator housing 2364 for retention of the liner removal component 2360 to the applicator housing 2364. The engagement portion 2362 may be configured to disengage from the outer surface of the applicator housing 2364 upon the liner removal component 2360 being axially pulled relative to the applicator housing 2364. For example, the engagement portion 2362 may comprise a press fit or friction fit with the applicator housing 2364. The engagement portion 2362 may include a snap-on or compression engagement with the applicator housing 2364. The liner removal component 2360 may be pulled axially from the applicator housing 2364, without rotation of the liner removal component 2360. As such, features such as screwing or unscrewing from threading may be excluded. The liner removal component 2360 may be pulled axially for removal, or may be pushed axially for recoupling with the applicator housing 2364 as desired.

In embodiments, a sheath 2366 of the liner removal component may be configured similarly as the sheath 2348 shown in FIGS. 69 and 70 for example. The sheath 2366 may seal an internal cavity 2368. A layer 2670 may be applied to the sheath 2366 that may seal an opening 2372 in the sheath 2366, and may be gas permeable in a similar manner as the layer 2344.

In embodiments, a stabilizing body 2374 may be provided that may stabilize a transcutaneous analyte sensor 1920 within a channel of the insertion element 915. The stabilizing body 2374, for example, may comprise a pin that may be removed with the removal of the liner removal component 2360 from the applicator housing 2364 or otherwise from the on-skin sensor assembly 508.

In embodiments, other forms of stabilizing bodies may be utilized. For example, FIG. 72 illustrates an embodiment in which an o-ring 2376 that surrounds the insertion element 915 may be utilized as a stabilizing body. The o-ring 2376 may be removed with the removal of the liner removal component 2378 from an applicator housing or otherwise from the on-skin sensor assembly 508.

FIG. 73 illustrates an embodiment of a liner removal component 2380 that shields a light sensor 2382 of an on-skin wearable medical device or the on-skin sensor assembly from light. The liner removal component 2380, for example, may include a light shield 2384 that may be opaque or otherwise blocks the type of light that the light sensor 2382 is configured to receive. A liner 2386 or one or more layers of the patch 2388 may include an opening for exposing the light sensor 2382 to the light.

The light sensor 2382 may be configured to activate or perform a wake-up operation for the on-skin sensor assembly. For example, the on-skin sensor assembly may be held in a low power state until a time of activation by the light sensor's 2382 exposure to light. In a storage or transport configuration, the liner removal component 2380 may be coupled to the patch 2388 via the liner 2386. The shield 2384 may block reception of light by the light sensor 2382 in such a storage or transport configuration.

At a desired time, the liner removal component 2380 may be removed from the applicator housing or otherwise from the on-skin sensor assembly. The shield 2384 may be removed from the light sensor 2382 to expose the sensor 2382 to light. The liner 2386 may be removed as well. Light may be incident upon the light sensor 2382 and an activation or wake up of the on-skin sensor assembly may occur.

In embodiments, the light sensor 2382 may be configured to detect a subsequent darkening or absence of light due to deployment to the skin of the host. For example, upon deployment to the skin of the host, the skin may block light from being received by the light sensor 2382. The light sensor 2382 may be configured to detect this subsequent darkening, and provide an electrical signal indicating that deployment of the on-skin sensor assembly has occurred.

Additional benefits of liner removal components disclosed herein may include support for the liner, to provide robustness for the on-skin device in case of drop or other shock. Such features may further reduce the possibility of the sensor becoming dislodged from the insertion element (e.g., a needle). Further protection against user contact with the insertion element may be provided as well in embodiments herein.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention. While the disclosure has been illustrated and described in detail in the drawings and foregoing description, such illustration and description are to be considered illustrative or exemplary and not restrictive.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article 'a' or 'an' does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases 'at least one' and 'one or more' to introduce claim recitations. However, the use of such phrases should not be construed to imply that the introduction of a claim recitation by the indefinite articles 'a' or 'an' limits any particular claim containing such introduced claim recitation to embodiments containing only one such recitation, even when the same claim includes the introductory phrases 'one or more' or 'at least one' and indefinite articles such as 'a' or 'an' (e.g., 'a' and/or 'an' should typically be interpreted to mean 'at least one' or 'one or more'); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of 'two recitations,' without other modifiers, typically means at least two recitations, or two or more recitations). Furthermore, in those instances where a convention analogous to 'at least one of A, B, and C, etc.' is used, in general such a construction is intended in the sense one having skill in the art would understand the convention (e.g., 'a system having at least one of A, B, and C' would include but not be limited to systems that have A alone, B alone, C alone, A and B together, A and C together, B and C together, and/or A, B, and C together, etc.). In those instances where a convention analogous to 'at least one of A, B, or C, etc.' is used, in general such a construction is intended in the sense one having skill in the art would understand the convention (e.g., 'a system having at least one of A, B, or C' would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase 'A or B' will be understood to include the possibilities of 'A' or 'B' or 'A and B.'

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A system comprising:
    an on-skin wearable medical device configured to be deployed to skin and including a patch having a first surface for engaging the skin;
    a liner positioned on the first surface;
    an applicator housing configured to retain the on-skin wearable medical device; and
    a liner removal component configured to engage the liner and at least partially decouple the liner from the first surface upon the liner removal component being at least partially withdrawn from the first surface, the liner removal component including a first portion for engaging the liner and a second portion that is spaced from the first portion.

2. The system of claim 1, wherein the first portion is configured to rotate relative to the second portion.

3. The system of claim 1, wherein the second portion is configured to be separated from the applicator housing.

4. The system of claim 1, wherein the second portion is configured to be unscrewed from the applicator housing to at least partially decouple the liner removal component from the applicator housing.

5. The system of claim 1, wherein the liner removal component includes one or more guides configured to prevent rotation of the first portion relative to the applicator housing upon the second portion rotating relative to the first portion.

6. The system of claim 1, wherein the liner removal component includes one or more bearing surfaces configured to couple the first portion to the second portion.

7. The system of claim 1, wherein the liner removal component includes one or more bearing surfaces configured to allow for rotation of the first portion relative to the second portion.

8. The system of claim 1, wherein the liner removal component includes one or more rotation couplers spaced from one or more bearing surfaces with a gap, and the one or more rotation couplers are configured to rotate relative to the one or more bearing surfaces.

9. The system of claim 8, wherein a rotation of the first portion relative to the second portion brings the one or more rotation couplers into contact with the one or more bearing surfaces.

10. The system of claim 9, wherein a first one of the rotation couplers is configured to contact the one or more bearing surfaces prior to a second one of the rotation couplers.

11. The system of claim 8, wherein the one or more rotation couplers include one or more arms.

12. The system of claim 11, wherein at least a portion of the liner removal component is configured to be assembled with the one or more arms deflected by the second portion.

13. The system of claim 1, further comprising a grip portion positioned at the second portion and configured to be gripped by a user to at least partially withdraw the liner removal component from the first surface of the on-skin wearable medical device.

14. The system of claim 1, further comprising an engagement portion positioned at the second portion and configured to engage a portion of the applicator housing to retain the liner removal component to the applicator housing.

15. The system of claim 14, wherein the engagement portion is configured to be rotated relative to the applicator housing to release the liner removal component from the applicator housing.

16. The system of claim 1, wherein a height of the first portion relative to the second portion is configured to be adjustable.

17. The system of claim 16, wherein the liner removal component includes a cam surface configured to adjust the height of the first portion relative to the second portion.

18. The system of claim 16, wherein the liner removal component includes one or more deflectable arms coupling the first portion to the second portion.

19. The system of claim 1, wherein the liner removal component includes a sheath for covering a needle.

20. The system of claim 1, wherein the liner removal component includes a spring configured to press against the on-skin wearable medical device, the spring configured to move the liner removal component away from the on-skin wearable medical device to at least partially decouple the liner from the first surface.

21. The system of claim 1, wherein the liner removal component is configured to peel the liner from the first surface upon the liner removal component being at least partially withdrawn from the first surface.

22. The system of claim 1, wherein the liner removal component comprises a cap.

23. The system of claim 1, wherein the liner removal component includes a sheath for sealing at least a portion of a needle or at least a portion of a transcutaneous analyte sensor.

24. The system of claim 1, wherein the liner removal component includes an engagement portion configured to engage an outer surface of the applicator housing for retention of the liner removal component to the applicator housing, the engagement portion configured to disengage from the outer surface upon the liner removal component being axially pulled relative to the applicator housing.

* * * * *